United States Patent
Morishita et al.

(10) Patent No.: US 10,953,631 B2
(45) Date of Patent: *Mar. 23, 2021

(54) HOT-DIP GALVANIZED STEEL SHEET

(71) Applicant: NIPPON STEEL CORPORATION, Tokyo (JP)

(72) Inventors: Atsushi Morishita, Tokyo (JP); Taihei Kaneto, Tokyo (JP); Satoshi Uchida, Tokyo (JP); Tatsuya Nakada, Tokyo (JP); Yuji Yamaguchi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/635,511

(22) PCT Filed: Jul. 31, 2017

(86) PCT No.: PCT/JP2017/027656
§ 371 (c)(1),
(2) Date: Jan. 30, 2020

(87) PCT Pub. No.: WO2019/026113
PCT Pub. Date: Feb. 7, 2019

(65) Prior Publication Data
US 2020/0156349 A1    May 21, 2020

(51) Int. Cl.
*B32B 15/01* (2006.01)
*C22C 38/28* (2006.01)
(Continued)

(52) U.S. Cl.
CPC ............ *B32B 15/013* (2013.01); *B32B 15/01* (2013.01); *B32B 15/012* (2013.01); *B32B 15/04* (2013.01);
(Continued)

(58) Field of Classification Search
CPC ..... B32B 15/01; B32B 15/013; B32B 15/012; B32B 15/04; B32B 15/043; B32B 15/18;
(Continued)

(56) References Cited

U.S. PATENT DOCUMENTS

| 6,558,815 B1 | 5/2003 | Suzuki et al. |
| 2004/0202889 A1 | 10/2004 | Fujita et al. |

(Continued)

FOREIGN PATENT DOCUMENTS

| JP | 9-176815 A | 7/1997 |
| JP | 11-140587 A | 5/1999 |

(Continued)

OTHER PUBLICATIONS

International Search Report for PCT/JP2017/027656 (PCT/ISA/210) dated Oct. 24, 2017.

(Continued)

*Primary Examiner* — Michael E. La Villa
(74) *Attorney, Agent, or Firm* — Birch, Stewart, Kolasch & Birch, LLP

(57) ABSTRACT

There is provided a hot-dip galvanized steel sheet with a microstructure in a ⅛ thickness to ⅜ thickness range whose middle is a ¼ thickness from a surface of a base steel sheet, the microstructure contains ferrite phase is 50% or more and 97% or less by volume fraction, and a predetermined phase wherein at an interface between a hot-dip galvanizing layer and the base steel sheet, a Fe—Al alloy layer has an average thickness of 0.1 μm to 2.0 μm, and a difference between a maximum thickness and a minimum thickness in a steel sheet width direction is within 0.5 μm, and in a fine-grain layer directly brought into contact with the Fe—Al alloy layer, the fine-grain has a difference between a maximum thickness and a minimum thickness of the fine-grain layer in the steel sheet width direction is within 2.0 μm.

8 Claims, 1 Drawing Sheet

(51) Int. Cl.

| | | |
|---|---|---|
| C22C 38/38 | (2006.01) | |
| C22C 38/26 | (2006.01) | |
| C22C 38/02 | (2006.01) | |
| C22C 38/00 | (2006.01) | |
| C22C 38/22 | (2006.01) | |
| C22C 38/08 | (2006.01) | |
| C22C 38/32 | (2006.01) | |
| C22C 38/16 | (2006.01) | |
| C22C 38/06 | (2006.01) | |
| C21D 9/46 | (2006.01) | |
| C21D 6/00 | (2006.01) | |
| C21D 8/02 | (2006.01) | |
| C22C 38/58 | (2006.01) | |
| C23C 2/06 | (2006.01) | |
| C23C 2/40 | (2006.01) | |
| C22C 38/54 | (2006.01) | |
| C22C 38/12 | (2006.01) | |
| C22C 38/48 | (2006.01) | |
| B32B 15/04 | (2006.01) | |
| B32B 15/18 | (2006.01) | |
| C22C 38/20 | (2006.01) | |
| C22C 38/40 | (2006.01) | |
| C22C 38/46 | (2006.01) | |
| C22C 38/44 | (2006.01) | |
| C22C 38/42 | (2006.01) | |
| C22C 38/24 | (2006.01) | |
| C22C 38/04 | (2006.01) | |
| C22C 38/18 | (2006.01) | |
| C22C 38/50 | (2006.01) | |
| C22C 38/14 | (2006.01) | |
| C23C 28/00 | (2006.01) | |
| C23C 2/26 | (2006.01) | |
| C23C 30/00 | (2006.01) | |
| C23C 28/02 | (2006.01) | |
| C23C 2/12 | (2006.01) | |
| C23C 2/28 | (2006.01) | |

(52) U.S. Cl.
CPC ............ *B32B 15/043* (2013.01); *B32B 15/18* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0263* (2013.01); *C21D 9/46* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/06* (2013.01); *C23C 2/12* (2013.01); *C23C 2/26* (2013.01); *C23C 2/28* (2013.01); *C23C 2/40* (2013.01); *C23C 28/025* (2013.01); *C23C 28/028* (2013.01); *C23C 28/3225* (2013.01); *C23C 30/00* (2013.01); *C23C 30/005* (2013.01); *C21D 2211/001* (2013.01); *C21D 2211/002* (2013.01); *C21D 2211/005* (2013.01); *C21D 2211/008* (2013.01); *Y10T 428/12757* (2015.01); *Y10T 428/12792* (2015.01); *Y10T 428/12951* (2015.01); *Y10T 428/12958* (2015.01); *Y10T 428/12972* (2015.01); *Y10T 428/12979* (2015.01)

(58) Field of Classification Search
CPC ....... C22C 38/00; C22C 38/58; C22C 38/001; C22C 38/002; C22C 38/02; C22C 38/06; C22C 38/08; C22C 38/16; C22C 38/22; C22C 38/26; C22C 38/28; C22C 38/32; C22C 38/38; C22C 38/04; C22C 38/12; C22C 38/14; C22C 38/18; C22C 38/20; C22C 38/24; C22C 38/40; C22C 38/42; C22C 38/44; C22C 38/46; C22C 38/48; C22C 38/50; C22C 38/54; C22C 38/004; C23C 30/00; C23C 30/005; C23C 2/06; C23C 2/40; C23C 2/12; C23C 2/26; C23C 2/28; C23C 28/3225; C23C 28/025; C23C 28/028; C21D 6/001; C21D 6/002; C21D 6/005; C21D 6/008; C21D 2211/001; C21D 2211/002; C21D 2211/005; C21D 2211/008; C21D 8/0205; C21D 8/0226; C21D 8/0263; C21D 9/46; Y10T 428/12757; Y10T 428/12792; Y10T 428/12951; Y10T 428/12958; Y10T 428/12972; Y10T 428/12979
See application file for complete search history.

(56) References Cited

U.S. PATENT DOCUMENTS

| | | |
|---|---|---|
| 2007/0051438 A1 | 3/2007 | Honda et al. |
| 2008/0035247 A1 | 2/2008 | Fujita et al. |
| 2009/0272467 A1 | 11/2009 | Fujita et al. |
| 2010/0112377 A1* | 5/2010 | Kaneko ............... C22C 38/06 428/659 |
| 2010/0304183 A1 | 12/2010 | Honda et al. |
| 2014/0287263 A1 | 9/2014 | Kawata et al. |
| 2017/0305114 A1 | 10/2017 | Kawata et al. |
| 2017/0313028 A1 | 11/2017 | Kawata et al. |
| 2017/0314115 A1 | 11/2017 | Kawata et al. |
| 2017/0314116 A1 | 11/2017 | Kawata et al. |
| 2020/0230918 A1* | 7/2020 | Morishita ............ C21D 9/46 |

FOREIGN PATENT DOCUMENTS

| | | |
|---|---|---|
| JP | 2001-26853 A | 1/2001 |
| JP | 2001-303226 A | 10/2001 |
| JP | 2002-88459 A | 3/2002 |
| JP | 2003-55751 A | 2/2003 |
| JP | 2003-96541 A | 4/2003 |
| JP | 2005-60742 A | 3/2005 |
| JP | 2005-60743 A | 3/2005 |
| JP | 2005-200750 A | 7/2005 |
| JP | 2008-19465 A | 1/2008 |
| JP | 2011-111675 A | 6/2011 |
| WO | WO 2013/047739 A1 | 4/2013 |
| WO | WO 2016/072477 A1 | 5/2016 |
| WO | WO 2016/072478 A1 | 5/2016 |
| WO | WO 2016/072479 A1 | 5/2016 |

OTHER PUBLICATIONS

Written Opinion of the International Searching Authority for PCT/JP2017/027656 (PCT/ISA/237) dated Oct. 24, 2017.

(56) References Cited

OTHER PUBLICATIONS

International Preliminary Report on Patentability and English translation of the Written Opinion of the International Searching Authority (forms PCT/IB/373. PCT/ISA/237 and PCT/IB/338), dated Feb. 13, 2020, for corresponding International Application No. PCT/JP2017/027656.

* cited by examiner

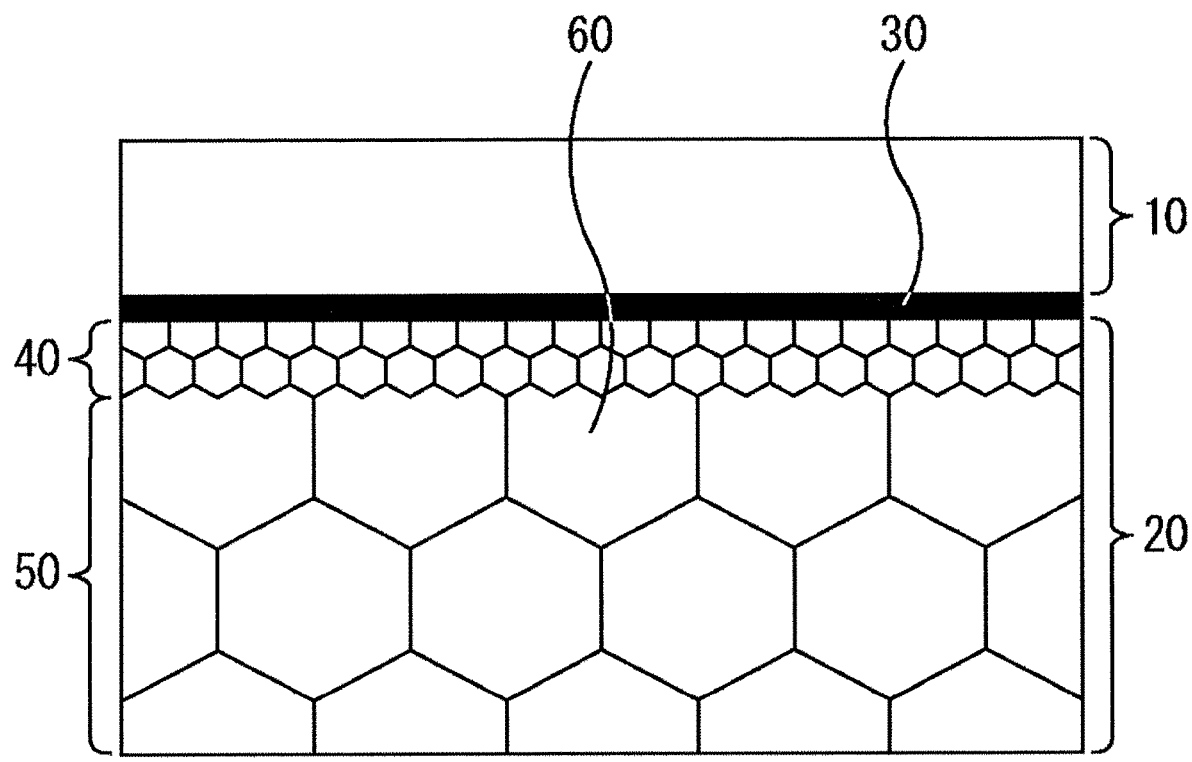

HOT-DIP GALVANIZED STEEL SHEET

TECHNICAL FIELD

The present invention relates to a high-strength hot-dip galvanized steel sheet excellent in ductility, bendability, hole expandability, and plating adhesion when performing bending deformation, and excellent in continuous bending fatigue resistance.

BACKGROUND ART

A demand for high-strengthening is increasing with respect to steel sheets mainly used as a framework member of an automobile. To these high-strength steel sheets, it is common to add alloying elements typified by Si and Mn that contribute to strength improvement, in order to obtain high strength and excellent formability. However, the alloying elements typified by Si and Mn also function to reduce plating adhesion.

Further, an automotive steel sheet is generally used outdoors, so that it is normally required to have excellent corrosion resistance.

Incidentally, for the purpose of usage such as an automotive outer panel, heavy-load bending (hem bending) is normally performed on a peripheral portion of the panel through presswork. Further, it is often the case that a steel sheet after being subjected to heavy-load bending, hole expanding, or the like by presswork is used not only in usage for the automotive outer panel but also in another usage. Further, when a conventional hot-dip galvanized steel sheet is subjected to the heavy-load bending, the hole expanding, or the like, a plating layer is sometimes peeled off a base steel sheet at the worked portion. When the plating layer is peeled off as described above, corrosion resistance of the peeled portion is lost, resulting in that corrosion and rusting occur in the base steel sheet at an early stage, which is a problem. Further, even if the peeling of the plating layer does not occur, when adhesion between the plating layer and the base steel sheet is lost, and even a slight gap is generated at that portion, the outside air or moisture enters the gap, resulting in that an anti-corrosion function provided by the plating layer is lost. As a result of this, corrosion and rusting occur in the base steel sheet at an early stage, similarly to the above.

Based on such problems, as a high-strength steel sheet used by being subjected to heavy-load bending or the like, a metal coated steel sheet including a hot-dip galvanizing layer excellent in adhesion of the plating layer with respect to a base steel sheet, is strongly desired.

In order to increase adhesion of a plating layer, there are proposed methods in which an oxide is generated inside a steel sheet to reduce an oxide, at an interface between base iron and the plating layer, which becomes a cause of plating peeling, as typified by Patent Literatures 1 to 3, for example. However, if such an oxide is generated in a steel sheet surface layer, carbon at the steel sheet surface layer bonds with oxygen to be turned into gas. As a result of this, carbon is released from the steel sheet, so that strength of a region from which the carbon is released is sometimes reduced significantly. When the strength of the steel sheet surface layer is reduced, there is a concern that fatigue resistance which strongly depends on the property of the surface layer portion deteriorates, and fatigue strength greatly reduces.

Alternatively, in order to increase adhesion of a plating layer, Patent Literature 4 proposes a method in which, before a general annealing step, a new annealing step and an acid pickling step are additionally performed to reform a surface of a base steel sheet, thereby increasing the plating adhesion. However, in the method described in Patent Literature 4, the number of steps is increased when compared to a general manufacturing method of a high-strength metal coated steel sheet, and thus there is a problem in terms of cost.

In addition, in Patent Literature 5, there is proposed a method in which carbon is removed from a surface layer portion of a base steel sheet to increase plating adhesion. However, in the method described in Patent Literature 5, strength of a region from which carbon is removed is reduced significantly. For this reason, in the method described in Patent Literature 5, there is a concern that fatigue resistance which strongly depends on the property of the surface layer portion deteriorates, and fatigue strength greatly reduces.

Further, in each of Patent Literatures 6 and 7, there is proposed a steel sheet in which amounts of Mn, Al, and Si in a plating layer are controlled to fall within suitable ranges, to thereby improve the plating adhesion. In each of the steel sheets described in Patent Literatures 6 and 7, there is a need to control the amounts of elements in the plating layer with high precision during manufacture, and thus an operational burden is large and there is a problem in terms of cost.

As a method of increasing the plating adhesion, Patent Literature 8 proposes a high-strength steel sheet in which a microstructure of the steel sheet is composed only of ferrite. However, in the steel sheet described in Patent Literature 8, since the microstructure is composed only of soft ferrite, sufficiently high strength cannot be obtained.

Here, a galvannealed steel sheet obtained by performing alloying treatment after hot-dip galvanizing treatment is widely used. The alloying treatment is treatment in which a plating layer is heated to a temperature equal to or higher than a melting point of Zn to diffuse a large quantity of Fe atoms from the inside of a base steel sheet into the plating layer, to thereby make the plating layer to be a layer mainly formed of a Zn—Fe alloy. For example, each of Patent Literatures 9, 10, and 11 proposes a galvannealed steel sheet excellent in plating adhesion. However, in order to sufficiently perform alloying on the plating layer, there is a need to heat the steel sheet to a high temperature. The heating of the steel sheet to a high temperature is not preferable since a microstructure inside the steel sheet is degenerated, a coarse iron-based carbide is likely to be generated in particular, and the property of the steel sheet is sometimes impaired.

Meanwhile, in a hot-dip galvanized steel sheet described in Patent Literature 12, an uneven appearance due to non-uniformity of a Fe content of a plating layer in a width direction sometimes occurs.

CITATION LIST

Patent Literature

Patent Literature 1: Japanese Laid-open Patent Publication No. 2008-019465
Patent Literature 2: Japanese Laid-open Patent Publication No. 2005-060742
Patent Literature 3: Japanese Laid-open Patent Publication No. 9-176815
Patent Literature 4: Japanese Laid-open Patent Publication No. 2001-026853
Patent Literature 5: Japanese Laid-open Patent Publication No. 2002-088459

Patent Literature 6: Japanese Laid-open Patent Publication No. 2003-055751

Patent Literature 7: Japanese Laid-open Patent Publication No. 2003-096541

Patent Literature 8: Japanese Laid-open Patent Publication No. 2005-200750

Patent Literature 9: Japanese Laid-open Patent Publication No. 11-140587

Patent Literature 10: Japanese Laid-open Patent Publication No. 2001-303226

Patent Literature 11: Japanese Laid-open Patent Publication No. 2005-060743

Patent Literature 12: International Publication Pamphlet No. WO 2016/072477

SUMMARY OF INVENTION

Technical Problem

In view of the present situation as described above, the present invention provides a high-strength hot-dip galvanized steel sheet excellent in formability of a steel sheet typified by ductility, bendability, and stretch flange formability, and excellent in plating appearance uniformity, fatigue resistance, weldability, corrosion resistance, and plating adhesion.

Solution to Problem

The present inventors repeatedly conducted earnest studies in order to obtain a high-strength hot-dip galvanized steel sheet excellent in formability of a steel sheet typified by ductility, bendability, and stretch flange formability, and excellent in fatigue resistance, weldability, corrosion resistance, and plating adhesion. As a result of this, the present inventors improved the ductility and hole expandability (stretch flangeability) by controlling a microstructure of the steel sheet to satisfy a proper structural fraction. Further, the present inventors improved the bendability and the fatigue resistance by controlling a volume fraction of a hard phase on a base steel sheet side from a boundary between a plating layer and the base steel sheet. In addition, the present inventors found out that even when a steel sheet containing large amounts of Si and Mn is used as a plating substrate, by making a specific fine-grain layer made of ultrafine grains of a ferrite phase to be formed right under a Fe—Al alloy layer formed at an interface between a plating layer and a base steel sheet, it is possible to suppress occurrence and spreading of crack during working, and it is possible to suppress plating peeling which starts from the crack. Further, it was found out that by controlling thicknesses of the fine-grain layer and the Fe—Al alloy layer in a steel sheet width direction to fall within specific ranges, it is possible to obtain a hot-dip galvanized steel sheet excellent in not only plating adhesion but also appearance uniformity.

The present invention was completed based on such findings, and modes thereof are as follows.

(1) A hot-dip galvanized steel sheet including a hot-dip galvanizing layer on at least one side of a base steel sheet, wherein:

the base steel sheet has chemical components containing, in mass %,

C: 0.040% to 0.280%,
Si: 0.05% to 2.00%,
Mn: 0.50% to 3.50%,
P: 0.0001% to 0.1000%,
S: 0.0001% to 0.0100%,
Al: 0.001% to 1.500%,
N: 0.0001% to 0.0100%,
O: 0.0001% to 0.0100%,
Ti: 0% to 0.150%,
Nb: 0% to 0.100%,
V: 0% to 0.300%,
Cr: 0% to 2.00%,
Ni: 0% to 2.00%,
Cu: 0% to 2.00%,
Mo: 0% to 2.00%,
B: 0% to 0.0100%,
W: 0% to 2.00%,
Ca, Ce, Mg, Zr, La, and REM: 0% to 0.0100% in total, and
a balance composed of Fe and impurities;
the base steel sheet has a microstructure in which:
in a 1/8 thickness to 3/8 thickness range whose middle is a 1/4 thickness of a total thickness of the base steel sheet from a surface of the base steel sheet,
ferrite phase is 50% or more and 97% or less by volume fraction,
a total of a hard structure comprising one or more of bainite phase, bainitic ferrite phase, fresh martensite phase, and tempered martensite phase is 3% or more by volume fraction,
retained austenite phase is 0% to 8% by volume fraction, and
a total of pearlite phase and coarse cementite phase is 0% to 8% by volume fraction;
in a surface layer portion from an interface between the hot-dip galvanizing layer and the base steel sheet up to a 20 μm depth in a steel sheet thickness direction,
retained austenite is 0% to 3% by volume fraction; and
V1/V2 being a ratio between a volume fraction V1 of the hard structure in the surface layer portion and a volume fraction V2 of the hard structure in the 1/8 thickness to 3/8 thickness range whose middle is the 1/4 thickness from the surface of the steel sheet, is set to fall within a range of 0.10 or more and 0.90 or less; and
in the hot-dip galvanizing layer, a Fe content is more than 0% and 3.0% or less, and an Al content is more than 0% and 1.0% or less,
the hot-dip galvanized steel sheet including:
at an interface between the hot-dip galvanizing layer and the base steel sheet, a Fe—Al alloy layer in which an average thickness is 0.1 μm to 2.0 μm, and a difference between a maximum thickness and a minimum thickness in a steel sheet width direction is within 0.5 μm; and
a fine-grain layer directly brought into contact with the Fe—Al alloy layer in the base steel sheet, the fine-grain layer with an average thickness of 0.1 μm to 5.0 μm, and an average grain diameter of 0.1 μm to 3.0 μm, the fine-grain layer containing an oxide of one or more of Si and Mn with a maximum diameter of 0.01 μm to 0.4 μm, and the fine-grain layer with a difference between a maximum thickness and a minimum thickness in the steel sheet width direction of within 2.0 μm.

(2) The hot-dip galvanized steel sheet according to (1), wherein a plating deposition amount per one side of the hot-dip galvanizing layer is 10 g/m² or more and 100 g/m² or less.

(3) The hot-dip galvanized steel sheet according to (1) or (2), wherein the base steel sheet further contains, in mass %, one or two or more selected from a group consisting of Ti: 0.001% to 0.150%,
Nb: 0.001% to 0.100%, and
V: 0.001% to 0.300%.

(4) The hot-dip galvanized steel sheet according to any one of (1) to (3), wherein the base steel sheet further contains, in mass %, one or two or more selected from a group consisting of Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

(5) The hot-dip galvanized steel sheet according to any one of (1) to (4), wherein the base steel sheet further contains, in mass %, one or two or more selected from a group consisting of Ca, Ce, Mg, Zr, La, and REM of 0.0001% to 0.0100% in total.

Advantageous Effects of Invention

According to the above-described modes of the present invention, it is possible to provide a hot-dip galvanized steel sheet excellent in plating appearance uniformity, formability, fatigue resistance, weldability, corrosion resistance, and plating adhesion.

BRIEF DESCRIPTION OF DRAWINGS

FIG. 1 is a diagram illustrating one example of a schematic diagram of a cross-sectional structure of a hot-dip galvanized steel sheet of the present invention.

DESCRIPTION OF EMBODIMENTS

A hot-dip galvanized steel sheet according to an embodiment of the present invention is realized by forming a hot-dip galvanizing layer (which is also simply referred to as a plating layer, hereinafter) on a surface of a base steel sheet (which is also simply referred to as a steel sheet, hereinafter) having chemical components containing, in mass %, C: 0.040% to 0.280%, Si: 0.05% to 2.00%, Mn: 0.50% to 3.50%, P: 0.0001% to 0.100%, S: 0.0001% to 0.0100%, Al: 0.001% to 1.500%, 0: 0.0001% to 0.0100%, N: 0.0001% to 0.0100%, and a balance composed of Fe and impurities.

Note that it is appropriate that a sheet thickness of the base steel sheet is 0.6 mm or more and less than 5.0 mm. The sheet thickness of the base steel sheet of less than 0.6 mm is not appropriate since it becomes difficult to keep a shape of the base steel sheet flat. Further, when the sheet thickness of the base steel sheet is 5.0 mm or more, there is a case where control of cooling in a manufacturing process becomes difficult, and a predetermined microstructure cannot be obtained, which deteriorates formability.

The plating layer has a Fe content of more than 0% and 3.0% or less, and an Al content of more than 0% and 1.0% or less.

First, chemical components (composition) of a base steel sheet that forms a hot-dip galvanized steel sheet according to an embodiment of the present invention will be described. Note that [%] in the description below means [mass %] unless otherwise noted.

(C: 0.040% to 0.280%)

C is contained in order to increase strength of the base steel sheet. However, when the C content exceeds 0.280%, spot weldability deteriorates, so that the C content is set to 0.280% or less. Note that from a viewpoint of spot weldability, the C content is preferably 0.250% or less, and more preferably 0.220% or less. On the other hand, when the C content is less than 0.040%, the strength is lowered and it becomes difficult to secure sufficient maximum tensile strength, so that the C content is set to 0.040% or more. Note that in order to further increase the strength, the C content is preferably 0.055% or more, and more preferably 0.070% or more.

(Si: 0.05% to 2.00%)

Si is an element which suppresses generation of iron-based carbide in the base steel sheet, to thereby increase strength and formability. However, Si is also an element which embrittles the steel material, and when the Si content exceeds 2.00%, a trouble such as cracking of a cast slab is likely to occur. For this reason, the Si content is set to 2.00% or less. Besides, Si forms an oxide in a surface of the base steel sheet in an annealing step to significantly impair plating adhesion. From this viewpoint, the Si content is preferably 1.500% or less, and more preferably 1.200% or less. On the other hand, when the Si content is less than 0.05%, large amounts of coarse iron-based carbides are generated in a plating step of the hot-dip galvanized steel sheet, which deteriorates the strength and the formability, so that the Si content is set to 0.05% or more. Note that from a viewpoint of suppression of the generation of iron-based carbide, the Si content is preferably 0.10% or more, and more preferably 0.25% or more.

(Mn: 0.50% to 3.50%)

Mn is contained to increase the strength by increasing hardenability of the base steel sheet. However, when the Mn content exceeds 3.50%, a coarse Mn concentrated portion is generated in a sheet thickness middle portion of the base steel sheet and the embrittlement is likely to occur, resulting in that a trouble such as cracking of a cast slab is likely to occur. For this reason, the Mn content is set to 3.50% or less. Further, when the Mn content is increased, the spot weldability of the hot-dip galvanized steel sheet also deteriorates. For this reason, the Mn content is preferably 3.00% or less, and more preferably 2.80% or less. On the other hand, when the Mn content is less than 0.50%, large amounts of soft structures are formed during cooling after annealing, and thus it becomes difficult to secure sufficiently high maximum tensile strength. Therefore, the Mn content is required to be set to 0.50% or more. In order to further increase the strength of the hot-dip galvanized steel sheet, the Mn content is preferably 0.80% or more, and more preferably 1.00% or more.

(P: 0.0001% to 0.1000%)

P is an element which embrittles the steel material, and further, when the P content exceeds 0.1000%, a trouble such as cracking of a cast slab or cracking of a slab during rolling is likely to occur, so that the P content is set to 0.1000% or less. Further, P is also an element which embrittles a molten portion generated by spot welding, and in order to obtain sufficient welded joint strength, the P content is preferably set to 0.0400% or less, and more preferably set to 0.0200% or less. Meanwhile, making the P content to less than 0.0001% leads to great increase in manufacturing cost, so that the P content employs 0.0001% as its lower limit value, and the P content is preferably set to 0.0010% or more.

(S: 0.0001% to 0.0100%)

S is an element which bonds with Mn to form coarse MnS to reduce formability such as ductility, hole expandability (stretch flangeability), and bendability, so that the S content is set to 0.0100% or less. Further, S is also an element which deteriorates the spot weldability. For this reason, the S content is preferably set to 0.0060% or less, and more preferably set to 0.0035% or less. On the other hand, making the S content to less than 0.0001% leads to great increase in manufacturing cost. For this reason, the S content employs 0.0001% as its lower limit value, and the S content is preferably set to 0.0005% or more, and more preferably set to 0.0010% or more.

(Al: 0.001% to 1.500%)

Al is an element which embrittles the steel material. When the Al content exceeds 1.500%, a trouble such as cracking of a cast slab is likely to occur, so that the Al content is set to 1.500% or less. Further, when the Al content is increased, the spot weldability deteriorates, so that the Al content is more preferably set to 1.200% or less, and still more preferably set to 1.000% or less. On the other hand, the effect of the present embodiment is exhibited even if a lower limit of the Al content is not defined in particular. However, Al is an impurity that slightly exists in a raw material, and making the Al content to less than 0.001% leads to great increase in manufacturing cost. For this reason, the Al content is set to 0.001% or more. Further, Al is an element which is effective also as a deoxidizing material, and in order to more sufficiently obtain the effect of deoxidation, the Al content is more preferably set to 0.010% or more.

(N: 0.0001% to 0.0100%)

N is an element which forms a coarse nitride to deteriorate the formability such as the ductility, the hole expandability (stretch flangeability), and the bendability, so that the N content is required to be suppressed. When the N content exceeds 0.0100%, the formability significantly deteriorates, so that an upper limit of the N content is set to 0.0100%. Further, when N is excessively contained, this leads to occurrence of blowholes at the time of welding, so that the N content is preferably small. From these viewpoints, the N content is preferably 0.0070% or less, and more preferably 0.0050% or less. On the other hand, although the effect of the present embodiment is exhibited without particularly defining a lower limit of the N content, making the N content to less than 0.0001% leads to great increase in manufacturing cost. For this reason, the lower limit of the N content is set to 0.0001% or more. The N content is preferably 0.0003% or more, and more preferably 0.0005% or more.

(O: 0.0001% to 0.0100%)

O forms an oxide to deteriorate the formability such as the ductility, the hole expandability (stretch flangeability), and the bendability of the hot-dip galvanized steel sheet, so that the O content is required to be suppressed. When the O content exceeds 0.0100%, the formability significantly deteriorates, so that an upper limit of the O content is set to 0.0100%. Further, the O content is preferably 0.0050% or less, and more preferably 0.0030% or less. Although the effect of the present embodiment is exhibited without particularly defining a lower limit of the O content, making the O content to less than 0.0001% leads to great increase in manufacturing cost, so that the lower limit is set to 0.0001%. The O content is preferably 0.0003% or more, and more preferably 0.0005% or more.

The base steel sheet of the hot-dip galvanized steel sheet according to the present embodiment may also contain the following elements, other than the above, according to need.

First, the base steel sheet according to the present embodiment may also further contain one or two or more selected from a group consisting of Ti: 0.001% to 0.150%, Nb: 0.001% to 0.100%, and V: 0.001% to 0.300%.

(Ti: 0.001% to 0.150%)

Ti is an element which contributes to strength increase of the hot-dip galvanized steel sheet by precipitate strengthening, strengthening by grain refinement by growth suppression of ferrite crystal grains, and dislocation strengthening through suppression of recrystallization. However, when the Ti content exceeds 0.150%, a carbonitride precipitates greatly to deteriorate the formability, so that the Ti content is set to 0.150% or less. Further, from a viewpoint of formability, the Ti content is preferably 0.080% or less. On the other hand, although the effect of the present embodiment is exhibited without particularly defining a lower limit of the Ti content, in order to sufficiently obtain the effect of strength increase provided by Ti, the Ti content is preferably 0.001% or more. In order to further increase the strength of the hot-dip galvanized steel sheet, the Ti content is more preferably 0.010% or more.

(Nb: 0.001% to 0.100%)

Nb is an element which contributes to strength increase of the hot-dip galvanized steel sheet by precipitate strengthening, strengthening by grain refinement by growth suppression of ferrite crystal grains, and dislocation strengthening through suppression of recrystallization. However, when the Nb content exceeds 0.100%, a carbonitride precipitates greatly to deteriorate the formability of the hot-dip galvanized steel sheet, so that the Nb content is set to 0.100% or less. From a viewpoint of formability, the Nb content is preferably 0.060% or less. On the other hand, although the effect of the present embodiment is exhibited without particularly defining a lower limit of the Nb content, in order to sufficiently obtain the effect of strength increase provided by Nb, the Nb content is preferably 0.001% or more. In order to further increase the strength of the hot-dip galvanized steel sheet, the Nb content is more preferably 0.005% or more.

(V: 0.001% to 0.300%)

V is an element which contributes to strength increase of the hot-dip galvanized steel sheet by precipitate strengthening, strengthening by grain refinement by growth suppression of ferrite crystal grains, and dislocation strengthening through suppression of recrystallization. However, when the V content exceeds 0.300%, a carbonitride precipitates greatly to deteriorate the formability. For this reason, the V content is set to 0.300% or less. The V content is preferably 0.200% or less. On the other hand, the effect of the present embodiment is exhibited without particularly defining a lower limit of the V content. In order to sufficiently obtain the effect of strength increase provided by V, the V content is preferably 0.001% or more, and more preferably 0.010% or more.

Besides, the base steel sheet according to the present embodiment may further contain one or two or more selected from a group consisting of Cr: 0.01% to 2.00%, Ni: 0.01% to 2.00%, Cu: 0.01% to 2.00%, Mo: 0.01% to 2.00%, B: 0.0001% to 0.0100%, and W: 0.01% to 2.00%.

(Cr: 0.01% to 2.00%)

Cr is an element which suppresses phase transformation at a high temperature and is effective for high-strengthening of the hot-dip galvanized steel sheet, and it may also be contained in place of a part of C and/or Mn. However, when the Cr content exceeds 2.00%, workability in hot working is impaired to reduce productivity, so that the Cr content is set to 2.00% or less. The Cr content is preferably 1.20% or less. On the other hand, although the effect of the present embodiment is exhibited without particularly defining a lower limit of the Cr content, in order to sufficiently obtain the effect of high-strengthening provided by Cr, the Cr content is preferably 0.01% or more, and more preferably 0.10% or more.

(Ni: 0.01% to 2.00%)

Ni is an element which suppresses phase transformation at a high temperature and is effective for high-strengthening of the hot-dip galvanized steel sheet, and it may also be contained in place of a part of C and/or Mn. However, when the Ni content exceeds 2.00%, weldability is impaired, so that the Ni content is set to 2.00% or less. The Ni content is preferably 1.20% or less. On the other hand, although the effect of the present embodiment is exhibited without particularly defining a lower limit of the Ni content, in order to sufficiently obtain the effect of high-strengthening provided by Ni, the Ni content is preferably 0.01% or more, and more preferably 0.10% or more.

(Cu: 0.01% to 2.00%)

Cu is an element which exists as fine grains in the steel, to thereby increase the strength of the hot-dip galvanized steel sheet, and it can be contained in place of a part of C and/or Mn. However, when the Cu content exceeds 2.00%, the weldability is impaired, so that the Cu content is set to 2.00% or less. The Cu content is preferably 1.20% or less. On the other hand, although the effect of the present embodiment is exhibited without particularly defining a lower limit of the Cu content, in order to sufficiently obtain the effect of high-strengthening of the hot-dip galvanized steel sheet provided by Cu, the Cu content is preferably 0.01% or more, and more preferably 0.10% or more.

(Mo: 0.01% to 2.00%)

Mo is an element which suppresses phase transformation at a high temperature and is effective for high-strengthening of the hot-dip galvanized steel sheet, and it may also be contained in place of a part of C and/or Mn. However, when the Mo content exceeds 2.00%, workability in hot working is impaired to reduce productivity, so that the Mo content is set to 2.00% or less. The Mo content is preferably 1.20% or less. On the other hand, although the effect of the present embodiment is exhibited without particularly defining a lower limit of the Mo content, in order to sufficiently obtain the effect of high-strengthening provided by Mo, the Mo content is preferably 0.01% or more, and more preferably 0.05% or more.

(B: 0.0001% to 0.0100%)

B is an element which suppresses phase transformation at a high temperature and is effective for high-strengthening of the hot-dip galvanized steel sheet, and it may also be contained in place of a part of C and/or Mn. However, when the B content exceeds 0.0100%, workability in hot working is impaired to reduce productivity, so that the B content is set to 0.0100% or less. From a viewpoint of productivity, the B content is preferably 0.0050% or less. On the other hand, although the effect of the present embodiment is exhibited without particularly defining a lower limit of the B content, in order to sufficiently obtain the effect of high-strengthening provided by B, the B content is preferably set to 0.0001% or more. In order to further increase the strength of the hot-dip galvanized steel sheet, the B content is more preferably 0.0005% or more.

(W: 0.01% to 2.00%)

W is an element which suppresses phase transformation at a high temperature and is effective for high-strengthening of the hot-dip galvanized steel sheet, and it may also be contained in place of a part of C and/or Mn. However, when the W content exceeds 2.00%, workability in hot working is impaired to reduce productivity, so that the W content is set to 2.00% or less. The W content is preferably 1.20% or less. On the other hand, although the effect of the present embodiment is exhibited without particularly defining a lower limit of the W content, in order to sufficiently realize high-strengthening with the use of W, the W content is preferably 0.01% or more, and more preferably 0.10% or more.

The base steel sheet of the hot-dip galvanized steel sheet of the present embodiment may further contain, as other elements, one or two or more selected from a group consisting of Ca, Ce, Mg, Zr, La, and REM of 0.0001% to 0.0100% in total. The reason of containing these elements is as follows. Note that REM is an abbreviation of Rare Earth Metal, and indicates an element which belongs to lanthanide series. In the embodiment of the present invention, REM and Ce are often contained in a form of mischmetal, and there is a case where other than La and Ce, elements in the lanthanide series are contained in a complex form. Even if these elements in the lanthanide series other than La and Ce are contained as impurities, the effect of the present embodiment is exhibited. Further, the effect of the present embodiment is exhibited even if metal La or Ce is contained.

Ca, Ce, Mg, Zr, La, and REM are elements which are effective for improving the formability of the hot-dip galvanized steel sheet, and one or two or more thereof can be contained. However, when a total content of one or two or more selected from a group consisting of Ca, Ce, Mg, Zr, La, and REM exceeds 0.0100%, the ductility may be impaired, so that the total content of the respective elements is set to 0.0100% or less. The total content of these respective elements is preferably 0.0070% or less. On the other hand, although the effect of the present embodiment is exhibited even if a lower limit of the content of one or two or more selected from a group consisting of Ca, Ce, Mg, Zr, La, and REM is not defined in particular, in order to sufficiently obtain the effect of improving the formability of the hot-dip galvanized steel sheet, the total content of these respective elements is preferably 0.0001% or more. From a viewpoint of formability, the total content of one or two or more selected from a group consisting of Ca, Ce, Mg, Zr, La, and REM is more preferably 0.0010% or more.

The balance of the respective elements explained above in the chemical components of the hot-dip galvanized steel sheet according to the present embodiment, is Fe and impurities. Note that regarding the aforementioned Ti, Nb, V, Cr, Ni, Cu, Mo, B, and W, a slight amount of less than the above-described lower limit value of each of them is allowed to be contained as impurities. Further, also regarding Ca, Ce, Mg, Zr, La, and REM, an extremely slight amount of less than the lower limit value of the total amount thereof is allowed to be contained as impurities.

The reason why the structure of the base steel sheet of the hot-dip galvanized steel sheet according to the embodiment of the present invention is defined is as follows.

(Microstructure)

A microstructure of the base steel sheet of the hot-dip galvanized steel sheet according to the embodiment of the present invention will be described. Although the property of the steel material is changed depending on the microstructure, when the microstructure is quantified, it is not realistic to quantify to define the microstructure over the entire region of the steel material. For this reason, in the present invention, a microstructure in $1/8$ thickness to $3/8$ thickness whose middle is a $1/4$ thickness from a surface of the base steel sheet, indicating a typical microstructure of the steel material, is quantified to be defined. In a sheet thickness middle portion, a microstructure changes due to strong solidification segregation, and thus the microstructure cannot be said as a typical microstructure of the steel sheet. In a portion close to a surface layer of the steel sheet, a microstructure changes due to a local temperature change or a reaction with outside air, and thus the microstructure cannot be said as a typical microstructure of the steel sheet.

The microstructure in the base steel sheet of the hot-dip galvanized steel sheet according to the embodiment of the present invention includes, in a $1/8$ thickness to $3/8$ thickness range whose middle is a $1/4$ thickness from a surface of the base steel sheet, ferrite phase (referred to as ferrite, hereinafter) of 50% or more and 97% or less by volume fraction, a total of a hard structure comprising one or more of bainite phase (referred to as bainite, hereinafter), bainitic ferrite phase (referred to as bainitic ferrite, hereinafter), fresh martensite phase (referred to as fresh martensite, hereinafter), and tempered martensite phase (referred to as tempered martensite, hereinafter) of 3% or more by volume fraction, retained austenite phase (referred to as retained austenite, hereinafter) of 0% to 8% (including 0%) by volume fraction, and a total of pearlite phase (referred to as pearlite, hereinafter) and coarse cementite phase (referred to as cementite, hereinafter) of 0% to 8% (including 0%) by volume fraction.

"Ferrite"

The ferrite is a structure having excellent ductility. However, the ferrite is soft and thus it has low strength, so that when the volume fraction of the ferrite is set to exceed 97%, it is impossible to obtain a hot-dip galvanized steel sheet with sufficient maximum tensile strength. For this reason, the volume fraction of the ferrite is set to 97% or less. In order to increase the maximum tensile strength of the hot-dip galvanized steel sheet, the volume fraction of the ferrite is preferably set to 92% or less, and more preferably set to 85% or less. Further, in order to obtain a hot-dip galvanized steel sheet whose maximum tensile strength exceeds 950 MPa, the volume fraction of the ferrite is more preferably set to 80% or less, and still more preferably set to 70% or less. On the other hand, when the volume fraction of the ferrite is less than 50%, sufficient ductility cannot be obtained, so that the volume fraction of the ferrite is set to 50% or more. The volume fraction of the ferrite is preferably set to 55% or more, and is more preferably 60% or more.

"Retained Austenite"

The retained austenite is a structure which increases a balance between strength and ductility of the hot-dip galvanized steel sheet. On the other hand, the retained austenite is transformed into hard martensite in accordance with deformation, to function as a starting point of breakage, which deteriorates stretch flangeability, so that an upper limit of a volume fraction of the retained austenite is set to 8%. From a viewpoint of formability of the hot-dip galvanized steel sheet, the volume fraction of the retained austenite is preferably small, and the volume fraction is preferably set to 5% or less, and more preferably set to 0% to 3% (including 0%). The volume fraction of the retained austenite of the hot-dip galvanized steel sheet is preferably as small as possible, and it may be 0%.

"Hard Structure"

In order to increase the maximum tensile strength of the hot-dip galvanized steel sheet, there is a need to set a volume fraction of the hard structure made of one or more of the bainite, the bainitic ferrite, the fresh martensite, and the tempered martensite to 3% or more in total. In order to increase the maximum tensile strength of the hot-dip galvanized steel sheet, the volume fraction of the hard structure is preferably set to 7% or more, and more preferably set to 15% or more. On the other hand, when the volume fraction of the hard structure is excessively increased, the ductility of the hot-dip galvanized steel sheet deteriorates, so that the volume fraction of the hard structure is limited to 60% or less. From this viewpoint, the volume fraction of the hard structure is preferably set to 55% or less, and is more preferably 50% or less.

"Bainitic Ferrite and Bainite"

The bainitic ferrite and the bainite are structures excellent in balance between the strength and the formability of the hot-dip galvanized steel sheet, and it is preferable that the steel sheet structure contains the bainitic ferrite and/or the bainite of 60% or less by volume fraction. Further, the bainitic ferrite and the bainite are microstructures having strength in the middle of soft ferrite and hard martensite and in the middle of the tempered martensite and the retained austenite, and from a viewpoint of stretch flangeability, the bainitic ferrite and the bainite are more preferably contained by 5% or more, and still more preferably contained by 10% or more. On the other hand, the volume fraction of the bainitic ferrite and/or the bainite exceeding 60% is not preferable since there is a concern that yield stress is excessively increased and shape fixability deteriorates.

"Tempered Martensite"

The tempered martensite is a structure which greatly improves tensile strength of the hot-dip galvanized steel sheet, and it may be contained in the steel sheet structure by 60% or less by volume fraction. From a viewpoint of tensile strength, the volume fraction of the tempered martensite is preferably set to 5% or more. On the other hand, the volume fraction of the tempered martensite contained in the steel sheet structure exceeding 60% is not preferable since there is a concern that yield stress is excessively increased and shape fixability deteriorates.

"Fresh Martensite"

The fresh martensite greatly improves tensile strength of the hot-dip galvanized steel sheet, but, on the other hand, it becomes a starting point of breakage, leading to deterioration of stretch flangeability, so that the fresh martensite is preferably contained in the steel sheet structure by 30% or less by volume fraction. In order to increase hole expandability in particular, the volume fraction of the fresh martensite is more preferably set to 20% or less, and still more preferably set to 10% or less.

"Other Microstructures"

The steel sheet structure of the hot-dip galvanized steel sheet according to the embodiment of the present invention may also contain structures other than the above, such as the pearlite and/or the coarse cementite. However, when a proportion of the pearlite and/or the coarse cementite in the steel sheet structure of the hot-dip galvanized steel sheet becomes large, ductility deteriorates. Based on the above, the volume fraction of the pearlite and/or the coarse cementite contained in the steel sheet structure is set to 8% or less in total. Note that the volume fraction of the pearlite and/or the coarse cementite is preferably 5% or less in total.

Further, in the steel sheet structure of the hot-dip galvanized steel sheet according to the embodiment of the present invention, in a surface layer portion starting from an interface between the plating layer and the base steel sheet (base iron) up to a 20 µm depth in a steel sheet thickness direction, the volume fraction of the retained austenite is limited to 3% or less, and a volume fraction "V1" of the hard structure in the surface layer portion is in a range of 0.10 times or more and 0.90 times or less of a volume fraction "V2" of the hard structure in a ⅛ thickness to ⅜ thickness whose middle is a ¼ thickness from the steel sheet surface.

"Retained Austenite in the Vicinity of Interface Between Plating Layer and Base Iron"

The retained austenite which exists in the vicinity of the interface between the plating layer and the base steel sheet of the hot-dip galvanized steel sheet is transformed into hard martensite in accordance with deformation, to function as a starting point of breakage when bending deformation in which large strain is applied to the vicinity of the surface of the hot-dip galvanized steel sheet is performed, and thus the retained austenite is a structure which contributes to deterioration of bendability and fatigue resistance. From this viewpoint, in the surface layer portion starting from the interface between the plating layer and the base steel sheet up to the 20 µm depth in the steel sheet thickness direction, there is a need to limit the volume fraction of the retained austenite to 0% to 3% (including 0%). Note that the volume fraction of the retained austenite in the surface layer portion is preferably as low as possible, and it may also be 0%.

"Hard Structure in the Vicinity of Interface Between Plating Layer and Base Iron"

The hard structure which exists in the vicinity of the interface between the plating layer and the base steel sheet (base iron) of the hot-dip galvanized steel sheet is a structure which increases hardness in the surface layer portion of the hot-dip galvanized steel sheet, and contributes to improvement of fatigue resistance by greatly improving fatigue limit strength. From this viewpoint, when the volume fraction of the hard structure in the surface layer portion starting from the interface between the plating layer and the base iron up to the 20 µm depth in the steel sheet thickness direction is set to "V1" and the total volume fraction in the ⅛ thickness to ⅜ thickness range whose middle is the ¼ thickness from the surface of the steel sheet is set to "V2", there is a need to set V1/V2 being a ratio thereof to 0.10 or more, to thereby sufficiently increase strength in the surface layer portion of the hot-dip galvanized steel sheet. Note that in order to sufficiently improve the fatigue resistance, V1/V2 is preferably 0.20 or more, more preferably 0.30 or more, and still more preferably 0.40 or more. On the other hand, it is also possible to improve bendability by suppressing a fraction of the hard structure in the surface layer portion starting from the interface between the plating layer and the base iron up to the 20 µm depth in the steel sheet thickness direction to a certain degree to lower strength in the vicinity of the surface of the hot-dip galvanized steel sheet, to thereby improve local ductility. From this viewpoint, in order to obtain good bendability, V1/V2 is set to 0.90 or less, preferably set to 0.85 or less, and more preferably set to 0.80 or less.

Besides, in the surface layer portion starting from the interface between the plating layer and the base iron of the hot-dip galvanized steel sheet according to the present embodiment up to the 20 µm depth in the steel sheet thickness direction, a fine oxide containing Si and/or Mn may also be contained at a BCC crystal grain boundary of iron and/or inside crystal grain. By making the fine oxide to be previously generated inside the steel sheet being the surface layer portion, it is possible to suppress generation of an oxide containing Si and/or Mn at the steel sheet surface to be a starting point of peeling of the plating layer, namely, at the interface between the plating layer and the base steel sheet.

The volume fractions of the respective structures contained in the base steel sheet of the hot-dip galvanized steel sheet according to the embodiment of the present invention can be measured by the following method, for example.

The volume fractions of the ferrite, the bainitic ferrite, the bainite, the tempered martensite, the fresh martensite, the pearlite, and the coarse cementite contained in the steel sheet structure of the hot-dip galvanized steel sheet of the present invention can be measured by using the following method. First, a sample whose observation surface is a thicknesswise cross section parallel to the rolling direction of the steel sheet is collected, the observation surface is polished and nital-etched. Subsequently, each of the ⅛ thickness to ⅜ thickness range whose middle is ¼ of the sheet thickness, and the range starting from the interface between the plating layer and the base steel sheet (base iron) up to the 20 µm depth in the steel sheet thickness direction is observed with a field emission scanning electron microscope (FE-SEM) to measure area fractions, which can be regarded as the volume fractions. However, when the plating layer is removed by the nital etching, there is no problem if a surface of the sample is regarded as the interface between the plating layer and the base iron.

The volume fraction of the retained austenite contained in the steel sheet structure of the hot-dip galvanized steel sheet of the present embodiment is evaluated by performing high-resolution crystal orientation analysis using an EBSD (Electron Bach-Scattering Diffraction) method. First, a thicknesswise cross section parallel to a rolling direction is finished into a mirror surface, and in a ⅛ thickness to ⅜ thickness range whose middle is a ¼ thickness from a surface of a base steel sheet and a range starting from an interface between a plating layer and base iron up to a 20 µm depth in a steel sheet thickness direction, crystal orientations are measured in a region of 10000 µm$^2$ or more in total at a measurement step of 0.15 µm or less. Subsequently, it is determined that each measurement point is either iron of BCC (body-centered cubic structure) or iron of FCC (face-centered cubic structure), in which a point determined as the FCC iron is set as the retained austenite, and an area fraction of the retained austenite is measured, which can be defined as the volume fraction. Note that when a sufficiently wide region is measured, the area fraction becomes equivalent to the volume fraction, so that in the above-described case, by measuring the crystal orientations in the region of 10000 µm$^2$ or more in total, the area fraction of the retained austenite can be defined as the volume fraction.

As illustrated in FIG. 1, the hot-dip galvanized steel sheet of the present embodiment has a Fe—Al alloy layer 30 at an interface between a hot-dip galvanizing layer 10 and a base steel sheet 20, and in the base steel sheet 20, there are provided a fine-grain layer 40 and a decarburized layer 50 to be described below.

As will be described later, the fine-grain layer and the decarburized layer are layers which are generated when a decarburization reaction progresses under a condition where a temperature region and an atmosphere in an annealing step are controlled to a specific temperature region and a specific atmosphere. For this reason, a constituent phase in the fine-grain layer and the decarburized layer is practically a structure mainly formed of a ferrite phase 60, except an oxide and inclusion particles. Concretely, a layer in which the volume fraction of the ferrite phase is 70% or more, and the balance of the structure is composed of a mixed structure occupied by one or two or more of the austenite phase, the bainite phase, the martensite phase, and the pearlite phase, is indicated.

Regarding the definition of the fine-grain layer, when an average grain diameter of the ferrite phase in an outermost portion of the base steel sheet is ½ or less of an average grain diameter of the ferrite phase in the decarburized layer, it is defined that the fine-grain layer exists. A boundary where the average grain diameter of the ferrite phase in the fine-grain layer becomes more than ½ of the average grain diameter of the ferrite phase in the decarburized layer, is defined as a boundary between the fine-grain layer and the decarburized layer.

The fine-grain layer is directly brought into contact with the above-described Fe—Al alloy layer. An average thickness of the fine-grain layer is 0.1 µm to 5.0 µm, an average grain diameter of the ferrite phase in the fine-grain layer is 0.1 µm to 3.0 µm, an oxide of one or more of Si and Mn is contained in the fine-grain layer, and the maximum diameter of the oxide is 0.01 µm to 0.4 µm.

The average thickness of the fine-grain layer is 0.1 μm to 5.0 μm. When the average thickness of the fine-grain layer is less than 0.1 the effect of suppressing the occurrence and the extension of crack cannot be obtained, and thus the effect of improving the plating adhesion cannot be obtained. When the average thickness of the fine-grain layer exceeds 5.0 alloying of the plating layer (generation of Zn—Fe alloy) progresses, resulting in that a Fe content in the plating layer becomes large, and the plating adhesion reduces. The average thickness of the fine-grain layer is preferably 0.2 μm to 4.0 μm, and more preferably 0.3 μm to 3.0 μm.

A difference between the maximum thickness and the minimum thickness of the fine-grain layer in a steel sheet width direction is preferably within 2.0 μm. Here, the maximum thickness and the minimum thickness of the fine-grain layer in the steel sheet width direction indicate the maximum thickness and the minimum thickness in results of measurement which is performed in a manner that thicknesses of the fine-grain layer at eight places in total, which are, positions separated by 50 mm from both edges and positions as a result of dividing a gap therebetween into seven equal parts, are respectively measured. The larger the thickness of the fine-grain layer, the more the alloying of the plating layer (the generation of Zn—Fe alloy) is likely to progress, so that when the difference in thickness of the fine-grain layer in the steel sheet width direction is large, this may cause uneven alloying and exert an adverse effect on plating adhesion and plating appearance uniformity. From a viewpoint of the plating adhesion and the plating appearance uniformity, the difference between the maximum thickness and the minimum thickness of the fine-grain layer in the steel sheet width direction is preferably 1.5 μm or less, and more preferably 1.0 μm or less.

The average grain diameter of the ferrite phase in the fine-grain layer is 0.1 μm to 3.0 μm. When the average grain diameter of the ferrite phase is less than 0.1 the effect of suppressing the occurrence and the extension of crack cannot be obtained, and thus the effect of improving the plating adhesion cannot be obtained. When the average grain diameter of the ferrite phase exceeds 3.0 μm, the effect of improving the plating adhesion cannot be obtained. A preferable average grain diameter of the ferrite phase is 0.1 μm to 2.0 μm.

As the oxide of one or more of Si and Mn contained in the fine-grain layer, there can be cited one or two or more selected from $SiO_2$, $Mn_2SiO_4$, $MnSiO_3$, $Fe_2SiO_4$, $FeSiO_3$, and MnO, for example.

The maximum diameter of the oxide of one or more of Si and Mn contained in the fine-grain layer is 0.01 μm to 0.4 μm, As will be described later, the oxide is formed inside the base steel sheet in a specific temperature region during annealing, and by the oxide particle, growth of ferrite phase crystal in the base steel sheet surface layer is suppressed, and the fine-grain layer is formed. When the maximum diameter of the oxide is less than 0.01 the fine-grain layer cannot be sufficiently formed, which reduces the plating adhesion. When the maximum diameter of the oxide exceeds 0.4 μm, the ferrite phase becomes coarse, formation of the fine-grain layer is insufficient, and the oxide itself becomes a starting point of plating peeling, and thus the plating adhesion reduces. A preferable range of the maximum diameter of the oxide is 0.05 μm to 0.2 μm.

The average thickness of the fine-grain layer and the average grain diameter of the ferrite phase in the fine-grain layer are measured by the following method. A sample is collected from a hot-dip galvanized steel sheet with a thicknesswise cross section parallel to a rolling direction of a base steel sheet set as an observation surface. The observation surface of the sample is worked with a CP (Cross section polisher) device, and a reflected electron image in FE-SEM (Field Emission Scanning Electron Microscopy) is observed at 5000 magnifications to be measured.

The maximum diameter of the oxide of one or more of Si and Mn contained in the fine-grain layer is measured by the following method. From the hot-dip galvanized steel sheet, samples whose observation surfaces are thicknesswise cross sections parallel to the rolling direction of the base steel sheet are collected. The observation surfaces of the samples are worked with FIB (Focused Ion Beam) to produce thin film samples. After that, the thin film samples are observed at 30000 magnifications by using FE-TEM (Field Emission Transmission Electron Microscopy). Each thin film sample is observed in five fields of view, and the maximum value of the diameter of the oxide measured in all the fields of view is set as the maximum diameter of the oxide in the thin film sample.

(Fe—Al Alloy Layer)

In the embodiment of the present invention, a Fe—Al alloy layer is formed at an interface between the plating layer and the steel sheet. By forming the Fe—Al alloy layer, alloying of the plating layer (generation of Zn—Fe alloy) is suppressed, and it is possible to suppress the reduction of plating adhesion. Besides, it is also possible to suppress occurrence of uneven appearance caused by uneven alloying. The uneven appearance caused by the uneven alloying is likely to occur more on a hot-dip galvanized steel sheet which is not subjected to alloying treatment, than a galvannealed steel sheet obtained by performing alloying treatment after hot-dip galvanizing treatment. A thickness of the Fe—Al alloy layer is set to 0.1 μm to 2.0 μm. When the thickness is less than 0.1 μm, the plating adhesion and the appearance sometimes deteriorate, and if it exceeds 2.0 μm, the plating adhesion is sometimes reduced. The thickness is preferably 0.1 μm to 1.0 μm.

A difference between the maximum thickness and the minimum thickness of the above-described Fe—Al alloy layer in the steel sheet width direction is set to fall within 0.5 μm. Here, the maximum thickness and the minimum thickness of the Fe—Al alloy layer in the steel sheet width direction indicate the maximum thickness and the minimum thickness in results of measurement which is performed in a manner that thicknesses of the Fe—Al alloy layer at eight places in total, which are, positions separated by 50 mm from both edges and positions as a result of dividing a gap therebetween into seven equal parts, are respectively measured. The smaller the thickness of the Fe—Al alloy layer, the more the alloying of the plating layer (the generation of Zn—Fe alloy) is likely to progress, so that when the difference in thickness of the Fe—Al alloy layer in the steel sheet width direction is large, this may cause uneven alloying and exert an adverse effect on plating adhesion and plating appearance uniformity. From a viewpoint of the plating adhesion and the plating appearance uniformity, the difference between the maximum thickness and the minimum thickness of the Fe—Al alloy layer in the steel sheet width direction is preferably 0.4 μm or less, and more preferably 0.3 μm or less.

(Plating Layer)

In the embodiment of the present invention, the hot-dip galvanizing layer has a Fe content of more than 0% and 3.0% or less, and an Al content of more than 0% and 1.0% or less. Besides, the hot-dip galvanizing layer may also contain one or two or more of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM, or one or two or more of these elements may also be mixed in the hot-dip galvanizing layer. As described above, even if the hot-dip galvanizing layer contains one or two or more of the above-described elements, or one or two or more of these elements are mixed in the hot-dip galvanizing layer, the effect of the present invention is not impaired, and there is also a preferable case such that corrosion resistance and workability are improved depending on the content of the elements.

Further, in the present embodiment, the hot-dip galvanizing layer may also contain a columnar crystal made of a ζ phase ($FeZn_{13}$), but, from a viewpoint of plating adhesion, a coverage ratio of the ζ phase at the entire interface between the plating layer and the base steel sheet is preferably less than 20%.

Besides, a deposition amount of the hot-dip galvanizing layer on one side of the base steel sheet is preferably 10 $g/m^2$ or more and 100 $g/m^2$ or less.

(Fe Content in Hot-Dip Galvanizing Layer: More than 0% and 3.0 or Less)

The Fe content in the hot-dip galvanizing layer is more than 0% and 3.0% or less. It is practically difficult to manufacture the hot-dip galvanizing layer whose Fe content is 0%. When the Fe content exceeds 3.0%, the plating adhesion reduces. When the Fe content is less than 0.3%, the plating adhesion sometimes reduces, so that from a viewpoint of securing the plating adhesion, a preferable range of the Fe content is 0.3% to 2.5%, and more preferably 0.5% to 2.0%.

(Al Content in Hot-Dip Galvanizing Layer: More than 0% and 1.0% or Less)

The Al content in the hot-dip galvanizing layer is more than 0% and 1.0% or less. When Al is not contained in a plating bath or the Al content is extremely small, alloying of the plating layer progresses to reduce the plating adhesion, so that the Al content in the plating layer is preferably set to 0.1% or more. Here, the alloying of the plating layer indicates that Fe atoms diffuse into the plating layer and a Zn—Fe alloy is generated. When the Al content exceeds 1.0%, the plating adhesion reduces. From a viewpoint of securing the plating adhesion, a preferable range of the Al content is 0.1% to 0.8%, and more preferably 0.2% to 0.5%.

(Deposition Amount in Hot-Dip Galvanization)

When the deposition amount of the hot-dip galvanizing layer with respect to one side of the base steel sheet is small, sufficient corrosion resistance may not be obtained. Accordingly, the deposition amount of the plating layer with respect to one side of the base steel sheet is preferably set to 10 $g/m^2$ or more. From a viewpoint of corrosion resistance, the deposition amount is more preferably 20 $g/m^2$ or more, and still more preferably 30 $g/m^2$ or more. On the other hand, when the deposition amount of the plating layer is large, wear of an electrode when performing spot welding becomes significant, and there is a possibility that when welding is continuously carried out, a reduction in molten nugget diameter and deterioration of welded joint strength occur. For this reason, the deposition amount of the plating layer is preferably set to 100 $g/m^2$ or less. From a viewpoint of continuous weldability, the deposition amount is more preferably 93 $g/m^2$ or less, and still more preferably 85 $g/m^2$ or less.

(Manufacturing Method of Hot-Dip Galvanized Steel Sheet)

Next, a method of manufacturing the hot-dip galvanized steel sheet according to the embodiment of the present invention will be described in detail.

A manufacturing method of the hot-dip galvanized steel sheet according to the present embodiment includes a hot rolling step being a step in which a slab having the above-described chemical components is heated to 1080° C. or more, subjected to hot rolling with a rolling completion temperature set to fall within a range of 850° C. to 980° C. to be a hot-rolled steel sheet, and then the hot-rolled steel sheet is coiled as a coil, and in which a temperature of the hot-rolled steel sheet in a cooling process from the completion of the hot rolling to 300° C. is controlled to satisfy a formula (1) to be described later, acid pickling subsequent to the hot rolling, after that, a cold rolling step of performing cold rolling with a total reduction ratio set to 85% or less, an annealing step in which the steel sheet after being subjected to the cold rolling step is heated by setting an average heating rate between 600° C. and 750° C. to 1.0° C./s or more, and a maximum heating temperature to fall within a temperature region of (Ac1+25°) C. or more and Ac3° C. or less, and 750° C. or more, and then cooling is performed by setting an average cooling rate between 760° C. and 700° C. to 0.1° C./s to 5.0° C./s, and an average cooling rate between 650° C. and 500° C. to 1.0° C./s or more, a plating step in which, after the annealing step, the steel sheet is immersed in a plating bath under plating conditions in which a plating bath temperature is set to 440° C. to 470° C., a steel sheet temperature when entering the plating bath is set to 430° C. to 480° C., and an effective Al amount in the plating bath is set to 0.180 to 0.250 mass %, to thereby perform hot-dip galvanization on the steel sheet surface to form a plating layer, and a working step in which, after the plating step, the steel sheet is cooled to 100° C. or less, and then subjected to bending-unbending deformation of two times or more in total by using a roll with a diameter of 50 mm to 800 mm.

Hereinafter, the respective manufacturing steps will be described in detail.

In order to manufacture the hot-dip galvanized steel sheet according to the embodiment of the present invention, a base steel sheet is first manufactured.

The base steel sheet is manufactured in a manner that a slab containing alloying elements according to properties is cast, subjected to hot rolling and then subjected to cold rolling.

Hereinafter, respective manufacturing steps will be described in detail.

"Casting Step"

First, the slab to be subjected to the hot rolling is cast. Chemical components (composition) of the slab are preferably the above-described components. As the slab to be subjected to the hot rolling, a continuously cast slab or one manufactured by a thin slab caster or the like can be used.

"Hot Rolling Step"

In the hot rolling step, in order to suppress anisotropy of crystal orientations ascribable to the casting, a slab heating temperature is preferably set to 1080° C. or more. The slab heating temperature is more preferably set to 1150° C. or more. On the other hand, an upper limit of the slab heating temperature is not particularly defined. In order to heat the slab to a temperature higher than 1300° C., large amounts of energies need to be applied, which leads to a great increase in manufacturing cost. Accordingly, the slab heating temperature is preferably set to 1300° C. or less.

After heating the slab, hot rolling is performed. When a completion temperature of the hot rolling (rolling completion temperature) is less than 850° C., a rolling reaction force is increased, and it becomes difficult to stably obtain a specified sheet thickness. For this reason, the completion temperature of the hot rolling is preferably set to 850° C. or more, and more preferably set to 870° C. or more. On the other hand, in order to make the completion temperature of the hot rolling to more than 980° C., a device for heating the steel sheet in a step from the end of the slab heating to the completion of the hot rolling becomes necessary, which requires a large cost. For this reason, the completion temperature of the hot rolling is set to 980° C. or less, and preferably set to 950° C. or less.

Next, a hot-rolled steel sheet after being subjected to the hot rolling is coiled as a coil. Note that an average cooling rate in a cooling process from the hot rolling to the coiling is preferably set to 10° C./second or more. This is for making transformation progress at a lower temperature, to thereby make a grain diameter of the hot-rolled steel sheet to be fine, and make an effective crystal grain diameter of the base steel sheet after cold rolling and annealing to be fine.

A coiling temperature of the hot-rolled steel sheet is preferably set to 450° C. or more and 650° C. or less. This is for making the pearlite and/or the coarse cementite with a major axis of 1 μm or more to be dispersed to be generated in a microstructure of the hot-rolled steel sheet, to thereby localize a strain introduced by cold rolling. This causes reverse transformation into austenite having various crystal orientations in an annealing step, which enables to make the effective crystal grain of the base steel sheet after the annealing to be fine. When the coiling temperature is less than 450° C., the pearlite and/or the coarse cementite may not be generated, which is not preferable. On the other hand, when the coiling temperature exceeds 650° C., the pearlite and the ferrite are respectively generated in a band shape which is long in the rolling direction. This creates a tendency that the effective crystal grain of the base steel sheet generated from a ferrite portion after the cold rolling and the annealing becomes a coarse one which extends in the rolling direction, and thus is not preferable.

Further, there is a case where after the hot-rolled steel sheet is coiled, an internal oxide layer is formed nonuniformly (in a manner that a middle portion is formed to be thicker than an edge portion) under a scale layer. This becomes significant when the coiling temperature exceeds 650° C. When the internal oxide layer is not removed even in a post-step (acid pickling, cold rolling) to be described later, nonuniform formation of the fine-grain layer and the Fe—Al alloy layer is caused, and an adverse effect may be exerted on the plating adhesion and the appearance uniformity. Therefore, also from a viewpoint of the plating adhesion and the appearance uniformity, the coiling temperature is preferably reduced to 650° C. or less.

Here, in the surface of the base steel sheet after the annealing, in order to control the hard structure to have predetermined volume fractions, there is a need to cause decarburization in a moderate manner from the base steel sheet surface in the hot rolling step. The decarburization behavior from the base steel sheet may be controlled through control of atmosphere, but, a large-scale facility is required, and a burden in terms of cost is large. For this reason, in the present embodiment, the decarburization behavior is controlled by controlling the cooling rate to control the steel sheet temperature in an interval from when finish rolling is completed (hot rolling is completed) to when the temperature reaches 300° C.

The temperature control of the base steel sheet is performed in a range of equal to or less than a temperature Ae3*° C. at which a BCC phase of iron becomes stable in the base steel sheet surface, in the interval from when the finish rolling is completed to when the temperature reaches 300° C. This is because decarburization from the BCC phase of iron progresses faster than decarburization from an FCC phase being a stable phase at a high temperature. Note that in the present embodiment, in a temperature range in which the base steel sheet temperature is lower than 300° C., a diffusion velocity of oxygen is sufficiently slow, and it can be regarded that also a progressing speed of decarburization does not exert an influence on the decarburization behavior, so that the temperature range of the temperature control of the base steel sheet in the hot rolling step is set to an interval up to when the temperature reaches 300° C.

Note that Ae3*[° C.] can be determined by using the following formula.

Ae3*[° C.]=885+31.7Si−29.3Mn+123.2Al−18.2Cr−40.0Ni−21.0Cu+12.6Mo

In the aforementioned formula, C, Si, Mn, Al, Cr, Ni, Cu, and Mo indicate contents [mass %] of the respective elements.

Further, the decarburization behavior of the steel sheet is controlled by being divided into a first period from when the finish rolling is completed to when the steel sheet is coiled as a coil, and a second period from when the steel sheet is coiled as a coil to when the temperature reaches a room temperature. This is because the progressing speeds of decarburization are greatly different between the both periods in a manner that although the decarburization progresses in the air in the first period, in the second period, the steel sheet is coiled as a coil and thus the steel sheets are mutually brought into close contact with each other, and the decarburization progresses under a condition where the outside air does not enter almost at all.

Concretely, in order to make the steel sheet surface layer portion to be moderately decarburized, in the cooling process from when the finish rolling is completed to when the temperature reaches 300° C., the steel sheet temperature is controlled to fall within a range satisfying the following formula (1). The formula (1) is a formula related to the progressing degree of the decarburization behavior, and indicates that the larger the value of the formula (1), the more the decarburization progresses.

Note that regarding each term in the formula (1), t [second] is an elapsed time from the completion of the finish rolling, t1 [second] indicates an elapsed time from when the finish rolling is completed to when the temperature reaches the Ae3*temperature, t2 [second] indicates an elapsed time from when the finish rolling is completed to when the steel sheet is coiled as a coil, and t3 [second] indicates an elapsed time from when the finish rolling is completed to when the steel sheet temperature reaches 300° C. Further, T(t) [° C.] indicates the steel sheet temperature, and Ws, [mass %] and WMn [mass %] respectively indicate average contents of the respective elements of Si and Mn in the entire steel sheet. Further, respective terms of α, β, γ, and δ are constant terms, and are $8.35 \times 10^8$, $2.20 \times 10^4$, $1.73 \times 10^{10}$, and $2.64 \times 10^4$, respectively.

[Mathematical formula 1]

$$0.8 \leq \left[ \int_{t1}^{t2} \alpha \cdot \exp\left(-\frac{\beta}{T(t)+273}\right) \cdot t\,dt + \int_{t2}^{t3} \gamma \cdot W_{Si}^{2.5} \cdot W_{Mn}^{0.5} \cdot \exp\left(-\frac{\delta}{T(t)+273}\right) \cdot t\,dt \right]^{0.5} \leq 20.0 \quad \text{Formula (1)}$$

In the above formula (1), a first integral term in the parentheses is a term related to the progressing degree of the decarburization during the cooling in the first period, and a second integral term is a term related to the progressing degree of the decarburization during the cooling in the second period. In each term, the higher the base steel sheet temperature and the longer the retention time, the more the decarburization progresses. Particularly, in the second period, oxygen being the element which makes the decarburization progress does not exist almost at all in the atmosphere, and the decarburization progresses with the use of oxygen drawn by Si and Mn in the steel from the scale layer of the surface layer, and thus the second integral term includes an influence exerted by the contents of Si and Mn, and it is indicated that as the amounts of Si and Mn in the steel become larger, the value of the formula (1) increases, and the decarburization progresses.

When the value of the above formula (1) becomes less than 0.8 in the cooling process after the completion of the finish rolling, the decarburization does not occur almost at all in the base steel sheet surface layer portion, and V1/V2 being the ratio between the volume fraction V1 of the hard structure of the surface layer portion and the volume fraction V2 of the hard structure in which the ¼ thickness of the sheet thickness from the surface is set as a middle, exceeds 0.90, and the bendability deteriorates, so that the cooling is performed to make the value of the above formula (1) to be 0.8 or more. From this viewpoint, it is preferable to perform the cooling to make the value of the above formula (1) to be 1.0 or more, and it is more preferable to perform the cooling to make the value of the above formula (1) to be 1.3 or more. On the other hand, when the value of the above formula (1) exceeds 20.0, the decarburization of the steel sheet surface layer portion is caused excessively, and V1/V2 becomes less than 0.30 to significantly deteriorate the fatigue resistance of the steel sheet, so that the cooling is performed to make the value of the above formula (1) to be 20.0 or less. From this viewpoint, it is preferable to perform the cooling to make the value of the above formula (1) to be 15.0 or less, and it is more preferable to perform the cooling to make the value of the above formula (1) to be 10.0 or less.

Next, the hot-rolled steel sheet manufactured as above is subjected to acid pickling. The acid pickling removes an oxide in the surface of the hot-rolled steel sheet, and thus is important for improving the platability of the base steel sheet. The acid pickling may be performed once or may be performed separately a plurality of times. The internal oxide layer generated under the scale layer is preferably removed as much as possible by strengthening the acid pickling, also from viewpoints of uniform formation of the fine-grain layer and the Fe—Al alloy layer and securement of uniform appearance provided by the uniform formation. The acid pickling conditions are not particularly limited as long as the internal oxide layer can be removed, and, for example, it is preferable to use hydrochloric acid from viewpoints of acid pickling efficiency and economic efficiency. As conditions for removing the internal oxide layer, for example, a concentration of hydrochloric acid of 5 mass % or more as hydrogen chloride, an acid pickling temperature of 80° C. or more, and an acid pickling time of 30 seconds or more, can be cited as recommended conditions.

"Cold Rolling Step"

Next, cold rolling is performed on the hot-rolled steel sheet after being subjected to the acid pickling, to thereby obtain a cold-rolled steel sheet.

In the cold rolling, when the total reduction ratio exceeds 85%, the ductility of the steel sheet is lost, and a risk of fracture of the steel sheet during the cold rolling increases. For this reason, the total reduction ratio is preferably set to 85% or less. From this viewpoint, the total reduction ratio is more preferably set to 75% or less, and still more preferably set to 70% or less. The lower limit of the total reduction ratio in the cold rolling step is not defined in particular. When the total reduction ratio is less than 0.05%, the shape of the base steel sheet becomes nonuniform and plating does not adhere on the base steel sheet uniformly, resulting in that an appearance is impaired. For this reason, the total reduction ratio is preferably set to 0.05% or more, and more preferably set to 0.10% or more. Note that the cold rolling is preferably performed in a plurality of passes, and the number of passes of the cold rolling and a distribution of a reduction ratio to the respective passes may be any.

Further, in a range in which the total reduction ratio in the cold rolling is more than 10% and less than 20%, in the annealing step to be performed thereafter, recrystallization does not progress sufficiently and coarse crystal grains in which large amounts of dislocations are contained and malleability has been lost remain near a surface layer, leading to deterioration of bendability and fatigue resistance in some cases. In order to avoid this, it is effective to reduce the total reduction ratio to reduce the accumulation of dislocations on the crystal grains, to thereby leave the malleability of the crystal grains. Alternatively, it is effective to increase the total reduction ratio to make the recrystallization sufficiently progress in the annealing step, to thereby make the worked structure have recrystallized grains in which accumulation of dislocations inside thereof is small. From a viewpoint of reducing the accumulation of dislocations on the crystal grains, the total reduction ratio in the cold rolling step is preferably set to 10% or less, and more preferably set to 5.0% or less. On the other hand, in order to make the recrystallization in the annealing step progress sufficiently, the total reduction ratio is preferably set to 20% or more, and more preferably set to 30% or more.

"Annealing Step"

In the embodiment of the present invention, annealing is performed on the cold-rolled steel sheet. In the embodiment of the present invention, it is preferable to use a continuous annealing-plating line having a preheating zone, a soaking zone, and a plating zone. Further, it is preferable that the steel sheet is made to pass through the preheating zone and the soaking zone while performing the annealing step thereon, the annealing step is terminated until when the steel sheet reaches the plating zone, and a plating step is performed in the plating zone.

When the continuous annealing-plating line is used in the annealing step and the plating step as described above, it is preferable to use the following method, for example.

In particular, control of an atmosphere and a heating method in the preheating zone, and control of an atmosphere in the soaking zone are important for securing the plating adhesion and the appearance uniformity while appropriately and uniformly generating the fine-grain layer and the Fe—Al alloy layer.

In the preheating zone, the steel sheet is passed while being heated to a steel sheet temperature of 400° C. to 800° C. by using a preheating burner with an air ratio set to 0.7 to 1.0, in an atmosphere in which $\text{Log}(P(H_2O)/P(H_2))$ being a Log value of a ratio between a water vapor partial pressure $P(H_2O)$ and a hydrogen partial pressure $P(H_2)$ is controlled to −1.7 to −0.2.

The adjustment of the ratio between the water vapor partial pressure $P(H_2O)$ and the hydrogen partial pressure $P(H_2)$ in the preheating zone exerts an influence on uniform precipitation of a Fe—Al alloy phase in the width direction on the interface in the subsequent hot-dip galvanization and a surface property of the steel sheet before plating.

This is because, by adjusting the air ratio in the preheating zone, generation of an oxide film of a strong deoxidizing element such as Si on the steel sheet surface is suppressed. Concurrently, by adjusting the ratio between the water vapor partial pressure $P(H_2O)$ and the hydrogen partial pressure $P(H_2)$, excessive decarburization in the steel sheet surface is suppressed. This makes a Fe—Al alloy reaction selectively occur by suppressing an excessive Fe—Zn alloy reaction in the grain boundary of the steel sheet surface in the subsequent plating step. When the Fe—Al alloy reaction selectively occurs, uniform formation of the Fe—Al alloy layer is facilitated, and it is possible to obtain excellent plating adhesion and uniform appearance. When $Log(P(H_2O)/P(H_2))$ exceeds −0.2, the Fe—Zn alloying is likely to occur in the subsequent plating step, and a Fe concentration in plating increases. Consequently, the plating adhesion reduces, and an uneven appearance is also likely to occur. On the other hand, when $Log(P(H_2O)/P(H_2))$ is less than −1.7, a portion with high carbon concentration is generated in the steel sheet surface, and the fine-grain layer is not formed on the surface, so that the plating adhesion reduces.

The "air ratio" is a ratio between a volume of air contained in a mixed gas of a unit volume and a volume of air theoretically required for completely combusting a fuel gas contained in the mixed gas of the unit volume, and expressed by the following formula.

Air ratio=[volume of air contained in mixed gas of unit volume ($m^3$)]/[volume of air theoretically required for completely combusting fuel gas contained in mixed gas of unit volume ($m^3$)]

When the above-described air ratio is excessively large to be more than 1.0, a Fe-oxide coating film is excessively generated in the steel sheet surface layer portion, the decarburized layer after the annealing is enlarged, and the fine-grain layer is also generated excessively. Consequently, alloying of plating excessively progresses, which reduces the plating adhesion, chipping resistance, and powdering resistance. Therefore, the above air ratio is preferably 1.0 or less, and more preferably 0.9 or less. When the above air ratio is excessively small to be less than 0.7, the fine-grain layer is not formed, and the plating adhesion reduces. Accordingly, the above air ratio is set to 0.7 or more, and is preferably 0.8 or more.

Further, when the steel sheet temperature at which the steel sheet is passed through the preheating zone is less than 400° C., it is not possible to form a sufficient fine-grain layer. Therefore, the steel sheet temperature at which the steel sheet is passed through the preheating zone is set to 400° C. or more, and preferably set to 600° C. or more. On the other hand, when the steel sheet temperature at which the steel sheet is passed through the preheating zone is a high temperature of more than 800° C., a coarse oxide containing Si and/or Mn is generated in the steel sheet surface, which reduces the plating adhesion. Therefore, the steel sheet temperature at which the steel sheet is passed through the preheating zone is set to 800° C. or less, and preferably set to 750° C. or less.

When a heating rate in the preheating zone is slow, internal oxidation progresses, and a coarse oxide is generated inside the steel sheet. In particular, the heating rate in 600° C. to 750° C. is important, and an average heating rate in 600° C. to 750° C. is required to be set to 1.0° C./second or more, in order to avoid excessive decarburization in the steel sheet surface layer portion and suppress the generation of coarse oxide. When the average heating rate in 600° C. to 750° C. is less than 1.0° C./second, a coarse oxide is generated in the fine-grain layer, resulting in that the plating adhesion and the powdering resistance reduce. In order to avoid the excessive decarburization in the steel sheet surface layer portion and the generation of coarse oxide, the average heating rate between 600° C. and 750° C. is preferably set to 1.5° C./second or more, and more preferably set to 2.0° C./second or more. The average heating rate in 600° C. to 750° C. is preferably set to 50° C./second or less by securing a treatment time in the preheating zone. When the average heating rate is 50° C./second or less, a uniform fine-grain layer is likely to be obtained, and it is possible to obtain a plating layer excellent in the plating adhesion and the appearance uniformity.

The maximum heating temperature in the annealing step is an important factor for controlling the fractions of the microstructure related to the formability of the steel sheet to fall within predetermined ranges. When the maximum heating temperature is low, a coarse iron-based carbide is left undissolved in the steel, which deteriorates the formability. Further, when the maximum heating temperature is less than 750° C., a coarse iron carbide in the hot-rolled steel sheet is not sufficiently dissolved, and is remained even in a sheet being manufactured as a product, which may greatly impair the ductility. In order to sufficiently dissolve the iron-based carbide to increase the formability, the maximum heating temperature is set to (Ac1 point+25°) C. or more and 750° C. or more, and preferably set to (Ac1 point+50°) C. or more. On the other hand, when the maximum heating temperature exceeds the Ac3 point, the ferrite fraction in the steel significantly reduces, so that the maximum heating temperature is set to the Ac3 point or less. Further, from a viewpoint of the plating adhesion, the maximum heating temperature is preferably low in order to decrease the oxide in the surface of base iron. From this viewpoint, the maximum heating temperature is preferably set to 850° C. or less, and more preferably set to 830° C. or less.

The Ac1 point and the Ac3 point of the steel sheet are a start point and a completion point of an austenite reverse transformation, respectively. Concretely, they are obtained in a manner that a small piece is cut out from the steel sheet after being subjected to the hot rolling, heated up to 1200° C. at 10° C./second, and a cubical expansion during the heating is measured.

The maximum heating temperature (750° C. or more) in the annealing step is reached in the soaking zone. In an atmosphere in this soaking zone, $Log(P(H_2O)/P(H_2))$ is controlled to −1.7 to −0.2. When $Log(P(H_2O)/P(H_2))$ is less than −1.7, the fine-grain layer is not formed, and the plating adhesion reduces. When $Log(P(H_2O)/P(H_2))$ exceeds −0.2, the decarburization excessively progresses, and the hard phase in the base steel sheet surface layer significantly reduces and a coarse oxide is formed in the fine-grain layer, resulting in that the plating adhesion and the powdering resistance reduce.

As described above, when $Log(P(H_2O)/P(H_2))$ in the soaking zone is −1.7 to −0.2, Si and Mn oxides to be a starting point of plating peeling are not formed on the outermost surface layer, and a fine oxide of Si and/or Mn whose maximum diameter is 0.05 μm to 0.4 μm is formed inside the steel sheet surface layer. The fine oxide of Si and/or Mn suppresses growth of Fe recrystallization during the annealing. Further, since water vapor in the annealing atmosphere causes decarburization of the base material surface layer, the base material surface layer after the annealing becomes the ferrite. As a result of this, on the surface layer of the base material after the annealing, there is formed a fine-grain layer in which an average thickness is 0.1 μm to 5.0 μm, an average grain diameter of the ferrite phase is 0.1 1 μm to 3.0 μm, and an oxide of Si and/or Mn whose maximum diameter is 0.01 μm to 0.4 μm is contained.

During the annealing step, in cooling before plating (a cooling step before plating) from when the temperature reaches the maximum heating temperature to when the steel sheet reaches a plating bath, by controlling the temperature of the steel sheet in two stages of a temperature region from 760° C. to 700° C. and a temperature region from 650° C. to 500° C., it is possible to obtain a predetermined microstructure. First, in order to make the generation of ferrite progress sufficiently, an average cooling rate between 760° C. and 700° C. is defined. When the average cooling rate from 760° C. to 700° C. exceeds 5.0° C./second, the generation of ferrite sometimes does not progress sufficiently, so that the average cooling rate is set to 5.0° C./second or less. In order to make the generation of ferrite progress sufficiently, the average cooling rate is preferably set to 3.5° C./second or less, and more preferably set to 2.5° C./second or less. On the other hand, when the average cooling rate from 760° C. to 700° C. is less than 0.3° C./second, large amounts of pearlite may be generated in some cases, so that the average cooling rate is set to 0.3° C./second or more. In order to avoid the generation of pearlite, the average cooling rate is preferably set to 0.5° C./second or more, and more preferably set to 0.7° C./second or more.

Next, in order to avoid excessive generation of pearlite and/or coarse cementite, a cooling rate from 650° C. to 500° C. is defined. When an average cooling rate from 650° C. to 500° C. is less than 1.0° C./second, large amounts of pearlite and/or coarse cementite are generated, so that the average cooling rate is set to 1.0° C./second or more. Since it is preferable that the steel does not contain the pearlite and/or the coarse cementite therein, in order to sufficiently avoid the generation of these, the average cooling rate is preferably set to 2.0° C./second or more, and more preferably set to 3.0° C./second or more. Although an upper limit of the average cooling rate in the temperature region from 650° C. to 500° C. is not particularly provided, in order to obtain an excessively large average cooling rate, a special cooling facility or a coolant which does not interfere with the plating step is required, which is not preferable. From this viewpoint, the average cooling rate in the above temperature region is preferably set to 100° C./second or less, and more preferably set to 70° C./second or less.

There is no problem even if, subsequent to the cooling step before plating, the steel sheet is retained for a given period of time in a predetermined temperature region as martensite transformation treatment from when the steel sheet temperature reaches 500° C. to when the steel sheet reaches the plating bath, in order to obtain the tempered martensite. A martensite transformation treatment temperature preferably sets a martensite transformation start temperature Ms point as its upper limit, and the upper limit is more preferably set to (Ms point −20)° C. The martensite transformation treatment preferably sets 50° C. as a lower limit, and the lower limit is more preferably set to 100° C. Further, a martensite transformation treatment time is preferably set to 1 second to 100 seconds, and more preferably set to 10 seconds to 60 seconds. Note that the martensite obtained through the martensite transformation treatment is changed to the tempered martensite when the steel sheet enters the plating bath at a high temperature in the plating step.

Note that the Ms point is calculated by the following formula.

$$\text{Ms point } [^\circ \text{C.}] = 541 - 474C/(1-VF) - 15Si - 35Mn - 17Cr - 17Ni + 19Al$$

In the above formula, VF indicates a volume fraction of the ferrite, and C, Si, Mn, Cr, Ni, and Al indicate contents [mass %] of the respective elements.

Note that it is difficult to directly measure the volume fraction of the ferrite during the manufacture. For this reason, when deciding the Ms point in the present invention, a small piece of a cold-rolled steel sheet before being passed through the continuous annealing line is cut out, the small piece is annealed under the same temperature history as that of the case where the small piece is passed through the continuous annealing line, the change in ferrite volume of the small piece is measured, and a numerical value calculated by using the measurement result is set as the volume fraction VF of the ferrite.

In addition, there is no problem if the steel sheet is retained for a given period of time in a predetermined temperature region as bainite transformation treatment from when the steel sheet temperature reaches 500° C. to when the steel sheet reaches the plating bath, in order to make the generation of bainite progress. When a bainite transformation treatment temperature exceeds 500° C., the generation of pearlite and/or coarse cementite progresses, so that the bainite transformation treatment temperature is set to 500° C. or less. Further, when the bainite transformation treatment temperature is lower than 350° C., the transformation does not progress sufficiently, so that the bainite transformation treatment temperature is set to 350° C. or more. A bainite transformation treatment time is set to 10 seconds or more in order to make the transformation progress sufficiently, and is set to 500 seconds or less in order to suppress the generation of pearlite and/or coarse cementite. Note that when both the bainite transformation treatment and the martensite transformation treatment are carried out after the cooling step before plating, it is set that the bainite transformation treatment and the martensite transformation treatment are carried out in this order.

"Plating Step"

Next, the base steel sheet obtained in a manner as described above is immersed in the plating bath.

The plating bath has a composition in which zinc is the main element and an effective Al amount is 0.180% to 0.250%, the effective Al amount being a value equal to the total Al amount in the plating bath from which the total Fe amount therein is subtracted. When the effective Al amount in the plating bath is less than 0.180%, the formation of the Fe—Al alloy layer is insufficient, and Fe enters the plating layer, leading to impairment of plating adhesion, so that the effective Al amount in the plating bath is required to be set to 0.180% or more. From this viewpoint, the effective Al amount in the plating bath is preferably 0.185% or more, and more preferably 0.190% or more. On the other hand, when the effective Al amount in the plating bath exceeds 0.250%, the Fe—Al alloy layer between the base steel sheet and the plating layer is generated excessively, which impairs the plating adhesion. From this viewpoint, the effective Al amount in the plating bath is required to be set to 0.250% or less, it is preferably set to 0.240% or less, and more preferably set to 0.230% or less.

In the plating bath, one or two or more of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM may be mixed, and there is sometimes a preferred case that corrosion resistance and workability of the hot-dip galvanizing layer improve, or the like depending on the content of each element.

Further, a temperature of the plating bath is preferably set to 440° C. to 470° C. When the plating bath temperature is less than 440° C., the viscosity of the plating bath increases excessively to make it difficult to control the thickness of the plating layer, which impairs the appearance of the hot-dip galvanized steel sheet. Therefore, the temperature of the plating bath is preferably 440° C. or more, and more preferably set to 445° C. or more. On the other hand, when the plating bath temperature exceeds 470° C., large amounts of fumes are generated to make it difficult to perform safe manufacture. For this reason, the plating bath temperature is preferably 470° C. or less, and more preferably set to 460° C. or less.

Further, if the steel sheet temperature when the base steel sheet enters the plating bath is less than 430° C., it becomes necessary to provide a large quantity of heat to the plating bath in order to stabilize the plating bath temperature at 440° C. or more, which is not appropriate practically. On the other hand, if the steel sheet temperature when the base steel sheet enters the plating bath exceeds 480° C., it becomes necessary to introduce a facility to remove a large quantity of heat from the plating bath in order to stabilize the plating bath temperature at 470° C. or less, which is not appropriate in view of manufacturing cost. Therefore, in order to stabilize the bath temperature of the plating bath, the temperature when the base steel sheet enters the plating bath is set to 430° C. or more and 480° C. or less. Further, in order to appropriately control the Fe—Al alloy layer, the temperature when the base steel sheet enters the plating bath is more preferably limited to 440° C. or more and 470° C. or less.

The temperature of the plating bath is preferably stabilized at a temperature within a range of 440° C. to 470° C. When the temperature of the plating bath is unstable, the Fe content in the Fe—Al alloy layer and the plating layer becomes nonuniform, which leads to nonuniform appearance and adhesion of the plating layer. In order to stabilize the temperature of the plating bath, the steel sheet temperature when the steel sheet enters the plating bath and the temperature of the plating bath are preferably made to substantially coincide with each other. Concretely, from a limit of temperature controllability of an actual manufacturing facility, the steel sheet temperature when the steel sheet enters the plating bath is preferably set to fall within ±10° C. of the plating bath temperature, and more preferably set to fall within ±5° C. of the plating bath temperature.

Note that after the steel sheet is immersed in the plating bath, in order to make a plating deposition amount appropriate, a high-pressure gas mainly composed of nitrogen is preferably sprayed to the steel sheet surface to remove excessive zinc on the surface layer. After that, cooling is performed to a room temperature. At that time, from a viewpoint of securing the plating adhesion, it is preferable to secure a cooling rate of 1° C./second or more up to a temperature of 350° C. at which the diffusion of Fe atoms into the plating layer from the base steel sheet does not progress almost at all and the generation of (phase is almost stopped.

Further, there is no problem if, after performing the cooling to 350° C., cooling is performed to 250° C. or less at an average cooling rate of 1.0° C./second or more, in order to obtain the hard structure. In order to obtain the fresh martensite phase and/or the tempered martensite phase, the average cooling rate is preferably set to 3.0° C./second or more, and more preferably set to 5.0° C./second or more.

Further, there is no problem if, after performing the cooling to 250° C. or less, reheat treatment is performed in order to obtain the tempered martensite. A treatment temperature and a treatment time of the reheat treatment may be appropriately set according to targeted properties. However, when the reheat treatment temperature is less than 250° C., a sufficient effect cannot be obtained, and on the other hand, when the temperature exceeds 350° C., there is a concern that the plating layer is degenerated to deteriorate the plating adhesion, so that the reheat treatment temperature is preferably set to 250° C. or more and 350° C. or less. Further, when the reheat treatment time exceeds 1000 seconds, the treatment effect is saturated, so that the treatment time is preferably set to 1000 seconds or less.

Further, there is no problem if, after performing the cooling to 350° C., bainite transformation treatment of performing retention for 15 seconds to 500 seconds in a temperature range of 250° C. to 350° C. is performed in order to obtain the retained austenite. When a bainite transformation treatment temperature is less than 250° C., the martensite is generated, and the retained austenite cannot be sufficiently obtained. For this reason, the bainite transformation treatment temperature is preferably set to 250° C. or more, and more preferably set to 300° C. or more. On the other hand, when the bainite transformation treatment temperature exceeds 350° C., the diffusion of Fe atoms into the plating layer from the base steel sheet progresses to deteriorate the plating adhesion. For this reason, the bainite transformation treatment temperature is preferably set to 350° C. or less, and more preferably set to 330° C. or less.

When the bainite transformation treatment time is 15 seconds or more, it is possible to sufficiently obtain an effect of performing the bainite transformation treatment. The bainite transformation treatment time is more preferably 25 seconds or more. When the bainite transformation treatment time is 500 seconds or less, it is possible to efficiently perform the bainite transformation treatment. The bainite transformation treatment time is more preferably 300 seconds or less.

Further, there is no problem if, after performing the cooling to 250° C. or less, reheat treatment is performed in order to further stabilize the retained austenite. A treatment temperature and a treatment time of the reheat treatment may be appropriately set according to targeted properties. However, when the reheat treatment temperature is less than 250° C., a sufficient effect cannot be obtained. For this reason, the reheat treatment temperature is preferably set to 250° C. or more, and more preferably set to 280° C. or more. When the reheat treatment temperature exceeds 350° C., the diffusion of Fe atoms into the plating layer from the base steel sheet progresses to deteriorate the plating adhesion. For this reason, the reheat treatment temperature is preferably set to 350° C. or less, and more preferably set to 330° C. or less.

Further, when the reheat treatment time exceeds 1000 seconds, the treatment effect is saturated, so that the treatment time is preferably set to 1000 seconds or less.

"Working Step"

Next, after cooling the steel sheet temperature to 100° C. or less, bending-unbending deformation is performed on the metal coated steel sheet, in order to reduce the retained austenite in the base steel sheet surface layer. The bending can be performed by using a roll with a diameter of 50 mm to 800 mm. When the roll diameter is less than 50 mm, large amounts of strains are introduced into the base steel sheet surface layer due to the bending deformation, which impairs the formability of the steel sheet. Further, when the roll diameter exceeds 800 mm, a strain amount in the base steel sheet surface layer is small, resulting in that the retained austenite is not reduced sufficiently. As the bending-unbending deformation, in order to reduce the retained austenite in each of a front surface and a rear surface of the base steel sheet, deformation in which the front surface is set as a bending outer side and deformation in which the rear surface is set as a bending outer side are respectively required to be performed one time or more, so that there is a need to perform the bending-unbending deformation of two times or more in total. Consequently, it is possible to make the retained austenite in both the front and rear surfaces of the base steel sheet fall within a predetermined range.

The hot-dip galvanized steel sheet according to the present embodiment can be manufactured by the above-described manufacturing method, but, the present invention is not limited to the above-described embodiment.

For example, there is no problem if a film made of a phosphorus oxide and/or a composite oxide containing phosphorus is applied on the surface of the galvanizing layer of the hot-dip galvanized steel sheet obtained by the above-described method.

The film made of the phosphorus oxide and/or the composite oxide containing the phosphorus is capable of functioning as a lubricant to protect the galvanizing layer formed on the surface of the base steel sheet when the hot-dip galvanized steel sheet is worked.

Further, in the present embodiment, there is no problem if cold rolling is performed on the hot-dip galvanized steel sheet cooled to the room temperature at a reduction ratio of 3.00% or less for the purpose of shape correction.

Note that the manufacturing method of the hot-dip galvanized steel sheet according to the embodiment of the present invention described above is preferably applied to manufacture of a hot-dip galvanized steel sheet in which a sheet thickness of a base steel sheet is 0.6 mm or more and less than 5.0 mm. The sheet thickness of the base steel sheet of less than 0.6 mm is not appropriate in some cases since it becomes difficult to keep a shape of the base steel sheet flat. Further, when the sheet thickness of the base steel sheet is 5.0 mm or more, there is a case where control of cooling in the annealing step and the plating step becomes difficult in some cases.

EXAMPLES

Examples of the present invention will be described. Note that conditions in the present examples are condition examples employed for confirming the feasibility and effects of the present invention. The present invention is not limited to the condition examples. The present invention can employ various conditions as long as the object of the present invention is achieved without departing from the gist of the present invention.

Example 1

Slabs having chemical components (compositions) of A to BY shown in Table 1 to Table 3 were cast, subjected to hot rolling under hot rolling step conditions (slab heating temperature, rolling completion temperature) shown in Table 4 to Table 7, and subjected to cooling under hot rolling step conditions (average cooling rate from completion of hot rolling up to coiling, coiling temperature, formula (1)) shown in Table 4 to Table 7, to thereby obtain hot-rolled steel sheets.

After that, the hot-rolled steel sheets were subjected to acid pickling (immersed in 10% hydrochloric acid at 80° C., with immersion time shown in Table 4 to Table 7), and subjected to cold rolling under cold rolling step conditions (reduction ratios) shown in Table 4 to Table 7, to thereby obtain cold-rolled steel sheets.

Next, the obtained cold-rolled steel sheets were annealed under heating step conditions (air ratio in preheating zone, $Log(P(H_2O)/P(H_2))$ in preheating zone atmosphere, $Log(P(H_2O)/P(H_2))$ in soaking zone atmosphere, average heating rate in temperature region of 600° C. to 750° C., maximum heating temperature) in the annealing step shown in Table 8 to Table 11. The annealed steel sheets were subjected to cooling treatment under conditions (cooling rate 1 (average cooling rate in temperature region of 760° C. to 700° C.), cooling rate 2 (average cooling rate in temperature region of 650° C. to 500° C.), martensite transformation treatment conditions (treatment temperature, treatment time), conditions in bainite transformation treatment 1 (treatment temperature, treatment time)) shown in Table 8 to Table 11, to thereby obtain base steel sheets for plating treatment.

Next, the steel sheets were immersed in a galvanizing bath under conditions (effective Al amount, plating bath temperature, steel sheet entrance temperature) shown in Table 12 to Table 15, and subjected to cooling treatment after plating under conditions (cooling rate 3 (average cooling rate up to 350° C.), cooling rate 4 (average cooling rate in temperature region of 350° C. to 250° C.), conditions in bainite transformation treatment 2 (treatment temperature, treatment time), reheat treatment conditions (treatment temperature, treatment time)) shown in Table 12 to Table 15. Next, bending-unbending was performed under conditions (roll diameter, number of times of working) shown in Table 12 to Table 15, and further, cold rolling was performed under conditions (reduction ratios) shown in Table 12 to Table 15, to thereby obtain hot-dip galvanized steel sheets in experimental examples 1 to 202 (note that the experiment was stopped in a part of the experimental examples).

Next, a sample was collected from each of the hot-dip galvanized steel sheets by setting a thicknesswise cross section parallel to the rolling direction of the base steel sheet as an observation surface, and microstructure observation using a field emission scanning electron microscope (FE-SEM) and high-resolution crystal orientation analysis using an EBSD method were conducted to measure each of a volume fraction of the microstructure in a ⅛ thickness to ⅜ thickness range whose middle is at ¼ of a sheet thickness (¼ thickness) and a volume fraction of the microstructure in the surface layer portion starting from the interface between the plating layer and the base steel sheet up to the 20 µm depth (surface layer of base iron). Note that "martensite" in Table 16 to Table 19 indicates the fresh martensite, and "others" in the microstructure in Table 16 to Table 19 indicate the pearlite and/or the coarse cementite. Further, "hard phase" is a hard structure composed of one or more of the bainite, the bainitic ferrite, the fresh martensite, and the tempered martensite.

A plating deposition amount was determined by melting the plating layer by using inhibitor-added hydrochloric acid, and comparing weights before and after the melting. At the same time, Fe and Al were quantified by ICP, to thereby measure the Fe concentration and the Al concentration in the plating layer.

Further, a sample was collected from each of the metal coated steel sheets by setting a thicknesswise cross section parallel to the rolling direction of the base steel sheet as an observation surface, and by using the above-described measuring method, an average thickness and a thickness difference in a width direction of a Fe—Al alloy layer at an interface between the base steel sheet and the hot-dip galvanizing layer, an average thickness and a thickness difference in a width direction of a fine-grain layer which was directly brought into contact with the Fe—Al alloy layer, an average grain diameter of a ferrite phase (ferrite phase average grain diameter) in the fine-grain layer, and a maximum diameter of an oxide (oxide maximum diameter) of one or more of Si and Mn in the fine-grain layer, were determined. Results thereof are shown in Table 20 to Table 23.

Next, in order to examine properties of the metal coated steel sheets, a tensile test, a hole expanding test, a bending test, a fatigue test, an adhesion evaluation test, a spot welding test, a corrosion test, a chipping resistance test, a powdering resistance test, and a plating appearance uniformity evaluation were conducted. Table 24 to Table 31 show properties in the respective experimental examples.

The tensile test was performed by a method described in JIS Z2241, by fabricating a No. 5 specimen described in JIS Z 2201 from each of the metal coated steel sheets, and yield strength YS, maximum tensile strength TS, and total elongation El were determined. Note that evaluation was made such that when the maximum tensile strength TS was 550 MPa or more, the tensile property was good.

The hole expanding test was performed by a method described in JIS Z 2256. Among the formabilities, the ductility (total elongation) El and the hole expandability λ change with the maximum tensile strength TS, and it is set that when the following formula (2) is satisfied, the strength, the ductility, and the hole expandability are good.

$$TS^{1.5} \times El \times \lambda^{0.5} \geq 2.0 \times 10^6 \quad \text{Formula (2)}$$

As the bending test, a No. 5 specimen described in JIS Z 2201 was formed from each of the hot-rolled galvanized steel sheets, and a 90° V-bending test was conducted by using a V block method described in JIS Z 2248. A radius at a bottom portion of a V block was changed from 1.0 mm to 6.0 mm in increments of 0.5 mm, and a smallest radius with which crack did not occur in the specimen, was set as a minimum bend radius r [mm]. The bendability was evaluated by "r/t" obtained by normalizing the minimum bend radius r with a sheet thickness t [mm], and a case where "r/t" was 2.0 or less was evaluated as good bendability.

As the fatigue test, a No. 1 specimen described in JIS Z 2275 was formed from each of the hot-dip galvanized steel sheets, and a pulsating plane bending fatigue test was conducted in accordance with JIS Z 2273. The maximum number of repetitions was set to ten-million times, a fatigue limit DL and a fatigue limit ratio DL/TS were evaluated, and a case where the fatigue limit ratio was 0.30 or more was set as good fatigue resistance.

For the plating adhesion, each of the metal coated steel sheets to which 5% uniaxial tensile strain was applied was subjected to a Dupont impact test. An adhesive tape was attached to each of the metal coated steel sheets after the impact test and then peeled off, in which a case where the plating was not peeled off was set as particularly good (⊚), a case where the plating was peeled off by 5% or more was set as bad (x), and a case where the plating was peeled off by less than 5% was set as good (○). The Dupont impact test was carried out by dropping a weight of 3 kg from a height of 1 m using an impact head having a tip with a ½ inch radius of curvature.

The spot weldability was evaluated by performing an electrode tip life test. Under a welding condition that a diameter of a molten portion becomes 5.3 times to 5.7 times a square root of a sheet thickness, spot welding was continuously performed 1000 times. Further, the diameter of the molten portion at the first point $d_1$ and that at the 1000th point $d_{1000}$ were compared, in which a case where $d_{1000}/d_1$ was 0.90 or more was set as pass (○), and a case where $d_{1000}/d_1$ was less than 0.90 was set as failure (x).

For the evaluation of corrosion resistance, a specimen cut out from each of the metal coated steel sheets to have a size of 150 mm×70 mm was used. The specimen was subjected to zinc phosphate-based dip-type chemical conversion treatment, subsequently subjected to cation electrodeposition coating of 20 μm, further subjected to intermediate coating of 35 μm and top coating of 35 μm, and then a rear surface and an end portion were sealed by an insulating tape. In the corrosion resistance test, CCT including SST of 6 hours, drying of 4 hours, wetting of 4 hours, and freezing of 4 hours as one cycle, was used. For the evaluation of the corrosion resistance after coating, a cross-cut reaching the base steel sheet was made on the coated surface with a cutter, and a blister width after 60 cycles of CCT was measured. A case where the blister width was 3.0 mm or less was set as pass (○), and a case where the blister width exceeded 3.0 mm was set as failure (x).

The chipping resistance was evaluated by using a specimen cut out from each of the metal coated steel sheets to have a size of 70 mm×150 mm. First, the specimen was subjected to respective steps of degreasing for automobiles, formation of chemical conversion film, and three-coat painting. Next, in a state where the specimen was kept cooled at −20° C., ten pieces of crushed stones (0.3 g to 0.5 g) were vertically sprayed to the specimen with an air pressure of 2 kgf/cm². The spraying of crushed stones was repeatedly performed five times for each of the specimens. After that, regarding each of the specimens, 50 chipping traces in total were observed, and evaluation was made according to the following criteria, based on the position of the peeling interface. A case where the peeling interface was above the plating layer (was the interface between the plating layer and the chemical conversion film, or the interface between the electrodeposition coating and the intermediate coating) was set as pass (○), and a case where peeling at the interface between the plating layer and the base iron occurred even once was set as failure (x).

The powdering resistance was evaluated by using V-bending (JIS Z 2248), in order to evaluate the workability of the plating layer. Each of the metal coated steel sheets was cut in a size of 50×90 mm, and with a 1R-90° V-shaped die press, a molded body was formed to be set as a test object. In a valley portion of each of the test objects, tape peeling was conducted. Concretely, a cellophane adhesive tape having a width of 24 mm was pressed against a bent portion of the test object and then pulled off, and a portion of the cellophane adhesive tape at a length of 90 mm was visually judged. The evaluation criteria were set as follows. A case where the peeling of the plating layer occurred in an area of less than 5% of the area of the worked portion was set to pass (○), and a case where the peeling of the plating layer occurred in an area of more than 5% of the area of the worked portion was set to failure (x).

Regarding the appearance uniformity evaluation, lightness (L*value) at eight places in total, which are, positions separated by 50 mm from both edges in the steel sheet width direction and positions as a result of dividing a gap therebetween into seven equal parts, were measured, in which a case where a difference obtained by subtracting a minimum value from a maximum value was less than 5 was evaluated as uniform (○), a case where the difference was 5 or more and less than 10 was evaluated as slightly nonuniform (Δ), and a case where the difference was 10 or more was evaluated as nonuniform (x).

TABLE 1

| CHEMICAL COMPONENT | C MASS % | Si MASS % | Mn MASS % | P MASS % | S MASS % | Al MASS % | N MASS % | O MASS % | |
|---|---|---|---|---|---|---|---|---|---|
| A | 0.085 | 0.86 | 1.92 | 0.005 | 0.0016 | 0.059 | 0.0035 | 0.0008 | EXAMPLE |
| B | 0.051 | 0.51 | 2.38 | 0.012 | 0.0015 | 0.035 | 0.0014 | 0.0011 | EXAMPLE |
| C | 0.097 | 1.47 | 3.00 | 0.005 | 0.0011 | 0.007 | 0.0008 | 0.0032 | EXAMPLE |
| D | 0.060 | 1.09 | 1.35 | 0.009 | 0.0005 | 0.020 | 0.0047 | 0.0017 | EXAMPLE |
| E | 0.180 | 1.15 | 1.28 | 0.005 | 0.0030 | 0.042 | 0.0020 | 0.0012 | EXAMPLE |
| F | 0.107 | 0.60 | 2.95 | 0.015 | 0.0034 | 0.035 | 0.0013 | 0.0010 | EXAMPLE |
| G | 0.208 | 0.38 | 2.35 | 0.008 | 0.0048 | 0.028 | 0.0014 | 0.0010 | EXAMPLE |
| H | 0.078 | 1.19 | 3.09 | 0.012 | 0.0038 | 0.086 | 0.0008 | 0.0020 | EXAMPLE |
| I | 0.115 | 0.22 | 2.94 | 0.008 | 0.0040 | 1.246 | 0.0022 | 0.0019 | EXAMPLE |
| J | 0.234 | 0.94 | 1.44 | 0.017 | 0.0003 | 0.038 | 0.0017 | 0.0025 | EXAMPLE |
| K | 0.268 | 0.76 | 2.87 | 0.016 | 0.0040 | 0.081 | 0.0050 | 0.0018 | EXAMPLE |
| L | 0.153 | 0.94 | 2.41 | 0.011 | 0.0015 | 0.004 | 0.0030 | 0.0027 | EXAMPLE |
| M | 0.091 | 0.37 | 1.56 | 0.014 | 0.0008 | 0.046 | 0.0026 | 0.0008 | EXAMPLE |
| N | 0.203 | 0.33 | 2.49 | 0.012 | 0.0029 | 0.016 | 0.0008 | 0.0012 | EXAMPLE |
| O | 0.075 | 1.90 | 2.00 | 0.010 | 0.0029 | 0.027 | 0.0041 | 0.0015 | EXAMPLE |
| P | 0.063 | 0.66 | 2.31 | 0.015 | 0.0027 | 0.099 | 0.0027 | 0.0004 | EXAMPLE |
| Q | 0.116 | 0.72 | 1.96 | 0.017 | 0.0029 | 0.018 | 0.0046 | 0.0020 | EXAMPLE |
| R | 0.081 | 0.50 | 2.39 | 0.009 | 0.0062 | 0.072 | 0.0036 | 0.0023 | EXAMPLE |
| S | 0.203 | 0.89 | 1.74 | 0.016 | 0.0016 | 0.061 | 0.0008 | 0.0021 | EXAMPLE |
| T | 0.157 | 0.50 | 3.16 | 0.011 | 0.0025 | 0.041 | 0.0046 | 0.0009 | EXAMPLE |
| U | 0.100 | 0.88 | 2.73 | 0.047 | 0.0032 | 0.028 | 0.0033 | 0.0015 | EXAMPLE |
| V | 0.083 | 0.65 | 1.30 | 0.014 | 0.0009 | 0.066 | 0.0013 | 0.0012 | EXAMPLE |
| W | 0.092 | 0.67 | 2.86 | 0.018 | 0.0012 | 0.036 | 0.0020 | 0.0012 | EXAMPLE |
| X | 0.069 | 0.60 | 2.03 | 0.007 | 0.0004 | 0.043 | 0.0018 | 0.0032 | EXAMPLE |
| Y | 0.097 | 1.00 | 2.31 | 0.011 | 0.0059 | 0.029 | 0.0037 | 0.0020 | EXAMPLE |
| Z | 0.106 | 0.53 | 2.28 | 0.006 | 0.0031 | 0.008 | 0.0043 | 0.0022 | EXAMPLE |
| AA | 0.204 | 1.03 | 2.49 | 0.012 | 0.0014 | 0.047 | 0.0045 | 0.0003 | EXAMPLE |
| AB | 0.176 | 0.16 | 2.06 | 0.023 | 0.0016 | 0.083 | 0.0017 | 0.0013 | EXAMPLE |
| AC | 0.086 | 1.08 | 1.60 | 0.018 | 0.0006 | 0.078 | 0.0018 | 0.0008 | EXAMPLE |
| AD | 0.141 | 0.66 | 2.28 | 0.004 | 0.0009 | 0.038 | 0.0059 | 0.0016 | EXAMPLE |
| AE | 0.138 | 0.46 | 2.95 | 0.016 | 0.0016 | 0.020 | 0.0040 | 0.0017 | EXAMPLE |
| AF | 0.124 | 0.93 | 1.92 | 0.017 | 0.0027 | 0.057 | 0.0008 | 0.0007 | EXAMPLE |
| AG | 0.158 | 0.86 | 2.90 | 0.009 | 0.0003 | 0.070 | 0.0030 | 0.0028 | EXAMPLE |
| AH | 0.172 | 0.76 | 2.99 | 0.018 | 0.0031 | 0.059 | 0.0050 | 0.0013 | EXAMPLE |
| AI | 0.075 | 0.65 | 2.04 | 0.013 | 0.0004 | 0.255 | 0.0009 | 0.0010 | EXAMPLE |
| AJ | 0.157 | 0.49 | 2.07 | 0.010 | 0.0013 | 0.472 | 0.0020 | 0.0009 | EXAMPLE |
| AK | 0.179 | 0.95 | 3.07 | 0.020 | 0.0043 | 0.009 | 0.0016 | 0.0008 | EXAMPLE |
| AL | 0.096 | 0.16 | 2.25 | 0.006 | 0.0025 | 0.008 | 0.0051 | 0.0015 | EXAMPLE |
| AM | 0.177 | 0.75 | 2.40 | 0.009 | 0.0004 | 0.756 | 0.0038 | 0.0014 | EXAMPLE |
| AN | 0.150 | 0.49 | 1.83 | 0.010 | 0.0031 | 0.068 | 0.0040 | 0.0008 | EXAMPLE |

※ UNDERLINED PART IS OUT OF PRESENT INVENTION RANGE

TABLE 2

| CHEMICAL COMPONENT | C MASS % | Si MASS % | Mn MASS % | P MASS % | S MASS % | Al MASS % | N MASS % | O MASS % | |
|---|---|---|---|---|---|---|---|---|---|
| AO | 0.134 | 0.67 | 2.36 | 0.009 | 0.0038 | 0.041 | 0.0017 | 0.0025 | EXAMPLE |
| AP | 0.170 | 0.34 | 2.34 | 0.010 | 0.0020 | 0.025 | 0.0024 | 0.0008 | EXAMPLE |
| AQ | 0.124 | 0.37 | 1.22 | 0.017 | 0.0064 | 0.046 | 0.0023 | 0.0027 | EXAMPLE |
| AR | 0.084 | 0.53 | 2.20 | 0.011 | 0.0053 | 0.058 | 0.0013 | 0.0017 | EXAMPLE |
| AS | 0.135 | 0.90 | 2.37 | 0.017 | 0.0023 | 0.061 | 0.0036 | 0.0025 | EXAMPLE |
| AT | 0.084 | 0.61 | 2.63 | 0.004 | 0.0049 | 0.033 | 0.0021 | 0.0014 | EXAMPLE |
| AU | 0.086 | 0.50 | 2.29 | 0.004 | 0.0022 | 0.045 | 0.0032 | 0.0014 | EXAMPLE |
| AV | 0.114 | 0.99 | 1.79 | 0.005 | 0.0032 | 0.084 | 0.0038 | 0.0014 | EXAMPLE |
| AW | 0.157 | 0.50 | 2.20 | 0.017 | 0.0022 | 0.087 | 0.0011 | 0.0009 | EXAMPLE |
| AX | 0.090 | 0.55 | 3.20 | 0.003 | 0.0017 | 0.051 | 0.0033 | 0.0007 | EXAMPLE |
| AY | 0.186 | 1.10 | 1.97 | 0.010 | 0.0033 | 0.030 | 0.0060 | 0.0029 | EXAMPLE |
| AZ | 0.070 | 0.75 | 2.36 | 0.015 | 0.0045 | 0.040 | 0.0083 | 0.0009 | EXAMPLE |
| BA | 0.142 | 0.93 | 2.10 | 0.013 | 0.0015 | 0.064 | 0.0007 | 0.0053 | EXAMPLE |
| BB | 0.136 | 0.89 | 3.30 | 0.008 | 0.0031 | 0.070 | 0.0039 | 0.0006 | EXAMPLE |
| BC | 0.096 | 0.28 | 2.29 | 0.009 | 0.0018 | 0.007 | 0.0048 | 0.0022 | EXAMPLE |
| BD | 0.149 | 0.07 | 1.82 | 0.012 | 0.0016 | 0.037 | 0.0015 | 0.0025 | EXAMPLE |
| BE | 0.085 | 0.91 | 1.52 | 0.018 | 0.0033 | 0.052 | 0.0046 | 0.0022 | EXAMPLE |
| BF | 0.186 | 1.06 | 1.96 | 0.012 | 0.0008 | 0.047 | 0.0024 | 0.0022 | EXAMPLE |
| BG | 0.094 | 1.33 | 1.14 | 0.009 | 0.0010 | 0.021 | 0.0007 | 0.0028 | EXAMPLE |
| BH | 0.157 | 0.84 | 2.84 | 0.016 | 0.0044 | 0.211 | 0.0018 | 0.0012 | EXAMPLE |
| BI | 0.109 | 1.49 | 0.71 | 0.014 | 0.0024 | 0.068 | 0.0060 | 0.0006 | EXAMPLE |
| BJ | 0.127 | 0.67 | 1.53 | 0.003 | 0.0036 | 0.011 | 0.0017 | 0.0024 | EXAMPLE |
| BK | 0.096 | 0.44 | 1.96 | 0.013 | 0.0049 | 0.063 | 0.0017 | 0.0027 | EXAMPLE |
| BL | 0.092 | 0.55 | 2.90 | 0.006 | 0.0044 | 0.016 | 0.0017 | 0.0005 | EXAMPLE |
| BM | 0.120 | 1.73 | 0.91 | 0.009 | 0.0024 | 0.010 | 0.0036 | 0.0015 | EXAMPLE |
| BN | 0.102 | 0.11 | 1.81 | 0.004 | 0.0005 | 0.254 | 0.0030 | 0.0027 | EXAMPLE |

TABLE 2-continued

| CHEMICAL COMPONENT | C MASS % | Si MASS % | Mn MASS % | P MASS % | S MASS % | Al MASS % | N MASS % | O MASS % | |
|---|---|---|---|---|---|---|---|---|---|
| BO | 0.016 | 1.11 | 2.91 | 0.013 | 0.0026 | 0.041 | 0.0027 | 0.0017 | COMPARATIVE EXAMPLE |
| BP | 0.411 | 0.80 | 2.60 | 0.004 | 0.0047 | 0.039 | 0.0040 | 0.0020 | COMPARATIVE EXAMPLE |
| BQ | 0.141 | 0.01 | 2.03 | 0.006 | 0.0025 | 0.016 | 0.0025 | 0.0029 | COMPARATIVE EXAMPLE |
| BR | 0.126 | 2.40 | 2.92 | 0.012 | 0.0014 | 0.040 | 0.0017 | 0.0016 | COMPARATIVE EXAMPLE |
| BS | 0.121 | 0.64 | 0.17 | 0.008 | 0.0037 | 0.042 | 0.0042 | 0.0034 | COMPARATIVE EXAMPLE |
| BT | 0.158 | 0.89 | 4.09 | 0.009 | 0.0016 | 0.083 | 0.0026 | 0.0018 | COMPARATIVE EXAMPLE |
| BU | 0.086 | 0.77 | 2.54 | 0.208 | 0.0026 | 0.034 | 0.0014 | 0.0024 | COMPARATIVE EXAMPLE |
| BV | 0.147 | 0.56 | 2.07 | 0.010 | 0.0139 | 0.043 | 0.0023 | 0.0008 | COMPARATIVE EXAMPLE |
| BW | 0.137 | 0.57 | 2.16 | 0.017 | 0.0034 | 2.077 | 0.0033 | 0.0021 | COMPARATIVE EXAMPLE |
| BX | 0.134 | 0.53 | 2.30 | 0.013 | 0.0021 | 0.026 | 0.0188 | 0.0022 | COMPARATIVE EXAMPLE |
| BY | 0.190 | 0.98 | 2.94 | 0.010 | 0.0034 | 0.050 | 0.0032 | 0.0154 | COMPARATIVE EXAMPLE |

※ UNDERLINED PART IS OUT OF PRESENT INVENTION RANGE

TABLE 3

| CHEMICAL COMPONENT | Ti MASS % | Nb MASS % | V MASS % | Cr MASS % | Ni MASS % | Cu MASS % | Mo MASS % | B MASS % | W MASS % |
|---|---|---|---|---|---|---|---|---|---|
| A | | | | | | | | | |
| B | | | | | | | | | |
| C | | | | | | | | | |
| D | | | | | | | | | |
| E | | | | | | | | | |
| F | | | | | | | | | |
| G | | | | | | | | | |
| H | 0.058 | | | | | | | | |
| I | | | | | | | | | |
| J | | | | | | | | | |
| K | | | | | | | | | |
| L | | | | | | | | | |
| M | | 0.049 | | | | | | | |
| N | | | 0.49 | | | | | | |
| O | | | | | | | | | |
| P | | | 0.131 | | | | | | |
| Q | | | | 0.26 | | | | | |
| R | | | | | | | | | |
| S | | | | | 0.41 | | | | |
| T | | | | | | | | | |
| U | | | | | | | | | |
| V | | | | | | | 0.48 | | |
| W | | | | | | | | 0.18 | |
| X | | | | | | | 0.0047 | | |
| Y | | | | | | | | | |
| Z | | | | | | | | | |
| AA | 0.016 | 0.016 | | | | | | | |
| AB | | | | | | | | | |
| AC | | | | | | | | | |
| AD | 0.013 | | | | | | | 0.0009 | |
| AE | | | | | | | | | |
| AF | | | | | | | | | |
| AG | 0.035 | 0.007 | | | | | 0.15 | 0.0003 | |
| AH | 0.007 | 0.015 | | 0.14 | | | | | |
| AI | 0.090 | 0.025 | | 1.34 | | | | | |
| AJ | 0.018 | 0.026 | | | | | 0.36 | 0.0018 | |
| AK | 0.045 | 0.011 | | 0.08 | | | | 0.0030 | |
| AL | | | | | | | | | |
| AM | 0.064 | 0.014 | | 0.95 | | | | 0.0014 | |
| AN | | | | | | | | | |
| AO | | | | | | | | | |
| AP | | | | | | | | | |
| AQ | | | | | | | | | |

TABLE 3-continued

| CHEMICAL COMPONENT | Ti MASS % | Nb MASS % | V MASS % | Cr MASS % | Ni MASS % | Cu MASS % | Mo MASS % | B MASS % | W MASS % |
|---|---|---|---|---|---|---|---|---|---|
| AR | | | | | | | | | |
| AS | 0.006 | | | 0.26 | | | | | |
| AT | 0.057 | | | | | | 0.06 | | |
| AU | | 0.082 | | | | | | | |
| AV | 0.116 | | | | | | | | |
| AW | | | | | | | | | |
| AX | | | | 0.09 | | | | | |
| AY | | | | | | | 0.26 | | |
| AZ | | | | | | | | | |
| BA | | | | | | | | | |
| BB | | | | | | | | | |
| BC | | | | | | | | | |
| BD | | | | | | | | | |
| BE | | | | | | 0.61 | 0.28 | | |
| BF | | | | | | | | | |
| BG | | | | | | | | | |
| BH | | | | | | | | | |
| BI | | | | 0.72 | | | 0.11 | | |
| BJ | | 0.074 | | | | | | | |
| BK | 0.015 | | | | | | | | |
| BL | | | | | | | | 0.0063 | |
| BM | 0.005 | 0.030 | | | | | | 0.0025 | |
| BN | 0.060 | 0.018 | | | | | | 0.0032 | |
| BO | | | | | | | | | |
| BP | | | | | | | | | |
| BQ | | | | | | | | | |
| BR | | | | | | | | | |
| BS | | | | | | | | | |
| BT | | | | | | | | | |
| BU | | | | | | | | | |
| BV | | | | | | | | | |
| BW | | | | | | | | | |
| BX | | | | | | | | | |
| BY | | | | | | | | | |

| CHEMICAL COMPONENT | Ca MASS % | Ce MASS % | Mg MASS % | Zr MASS % | La MASS % | REM MASS % | |
|---|---|---|---|---|---|---|---|
| A | | | | | | | EXAMPLE |
| B | | | | | | | EXAMPLE |
| C | | | | | | | EXAMPLE |
| D | | | | | | | EXAMPLE |
| E | | | | | | | EXAMPLE |
| F | | | | | | | EXAMPLE |
| G | | | | | | | EXAMPLE |
| H | | | | | | | EXAMPLE |
| I | | | | | | | EXAMPLE |
| J | | | | | | | EXAMPLE |
| K | | | | | | | EXAMPLE |
| L | | | | | | | EXAMPLE |
| M | | | | | | | EXAMPLE |
| N | | | | | | | EXAMPLE |
| O | | | | | | | EXAMPLE |
| P | | | | | | | EXAMPLE |
| Q | | | | | | | EXAMPLE |
| R | | | | | | | EXAMPLE |
| S | | | | | | | EXAMPLE |
| T | | | | | | | EXAMPLE |
| U | | | | | | | EXAMPLE |
| V | | | | | | | EXAMPLE |
| W | | | | | | | EXAMPLE |
| X | | | | | | | EXAMPLE |
| Y | 0.0045 | | | | | | EXAMPLE |
| Z | | 0.0032 | | | | | EXAMPLE |
| AA | | | | | | | EXAMPLE |
| AB | | | 0.0046 | | | | EXAMPLE |
| AC | | | | | 0.0046 | | EXAMPLE |
| AD | | | | | | | EXAMPLE |
| AE | | | | 0.0006 | | | EXAMPLE |
| AF | | | | | | 0.0024 | EXAMPLE |
| AG | | | | | | | EXAMPLE |
| AH | | | | | | | EXAMPLE |

TABLE 3-continued

| CHEMICAL COMPONENT | Ti MASS % | Nb MASS % | V MASS % | Cr MASS % | Ni MASS % | Cu MASS % | Mo MASS % | B MASS % | W MASS % | |
|---|---|---|---|---|---|---|---|---|---|---|
| AI | | | | | | | | | | EXAMPLE |
| AJ | | | | | | | | | | EXAMPLE |
| AK | | | | | | | | | | EXAMPLE |
| AL | | | | | | | | | | EXAMPLE |
| AM | | | | | | | | | | EXAMPLE |
| AN | 0.0025 | 0.0013 | | | | | | | | EXAMPLE |
| AO | | 0.0041 | | | 0.0020 | | | | | EXAMPLE |
| AP | | | | | | | | | | EXAMPLE |
| AQ | 0.0015 | 0.0021 | | | 0.0008 | | | | | EXAMPLE |
| AR | | | | | | | | | | EXAMPLE |
| AS | | | | | | | | | | EXAMPLE |
| AT | | | | | | | | | | EXAMPLE |
| AU | | | | | | | | | | EXAMPLE |
| AV | | | | | | | | | | EXAMPLE |
| AW | | | | | | | | | | EXAMPLE |
| AX | | | | | | | | | | EXAMPLE |
| AY | | | | | | | | | | EXAMPLE |
| AZ | | | | | | | | | | EXAMPLE |
| BA | | | | | | | | | | EXAMPLE |
| BB | | | | | | | | | | EXAMPLE |
| BC | | | | | | | | | | EXAMPLE |
| BD | | | | | | | | | | EXAMPLE |
| BE | | | | | | | | | | EXAMPLE |
| BF | | | | | | | | | | EXAMPLE |
| BG | | | | | | | | | | EXAMPLE |
| BH | | | | | | | | | | EXAMPLE |
| BI | | | | | | | | | | EXAMPLE |
| BJ | | | | | | | | | | EXAMPLE |
| BK | | | | | | | | | | EXAMPLE |
| BL | | | | | | | | | | EXAMPLE |
| BM | | | | | | | | | | EXAMPLE |
| BN | | | | | | | | | | EXAMPLE |
| BO | | | | | | | | | | COMPARATIVE EXAMPLE |
| BP | | | | | | | | | | COMPARATIVE EXAMPLE |
| BQ | | | | | | | | | | COMPARATIVE EXAMPLE |
| BR | | | | | | | | | | COMPARATIVE EXAMPLE |
| BS | | | | | | | | | | COMPARATIVE EXAMPLE |
| BT | | | | | | | | | | COMPARATIVE EXAMPLE |
| BU | | | | | | | | | | COMPARATIVE EXAMPLE |
| BV | | | | | | | | | | COMPARATIVE EXAMPLE |
| BW | | | | | | | | | | COMPARATIVE EXAMPLE |
| BX | | | | | | | | | | COMPARATIVE EXAMPLE |
| BY | | | | | | | | | | COMPARATIVE EXAMPLE |

※ UNDERLINED PART IS OUT OF PRESENT INVENTION RANGE

TABLE 4

| EXPERIMENTAL EXAMPLE | CHEMICAL COMPONENT | HOT ROLLING STEP | | | | | | ACID PICKLING STEP ACID PICKLING TIME SECOND | COLD ROLLING STEP REDUCTION RATIO % | |
|---|---|---|---|---|---|---|---|---|---|---|
| | | SLAB HEATING TEMPERATURE °C. | ROLLING COMPLETION TEMPERATURE °C. | AVERAGE COOLING RATE °C./SECOND | COILING TEMPERATURE °C. | Ae3* °C. | FORMULA (1) | | | |
| 1 | A | 1205 | 913 | 22 | 538 | 863 | 2.2 | 30 | 63 | EXAMPLE |
| 2 | A | 1225 | 914 | 15 | 601 | 863 | 3.6 | 30 | 57 | COMPARATIVE EXAMPLE |

TABLE 4-continued

| | | HOT ROLLING STEP | | | | | ACID PICKLING STEP | COLD ROLLING STEP | |
|---|---|---|---|---|---|---|---|---|---|
| EXPER-IMEN-TAL EX-AMPLE | CHEM-ICAL COM-PONENT | SLAB HEATING TEMPER-ATURE °C. | ROLLING COM-PLETION TEMPER-ATURE °C. | AVER-AGE COOLING RATE °C./ SECOND | COILING TEMPER-ATURE °C. | Ae3* °C. | FORM-ULA (1) | ACID PICKLING TIME SECOND | REDUCTION RATIO % | |
| 3 | A | 1235 | 939 | 42 | 652 | 863 | 5.3 | 30 | 38 | COMPARATIVE EXAMPLE |
| 4 | A | 1235 | 939 | 42 | 652 | 863 | 5.3 | 60 | 38 | EXAMPLE |
| 5 | A | 1190 | 887 | 76 | 508 | 863 | 1.2 | 30 | 57 | EXAMPLE |
| 6 | B | 1195 | 888 | 22 | 545 | 836 | 1.8 | 30 | 61 | EXAMPLE |
| 7 | B | 1160 | 913 | 37 | 505 | 836 | 1.4 | 30 | 54 | EXAMPLE |
| 8 | B | 1230 | 933 | 19 | 608 | 836 | 2.5 | 30 | 45 | EXAMPLE |
| 9 | B | 1220 | 903 | 49 | 576 | 836 | 2.0 | 30 | 69 | EXAMPLE |
| 10 | C | 1205 | 907 | 15 | 592 | 845 | 5.0 | 30 | 56 | EXAMPLE |
| 11 | C | 1180 | 943 | 21 | 657 | 845 | 17.2 | 30 | 69 | COMPARATIVE EXAMPLE |
| 12 | C | 1180 | 943 | 21 | 657 | 845 | 17.2 | 60 | 69 | EXAMPLE |
| 13 | C | 1210 | 916 | 16 | 621 | 845 | 11.7 | 30 | 66 | EXAMPLE |
| 14 | C | 1205 | 906 | 19 | 600 | 845 | 5.7 | 30 | 35 | COMPARATIVE EXAMPLE |
| 15 | D | 1215 | 940 | 22 | 609 | 882 | 4.1 | 30 | 44 | EXAMPLE |
| 16 | D | 1185 | 908 | 21 | 487 | 882 | 3.3 | 30 | 62 | COMPARATIVE EXAMPLE |
| 17 | D | 1225 | 892 | 61 | 465 | 882 | 2.1 | 30 | 56 | EXAMPLE |
| 18 | D | 1235 | 915 | 15 | 600 | 882 | 4.7 | 30 | 70 | EXAMPLE |
| 19 | E | 1225 | 868 | 22 | 608 | 889 | 4.6 | 30 | 58 | EXAMPLE |
| 20 | E | 1195 | 903 | 20 | 601 | 889 | 4.9 | 30 | 25 | EXAMPLE |
| 21 | E | 1190 | 885 | 11 | 617 | 889 | 6.3 | 30 | 66 | EXAMPLE |
| 22 | E | 1215 | 921 | 20 | 577 | 889 | 3.5 | 30 | 36 | COMPARATIVE EXAMPLE |
| 23 | F | 1220 | 939 | 34 | 562 | 822 | 1.5 | 30 | 48 | EXAMPLE |
| 24 | F | 1200 | 911 | 45 | 632 | 822 | 2.9 | 30 | 54 | EXAMPLE |
| 25 | F | 1210 | 974 | 39 | 572 | 822 | 1.5 | 30 | 65 | EXAMPLE |
| 26 | F | 1210 | 934 | 58 | 596 | 822 | 2.0 | 30 | 52 | EXAMPLE |
| 27 | G | 1250 | 910 | 22 | 568 | 832 | 1.7 | 30 | 46 | EXAMPLE |
| 28 | G | 1225 | 891 | 54 | 508 | 832 | 0.6 | 30 | 58 | COMPARATIVE EXAMPLE |
| 29 | G | 1245 | 896 | 15 | 596 | 832 | 2.1 | 30 | 67 | EXAMPLE |
| 30 | H | 1235 | 915 | 50 | 602 | 843 | 3.9 | 30 | 52 | EXAMPLE |
| 31 | H | 1265 | 917 | 53 | 552 | 843 | 2.2 | 30 | 45 | EXAMPLE |
| 32 | H | 1255 | 904 | 34 | 564 | 843 | 2.5 | 30 | 2 | EXAMPLE |
| 33 | I | 1245 | 946 | 50 | 581 | 960 | 4.1 | 30 | 48 | EXAMPLE |
| 34 | I | 1245 | 968 | 14 | 630 | 960 | 6.9 | 30 | 55 | EXAMPLE |
| 35 | I | 1210 | 950 | 58 | 583 | 960 | 3.9 | 30 | 58 | EXAMPLE |
| 36 | J | 1190 | 891 | 27 | 595 | 877 | 3.5 | 30 | 26 | EXAMPLE |
| 37 | J | 1225 | 868 | 38 | 594 | 877 | 3.1 | 30 | 48 | EXAMPLE |
| 38 | J | 1175 | 935 | 17 | 578 | 877 | 3.4 | 30 | 53 | EXAMPLE |
| 39 | K | 1190 | 884 | 20 | 584 | 835 | 2.4 | 30 | 50 | EXAMPLE |
| 40 | K | 1240 | 917 | 16 | 582 | 835 | 2.4 | 30 | 38 | EXAMPLE |
| 41 | K | 1205 | 858 | 17 | 585 | 835 | 2.3 | 30 | 51 | EXAMPLE |
| 42 | L | 1205 | 925 | 16 | 584 | 845 | 3.1 | 30 | 59 | EXAMPLE |
| 43 | L | 1210 | 923 | 34 | 552 | 845 | 2.2 | 30 | 52 | COMPARATIVE EXAMPLE |
| 44 | M | 1185 | 882 | 15 | 544 | 857 | 2.5 | 30 | 50 | EXAMPLE |
| 45 | M | 1270 | 896 | 15 | 567 | 857 | 2.8 | 30 | 44 | EXAMPLE |
| 46 | M | 1245 | 955 | 24 | 584 | 857 | 2.4 | 30 | 47 | COMPARATIVE EXAMPLE |
| 47 | N | 1235 | 914 | 23 | 549 | 816 | 1.6 | 30 | 61 | EXAMPLE |
| 48 | N | 1255 | 911 | 31 | 569 | 816 | 2.4 | 30 | 35 | EXAMPLE |
| 49 | N | 1235 | 946 | 23 | 550 | 816 | 1.5 | 30 | 38 | COMPARATIVE EXAMPLE |
| 50 | O | 1255 | 941 | 18 | 554 | 890 | 4.7 | 30 | 52 | EXAMPLE |

TABLE 5

| EXPERIMENTAL EXAMPLE | CHEMICAL COMPONENT | HOT ROLLING STEP | | | | | | ACID PICKLING STEP ACID PICKLING TIME SECOND | COLD ROLLING STEP REDUCTION RATIO % | |
|---|---|---|---|---|---|---|---|---|---|---|
| | | SLAB HEATING TEMPERATURE ° C. | ROLLING COMPLETION TEMPERATURE ° C. | AVERAGE COOLING RATE ° C./SECOND | COILING TEMPERATURE ° C. | Ae3* ° C. | FORMULA (1) | | | |
| 51 | O | 1245 | 890 | 8 | 628 | 890 | <u>21.7</u> | 30 | 52 | COMPARATIVE EXAMPLE |
| 52 | O | 1215 | 896 | 47 | 603 | 890 | 8.1 | 30 | 25 | EXAMPLE |
| 53 | O | 1185 | 881 | 10 | 624 | 890 | 12.1 | 30 | 59 | EXAMPLE |
| 54 | P | 1235 | 928 | 22 | 572 | 851 | 2.2 | 30 | 50 | EXAMPLE |
| 55 | P | 1240 | 909 | 14 | 616 | 851 | 1.9 | 30 | 42 | EXAMPLE |
| 56 | P | 1215 | 925 | 75 | 552 | 851 | 1.4 | 30 | 47 | EXAMPLE |
| 57 | Q | 1200 | 890 | 34 | 556 | 842 | 2.0 | 30 | 50 | EXAMPLE |
| 58 | Q | 1205 | 908 | 58 | 582 | 842 | 2.2 | 30 | 36 | EXAMPLE |
| 59 | Q | 1230 | 898 | 63 | 570 | 842 | 2.0 | 30 | 49 | COMPARATIVE EXAMPLE |
| 60 | R | 1250 | 874 | 39 | 612 | 840 | 2.1 | 30 | 70 | EXAMPLE |
| 61 | R | 1185 | 880 | 27 | 563 | 840 | 4.9 | 30 | 39 | EXAMPLE |
| 62 | R | 1240 | 905 | 18 | 554 | 840 | 3.0 | 30 | 28 | EXAMPLE |
| 63 | S | 1230 | 899 | 50 | 547 | 861 | 1.8 | 30 | 52 | EXAMPLE |
| 64 | S | 1220 | 945 | 20 | 607 | 861 | 5.9 | 30 | 63 | EXAMPLE |
| 65 | T | 1245 | 908 | 25 | 605 | 813 | 2.0 | 30 | 57 | EXAMPLE |
| 66 | T | 1190 | 918 | 53 | 606 | 813 | 1.7 | 30 | 28 | EXAMPLE |
| 67 | T | 1225 | 884 | 45 | 564 | 813 | 1.8 | 30 | 45 | COMPARATIVE EXAMPLE |
| 68 | U | 1210 | 887 | 17 | 598 | 836 | 3.1 | 30 | 58 | EXAMPLE |
| 69 | U | 1220 | 932 | 17 | 581 | 836 | 3.7 | 30 | 37 | EXAMPLE |
| 70 | U | 1220 | 888 | 23 | 548 | 836 | 2.0 | 30 | 29 | EXAMPLE |
| 71 | V | 1195 | 942 | 18 | 553 | 882 | 3.0 | 30 | 52 | EXAMPLE |
| 72 | V | 1220 | 870 | 46 | 581 | 882 | 1.4 | 30 | 33 | EXAMPLE |
| 73 | V | 1225 | 929 | 32 | 596 | 882 | 2.3 | 30 | 43 | EXAMPLE |
| 74 | W | 1200 | 943 | 16 | 613 | 82/ | 3.2 | 30 | 53 | EXAMPLE |
| 75 | W | 1250 | 892 | 29 | 538 | 827 | 1.7 | 30 | 42 | COMPARATIVE EXAMPLE |
| 76 | W | 1220 | 950 | 37 | 553 | 827 | 3.4 | 30 | 44 | EXAMPLE |
| 77 | X | 1240 | 894 | 23 | 607 | 850 | 2.8 | 30 | 37 | EXAMPLE |
| 78 | X | 1205 | 940 | 24 | 571 | 850 | 3.9 | 30 | 44 | EXAMPLE |
| 79 | X | 1225 | 922 | 30 | 591 | 850 | 4.8 | 30 | 56 | COMPARATIVE EXAMPLE |
| 80 | Y | 1225 | 891 | 21 | 557 | 853 | 2.7 | 30 | 46 | EXAMPLE |
| 81 | Y | 1255 | 888 | 15 | 567 | 853 | 2.7 | 30 | 36 | EXAMPLE |
| 82 | Y | 1185 | 873 | 14 | 587 | 853 | 3.1 | 30 | 63 | EXAMPLE |
| 83 | Z | 1205 | 918 | 17 | 579 | 836 | 2.2 | 30 | 56 | EXAMPLE |
| 84 | Z | 1200 | 922 | 16 | 582 | 836 | 1.6 | 30 | 53 | COMPARATIVE EXAMPLE |
| 85 | Z | 1205 | 911 | 52 | 619 | 836 | 1.4 | 30 | 50 | EXAMPLE |
| 86 | A A | 1235 | 938 | 22 | 601 | 850 | 4.0 | 30 | 63 | EXAMPLE |
| 87 | A A | 1200 | 886 | 18 | 519 | 850 | 2.4 | 30 | 30 | EXAMPLE |
| 88 | A B | 1195 | 913 | 19 | 592 | 840 | 1.9 | 30 | 58 | EXAMPLE |
| 89 | A B | 1235 | 926 | 32 | 538 | 840 | 1.4 | 30 | 28 | EXAMPLE |
| 90 | A B | 1180 | 882 | 49 | 496 | 840 | 1.2 | 30 | 45 | EXAMPLE |
| 91 | A C | 1240 | 908 | 21 | 563 | 882 | 3.5 | 30 | 50 | EXAMPLE |
| 92 | A C | 1205 | 883 | 19 | 635 | 882 | 5.5 | 30 | 56 | EXAMPLE |
| 93 | A D | 1230 | 934 | 61 | 556 | 844 | 1.3 | 30 | 62 | EXAMPLE |
| 94 | A D | 1195 | 906 | 57 | 551 | 844 | 1.5 | 30 | 46 | EXAMPLE |
| 95 | AE | 1235 | 896 | 30 | 542 | 816 | 1.6 | 30 | 26 | EXAMPLE |
| 96 | AE | 1195 | 909 | 19 | 613 | 816 | 1.4 | 30 | 53 | EXAMPLE |
| 97 | AF | 1195 | 932 | 21 | 581 | 865 | 3.2 | 30 | 63 | EXAMPLE |
| 98 | AF | 1230 | 914 | 19 | 623 | 865 | 2.5 | 30 | 53 | EXAMPLE |
| 99 | AG | 1185 | 889 | 48 | 569 | 838 | 1.8 | 30 | 52 | EXAMPLE |
| 100 | AG | 1240 | 942 | 28 | 630 | 838 | 3.4 | 30 | 47 | EXAMPLE |

TABLE 6

| EXPERIMENTAL EXAMPLE | CHEMICAL COMPONENT | HOT ROLLING STEP | | | | | | ACID PICKLING STEP | COLD ROLLING STEP | |
| --- | --- | --- | --- | --- | --- | --- | --- | --- | --- | --- |
| | | SLAB HEATING TEMPERATURE °C. | ROLLING COMPLETION TEMPERATURE °C. | AVERAGE COOLING RATE °C./SECOND | COILING TEMPERATURE °C. | Ae3* °C. | FORMULA (1) | ACID PICKLING TIME SECOND | REDUCTION RATIO % | |
| 101 | AH | 1245 | 916 | 19 | 610 | 826 | 3.4 | 30 | 75 | EXAMPLE |
| 102 | AH | 1220 | 926 | 29 | 612 | 826 | 2.8 | 30 | 56 | EXAMPLE |
| 103 | AI | 1210 | 902 | 14 | 601 | 853 | 3.0 | 30 | 55 | EXAMPLE |
| 104 | AI | 1205 | 928 | 22 | 592 | 853 | 2.7 | 30 | 60 | EXAMPLE |
| 105 | AJ | 1230 | 921 | 32 | 557 | 903 | 3.0 | 30 | 63 | EXAMPLE |
| 106 | AJ | 1245 | 904 | 29 | 613 | 903 | 2.6 | 30 | 41 | EXAMPLE |
| 107 | AK | 1235 | 913 | 65 | 545 | 825 | 1.3 | 30 | 56 | EXAMPLE |
| 108 | AK | 1210 | 912 | 24 | 609 | 825 | 8.4 | 30 | 59 | EXAMPLE |
| 109 | AL | 1210 | 903 | 21 | 551 | 825 | 1.5 | 30 | 42 | EXAMPLE |
| 110 | AL | 1240 | 878 | 44 | 590 | 825 | 3.0 | 30 | 59 | EXAMPLE |
| 111 | AM | 1235 | 938 | 16 | 588 | 915 | 6.8 | 30 | 57 | EXAMPLE |
| 112 | AM | 1175 | 925 | 22 | 568 | 915 | 5.2 | 30 | 21 | EXAMPLE |
| 113 | AM | 1245 | 889 | 27 | 521 | 915 | 3.5 | 30 | 36 | EXAMPLE |
| 114 | AM | 1200 | 933 | 14 | 625 | 915 | 20.6 | 30 | 42 | COMPARATIVE EXAMPLE |
| 115 | AN | 1240 | 905 | 20 | 596 | 855 | 2.4 | 30 | 66 | EXAMPLE |
| 116 | AN | 1250 | 890 | 30 | 652 | 855 | 3.1 | 30 | 31 | COMPARATIVE EXAMPLE |
| 117 | AO | 1225 | 916 | 48 | 585 | 842 | 1.8 | 30 | 60 | EXAMPLE |
| 118 | AO | 1225 | 912 | 16 | 555 | 842 | 1.8 | 30 | 40 | EXAMPLE |
| 119 | AP | 1230 | 905 | 26 | 598 | 830 | 1.7 | 30 | 59 | EXAMPLE |
| 120 | AP | 1215 | 897 | 29 | 550 | 830 | 1.5 | 30 | 50 | EXAMPLE |
| 121 | AP | 1245 | 959 | 38 | 532 | 830 | 1.4 | 30 | 49 | EXAMPLE |
| 122 | AQ | 1235 | 873 | 11 | 599 | 867 | 3.2 | 30 | 63 | EXAMPLE |
| 123 | AQ | 1220 | 936 | 19 | 538 | 867 | 2.6 | 30 | 58 | EXAMPLE |
| 124 | AR | 1190 | 916 | 15 | 593 | 844 | 2.5 | 30 | 50 | EXAMPLE |
| 125 | AR | 1235 | 929 | 73 | 512 | 844 | 1.0 | 30 | 38 | EXAMPLE |
| 126 | AS | 1210 | 906 | 20 | 575 | 847 | 2.7 | 30 | 40 | EXAMPLE |
| 127 | AS | 1245 | 934 | 24 | 534 | 847 | 1.6 | 30 | 62 | EXAMPLE |
| 128 | AT | 1235 | 913 | 22 | 575 | 832 | 2.0 | 30 | 58 | EXAMPLE |
| 129 | AT | 1210 | 927 | 42 | 621 | 832 | 3.0 | 30 | 52 | EXAMPLE |
| 130 | AU | 1180 | 919 | 17 | 571 | 839 | 2.2 | 30 | 46 | EXAMPLE |
| 131 | AU | 1205 | 881 | 44 | 480 | 839 | 0.7 | 30 | 35 | COMPARATIVE EXAMPLE |
| 132 | AU | 1255 | 873 | 21 | 540 | 839 | 1.3 | 30 | 41 | EXAMPLE |
| 133 | AV | 1230 | 902 | 18 | 535 | 839 | 2.7 | 30 | 49 | EXAMPLE |
| 134 | AV | 1235 | 915 | 28 | 600 | 874 | 3.5 | 30 | 64 | EXAMPLE |
| 135 | AV | 1210 | 926 | 27 | 630 | 874 | 4.2 | 30 | 68 | EXAMPLE |
| 136 | AW | 1200 | 878 | 16 | 560 | 847 | 2.4 | 30 | 69 | EXAMPLE |
| 137 | AW | 1230 | 886 | 21 | 539 | 847 | 1.6 | 30 | 61 | COMPARATIVE EXAMPLE |
| 138 | AW | 1225 | 954 | 17 | 622 | 847 | 3.5 | 30 | 37 | EXAMPLE |
| 139 | AX | 1230 | 939 | 27 | 606 | 813 | 2.0 | 30 | 48 | EXAMPLE |
| 140 | AX | 1205 | 918 | 53 | 497 | 813 | 1.0 | 30 | 53 | EXAMPLE |
| 141 | AY | 1215 | 942 | 31 | 562 | 869 | 2.7 | 30 | 42 | EXAMPLE |
| 142 | AY | 1210 | 962 | 21 | 538 | 869 | 9.1 | 30 | 44 | EXAMPLE |

TABLE 6-continued

| EXPERIMENTAL EXAMPLE | CHEMICAL COMPONENT | HOT ROLLING STEP | | | | | | ACID PICKLING STEP | COLD ROLLING STEP | |
|---|---|---|---|---|---|---|---|---|---|---|
| | | SLAB HEATING TEMPERATURE °C | ROLLING COMPLETION TEMPERATURE °C | AVERAGE COOLING RATE °C./SECOND | COILING TEMPERATURE °C | Ae3* °C | FORMULA (1) | ACID PICKLING TIME SECOND | REDUCTION RATIO % | |
| 143 | AZ | 1230 | 896 | 27 | 571 | 845 | 2.0 | 30 | 74 | EXAMPLE |
| 144 | AZ | 1245 | 926 | 15 | 608 | 845 | 2.8 | 30 | 56 | EXAMPLE |
| 145 | BA | 1215 | 869 | 25 | 564 | 861 | 2.4 | 30 | 56 | EXAMPLE |
| 146 | BA | 1180 | 895 | 27 | 583 | 861 | 3.0 | 30 | 41 | EXAMPLE |
| 147 | BB | 1215 | 908 | 25 | 594 | 825 | 3.1 | 30 | 52 | EXAMPLE |
| 148 | BB | 1170 | 914 | 17 | 553 | 825 | 3.0 | 30 | 56 | COMPARATIVE EXAMPLE |
| 149 | BB | 1235 | 907 | 15 | 574 | 825 | 3.0 | 30 | 5 | EXAMPLE |
| 150 | BB | 1185 | 911 | 51 | 551 | 825 | 2.5 | 30 | 61 | EXAMPLE |
| 151 | BC | 1190 | 920 | 70 | 545 | 828 | 1.0 | 30 | 73 | EXAMPLE |

TABLE 7

| EXPERIMENTAL EXAMPLE | CHEMICAL COMPONENT | HOT ROLLING STEP | | | | | | | ACID PICKLING STEP | COLD ROLLING | |
|---|---|---|---|---|---|---|---|---|---|---|---|
| | | SLAB HEATING TEMPERATURE °C. | ROLLING COMPLETION TEMPERATURE °C. | AVERAGE COOLING RATE °C./SECOND | COILING TEMPERATURE °C. | Ae3* °C. | FORMULA (1) | | ACID PICKLING TIME SECOND | STEP REDUCTION RATIO % | |
| 152 | BC | 1215 | 879 | 63 | 534 | 828 | 0.9 | | 30 | 59 | EXAMPLE |
| 153 | BC | 1200 | 899 | 55 | 591 | 828 | 1.5 | | 30 | 55 | EXAMPLE |
| 154 | BC | 1250 | 913 | 28 | 572 | 828 | 1.4 | | 30 | 1 | EXAMPLE |
| 155 | BC | 1235 | 882 | 55 | 538 | 828 | 0.6 | | 30 | 44 | COMPARATIVE EXAMPLE |
| 156 | BD | 1240 | 906 | 23 | 553 | 838 | 1.9 | | 30 | 50 | EXAMPLE |
| 157 | BD | 1235 | 938 | 16 | 606 | 838 | 2.6 | | 30 | 43 | EXAMPLE |
| 158 | BE | 1230 | 894 | 32 | 568 | 838 | 1.9 | | 30 | 58 | EXAMPLE |
| 159 | BE | 1230 | 898 | 16 | 565 | 845 | 2.0 | | 30 | 41 | EXAMPLE |
| 160 | BF | 1230 | 914 | 34 | 571 | 867 | 2.8 | | 30 | 60 | EXAMPLE |
| 161 | RF | 1190 | 931 | 66 | 577 | 867 | 1.5 | | 30 | 48 | EXAMPLE |
| 162 | BF | 1210 | 912 | 27 | 598 | 867 | 2.9 | | 30 | 38 | EXAMPLE |
| 163 | BF | 1195 | 903 | 16 | 573 | 867 | 3.6 | | 30 | 51 | COMPARATIVE EXAMPLE |
| 164 | BG | 1250 | 904 | 45 | 573 | 896 | 3.6 | | 30 | 74 | EXAMPLE |
| 165 | BG | 1235 | 908 | 19 | 621 | 896 | 20.3 | | 30 | 59 | COMPARATIVE EXAMPLE |
| 166 | BG | 1215 | 879 | 28 | 589 | 896 | 3.5 | | 30 | 62 | EXAMPLE |
| 167 | BH | 1225 | 886 | 19 | 566 | 854 | 2.7 | | 30 | 63 | EXAMPLE |
| 168 | BH | 1195 | 904 | 29 | 563 | 854 | 1.7 | | 30 | 27 | COMPARATIVE EXAMPLE |
| 169 | BH | 1215 | 936 | 58 | 602 | 854 | 2.1 | | 30 | 49 | EXAMPLE |
| 170 | BH | 1240 | 882 | 61 | 574 | 854 | 1.7 | | 30 | 48 | EXAMPLE |
| 171 | BI | 1210 | 939 | 55 | 558 | 908 | 4.0 | | 30 | 38 | EXAMPLE |
| 172 | BI | 1195 | 898 | 25 | 516 | 908 | 7.9 | | 30 | 69 | COMPARATIVE EXAMPLE |
| 173 | BJ | 1245 | 893 | 48 | 595 | 863 | 2.1 | | 30 | 55 | EXAMPLE |
| 174 | BJ | 1195 | 881 | 52 | 528 | 863 | 1.8 | | 30 | 46 | COMPARATIVE EXAMPLE |
| 175 | BJ | 1225 | 920 | 35 | 559 | 863 | 3.1 | | 30 | 46 | EXAMPLE |
| 176 | BK | 1220 | 914 | 52 | 618 | 849 | 2.0 | | 30 | 61 | EXAMPLE |
| 177 | BK | 1235 | 911 | 62 | 581 | 849 | 2.6 | | 30 | 57 | EXAMPLE |
| 178 | BL | 1190 | 905 | 19 | 604 | 820 | 2.6 | | 30 | 68 | EXAMPLE |
| 179 | BL | 1185 | 912 | 46 | 582 | 820 | 2.4 | | 30 | 46 | EXAMPLE |
| 180 | BL | 1245 | 916 | 18 | 555 | 820 | 1.9 | | 30 | 39 | COMPARATIVE EXAMPLE |
| 181 | BL | 1210 | 890 | 56 | 575 | 820 | 1.3 | | 30 | 65 | COMPARATIVE EXAMPLE |
| 182 | BM | 1215 | 925 | 28 | 589 | 914 | 5.7 | | 30 | 42 | EXAMPLE |
| 183 | BM | 1250 | 903 | 53 | 601 | 914 | 13.9 | | 30 | 50 | COMPARATIVE EXAMPLE |
| 184 | BM | 1215 | 944 | 12 | 637 | 914 | 15.4 | | 30 | 45 | COMPARATIVE EXAMPLE |
| 185 | BN | 1240 | 890 | 18 | 605 | 867 | 2.5 | | 30 | 50 | EXAMPLE |
| 186 | BN | 1220 | 946 | 32 | 548 | 867 | 2.7 | | 30 | 57 | EXAMPLE |
| 187 | BO | 1225 | 939 | 24 | 575 | 840 | 2.9 | | 30 | 56 | COMPARATIVE EXAMPLE |
| 188 | BP | 1250 | 893 | 57 | 578 | 839 | 1.9 | | 30 | 52 | COMPARATIVE EXAMPLE |
| 189 | BQ | 1220 | 907 | 29 | 574 | 828 | 1.4 | | 30 | 59 | COMPARATIVE EXAMPLE |
| 190 | BR | EXPERIMENT STOPPED BECAUSE CRACKED DURING SLAB HEATING IN HOT ROLLING STEP | | | | | | | | | COMPARATIVE EXAMPLE |
| 191 | BS | 1180 | 909 | 16 | 555 | 905 | 5.4 | | 30 | 53 | COMPARATIVE EXAMPLE |

TABLE 7-continued

| | | HOT ROLLING STEP | | | | | | ACID PICKLING STEP | COLD ROLLING STEP | |
|---|---|---|---|---|---|---|---|---|---|---|
| EXPERIMENTAL EXAMPLE | CHEMICAL COMPONENT | SLAB HEATING TEMPERATURE °C. | ROLLING COMPLETION TEMPERATURE °C. | AVERAGE COOLING RATE °C./SECOND | COILING TEMPERATURE °C. | Ae3* °C. | FORMULA (1) | ACID PICKLING TIME SECOND | REDUCTION RATIO % | |
| 192 | BT | EXPERIMENT STOPPED BECAUSE SLAB CRACKED DURING SLAB HEATING IN HOT ROLLING STEP | | | | | | | | COMPARATIVE EXAMPLE |
| 193 | BU | EXPERIMENT STOPPED BECAUSE SLAB CRACKED DURING ROLLING IN HOT ROLLING STEP | | | | | | | | COMPARATIVE EXAMPLE |
| 194 | Bv | 1225 | 939 | 23 | 561 | 847 | 2.1 | 30 | 62 | COMPARATIVE EXAMPLE |
| 195 | BW | AFTER SLAB WAS CAST, SLAB CRACKED DURING TRANSFER, SO THAT EXPERIMENT STOPPED | | | | | | | | COMPARATIVE EXAMPLE |
| 196 | BX | 1245 | 876 | 47 | 583 | 838 | 1.7 | 30 | 50 | COMPARATIVE EXAMPLE |
| 197 | BY | 1215 | 916 | 50 | 594 | 836 | 2.9 | 30 | 40 | COMPARATIVE EXAMPLE |
| 198 | A | 1205 | 913 | 22 | 538 | 877 | 3.4 | 30 | 53 | COMPARATIVE EXAMPLE |
| 199 | J | 1175 | 935 | 17 | 578 | 877 | 3.4 | 30 | 53 | EXAMPLE |
| 200 | D | 1215 | 940 | 22 | 609 | 882 | 4.1 | 15 | 44 | COMPARATIVE EXAMPLE |
| 201 | D | 1215 | 940 | 22 | 609 | 882 | 4.1 | 30 | 40 | EXAMPLE |
| 202 | D | 1215 | 940 | 22 | 609 | 882 | 4.1 | 30 | 38 | COMPARATIVE EXAMPLE |

TABLE 8

| | | | HEATING STEP | | | | | ANNEALING STEP | | | | | COOLING STEP | | | | | |
|---|---|---|---|---|---|---|---|---|---|---|---|---|---|---|---|---|---|---|
| | | | | | | | | PREHEATING ZONE | | SOAKING ZONE | | | | MARTENSITE TRANSFORMATION TREATMENT | | | BAINITE TRANSFORMATION TREATMENT 1 | | |
| EXPERIMENTAL EXAMPLE | CHEMICAL COMPONENT | AVERAGE HEATING RATE °C/SECOND | MAXIMUM HEATING TEMPERATURE Tm °C | Ac3 °C | Ac3-Tm °C | Ac1 °C | Tm-Ac1 °C | AIR RATIO | Log(P(H₂O)/P(H₂)) | Log(P(H₂O)/P(H₂)) | COOLING Rate 1 °C/SECOND | COOLING Rate 2 °C/SECOND | Ms POINT °C | AVERAGE TEMPERATURE °C | TREATMENT TIME SECOND | AVERAGE TEMPERATURE °C | TREATMENT TIME SECOND | |
| 1 | A | 2.5 | 813 | 861 | 48 | 712 | 101 | 0.8 | −0.6 | −0.7 | 1.3 | 4.2 | 364 | — | — | — | — | EXAMPLE |
| 2 | A | 2.6 | 801 | 861 | 60 | 712 | 89 | 0.9 | −0.7 | −0.5 | 1.6 | 5.4 | 350 | — | — | — | — | COMPARATIVE EXAMPLE |
| 3 | A | 1.3 | 796 | 861 | 65 | 712 | 84 | 0.8 | −0.7 | −0.7 | 1.3 | 37.0 | 323 | — | — | 460 | 39 | COMPARATIVE EXAMPLE |
| 4 | A | 1.3 | 796 | 861 | 65 | 712 | 84 | 0.8 | −0.7 | −0.7 | 1.3 | 37.0 | 323 | — | — | 460 | 39 | EXAMPLE |
| 5 | A | 2.0 | 809 | 861 | 52 | 712 | 97 | 0.9 | −0.7 | −0.6 | 1.1 | 5.6 | 250 | — | — | — | — | EXAMPLE |
| 6 | B | 2.3 | 805 | 852 | 47 | 693 | 112 | 0.9 | −0.6 | −0.5 | 1.5 | 5.8 | 375 | — | — | — | — | EXAMPLE |
| 7 | B | 2.4 | 797 | 852 | 55 | 693 | 104 | 0.9 | −0.7 | −0.5 | 1.2 | 8.0 | 330 | — | — | — | — | EXAMPLE |
| 8 | B | 2.9 | 829 | 852 | 23 | 693 | 136 | 0.8 | −0.4 | −0.2 | 1.6 | 6.8 | 336 | — | — | — | — | EXAMPLE |
| 9 | B | 2.4 | 794 | 852 | 58 | 693 | 101 | 0.8 | −1.2 | −1.7 | 1.2 | 7.1 | 365 | 307 | 13 | 420 | 98 | EXAMPLE |
| 10 | C | 1.9 | 805 | 847 | 42 | 703 | 102 | 0.8 | −0.6 | −0.5 | 1.4 | 8.5 | 296 | — | — | — | — | EXAMPLE |
| 11 | C | 3.3 | 789 | 847 | 58 | 703 | 86 | 0.9 | −0.8 | −1.0 | 1.3 | 21.9 | 296 | — | — | — | — | COMPARATIVE EXAMPLE |
| 12 | C | 3.3 | 789 | 847 | 58 | 703 | 86 | 0.9 | −0.8 | −1.0 | 1.3 | 21.9 | 296 | — | — | — | — | EXAMPLE |
| 13 | C | 2.5 | 789 | 847 | 58 | 703 | 86 | 0.8 | −0.7 | −0.6 | 1.2 | 8.4 | 296 | — | — | — | — | EXAMPLE |
| 14 | C | 2.7 | 791 | 847 | 56 | 703 | 88 | 0.9 | −0.6 | −0.5 | 0.9 | 6.4 | 275 | — | — | — | — | COMPARATIVE EXAMPLE |
| 15 | D | 3.3 | 831 | 892 | 61 | 728 | 103 | 0.9 | −0.6 | −0.5 | 1.1 | 12.1 | 380 | — | — | — | — | EXAMPLE |
| 16 | D | 4.0 | 810 | 892 | 82 | 728 | 82 | 1.1 | −0.7 | −0.7 | 1.2 | 24.3 | 343 | — | — | — | — | COMPARATIVE EXAMPLE |
| 17 | D | 2.0 | 819 | 892 | 73 | 728 | 91 | 0.9 | −0.6 | −0.5 | 2.3 | 14.7 | 401 | 376 | 17 | — | — | EXAMPLE |
| 18 | D | 2.2 | 817 | 892 | 75 | 728 | 89 | 0.9 | −0.7 | −0.6 | 1.5 | 13.9 | 360 | 346 | 12 | 348 | 26 | EXAMPLE |
| 19 | E | 2.0 | 825 | 867 | 42 | 733 | 92 | 0.9 | −0.6 | −0.7 | 1.0 | 7.4 | 236 | — | — | — | — | EXAMPLE |
| 20 | E | 2.3 | 799 | 867 | 68 | 733 | 66 | 1.0 | −0.5 | −0.4 | 1.3 | 4.2 | 243 | — | — | — | — | COMPARATIVE EXAMPLE |
| 21 | E | 2.1 | 812 | 867 | 55 | 733 | 79 | 0.8 | −0.5 | −0.4 | 2.2 | 5.1 | 290 | — | — | — | — | EXAMPLE |
| 22 | E | 2.8 | 816 | 867 | 51 | 733 | 83 | 0.9 | −0.6 | −0.5 | 0.3 | 6.0 | 125 | — | — | — | — | COMPARATIVE EXAMPLE |
| 23 | F | 2.0 | 777 | 824 | 47 | 686 | 91 | 0.8 | −0.7 | −0.6 | 1.0 | 3.3 | 275 | — | — | — | — | EXAMPLE |
| 24 | F | 2.4 | 768 | 824 | 56 | 686 | 82 | 0.8 | −0.7 | −0.6 | 1.3 | 4.8 | 302 | — | — | 416 | 15 | EXAMPLE |
| 25 | F | 1.6 | 771 | 824 | 53 | 686 | 85 | 0.7 | −0.8 | −1.0 | 1.1 | 4.8 | 284 | — | — | — | — | EXAMPLE |
| 26 | F | 2.2 | 768 | 824 | 56 | 686 | 82 | 0.9 | −0.5 | −0.3 | 0.9 | 2.8 | 254 | — | — | — | — | EXAMPLE |
| 27 | G | 1.8 | 790 | 818 | 28 | 689 | 101 | 0.8 | −0.8 | −0.7 | 1.0 | 4.7 | 102 | — | — | — | — | COMPARATIVE EXAMPLE |
| 28 | G | 1.6 | 771 | 818 | 47 | 689 | 82 | 0.8 | −0.8 | −0.7 | 0.8 | 4.9 | 155 | — | — | — | — | EXAMPLE |

TABLE 8-continued

| EXPERIMENTAL EXAMPLE | CHEMICAL COMPONENT | ANNEALING STEP ||||||||| COOLING STEP |||||  |
|---|---|---|---|---|---|---|---|---|---|---|---|---|---|---|---|---|
| | | HEATING STEP ||||||| | | | MARTENSITE TRANSFORMATION TREATMENT || BAINITE TRANSFORMATION TREATMENT 1 || |
| | | AVERAGE HEATING RATE °C./SECOND | MAXIMUM HEATING TEMPERATURE Tm °C. | Ac3 °C. | Ac3-Tm °C. | Ac1 °C. | Tm-Ac1 °C. | PREHEATING ZONE AIR RATIO | PREHEATING ZONE Log (P(H₂O)/P(H₂)) | SOAKING ZONE Log (P(H₂O)/P(H₂)) | COOLING Rate 1 °C./SECOND | COOLING Rate 2 °C./SECOND | Ms POINT °C. | AVERAGE TEMPERATURE °C. | TREATMENT TIME SECOND | AVERAGE TEMPERATURE °C. | TREATMENT TIME SECOND | |
| 29 | G | 2.8 | 813 | 818 | 5 | 689 | 124 | 0.7 | −0.6 | −0.5 | 0.9 | 7.5 | 102 | — | — | — | — | EXAMPLE |
| 30 | H | 2.1 | 797 | 856 | 59 | 696 | 101 | 0.9 | −0.6 | −0.6 | 1.0 | 7.5 | 294 | — | — | — | — | EXAMPLE |
| 31 | H | 2.6 | 781 | 856 | 75 | 696 | 85 | 0.8 | −0.9 | −1.3 | 1.6 | 8.1 | 320 | 313 | 42 | — | — | EXAMPLE |
| 32 | H | 1.6 | 799 | 856 | 57 | 696 | 103 | 0.7 | −0.6 | −0.5 | 0.7 | 5.8 | 133 | — | — | — | — | EXAMPLE |
| 33 | I | 3.2 | 874 | 987 | 113 | 724 | 150 | 0.8 | −0.7 | −0.5 | 1.1 | 9.0 | 276 | — | — | — | — | EXAMPLE |
| 34 | I | 1.5 | 865 | 987 | 122 | 724 | 141 | 1.0 | −1.0 | −1.2 | 0.9 | 2.5 | 288 | — | — | 339 | 83 | EXAMPLE |
| 35 | I | 1.2 | 768 | 987 | 219 | 724 | 44 | 0.7 | −0.6 | −0.8 | 1.1 | 10.0 | 137 | — | — | — | — | EXAMPLE |
| 36 | J | 2.3 | 799 | 839 | 40 | 719 | 80 | 0.9 | −0.5 | −0.4 | 1.1 | 5.0 | 107 | — | — | — | — | EXAMPLE |
| 37 | J | 3.3 | 787 | 839 | 52 | 719 | 68 | 0.7 | −0.6 | −0.6 | 0.8 | 7.9 | 225 | — | — | 476 | 21 | EXAMPLE |
| 38 | J | 1.8 | 794 | 839 | 45 | 719 | 75 | 1.0 | −1.2 | −1.5 | 1.5 | 13.3 | 107 | — | — | — | — | EXAMPLE |
| 39 | K | 1.8 | 790 | 808 | 18 | 690 | 100 | 0.8 | −0.7 | −0.8 | 0.7 | 5.7 | 68 | — | — | — | — | EXAMPLE |
| 40 | K | 1.8 | 768 | 808 | 40 | 690 | 78 | 0.7 | −0.8 | −0.8 | 0.9 | 1.4 | 149 | — | — | — | — | EXAMPLE |
| 41 | K | 2.6 | 765 | 808 | 43 | 690 | 75 | 0.9 | −0.6 | −0.5 | 0.8 | 3.1 | 149 | — | — | — | — | EXAMPLE |
| 42 | L | 2.3 | 815 | 843 | 28 | 704 | 111 | 0.9 | −0.6 | −0.6 | 1.3 | 8.1 | 174 | — | — | — | — | EXAMPLE |
| 43 | L | 3.0 | 794 | 843 | 49 | 704 | 90 | 0.9 | −0.6 | −0.6 | 0.9 | 5.9 | 164 | — | — | 525 | 175 | COMPARATIVE EXAMPLE |
| 44 | M | 2.1 | 808 | 864 | 56 | 703 | 105 | 0.9 | −0.7 | −0.6 | 1.1 | 6.3 | 150 | — | — | — | — | EXAMPLE |
| 45 | M | 1.7 | 804 | 864 | 60 | 703 | 101 | 0.9 | −0.7 | −0.6 | 2.1 | 7.0 | 377 | — | — | 419 | 248 | EXAMPLE |
| 46 | M | 1.5 | 791 | 864 | 73 | 703 | 88 | 0.6 | −0.6 | −0.5 | 0.7 | 6.5 | 150 | — | — | — | — | COMPARATIVE EXAMPLE |
| 47 | N | 2.3 | 785 | 811 | 26 | 698 | 87 | 0.8 | −0.6 | −0.5 | 1.3 | 2.3 | 188 | — | — | — | — | EXAMPLE |
| 48 | N | 2.1 | 785 | 811 | 26 | 698 | 87 | 0.8 | −0.6 | −0.5 | 1.5 | 20.3 | 245 | — | — | — | — | EXAMPLE |
| 49 | N | 2.6 | 768 | 811 | 43 | 698 | 70 | 0.9 | −0.6 | −0.5 | 5.4 | 7.0 | 302 | — | — | 385 | 63 | COMPARATIVE EXAMPLE |
| 50 | O | 2.4 | 828 | 898 | 70 | 729 | 99 | 1.0 | −0.6 | −0.7 | 1.2 | 5.2 | 306 | — | — | — | — | EXAMPLE |

TABLE 9

| EXPERI-MENTAL EXAMPLE | CHEM-ICAL COMPO-NENT | ANNEALING STEP ||||||||||||| |
|---|---|---|---|---|---|---|---|---|---|---|---|---|---|---|
| | | HEATING STEP |||||||| COOLING STEP ||||| |
| | | AVERAGE HEATING RATE °C/ SECOND | MAXIMUM HEATING TEMPERA-TURE Tm °C | Ac3 °C | Ac3-Tm °C | Ac1 °C | Tm-Ac1 °C | PREHEATING ZONE || SOAK-ING ZONE Log (P(H₂O)/P(H₂)) | COOL-ING Rate 1 °C/ SEC-OND | COOL-ING Rate 2 °C/ SEC-OND | Ms POINT °C | MARTENSITE TRANSFORMATION TREATMENT || BAINITE TRANSFOR-MATION TREATMENT 1 || |
| | | | | | | | | AIR RATIO | Log (P(H₂O)/P(H₂)) | | | | | AVER-AGE TEM-PERA-TURE °C | TREAT-MENT TIME SEC-OND | AVER-AGE TEM-PERA-TURE °C | TREAT-MENT TIME SEC-OND | |
| 51 | O | 3.0 | 830 | 898 | 68 | 729 | 101 | 0.8 | −0.7 | −0.8 | 1.2 | 7.5 | 295 | — | — | — | — | COMPARATIVE EXAMPLE |
| 52 | O | 3.2 | 812 | 898 | 86 | 729 | 83 | 0.8 | −0.6 | −0.5 | 1.1 | 5.2 | 328 | — | — | — | — | EXAMPLE |
| 53 | O | 2.9 | 813 | 898 | 85 | 729 | 84 | 1.0 | −0.6 | −0.5 | 1.0 | 14.4 | 301 | — | — | — | — | EXAMPLE |
| 54 | P | 2.9 | 802 | 868 | 66 | 701 | 101 | 0.9 | −0.7 | −0.6 | 1.0 | 4.5 | 337 | — | — | — | — | EXAMPLE |
| 55 | P | 3.6 | 794 | 868 | 74 | 701 | 93 | 0.8 | −1.0 | −1.5 | 1.3 | 4.4 | 345 | — | — | — | — | EXAMPLE |
| 56 | P | 3.1 | 801 | 868 | 67 | 701 | 100 | 0.7 | −07 | −0.6 | 1.2 | 5.8 | 359 | — | — | — | — | EXAMPLE |
| 57 | Q | 2.3 | 804 | 835 | 31 | 693 | 111 | 0.7 | −0.6 | −0.5 | 0.9 | 7.3 | 114 | — | — | — | — | EXAMPLE |
| 58 | Q | 3.3 | 782 | 835 | 53 | 693 | 89 | 0.9 | −0.5 | −0.5 | 1.4 | 10.1 | 296 | — | — | — | — | EXAMPLE |
| 59 | Q | 2.6 | 794 | 835 | 41 | 693 | 101 | 0.8 | −0.6 | −0.4 | 1.8 | 6.7 | 327 | 307 | 18 | 409 | 128 | COMPARATIVE EXAMPLE |
| 60 | R | 1.7 | 798 | 843 | 45 | 690 | 108 | 0.8 | −0.6 | −0.6 | 0.8 | 4.0 | 24 | — | — | — | — | EXAMPLE |
| 61 | R | 1.6 | 790 | 843 | 53 | 690 | 100 | 1.0 | −0.6 | −0.6 | 0.7 | 7.5 | 131 | — | — | — | — | EXAMPLE |
| 62 | R | 3.6 | 787 | 843 | 56 | 690 | 97 | 0.8 | −0.6 | −0.5 | 0.8 | 2.2 | −97 | — | — | — | — | EXAMPLE |
| 63 | S | 2.1 | 810 | 831 | 21 | 713 | 97 | 0.7 | −0.7 | −0.4 | 1.0 | 7.6 | 112 | — | — | — | — | EXAMPLE |
| 64 | S | 2.0 | 787 | 831 | 44 | 713 | 74 | 1.0 | −0.6 | −0.7 | 0.9 | 39.0 | 136 | — | — | — | — | EXAMPLE |
| 65 | S | 2.1 | 769 | 811 | 42 | 677 | 92 | 0.8 | −0.6 | −0.6 | 0.8 | 1.6 | 148 | — | — | — | — | EXAMPLE |
| 66 | T | 2.0 | 794 | 811 | 17 | 677 | 117 | 0.9 | −0.6 | −0.5 | 1.1 | 82.1 | 176 | — | — | 376 | 413 | COMPARATIVE EXAMPLE |
| 67 | T | 2.5 | 828 | 811 | −17 | 677 | 151 | 0.9 | −0.6 | −0.6 | 2.5 | 2.6 | 321 | — | — | — | — | EXAMPLE |
| 68 | T | 2.7 | 793 | 837 | 44 | 690 | 103 | 0.9 | −0.6 | −0.6 | 1.1 | 8.1 | 236 | — | — | — | — | EXAMPLE |
| 69 | U | 2.6 | 775 | 837 | 62 | 690 | 85 | 0.8 | −0.7 | −0.8 | 1.4 | 10.0 | 311 | — | — | — | — | EXAMPLE |
| 70 | U | 2.5 | 771 | 837 | 66 | 690 | 81 | 0.8 | −0.7 | −0.8 | 1.3 | 5.9 | 305 | — | — | — | — | EXAMPLE |
| 71 | U | 2.3 | 817 | 883 | 66 | 720 | 97 | 0.9 | −0.7 | −0.7 | 1.4 | 5.4 | 368 | — | — | — | — | EXAMPLE |
| 72 | V | 3.8 | 818 | 883 | 65 | 720 | 98 | 1.0 | −0.6 | −0.5 | 1.7 | 22.2 | 381 | — | — | — | — | EXAMPLE |
| 73 | V | 2.8 | 816 | 883 | 67 | 720 | 96 | 0.9 | −0.6 | −0.5 | 0.4 | 5.9 | 159 | — | — | — | — | EXAMPLE |
| 74 | V | 3.0 | 786 | 836 | 50 | 685 | 101 | 0.9 | −0.6 | −0.5 | 1.2 | 4.7 | 296 | — | — | — | — | EXAMPLE |
| 75 | W | 2.0 | 778 | 836 | 58 | 685 | 93 | 0.9 | −0.4 | −0.1 | 0.8 | 7.7 | 214 | — | — | — | — | EXAMPLE |
| 76 | W | 1.7 | 781 | 836 | 55 | 685 | 96 | 0.9 | −0.5 | −0.5 | 0.6 | 2.8 | 141 | — | — | — | — | EXAMPLE |
| 77 | W | 1.9 | 808 | 860 | 52 | 699 | 109 | 0.9 | −0.5 | −0.5 | 1.1 | 11.0 | 135 | — | — | — | — | EXAMPLE |
| 78 | X | 3.0 | 796 | 860 | 64 | 699 | 97 | 0.8 | −0.5 | −0.4 | 1.5 | 4.1 | 345 | — | — | — | — | EXAMPLE |
| 79 | X | 2.0 | 796 | 860 | 64 | 699 | 97 | 0.8 | −0.4 | −0.3 | 1.2 | 4.3 | 336 | — | — | — | — | EXAMPLE |
| 80 | Y | 2.5 | 818 | 852 | 34 | 704 | 114 | 0.8 | −0.6 | −0.5 | 1.1 | 7.8 | 159 | 300 | 27 | — | — | COMPARATIVE EXAMPLE |
| 81 | Y | 1.8 | 802 | 852 | 50 | 704 | 98 | 0.9 | −0.8 | −0.4 | 2.2 | 48.0 | 350 | — | — | — | — | EXAMPLE |
| 82 | Y | 2.4 | 789 | 852 | 63 | 704 | 85 | 0.8 | −0.5 | −1.0 | 1.0 | 5.0 | 276 | — | — | — | — | EXAMPLE |
| 83 | Z | 3.0 | 803 | 849 | 46 | 698 | 105 | 0.8 | −0.5 | −0.8 | 1.1 | 4.9 | 280 | — | — | — | — | EXAMPLE |
| 84 | Z | 0.1 | 773 | 849 | 76 | 690 | 75 | 0.8 | −0.6 | −0.5 | 1.0 | 7.8 | 301 | — | — | — | — | COMPARATIVE EXAMPLE |

TABLE 9-continued

| | | | HEATING STEP | | | | | | PREHEATING ZONE | | SOAKING ZONE | | | COOLING STEP | | | | | | |
|---|---|---|---|---|---|---|---|---|---|---|---|---|---|---|---|---|---|---|---|---|
| | | | | | | | | | | | | | | | MARTENSITE TRANSFORMATION TREATMENT | | | BAINITE TRANSFORMATION TREATMENT 1 | | |
| EXPERI-MENTAL EXAMPLE | CHEM-ICAL COMPO-NENT | AVERAGE HEATING RATE °C/SECOND | MAXIMUM HEATING TEMPERA-TURE Tm °C | Ac3 °C | Ac3-Tm °C | Ac1 °C | Tm Ac1 °C | AIR RATIO | Log (P(H₂O)/P(H₂)) | Log (P(H₂O)/P(H₂)) | COOL-ING Rate 1 °C/SECOND | COOL-ING Rate 2 °C/SECOND | Ms POINT °C | AVER-AGE TEM-PERA-TURE °C | TREAT-MENT TIME SEC-OND | AVER-AGE TEM-PERA-TURE °C | TREAT-MENT TIME SEC-OND | |
| 85 | Z | 2.9 | 750 | 849 | 59 | 698 | 92 | 0.8 | −0.6 | −0.5 | 0.9 | 7.1 | 189 | — | — | — | — | EXAMPLE |
| 86 | AA | 2.4 | 813 | 841 | 28 | 703 | 110 | 1.0 | −0.7 | −0.7 | 1.0 | 12.1 | 94 | — | — | — | — | EXAMPLE |
| 87 | AA | 2.4 | 783 | 841 | 58 | 703 | 80 | 0.9 | −0.6 | −0.7 | 1.0 | 4.8 | 197 | — | — | — | — | EXAMPLE |
| 88 | AB | 2.5 | 793 | 832 | 39 | 695 | 96 | 0.8 | −0.7 | −0.6 | 1.8 | 4.0 | 265 | — | — | — | — | EXAMPLE |
| 89 | AB | 2.2 | 782 | 832 | 50 | 695 | 87 | 0.9 | −0.6 | −0.5 | 1.2 | 5.3 | 248 | — | — | 380 | 45 | EXAMPLE |
| 90 | AB | 1.6 | 794 | 832 | 38 | 695 | 99 | 0.8 | −1.2 | −0.9 | 0.7 | 2.6 | 120 | — | — | — | — | EXAMPLE |
| 91 | AC | 2.1 | 834 | 886 | 52 | 720 | 114 | 0.6 | −0.7 | −0.6 | 1.1 | 3.0 | 130 | — | — | — | — | EXAMPLE |
| 92 | AC | 2.4 | 806 | 886 | 80 | 720 | 86 | 0.7 | −0.6 | −0.8 | 0.6 | 4.7 | 166 | — | — | — | — | EXAMPLE |
| 93 | AD | 2.7 | 795 | 839 | 44 | 702 | 93 | 0.7 | −0.7 | −0.5 | 1.3 | 2.7 | 276 | — | — | — | — | EXAMPLE |
| 94 | AD | 2.1 | 793 | 839 | 46 | 702 | 91 | 1.0 | −0.7 | −0.5 | 1.5 | 7.4 | 281 | — | — | — | — | EXAMPLE |
| 95 | AE | 1.7 | 774 | 821 | 47 | 675 | 99 | 0.9 | −0.6 | −0.6 | 1.0 | 3.0 | 220 | — | — | — | — | EXAMPLE |
| 96 | AE | 3.2 | 782 | 821 | 39 | 675 | 107 | 0.6 | −0.6 | −0.5 | 1.6 | 5.7 | 286 | — | — | 437 | 26 | EXAMPLE |
| 97 | AF | 1.9 | 822 | 868 | 46 | 711 | 111 | 0.8 | −0.6 | −0.5 | 1.2 | 3.3 | 235 | — | — | — | — | EXAMPLE |
| 98 | AF | 1.9 | 806 | 666 | 62 | 711 | 95 | 0.6 | −0.6 | −0.5 | 2.6 | 14.5 | 343 | — | — | — | — | EXAMPLE |
| 99 | AG | 3.0 | 795 | 828 | 33 | 694 | 101 | 0.9 | −0.7 | −0.6 | 0.9 | 13.4 | 194 | — | — | — | — | EXAMPLE |
| 100 | AG | 1.2 | 786 | 828 | 42 | 694 | 92 | 0.8 | −0.5 | −0.4 | 1.2 | 5.3 | 241 | — | — | — | — | EXAMPLE |

TABLE 10

| | | ANNEALING STEP | | | | | | | | | | | | | | |
|---|---|---|---|---|---|---|---|---|---|---|---|---|---|---|---|---|
| | | HEATING STEP | | | | | | | COOLING STEP | | | | | | | |
| | | | | | | PREHEATING ZONE | | SOAKING ZONE | | | | MARTENSITE TRANSFORMATION TREATMENT | | BAINITE TRANSFORMATION TREATMENT 1 | | |
| EXPERIMENTAL EXAMPLE | CHEMICAL COMPONENT | AVERAGE HEATING RATE °C/SECOND | MAXIMUM HEATING TEMPERATURE Tm °C | Ac3 °C | Ac3-Tm °C | Ac1 °C | Tm-Ac1 °C | AIR RATIO | Log (P(H₂O)/P(H₂)) | Log (P(H₂O)/P(H₂)) | COOLING Rate 1 °C/SECOND | COOLING Rate 2 °C/SECOND | Ms POINT °C | AVERAGE TEMPERATURE °C | TREATMENT TIME SECOND | AVERAGE TEMPERATURE °C | TREATMENT TIME SECOND | |
| 101 | AH | 2.2 | 784 | 822 | 38 | 689 | 95 | 0.9 | −0.7 | −0.6 | 1.2 | 12.5 | 234 | — | — | — | — | EXAMPLE |
| 102 | AH | 2.5 | 777 | 822 | 45 | 689 | 88 | 0.7 | −0.8 | −0.7 | 1.0 | 2.8 | 220 | — | — | 442 | 22 | EXAMPLE |
| 103 | AI | 2.9 | 802 | 820 | 18 | 745 | 57 | 1.0 | −0.6 | −0.6 | 1.0 | 4.4 | 220 | — | — | — | — | EXAMPLE |
| 104 | AI | 2.6 | 772 | 820 | 48 | 745 | 27 | 0.8 | −0.6 | −0.5 | 1.2 | 6.6 | 319 | — | — | 470 | 29 | EXAMPLE |
| 105 | AJ | 1.6 | 820 | 872 | 52 | 720 | 100 | 0.9 | −0.5 | −0.5 | 1.0 | 2.9 | 222 | — | — | — | — | EXAMPLE |
| 106 | AJ | 2.2 | 807 | 872 | 65 | 720 | 87 | 0.9 | −0.7 | −0.5 | 1.4 | 4.8 | 293 | — | — | — | — | EXAMPLE |
| 107 | AK | 2.4 | 773 | 819 | 46 | 686 | 87 | 0.9 | −0.6 | −0.5 | 1.3 | 3.3 | 225 | — | — | — | — | EXAMPLE |
| 108 | AK | 2.2 | 782 | 819 | 37 | 686 | 96 | 0.8 | −0.6 | −0.5 | 1.5 | 20.0 | 234 | — | — | 477 | 30 | EXAMPLE |
| 109 | AL | 2.1 | 793 | 828 | 35 | 684 | 109 | 0.8 | −0.7 | −0.5 | 0.8 | 4.8 | 135 | — | — | — | — | EXAMPLE |
| 110 | AL | 2.7 | 776 | 828 | 52 | 684 | 92 | 0.9 | −0.7 | −0.5 | 1.1 | 6.3 | 270 | — | — | 454 | 40 | EXAMPLE |
| 111 | AM | 2.5 | 831 | 880 | 49 | 750 | 81 | 0.8 | −0.6 | −0.5 | 0.9 | 3.1 | 217 | — | — | — | — | EXAMPLE |
| 112 | AM | 1.9 | 811 | 880 | 69 | 750 | 61 | 0.8 | −0.7 | −0.6 | 0.8 | 6.3 | 211 | — | — | — | — | EXAMPLE |
| 113 | AM | 2.3 | 853 | 880 | 27 | 750 | 103 | 0.9 | −0.6 | −0.6 | 1.3 | 3.6 | 217 | — | — | — | — | EXAMPLE |
| 114 | AM | 2.5 | 824 | 880 | 56 | 750 | 74 | 0.8 | −0.5 | −0.4 | 1.0 | 2.9 | 229 | — | — | — | — | COMPARATIVE EXAMPLE |
| 115 | AN | 2.7 | 796 | 835 | 39 | 708 | 88 | 0.8 | −0.7 | −0.6 | 1.8 | 8.1 | 132 | — | — | — | — | EXAMPLE |
| 116 | AN | 2.8 | 786 | 835 | 49 | 708 | 78 | 0.7 | −0.8 | −0.7 | 1.0 | 12.2 | 289 | — | — | — | — | EXAMPLE |
| 117 | AO | 3.6 | 805 | 836 | 31 | 707 | 98 | 0.9 | −0.8 | −0.8 | 1.0 | 12.0 | 115 | — | — | — | — | COMPARATIVE EXAMPLE |
| 118 | AO | 1.8 | 781 | 836 | 55 | 707 | 74 | 0.8 | −0.7 | −0.6 | 0.8 | 4.0 | 237 | — | — | — | — | EXAMPLE |
| 119 | AP | 2.3 | 790 | 815 | 25 | 691 | 99 | 0.9 | −0.6 | −0.5 | 0.9 | 6.3 | 104 | — | — | — | — | EXAMPLE |
| 120 | AP | 2.3 | 772 | 815 | 43 | 691 | 81 | 0.8 | −0.8 | −0.8 | 0.8 | 7.5 | 194 | — | — | — | — | EXAMPLE |
| 121 | AP | 1.9 | 779 | 815 | 36 | 691 | 88 | 0.7 | −0.6 | −0.6 | 0.8 | 3.4 | 132 | — | — | — | — | EXAMPLE |
| 122 | AQ | 3.6 | 795 | 855 | 60 | 713 | 82 | 1.0 | −0.5 | −0.4 | 1.1 | 8.1 | 148 | — | — | — | — | EXAMPLE |
| 123 | AQ | 2.0 | 796 | 855 | 59 | 713 | 83 | 1.0 | −0.6 | −0.5 | 0.7 | 7.8 | 148 | — | — | — | — | EXAMPLE |
| 124 | AR | 2.2 | 800 | 846 | 46 | 696 | 104 | 0.9 | −0.6 | −0.4 | 0.9 | 6.5 | 151 | — | — | — | — | EXAMPLE |
| 125 | AR | 2.6 | 785 | 846 | 61 | 696 | 89 | 0.9 | −0.8 | −0.6 | 1.2 | 12.5 | 310 | — | — | — | — | EXAMPLE |
| 126 | AS | 3.0 | 815 | 845 | 30 | 707 | 108 | 0.9 | −0.6 | −0.7 | 1.1 | 4.7 | 185 | — | — | — | — | EXAMPLE |
| 127 | AS | 3.5 | 788 | 845 | 57 | 707 | 81 | 0.8 | −0.7 | −0.4 | 1.5 | 3.5 | 277 | — | — | — | — | EXAMPLE |
| 128 | AT | 2.9 | 785 | 840 | 55 | 687 | 98 | 0.9 | −0.7 | −0.7 | 0.9 | 17.5 | 241 | — | — | — | — | EXAMPLE |
| 129 | AT | 1.5 | 777 | 840 | 63 | 687 | 90 | 0.9 | −0.6 | −0.6 | 0.6 | 4.0 | 108 | — | — | — | — | EXAMPLE |
| 130 | AU | 2.2 | 805 | 845 | 40 | 695 | 110 | 0.8 | −0.7 | −0.8 | 0.8 | 9.5 | 140 | — | — | — | — | EXAMPLE |
| 131 | AU | 1.7 | 787 | 845 | 58 | 695 | 92 | 0.9 | −0.7 | −0.6 | 1.0 | 4.0 | 250 | — | — | — | — | COMPARATIVE EXAMPLE |
| 132 | AU | 2.2 | 795 | 845 | 50 | 695 | 100 | 0.9 | −1.2 | −1.5 | 1.0 | 52.1 | 163 | — | — | 465 | 40 | EXAMPLE |
| 133 | AU | 2.1 | 793 | 845 | 52 | 695 | 98 | 0.8 | −0.8 | −0.6 | 0.8 | 3.8 | 114 | — | — | — | — | EXAMPLE |

TABLE 10-continued

| | | ANNEALING STEP | | | | | | | | | | COOLING STEP | | | | | |
|---|---|---|---|---|---|---|---|---|---|---|---|---|---|---|---|---|---|
| | | HEATING STEP | | | | PREHEATING ZONE | | SOAKING ZONE | COOLING Rate 1 | COOLING Rate 2 | MARTENSITE TRANSFORMATION TREATMENT | | | BAINITE TRANSFORMATION TREATMENT 1 | | |
| EXPERIMENTAL EXAMPLE | CHEMICAL COMPONENT | AVERAGE HEATING RATE °C/SECOND | MAXIMUM HEATING TEMPERATURE Tm °C | Ac3 °C | Ac3-Tm °C | Ac1 °C | Tm-Ac1 °C | AIR RATIO | Log (P(H₂O)/P(H₂)) | Log (P(H₂O)/P(H₂)) | °C/SECOND | °C/SECOND | Ms POINT °C | AVERAGE TEMPERATURE °C | TREATMENT TIME SECOND | AVERAGE TEMPERATURE °C | TREATMENT TIME SECOND | |
| 134 | AV | 3.3 | 827 | 863 | 36 | 722 | 105 | 0.8 | −0.6 | −0.5 | 2.0 | 11.1 | 208 | — | — | — | — | EXAMPLE |
| 135 | AV | 3.4 | 801 | 863 | 62 | 722 | 79 | 0.9 | −0.6 | −0.7 | 1.6 | 13.9 | 326 | — | — | — | — | EXAMPLE |
| 136 | AW | 3.0 | 799 | 839 | 40 | 696 | 103 | 0.8 | −0.6 | −0.6 | 1.4 | 5.0 | 232 | — | — | — | — | EXAMPLE |
| 137 | AW | 2.2 | 792 | 839 | 47 | 696 | 96 | 1.0 | −0.6 | −0.5 | 1.4 | 0.6 | 257 | — | — | — | — | COMPARATIVE EXAMPLE |
| 138 | AW | 4.4 | 777 | 839 | 62 | 696 | 81 | 0.9 | −0.6 | −0.4 | 1.3 | 9.1 | 272 | — | — | 456 | 35 | EXAMPLE |
| 139 | AX | 3.6 | 785 | 827 | 42 | 682 | 103 | 0.9 | −0.7 | −0.6 | 1.6 | 5.8 | 311 | — | — | — | — | EXAMPLE |
| 140 | AX | 2.1 | 774 | 827 | 53 | 682 | 92 | 0.8 | −0.6 | −0.5 | 1.3 | 3.3 | 302 | — | — | — | — | EXAMPLE |
| 141 | AY | 2.2 | 809 | 845 | 36 | 716 | 93 | 0.7 | −0.6 | −0.4 | 1.4 | 4.9 | 268 | — | — | — | — | EXAMPLE |
| 142 | AY | 2.8 | 795 | 845 | 50 | 716 | 79 | 0.9 | −0.7 | −0.6 | 1.6 | 15.4 | 264 | — | — | — | — | EXAMPLE |
| 143 | AZ | 1.8 | 793 | 857 | 64 | 699 | 94 | 0.8 | −0.6 | −0.6 | 1.2 | 12.5 | 330 | — | — | — | — | EXAMPLE |
| 144 | AZ | 2.5 | 796 | 857 | 61 | 699 | 97 | 0.8 | −0.7 | −0.7 | 1.0 | 3.1 | 320 | — | — | — | — | EXAMPLE |
| 145 | BA | 3.3 | 803 | 850 | 47 | 708 | 95 | 0.8 | −0.7 | −0.7 | 1.0 | 3.6 | 186 | — | — | — | — | EXAMPLE |
| 146 | BA | 2.8 | 789 | 850 | 61 | 708 | 81 | 0.9 | −0.6 | −0.4 | 1.9 | 3.7 | 302 | — | — | — | — | EXAMPLE |
| 147 | BB | 2.1 | 785 | 820 | 35 | 682 | 103 | 0.8 | −0.6 | −0.5 | 1.5 | 16.7 | 266 | — | — | — | — | EXAMPLE |
| 148 | BB | 2.5 | 782 | 820 | 38 | 682 | 100 | 0.9 | −0.6 | −0.5 | 0.9 | 5.7 | 198 | — | — | — | — | COMPARATIVE EXAMPLE |
| 149 | BB | 1.5 | 775 | 820 | 45 | 682 | 93 | 0.7 | −0.7 | −0.5 | 1.0 | 4.8 | 229 | — | — | 482 | 40 | EXAMPLE |
| 150 | BB | 1.6 | 772 | 820 | 48 | 682 | 90 | 1.0 | −0.5 | −0.5 | 0.9 | 1.3 | 223 | — | — | — | — | EXAMPLE |
| 151 | BC | 2.3 | 787 | 836 | 49 | 688 | 99 | 0.9 | −0.6 | −0.5 | 0.9 | 3.3 | 132 | — | — | — | — | EXAMPLE |

TABLE 11

| | | | HEATING STEP | | | | | ANNEALING STEP | | | | COOLING STEP | | | | | |
|---|---|---|---|---|---|---|---|---|---|---|---|---|---|---|---|---|---|
| | | | | | | | | PREHEATING ZONE | | SOAKING ZONE | | | | MARTENSITE TRANSFORMATION TREATMENT | | BAINITE TRANSFORMATION TREATMENT 1 | |
| EXPERIMENTAL EXAMPLE | CHEMICAL COMPONENT | AVERAGE HEATING RATE °C./SECOND | MAXIMUM HEATING TEMPERATURE Tm °C. | Ac3 °C. | Ac3-Tm °C. | Ac1 °C. | Tm-Ac1 °C. | AIR RATIO | Log (P(H$_2$O)/P(H$_2$)) | Log (P(H$_2$O)/P(H$_2$)) | COOLING Rate 1 °C./SECOND | COOLING Rate 2 °C./SECOND | Ms POINT °C. | AVERAGE TEMPERATURE °C. | TREATMENT TIME SECOND | AVERAGE TEMPERATURE °C. | TREATMENT TIME SECOND | |
|---|---|---|---|---|---|---|---|---|---|---|---|---|---|---|---|---|---|---|
| 152 | BC | 2.8 | 796 | 836 | 40 | 688 | 108 | 0.8 | −0.5 | −0.5 | 1.5 | 14.5 | 323 | — | — | — | — | EXAMPLE |
| 153 | BC | 3.9 | 785 | 836 | 51 | 688 | 97 | 0.8 | −0.4 | −0.3 | 1.4 | 3.8 | 319 | — | — | — | — | EXAMPLE |
| 157 | BC | 2.8 | 780 | 836 | 56 | 688 | 92 | 0.8 | −0.6 | −0.5 | 1.0 | 3.3 | 240 | — | — | 453 | 36 | COMPARATIVE EXAMPLE |
| 155 | BC | 2.5 | 792 | 836 | 44 | 688 | 104 | 1.0 | −0.6 | −0.5 | 1.0 | 6.5 | 204 | — | — | — | — | EXAMPLE |
| 156 | BD | 2.3 | 798 | 832 | 34 | 698 | 100 | 0.8 | −0.6 | −0.6 | 1.2 | 9.2 | 124 | — | — | — | — | EXAMPLE |
| 157 | BD | 1.8 | 780 | 832 | 52 | 698 | 82 | 0.7 | −0.6 | −0.7 | 0.7 | 2.6 | 124 | — | — | — | — | EXAMPLE |
| 158 | BE | 3.4 | 802 | 855 | 53 | 696 | 106 | 0.9 | −0.7 | −0.5 | 1.3 | 7.1 | 290 | — | — | — | — | EXAMPLE |
| 159 | BE | 2.8 | 802 | 855 | 53 | 696 | 106 | 1.0 | −0.6 | −0.6 | 1.1 | 3.0 | 196 | — | — | — | — | EXAMPLE |
| 160 | BF | 2.7 | 797 | 845 | 48 | 712 | 85 | 0.9 | −0.7 | −0.6 | 1.0 | 3.2 | 212 | — | — | — | — | EXAMPLE |
| 161 | BF | 1.9 | 785 | 845 | 60 | 712 | 73 | 0.9 | −0.9 | −0.8 | 1.1 | 3.3 | 231 | — | — | — | — | EXAMPLE |
| 162 | BF | 2.4 | 794 | 845 | 51 | 712 | 82 | 0.9 | −0.6 | −1.5 | 1.0 | 3.7 | 219 | — | — | 458 | 81 | COMPARATIVE EXAMPLE |
| 163 | BF | 2.6 | 805 | 845 | 40 | 712 | 93 | 1.0 | −0.6 | −0.5 | 1.3 | 14.4 | 219 | — | — | — | — | EXAMPLE |
| 164 | BG | 2.9 | 839 | 901 | 62 | 736 | 103 | 1.0 | −0.7 | −0.6 | 1.1 | 9.0 | 139 | — | — | — | — | COMPARATIVE |
| 165 | BG | 2.0 | 816 | 901 | 85 | 736 | 80 | 0.9 | −0.6 | −0.5 | 1.0 | 18.8 | 259 | — | — | — | — | EXAMPLE |
| 166 | BG | 2.4 | 813 | 901 | 88 | 736 | 77 | 1.0 | −0.8 | −0.6 | 1.4 | 2.6 | 328 | — | — | — | — | EXAMPLE |
| 167 | BH | 2.7 | 792 | 837 | 45 | 696 | 96 | 0.9 | −0.6 | −0.5 | 1.1 | 7.4 | 220 | — | — | — | — | EXAMPLE |
| 168 | BH | 3.5 | 782 | 837 | 55 | 696 | 86 | 0.9 | −0.9 | −1.8 | 1.1 | 7.5 | 271 | — | — | — | — | COMPARATIVE EXAMPLE |
| 169 | BH | 2.2 | 792 | 837 | 45 | 696 | 96 | 0.8 | −0.6 | −0.8 | 1.9 | 8.3 | 256 | — | — | 394 | 71 | EXAMPLE |
| 170 | BH | 3.2 | 783 | 837 | 54 | 696 | 87 | 0.8 | −0.7 | −0.7 | 1.4 | 34.0 | 271 | — | — | — | — | EXAMPLE |
| 171 | BI | 3.0 | 860 | 936 | 76 | 741 | 119 | 0.9 | −0.7 | −0.6 | 1.5 | 16.2 | 151 | — | — | — | — | EXAMPLE |
| 172 | BI | 2.5 | 830 | 936 | 106 | 741 | 89 | 0.8 | −0.6 | −0.5 | 1.1 | 4.9 | 288 | — | — | 463 | 24 | EXAMPLE |
| 173 | BJ | 2.2 | 816 | 865 | 49 | 715 | 101 | 0.9 | −0.7 | −0.6 | 1.1 | 4.9 | 124 | — | — | — | — | EXAMPLE |
| 174 | BJ | 3.7 | 810 | 865 | 55 | 715 | 95 | 0.8 | −0.8 | −0.6 | 2.0 | 9.0 | 315 | — | — | 461 | 810 | COMPARATIVE EXAMPLE |
| 175 | BJ | 2.1 | 806 | 865 | 59 | 715 | 91 | 0.9 | −0.7 | −0.6 | 0.9 | 23.8 | 124 | — | — | — | — | EXAMPLE |
| 176 | BK | 2.5 | 793 | 845 | 52 | 701 | 92 | 0.9 | −0.6 | −0.5 | 1.0 | 9.5 | 142 | — | — | — | — | EXAMPLE |
| 177 | BK | 4.1 | 792 | 845 | 53 | 701 | 91 | 0.8 | −0.6 | −0.7 | 1.5 | 14.2 | 341 | — | — | — | — | EXAMPLE |
| 178 | BL | 3.0 | 783 | 833 | 50 | 681 | 102 | 0.7 | −0.6 | −0.6 | 0.9 | 8.8 | 233 | 278 | 24 | — | — | EXAMPLE |
| 179 | BL | 3.0 | 774 | 833 | 59 | 681 | 93 | 0.9 | −0.7 | −0.7 | 1.5 | 35.0 | 319 | — | — | — | — | EXAMPLE |
| 180 | BL | 1.4 | 773 | 833 | 60 | 681 | 92 | 0.9 | −0.5 | −0.5 | 0.8 | 3.0 | 233 | — | — | — | — | COMPARATIVE EXAMPLE |
| 181 | BL | 1.5 | 783 | 833 | 50 | 681 | 102 | 0.9 | −1.8 | −0.8 | 1.2 | 1.7 | 295 | — | — | 473 | 19 | COMPARATIVE EXAMPLE |
| 182 | BM | 3.2 | 836 | 917 | 81 | 746 | 90 | 0.9 | −0.6 | −0.5 | 1.0 | 7.3 | 212 | — | — | — | — | EXAMPLE |
| 183 | BM | 2.4 | 763 | 917 | 154 | 746 | 17 | 1.0 | −0.8 | −0.7 | 1.5 | 12.7 | −86 | — | — | — | — | COMPARATIVE EXAMPLE |
| 184 | BM | 2.9 | 837 | 917 | 80 | 746 | 91 | 0.7 | −0.6 | −0.4 | 1.2 | 10.9 | 246 | — | — | — | — | EXAMPLE |
| 185 | BN | 2.2 | 815 | 861 | 46 | 710 | 105 | 0.9 | −0.5 | −0.5 | 0.8 | 6.6 | 136 | — | — | — | — | EXAMPLE |

TABLE 11-continued

| | | ANNEALING STEP | | | | | | | | | | | | | |
|---|---|---|---|---|---|---|---|---|---|---|---|---|---|---|---|
| | | HEATING STEP | | | | | | | | COOLING STEP | | | | | |
| | | | | | | | PREHEATING ZONE | | SOAKING ZONE | COOLING Rate 1 | COOLING Rate 2 | MARTENSITE TRANSFORMATION TREATMENT | | | BAINITE TRANSFORMATION TREATMENT 1 | |
| EXPERIMENTAL EXAMPLE | CHEMICAL COMPONENT | AVERAGE HEATING RATE °C./SECOND | MAXIMUM HEATING TEMPERATURE Tm °C. | Ac3 °C. | Ac3-Tm °C. | Ac1 °C. | Tm-Ac1 °C. | AIR RATIO | Log (P(H₂O)/P(H₂)) | Log (P(H₂O)/P(H₂)) | °C./SECOND | °C./SECOND | Ms POINT °C. | AVERAGE TEMPERATURE °C. | TREATMENT TIME SECOND | AVERAGE TEMPERATURE °C. | TREATMENT TIME SECOND | |
| 186 | BN | 2.2 | 798 | 861 | 63 | 710 | 88 | 0.8 | −0.7 | −0.6 | 1.1 | 3.0 | 302 | — | — | — | — | EXAMPLE |
| 187 | BO | 2.2 | 845 | 884 | 39 | 792 | 53 | 0.9 | −0.6 | −0.6 | 1.2 | 3.1 | * | — | — | — | — | COMPARATIVE EXAMPLE |
| 188 | BP | 2.9 | 777 | 782 | 5 | 690 | 87 | 0.8 | −0.6 | −0.6 | 1.1 | 3.6 | 71 | — | — | — | — | COMPARATIVE EXAMPLE |
| 189 | BQ | 2.9 | 794 | 824 | 30 | 686 | 108 | 0.8 | −0.6 | −0.6 | 0.9 | 5.2 | 240 | — | — | — | — | COMPARATIVE EXAMPLE |
| 190 | BR | | EXPERIMENT STOPPED BECAUSE SLAB CRACKED DURING SLAB HEATING IN HOT ROLLING STEP | | | | | | | | | | | | | | | COMPARATIVE EXAMPLE |
| 191 | BS | 2.4 | 825 | 892 | 67 | 737 | 88 | 0.9 | −0.8 | −0.7 | 1.1 | 4.9 | 168 | — | — | — | — | COMPARATIVE EXAMPLE |
| 192 | BT | | EXPERIMENT STOPPED BECAUSE SLAB CRACKED DURING SLAB HEATING IN HOT ROLLING STEP | | | | | | | | | | | | | | | COMPARATIVE EXAMPLE |
| 193 | BU | | EXPERIMENT STOPPED BECAUSE SLAB CRACKED DURING ROLLING IN HOT ROLLING STEP | | | | | | | | | | | | | | | COMPARATIVE EXAMPLE |
| 194 | BV | 1.9 | 810 | 835 | 25 | 703 | 107 | 0.8 | −0.6 | −0.5 | 1.4 | 4.2 | 229 | — | — | — | — | COMPARATIVE EXAMPLE |
| 195 | BW | | AFTER SLAB WAS CAST, SLAB CRACKED DURING TRANSFER, SO THAT EXPERIMENT STOPPED | | | | | | | | | | | | | | | COMPARATIVE EXAMPLE |
| 196 | BX | 2.7 | 804 | 831 | 27 | 693 | 111 | 1.0 | −0.8 | −0.7 | 1.7 | 7.0 | 255 | — | — | — | — | COMPARATIVE EXAMPLE |
| 197 | BY | 2.6 | 800 | 827 | 27 | 694 | 106 | 0.9 | −0.6 | −0.5 | 1.1 | 2.7 | 199 | — | — | — | — | COMPARATIVE EXAMPLE |
| 198 | A | 2.0 | 813 | 861 | 48 | 712 | 101 | 0.9 | −0.1 | −0.6 | 1.5 | 13.3 | 364 | — | — | — | — | EXAMPLE |
| 199 | J | 1.8 | 794 | 839 | 45 | 719 | 75 | 1.0 | −1.7 | −1.5 | 0.7 | 12.1 | 107 | — | — | — | — | COMPARATIVE EXAMPLE |
| 200 | D | 3.3 | 831 | 892 | 61 | 728 | 103 | 0.9 | −0.6 | −0.5 | 1.1 | 12.1 | 380 | — | — | — | — | EXAMPLE |
| 201 | D | 45.0 | 825 | 892 | 67 | 728 | 97 | 1.0 | −0.7 | −0.6 | 1.2 | 10.9 | 375 | — | — | — | — | EXAMPLE |
| 202 | D | 55.0 | 829 | 892 | 63 | 728 | 101 | 0.9 | −0.6 | −0.4 | 0.9 | 13.0 | 382 | — | — | — | — | COMPARATIVE EXAMPLE |

TABLE 12

| EXPERIMENTAL EXAMPLE | PLATING STEP | | | COOLING STEP AFTER PLATING | | | | | | WORKING STEP | | | |
|---|---|---|---|---|---|---|---|---|---|---|---|---|---|
| | EFFECTIVE Al AMOUNT MASS % | PLATING BATH BATH TEMPERATURE °C | STEEL SHEET ENTRANCE TEMPERATURE °C | COOLING RATE 3 (TO 350° C.) °C/SECOND | COOLING RATE 4 (350 TO 250° C.) °C/SECOND | BAINITE TRANSFORMATION TREATMENT 2 | | REHEAT TREATMENT | | BENDING-UNBENDING | | COLD ROLLING | |
| | | | | | | TREATMENT TEMPERATURE °C | TREATMENT TIME SECOND | TREATMENT TEMPERATURE °C | TREATMENT TIME SECOND | ROLL DIAMETER mm | TIMES OF WORKING TIMES | REDUCTION RATIO % | |
| 1 | 0.184 | 449 | 457 | 2.5 | 3.2 | — | — | — | — | 350 | 2 | 0.11 | COMPARATIVE EXAMPLE |
| 2 | 0.168 | 450 | 452 | 2.1 | 2.0 | — | — | — | — | 350 | 2 | 0.13 | COMPARATIVE EXAMPLE |
| 3 | 0.185 | 450 | 446 | 2.8 | 1.9 | — | — | — | — | 350 | 2 | 0.40 | COMPARATIVE EXAMPLE |
| 4 | 0.185 | 450 | 446 | 2.8 | 1.9 | — | — | — | — | 500 | 2 | 0.40 | EXAMPLE |
| 5 | 0.184 | 451 | 449 | 1.9 | 1.9 | — | — | 291 | 18 | 350 | 8 | 0.27 | EXAMPLE |
| 6 | 0.187 | 446 | 450 | 3.0 | 2.5 | — | — | — | — | 350 | 2 | 0.12 | EXAMPLE |
| 7 | 0.195 | 456 | 465 | 2.5 | 3.1 | — | — | — | — | 350 | 2 | 0.05 | EXAMPLE |
| 8 | 0.203 | 459 | 468 | 2.2 | 2.0 | — | — | — | — | 350 | 2 | 0.25 | EXAMPLE |
| 9 | 0.197 | 449 | 450 | 2.6 | 2.0 | 313 | 38 | — | — | 350 | 2 | 0.81 | EXAMPLE |
| 10 | 0.194 | 450 | 455 | 1.5 | 3.5 | — | — | — | — | 350 | 2 | 0.06 | EXAMPLE |
| 11 | 0.188 | 452 | 451 | 1.8 | 3.2 | 320 | 61 | 330 | 6 | 350 | 2 | 0.08 | COMPARATIVE EXAMPLE |
| 12 | 0.188 | 452 | 451 | 1.8 | 3.2 | 320 | 61 | 330 | 6 | 350 | 2 | 0.08 | EXAMPLE |
| 13 | 0.187 | 449 | 447 | 1.3 | 2.4 | — | — | — | — | 350 | 2 | 0.15 | EXAMPLE |
| 14 | 0.001 | 445 | 457 | 2.2 | 2.1 | — | — | — | — | 350 | 2 | 0.18 | COMPARATIVE EXAMPLE |
| 15 | 0.194 | 450 | 452 | 2.0 | 3.5 | — | — | — | — | 350 | 2 | 0.20 | EXAMPLE |
| 16 | 0.185 | 455 | 447 | 2.3 | 3.3 | — | — | — | — | 350 | 2 | 0.15 | EXAMPLE |
| 17 | 0.195 | 451 | 454 | 2.7 | 2.3 | — | — | — | — | 350 | 2 | 0.20 | COMPARATIVE EXAMPLE |
| 18 | 0.200 | 450 | 455 | 3.1 | 3.2 | — | — | 324 | 38 | 350 | 2 | 0.09 | EXAMPLE |
| 19 | 0.184 | 449 | 446 | 2.5 | 4.1 | — | — | — | — | 700 | 6 | 0.19 | EXAMPLE |
| 20 | 0.204 | 449 | 450 | 2.7 | 2.5 | — | — | — | — | 350 | 2 | 0.20 | EXAMPLE |
| 21 | 0.188 | 452 | 458 | 2.0 | 1.7 | — | — | — | — | 350 | 2 | 0.55 | COMPARATIVE EXAMPLE |
| 22 | 0.186 | 452 | 452 | 1.7 | 4.2 | — | — | — | — | 350 | 2 | 0.11 | EXAMPLE |
| 23 | 0.199 | 452 | 444 | 1.4 | 2.8 | — | — | — | — | 350 | 2 | 0.49 | COMPARATIVE EXAMPLE |
| 24 | 0.209 | 447 | 451 | 2.7 | 3.1 | — | — | 310 | 14 | 350 | 2 | 0.14 | EXAMPLE |
| 25 | 0.186 | 451 | 453 | 2.2 | 2.0 | 336 | 180 | — | — | 700 | 6 | 0.14 | EXAMPLE |
| 26 | 0.186 | 455 | 450 | 2.6 | 2.2 | — | — | — | — | 350 | 2 | 0.18 | EXAMPLE |
| 27 | 0.188 | 448 | 447 | 2.0 | 3.9 | — | — | — | — | 350 | 2 | 0.16 | COMPARATIVE EXAMPLE |
| 28 | 0.188 | 453 | 453 | 1.6 | 2.4 | — | — | — | — | 350 | 2 | 0.18 | EXAMPLE |
| 29 | 0.184 | 452 | 449 | .4 | 2.1 | — | — | — | — | 350 | 2 | 0.05 | EXAMPLE |
| 30 | 0.180 | 450 | 456 | 1.5 | 2.9 | — | — | — | — | 350 | 2 | 0.38 | EXAMPLE |
| 31 | 0.211 | 451 | 446 | 1.8 | 4.3 | — | — | — | — | 350 | 2 | 0.10 | EXAMPLE |
| 32 | 0.189 | 453 | 450 | 2.6 | 1.9 | — | — | — | — | 350 | 2 | 0.19 | EXAMPLE |
| 33 | 0.196 | 450 | 453 | 2.3 | 2.9 | — | — | — | — | 350 | 2 | 0.22 | EXAMPLE |
| 34 | 0.185 | 449 | 450 | 3.4 | 2.3 | — | — | 273 | 16 | 350 | 2 | 0.21 | EXAMPLE |
| 35 | 0.191 | 449 | 440 | 2.3 | 3.8 | — | — | — | — | 350 | 2 | 1.13 | EXAMPLE |
| 36 | 0.196 | 450 | 446 | 2.5 | 2.4 | — | — | — | — | 350 | 2 | 0.28 | EXAMPLE |
| 37 | 0.198 | 452 | 458 | 1.6 | 2.8 | — | — | — | — | 700 | 6 | 0.24 | EXAMPLE |
| 38 | 0.198 | 447 | 441 | 3.1 | 1.7 | — | — | — | — | 350 | 2 | 0.19 | EXAMPLE |

TABLE 12-continued

| | | PLATING STEP | | COOLING STEP AFTER PLATING | | | | | | | WORKING STEP | | | |
|---|---|---|---|---|---|---|---|---|---|---|---|---|---|---|
| | | | | | | BAINITE TRANSFORMATION TREATMENT 2 | | REHEAT TREATMENT | | | BENDING-UNBENDING WORKING STEP | | COLD ROLLING | |
| EXPERIMENTAL EXAMPLE | EFFECTIVE Al AMOUNT MASS % | PLATING BATH BATH TEMPERATURE °C. | STEEL SHEET ENTRANCE TEMPERATURE °C. | COOLING RATE 3 (TO 350° C.) °C./SECOND | COOLING RATE 4 (350 TO 250° C.) °C./SECOND | TREATMENT TEMPERATURE °C. | TREATMENT TIME SECOND | TREATMENT TEMPERATURE °C. | TREATMENT TIME SECOND | ROLL DIAMETER mm | TIMES OF WORKING TIMES | REDUCTION RATIO % | | |
| 39 | 0.185 | 448 | 443 | 2.5 | 2.9 | — | — | — | — | 350 | 2 | 0.12 | EXAMPLE |
| 40 | 0.196 | 448 | 455 | 2.3 | 1.8 | — | — | — | — | 350 | 2 | 0.17 | EXAMPLE |
| 41 | 0.186 | 451 | 452 | 2.2 | 2.1 | 262 | 35 | — | — | 350 | 2 | 0.15 | EXAMPLE |
| 42 | 0.186 | 449 | 454 | 1.4 | 3.1 | — | — | — | — | 350 | 2 | 0.15 | EXAMPLE |
| 43 | 0.193 | 448 | 454 | 2.6 | 2.3 | — | — | — | — | 350 | 2 | 0.17 | COMPARATIVE EXAMPLE |
| 44 | 0.186 | 449 | 444 | 1.7 | 3.7 | — | — | — | — | 400 | 2 | 0.22 | EXAMPLE |
| 45 | 0.213 | 453 | 450 | 2.1 | 2.1 | — | — | — | — | 400 | 2 | 0.16 | EXAMPLE |
| 46 | 0.186 | 450 | 454 | 2.6 | 2.0 | — | — | — | — | 400 | 2 | 0.13 | COMPARATIVE EXAMPLE |
| 47 | 0.186 | 449 | 450 | 1.4 | 4.3 | — | — | — | — | 400 | 2 | 0.25 | EXAMPLE |
| 48 | 0.200 | 449 | 457 | 1.7 | 2.2 | — | — | 314 | 30 | 400 | 2 | 0.40 | EXAMPLE |
| 49 | 0.190 | 451 | 448 | 2.5 | 3.4 | — | — | — | — | 400 | 2 | 0.10 | COMPARATIVE EXAMPLE |
| 50 | 0.186 | 451 | 457 | 2.1 | 3.1 | — | — | — | — | 350 | 2 | 0.20 | EXAMPLE |

TABLE 13

| EXPERIMENTAL EXAMPLE | EFFECTIVE Al AMOUNT MASS % | PLATING STEP PLATING BATH BATH TEMPERATURE °C. | STEEL SHEET ENTRANCE TEMPERATURE °C. | COOLING STEP AFTER PLATING COOLING RATE 3 (TO 350° C.) °C./SECOND | COOLING RATE 4 (350 TO 250° C.) °C./SECOND | BAINITE TRANSFORMATION TREATMENT 2 TREATMENT TEMPERATURE °C. | TREATMENT TIME SECOND | REHEAT TREATMENT TREATMENT TEMPERATURE °C. | TREATMENT TIME SECOND | WORKING STEP BENDING-UNBENDING ROLL DIAMETER mm | TIMES OF WORKING TIMES | WORKING STEP COLD ROLLING REDUCTION RATIO % | |
|---|---|---|---|---|---|---|---|---|---|---|---|---|---|
| 51 | 0.200 | 448 | 447 | 2.4 | 3.2 | — | — | — | — | 350 | 2 | 0.22 | COMPARATIVE EXAMPLE |
| 52 | 0.196 | 449 | 447 | 2.2 | 2.8 | — | — | — | — | 350 | 2 | 0.15 | EXAMPLE |
| 53 | 0.182 | 450 | 446 | 2.3 | 2.5 | — | — | 291 | 19 | 350 | 2 | 0.16 | EXAMPLE |
| 54 | 0.190 | 451 | 445 | 2.6 | 3.2 | — | — | — | — | 350 | 4 | 0.13 | EXAMPLE |
| 55 | 0.196 | 451 | 446 | 1.9 | 3.2 | 276 | 53 | — | — | 350 | 4 | 0.22 | EXAMPLE |
| 56 | 0.220 | 450 | 451 | 2.3 | 3.1 | — | — | — | — | 350 | 4 | 0.18 | EXAMPLE |
| 57 | 0.203 | 451 | 445 | 2.6 | 3.0 | — | — | — | — | 350 | 2 | 0.23 | EXAMPLE |
| 58 | 0.189 | 449 | 446 | 1.5 | 3.4 | — | — | — | — | 350 | 2 | 0.35 | EXAMPLE |
| 59 | 0.197 | 448 | 453 | 2.1 | 3.9 | 268 | 52 | 272 | 22 | 1800 | 2 | 0.10 | EXAMPLE |
| 60 | 0.186 | 449 | 446 | 2.7 | 2.6 | — | — | — | — | 350 | 2 | 0.05 | EXAMPLE |
| 61 | 0.186 | 451 | 452 | 2.2 | 1.8 | — | — | — | — | 350 | 2 | 0.09 | EXAMPLE |
| 62 | 0.186 | 451 | 455 | 3.1 | 3.6 | — | — | 324 | 9 | 350 | 2 | 0.10 | COMPARATIVE EXAMPLE |
| 63 | 0.190 | 450 | 454 | 2.1 | 4.6 | — | — | — | — | 400 | 4 | 0.48 | EXAMPLE |
| 64 | 0.217 | 450 | 452 | 2.0 | 2.1 | — | — | — | — | 400 | 4 | 0.18 | EXAMPLE |
| 65 | 0.186 | 448 | 453 | 2.5 | 2.8 | — | — | — | — | 350 | 2 | 0.14 | EXAMPLE |
| 66 | 0.190 | 450 | 40 | 1.3 | 3.0 | — | — | — | — | 350 | 2 | 0.16 | EXAMPLE |
| 67 | 0.196 | 450 | 458 | 1.7 | 2.5 | — | — | — | — | 350 | 2 | 0.09 | COMPARATIVE EXAMPLE |
| 68 | 0.198 | 450 | 446 | 2.0 | 4.2 | — | — | — | — | 150 | 2 | 0.23 | EXAMPLE |
| 69 | 0.189 | 449 | 448 | 2.4 | 3.2 | — | — | — | — | 150 | 2 | 0.20 | EXAMPLE |
| 70 | 0.195 | 450 | 448 | 2.3 | 0.4 | — | — | — | — | 150 | 2 | 0.19 | EXAMPLE |
| 71 | 0.198 | 452 | 444 | 2.5 | 2.9 | — | — | — | — | 150 | 2 | 0.29 | EXAMPLE |
| 72 | 0.221 | 446 | 450 | 2.1 | 0.5 | — | — | — | — | 170 | 2 | 0.20 | EXAMPLE |
| 73 | 0.203 | 448 | 447 | 1.5 | 2.7 | — | — | 272 | 12 | 170 | 2 | 0.08 | EXAMPLE |
| 74 | 0.192 | 452 | 438 | 2.6 | 3.1 | — | — | — | — | 350 | 2 | 0.21 | EXAMPLE |
| 75 | 0.200 | 447 | 443 | 2.5 | 1.5 | — | — | — | — | 350 | 2 | 0.22 | COMPARATIVE EXAMPLE |
| 76 | 0.191 | 446 | 448 | 2.1 | 1.4 | — | — | 303 | 30 | 350 | 2 | 0.10 | EXAMPLE |
| 77 | 0.210 | 445 | 437 | 2.2 | 3.8 | — | — | — | — | 350 | 2 | 0.20 | EXAMPLE |
| 78 | 0.198 | 450 | 454 | 3.0 | 2.8 | — | — | — | — | 350 | 2 | 0.24 | EXAMPLE |
| 79 | 0.189 | 449 | 446 | 3.0 | 2.4 | — | — | 283 | 18 | 350 | 2 | 0.04 | COMPARATIVE EXAMPLE |
| 80 | 0.189 | 453 | 459 | 2.6 | 3.7 | — | — | — | — | 25 | 2 | 0.14 | EXAMPLE |
| 81 | 0.181 | 448 | 441 | 1.5 | 2.5 | — | — | — | — | 350 | 2 | 0.17 | EXAMPLE |
| 82 | 0.186 | 452 | 455 | 1.8 | 2.3 | — | — | — | — | 350 | 2 | 0.16 | EXAMPLE |
| 83 | 0.191 | 452 | 461 | 2.0 | 4.4 | — | — | — | — | 350 | 2 | 0.08 | COMPARATIVE EXAMPLE |
| 84 | 0.187 | 452 | 447 | 1.7 | 2.4 | — | — | — | — | 350 | 2 | 0.10 | EXAMPLE |
| 85 | 0.190 | 449 | 451 | 2.4 | 2.9 | — | — | — | — | 350 | 2 | 0.08 | EXAMPLE |
| 86 | 0.198 | 448 | 454 | 2.3 | 3.5 | — | — | — | — | 350 | 2 | 0.05 | EXAMPLE |
| 87 | 0.202 | 447 | 454 | 2.0 | 3.0 | — | — | 325 | 8 | 350 | 2 | — | EXAMPLE |
| 88 | 0.192 | 449 | 448 | 2.5 | 4.5 | — | — | — | — | 350 | 4 | 0.15 | EXAMPLE |

TABLE 13-continued

| | PLATING STEP PLATING BATH | | COOLING STEP AFTER PLATING | | | BAINITE TRANSFORMATION TREATMENT 2 | | REHEAT TREATMENT | | WORKING STEP BENDING-UNBENDING WORKING STEP | | WORKING STEP COLD ROLL-ING REDUC-TION RATIO % | |
|---|---|---|---|---|---|---|---|---|---|---|---|---|---|
| EXPERIMENTAL EXAMPLE | EFFECTIVE Al AMOUNT MASS % | BATH TEMPERATURE °C. | STEEL SHEET ENTRANCE TEMPERATURE °C. | COOLING RATE 3 (TO 350° C.) °C./ SECOND | COOL-ING RATE 4 (350 TO 250° C.) °C./ SECOND | TREAT-MENT TEMPER-ATURE °C. | TREAT-MENT TIME SEC-OND | TREAT-MENT TEMPER-ATURE °C. | TREAT-MENT TIME SEC-OND | ROLL DIAM-ETER mm | TIMES OF WORK-ING TIMES | | |
| 89 | 0.241 | 456 | 457 | 2.4 | 2.9 | — | — | — | — | 350 | 4 | 0.21 | EXAMPLE |
| 90 | 0.198 | 447 | 442 | 1.9 | 1.2 | 274 | 54 | — | — | 350 | 4 | 0.15 | EXAMPLE |
| 91 | 0.196 | 449 | 445 | 1.8 | 4.7 | — | — | — | — | 350 | 4 | 0.06 | EXAMPLE |
| 92 | 0.190 | 451 | 449 | 3.1 | 2.7 | — | — | — | — | 350 | 4 | 0.26 | EXAMPLE |
| 93 | 0.197 | 458 | 439 | 2.0 | 4.7 | — | — | — | — | 350 | 4 | 0.22 | EXAMPLE |
| 94 | 0.196 | 458 | 447 | 1.6 | 2.4 | — | — | 290 | 30 | 350 | 4 | 0.29 | EXAMPLE |
| 95 | 0.202 | 451 | 450 | 1.4 | 3.4 | — | — | — | — | 350 | 4 | 0.08 | EXAMPLE |
| 96 | 0.189 | 451 | 447 | 2.3 | 3.3 | — | — | 284 | 9 | 350 | 4 | 0.17 | EXAMPLE |
| 97 | 0.190 | 449 | 451 | 2.5 | 3.8 | — | — | — | — | 350 | 4 | 0.22 | EXAMPLE |
| 98 | 0.184 | 451 | 445 | 2.8 | 2.7 | — | — | — | — | 350 | 4 | 0.17 | EXAMPLE |
| 99 | 0.194 | 446 | 454 | 2.1 | 3.6 | — | — | — | — | 350 | 4 | 0.19 | EXAMPLE |
| 100 | 0.186 | 450 | 456 | 1.4 | 2.6 | — | — | — | — | 350 | 4 | 0.15 | EXAMPLE |

TABLE 14

| EXPERI-MENTAL EXAMPLE | PLATING STEP PLATING BATH | | STEEL SHEET EN-TRANCE TEMPER-ATURE °C. | COOLING STEP AFTER PLATING | | | BAINITE TRANSFORMATION TREATMENT 2 | | REHEAT TREATMENT | | WORKING STEP | | | |
|---|---|---|---|---|---|---|---|---|---|---|---|---|---|---|
| | EFFECT-IVE Al AMOUNT MASS % | BATH TEMPER-ATURE °C. | | COOLING RATE 3 (TO 350 °C.) °C./SECOND | COOLING RATE 4 (350 TO 250° C.) °C./SECOND | | TREATMENT TEMPER-ATURE °C. | TREAT-MENT TIME SECOND | TREATMENT TEMPER-ATURE °C. | TREAT-MENT TIME SECOND | BENDING-UNBENDING WORKING STEP | | COLD ROLLING REDUCTION RATIO % | |
| | | | | | | | | | | | ROLL DIAMETER mm | TIMES OF WORK-ING TIMES | | |
| 101 | 0.186 | 450 | 453 | 2.2 | 4.3 | | — | — | — | — | 600 | 4 | 0.10 | EXAMPLE |
| 102 | 0.185 | 448 | 440 | 2.3 | 2.8 | | — | — | — | — | 600 | 4 | 0.28 | EXAMPLE |
| 103 | 0.191 | 448 | 444 | 2.7 | 3.1 | | — | — | — | — | 350 | 2 | 0.15 | EXAMPLE |
| 104 | 0.203 | 448 | 451 | 2.0 | 2.1 | | — | — | — | — | 350 | 2 | — | EXAMPLE |
| 105 | 0.183 | 452 | 446 | 2.5 | 2.8 | | — | — | — | — | 350 | 2 | 0.24 | EXAMPLE |
| 106 | 0.184 | 453 | 444 | 2.3 | 2.6 | | — | — | — | — | 350 | 2 | 0.29 | EXAMPLE |
| 107 | 0.195 | 451 | 445 | 2.2 | 4.8 | | — | — | — | — | 350 | 2 | 0.19 | EXAMPLE |
| 108 | 0.186 | 449 | 452 | 1.5 | 3.8 | | — | — | — | — | 350 | 2 | 0.19 | EXAMPLE |
| 109 | 0.194 | 448 | 462 | 2.7 | 3.4 | | — | — | — | — | 350 | 2 | 0.05 | EXAMPLE |
| 110 | 0.189 | 451 | 449 | 2.0 | 3.1 | | 383 | 17 | — | — | 350 | 2 | 0.14 | EXAMPLE |
| 111 | 0.184 | 452 | 456 | 1.9 | 3.8 | | — | — | — | — | 350 | 2 | 0.10 | EXAMPLE |
| 112 | 0.183 | 441 | 433 | 1.8 | 4.5 | | — | — | 310 | 8 | 350 | 2 | 0.15 | EXAMPLE |
| 113 | 0.192 | 447 | 442 | 1.3 | 3.3 | | 270 | 28 | — | — | 350 | 2 | 0.35 | EXAMPLE |
| 114 | 0.192 | 446 | 454 | 2.7 | 2.4 | | — | — | — | — | 350 | 2 | 0.13 | COMPARATIVE EXAMPLE |
| 115 | 0.197 | 451 | 456 | 1.4 | 3.2 | | — | — | — | — | 350 | 2 | 0.15 | EXAMPLE |
| 116 | 0.187 | 454 | 447 | 3.4 | 2.8 | | — | — | — | — | 350 | 2 | 0.21 | COMPARATIVE EXAMPLE |
| 117 | 0.200 | 450 | 460 | 2.3 | 3.7 | | — | — | — | — | 350 | 2 | 0.64 | EXAMPLE |
| 118 | 0.194 | 453 | 445 | 2.5 | 2.5 | | — | — | — | — | 350 | 2 | 0.10 | EXAMPLE |
| 119 | 0.190 | 448 | 445 | 2.6 | 2.7 | | — | — | — | — | 600 | 2 | 0.06 | EXAMPLE |
| 120 | 0.181 | 450 | 448 | 2.5 | 2.0 | | — | — | — | — | 600 | 2 | 0.38 | EXAMPLE |
| 121 | 0.191 | 450 | 447 | 2.2 | 0.6 | | — | — | — | — | 600 | 2 | 0.09 | EXAMPLE |
| 122 | 0.208 | 453 | 445 | 1.7 | 2.8 | | — | — | — | — | 600 | 2 | 0.13 | EXAMPLE |
| 123 | 0.208 | 452 | 444 | 2.5 | 1.8 | | — | — | — | — | 600 | 2 | 0.75 | EXAMPLE |
| 124 | 0.203 | 451 | 453 | 1.8 | 2.2 | | — | — | — | — | 600 | 2 | 0.18 | EXAMPLE |
| 125 | 0.199 | 448 | 441 | 3.1 | 2.8 | | — | — | — | — | 600 | 2 | 0.13 | EXAMPLE |
| 126 | 0.189 | 451 | 458 | 2.1 | 3.7 | | — | — | — | — | 750 | 10 | 0.08 | EXAMPLE |
| 127 | 0.193 | 455 | 463 | 2.5 | 2.6 | | — | — | — | — | 750 | 10 | 0.21 | EXAMPLE |
| 128 | 0.195 | 448 | 441 | 1.3 | 5.3 | | — | — | — | — | 600 | 2 | 0.19 | EXAMPLE |
| 129 | 0.204 | 455 | 445 | 2.7 | 1.5 | | — | — | 285 | 7 | 600 | 2 | 0.12 | EXAMPLE |
| 130 | 0.199 | 445 | 450 | 2.0 | 4.8 | | — | — | — | — | 350 | 2 | 0.13 | EXAMPLE |
| 131 | 0.182 | 455 | 454 | 1.4 | 1.9 | | — | — | — | — | 350 | 2 | 0.23 | COMPARATIVE EXAMPLE |
| 132 | 0.187 | 447 | 443 | 2.5 | 2.5 | | 264 | 38 | — | — | 350 | 2 | 0.26 | EXAMPLE |
| 133 | 0.185 | 449 | 450 | 2.3 | 1.8 | | — | — | — | — | 350 | 2 | 0.15 | EXAMPLE |
| 134 | 0.188 | 453 | 455 | 2.1 | 4.3 | | 341 | 24 | — | — | 350 | 2 | 0.21 | EXAMPLE |
| 135 | 0.190 | 453 | 457 | 2.2 | 4.3 | | — | — | — | — | 350 | 2 | 0.09 | EXAMPLE |

TABLE 14-continued

| | PLATING STEP PLATING BATH | | STEEL | COOLING STEP AFTER PLATING | | | | | | WORKING STEP | | | |
|---|---|---|---|---|---|---|---|---|---|---|---|---|---|
| | | | | COOLING | | BAINITE TRANSFORMATION TREATMENT 2 | | REHEAT TREATMENT | | BENDING-UNBENDING WORKING STEP | | COLD | |
| EXPERI-MENTAL EXAMPLE | EFFECT-IVE Al AMOUNT MASS % | BATH TEMPER-ATURE ° C. | SHEET EN-TRANCE TEMPER-ATURE ° C. | COOLING RATE 3 (TO 350° C.) ° C./SECOND | COOLING RATE 4 (350 TO 250° C.) ° C./SECOND | TREATMENT TEMPER-ATURE ° C. | TREAT-MENT TIME SECOND | TREATMENT TEMPER-ATURE ° C. | TREAT-MENT TIME SECOND | ROLL DIAMETER mm | TIMES OF WORK-ING TIMES | ROLLING REDUCTION RATIO % | |
| 136 | 0.194 | 454 | 450 | 3.1 | 3.2 | — | — | — | — | 500 | 2 | 0.06 | EXAMPLE |
| 137 | 0.196 | 445 | 452 | 1.8 | 4.0 | — | — | — | — | 500 | 2 | 0.40 | COMPARATIVE EXAMPLE |
| 138 | 0.186 | 449 | 450 | 2.5 | 2.8 | 279 | 32 | — | — | 500 | 2 | 0.07 | EXAMPLE |
| 139 | 0.195 | 448 | 452 | 2.0 | 3.8 | — | — | — | — | 500 | 2 | 0.29 | EXAMPLE |
| 140 | 0.203 | 451 | 453 | 2.4 | 2.2 | — | — | — | — | 500 | 2 | 0.06 | EXAMPLE |
| 141 | 0.185 | 446 | 448 | 2.1 | 4.9 | — | — | — | — | 500 | 4 | 0.28 | EXAMPLE |
| 142 | 0.188 | 449 | 449 | 2.1 | 3.9 | — | — | — | — | 500 | 4 | 0.16 | EXAMPLE |
| 143 | 0.199 | 449 | 454 | 1.8 | 2.6 | — | — | — | — | 500 | 4 | 0.27 | EXAMPLE |
| 144 | 0.183 | 450 | 447 | 2.4 | 1.6 | — | — | — | — | 500 | 4 | 0.10 | EXAMPLE |
| 145 | 0.194 | 452 | 449 | 2.5 | 4.0 | — | — | — | — | 500 | 2 | 0.31 | EXAMPLE |
| 146 | 0.189 | 449 | 452 | 1.8 | 3.4 | — | — | — | — | 350 | 2 | 0.06 | EXAMPLE |
| 147 | 0.195 | 449 | 447 | 2.3 | 4.0 | — | — | — | — | 350 | 2 | 0.34 | EXAMPLE |
| 148 | 0.258 | 451 | 443 | 1.4 | 3.4 | — | — | — | — | 350 | 2 | 0.31 | COMPARATIVE EXAMPLE |
| 149 | 0.197 | 449 | 452 | 2.7 | 2.0 | — | — | — | — | 350 | 2 | 0.07 | EXAMPLE |
| 150 | 0.187 | 445 | 443 | 2.2 | 1.4 | — | — | — | — | 350 | 2 | 0.29 | EXAMPLE |
| 151 | 0.194 | 448 | 448 | 2.7 | 2.5 | — | — | — | — | 350 | 2 | 0.13 | EXAMPLE |

TABLE 15

| EXPERI-MENTAL EXAMPLE | PLATING STEP PLATING BATH | | STEEL SHEET EN-TRANCE TEMPER-ATURE °C. | COOLING STEP AFTER PLATING | | | BAINITE TRANSFORMATION TREATMENT 2 | | REHEAT TREATMENT | | WORKING STEP | | | |
|---|---|---|---|---|---|---|---|---|---|---|---|---|---|---|
| | EFFECT-IVE Al AMOUNT MASS % | BATH TEMPER-ATURE °C. | | COOLING RATE 3 (TO 350° C.) °C./SECOND | COOLING RATE 4 (350 TO 250° C.) °C./SECOND | | TREATMENT TEMPER-ATURE °C. | TREAT MENT TIME SECOND | TREATMENT TEMPER-ATURE °C. | TREAT MENT TIME SECOND | BENDING-UNBENDING WORKING STEP ROLL DIAMETER mm | TIMES OF WORK-ING TIMES | COLD ROLLING REDUC-TION RATIO % | |
| 152 | 0.190 | 447 | 453 | 1.9 | 3.0 | | 330 | 21 | — | — | 600 | 2 | 0.41 | EXAMPLE |
| 153 | 0.183 | 451 | 445 | 1.8 | 2.6 | | — | — | — | — | 600 | 2 | 0.12 | EXAMPLE |
| 157 | 0.200 | 448 | 448 | 1.3 | 2.0 | | 315 | 90 | — | — | 350 | 2 | 0.23 | EXAMPLE |
| 155 | 0.189 | 448 | 454 | 2.7 | 2.4 | | — | — | — | — | 350 | 2 | 0.04 | COMPARATIVE EXAMPLE |
| 156 | 0.181 | 448 | 453 | 1.4 | 3.9 | | — | — | — | — | 350 | 2 | 0.19 | EXAMPLE |
| 157 | 0.190 | 451 | 457 | 3.4 | 1.8 | | — | — | — | — | 350 | 2 | 0.05 | EXAMPLE |
| 158 | 0.185 | 452 | 458 | 2.3 | 4.9 | | — | — | — | — | 350 | 2 | 0.16 | EXAMPLE |
| 159 | 0.219 | 449 | 445 | 2.5 | 2.3 | | — | — | — | — | 350 | 2 | 0.09 | EXAMPLE |
| 160 | 0.200 | 447 | 455 | 2.6 | 2.7 | | — | — | — | — | 350 | 2 | 0.24 | EXAMPLE |
| 161 | 0.190 | 449 | 443 | 2.5 | 2.4 | | — | — | — | — | 350 | 2 | 0.05 | EXAMPLE |
| 162 | 0.185 | 454 | 459 | 2.2 | 2.3 | | — | — | — | — | 350 | 2 | 0.10 | EXAMPLE |
| 163 | 0.199 | 448 | 455 | 1.7 | 3.8 | | 420 | 91 | — | — | 350 | 2 | 0.14 | COMPARATIVE EXAMPLE |
| 164 | 0.181 | 450 | 453 | 2.5 | 4.2 | | — | — | — | — | 350 | 2 | 0.37 | EXAMPLE |
| 165 | 0.190 | 453 | 456 | 3.1 | 2.1 | | — | — | — | — | 350 | 2 | 0.07 | COMPARATIVE EXAMPLE |
| 166 | 0.191 | 449 | 454 | 2.5 | 3.6 | | — | — | — | — | 70 | 2 | 0.07 | COMPARATIVE EXAMPLE |
| 167 | 0.194 | 449 | 452 | 2.2 | 3.4 | | — | — | — | — | 350 | 2 | 0.12 | EXAMPLE |
| 168 | 0.200 | 452 | 445 | 2.6 | 4.1 | | — | — | — | — | 350 | 2 | 0.07 | EXAMPLE |
| 169 | 0.185 | 454 | 452 | 2.2 | 2.7 | | 279 | 19 | — | — | 350 | 2 | 0.23 | COMPARATIVE EXAMPLE |
| 170 | 0.197 | 447 | 445 | 2.5 | 4.1 | | 315 | 45 | — | — | 140 | 2 | 0.07 | COMPARATIVE EXAMPLE |
| 171 | 0.191 | 452 | 458 | 1.4 | 2.5 | | — | — | — | — | 350 | 2 | 0.14 | EXAMPLE |
| 172 | 0.181 | 450 | 444 | 1.5 | 2.4 | | 314 | 20 | 290 | 21 | 350 | 2 | 0.15 | EXAMPLE |
| 173 | 0.196 | 451 | 456 | 3.4 | 4.5 | | — | — | — | — | 350 | 2 | 0.22 | COMPARATIVE EXAMPLE |
| 174 | 0.193 | 452 | 450 | 3.1 | 3.6 | | — | — | — | — | 350 | 2 | 0.17 | COMPARATIVE EXAMPLE |
| 175 | 0.182 | 452 | 460 | 2.3 | 3.2 | | — | — | — | — | 350 | 2 | 0.15 | EXAMPLE |
| 176 | 0.197 | 451 | 449 | 2.4 | 2.4 | | — | — | — | — | 350 | 2 | 0.17 | EXAMPLE |
| 177 | 0.191 | 446 | 452 | 1.8 | 3.5 | | — | — | — | — | 350 | 2 | 0.25 | COMPARATIVE EXAMPLE |
| 178 | 0.196 | 453 | 459 | 2.2 | 3.8 | | — | — | — | — | 350 | 2 | 0.50 | COMPARATIVE EXAMPLE |
| 179 | 0.202 | 450 | 448 | 1.9 | 2.7 | | — | — | — | — | 350 | 2 | 0.15 | EXAMPLE |
| 180 | 0.182 | 456 | 457 | 0.5 | 1.5 | | — | — | — | — | 350 | 2 | 0.06 | COMPARATIVE EXAMPLE |
| 181 | 0.200 | 447 | 441 | 2.6 | 2.3 | | — | — | — | — | 350 | 2 | 0.07 | COMPARATIVE EXAMPLE |
| 182 | 0.194 | 449 | 440 | 2.6 | 3.3 | | — | — | — | — | 350 | 2 | 0.19 | COMPARATIVE EXAMPLE |
| 183 | 0.191 | 451 | 443 | 3.1 | 2.8 | | — | — | — | — | 350 | 2 | 0.24 | EXAMPLE |
| 184 | 0.198 | 449 | 446 | 1.4 | 2.8 | | 267 | 35 | 304 | 14 | 350 | 2 | 0.18 | EXAMPLE |
| 185 | 0.191 | 447 | 447 | 2.1 | 3.1 | | — | — | — | — | 350 | 2 | 0.04 | EXAMPLE |
| 186 | 0.198 | 452 | 449 | 2.0 | 2.1 | | — | — | — | — | 350 | 2 | 0.06 | COMPARATIVE EXAMPLE |
| 187 | 0.186 | 453 | 446 | 1.7 | 3.4 | | — | — | — | — | 350 | 8 | 0.09 | COMPARATIVE EXAMPLE |
| 188 | 0.197 | 448 | 440 | 2.3 | 2.6 | | — | — | — | — | 350 | 2 | 0.28 | COMPARATIVE EXAMPLE |
| 189 | 0.199 | 449 | 452 | 3.0 | 4.8 | | — | — | — | — | 350 | 2 | 0.09 | COMPARATIVE EXAMPLE |

TABLE 15-continued

| EXPERIMENTAL EXAMPLE | PLATING STEP PLATING BATH | | COOLING STEP AFTER PLATING | | | | | | WORKING STEP | | | |
|---|---|---|---|---|---|---|---|---|---|---|---|---|
| | EFFECTIVE Al AMOUNT MASS % | BATH TEMPERATURE °C. | STEEL SHEET ENTRANCE TEMPERATURE °C. | COOLING RATE 3 (TO 350° C.) °C./SECOND | COOLING RATE 4 (350 TO 250° C.) °C./SECOND | BAINITE TRANSFORMATION TREATMENT | | REHEAT TREATMENT | | BENDING-UNBENDING WORKING STEP | | COLD ROLLING |
| | | | | | | TREATMENT TEMPERATURE °C. | TREATMENT TIME SECOND | TREATMENT TEMPERATURE °C. | TREATMENT TIME SECOND | ROLL DIAMETER mm | TIMES OF WORKING TIMES | REDUCTION RATIO % |
| 190 | | | | | | | | | | | | | COMPARATIVE EXAMPLE |
| 191 | 0.198 | 448 | 448 | 2.4 | 3.3 | — | — | — | — | 350 | 2 | 0.10 | COMPARATIVE EXAMPLE |
| 192 | | | | | | | | | | | | | COMPARATIVE EXAMPLE |
| 193 | | | | | | | | | | | | | COMPARATIVE EXAMPLE |
| 194 | 0.200 | 449 | 447 | 1.7 | 3.5 | — | — | — | — | 350 | 2 | 0.04 | COMPARATIVE EXAMPLE |
| 195 | | | | | | | | | | | | | COMPARATIVE EXAMPLE |
| 196 | 0.191 | 456 | 452 | 2.6 | 3.5 | — | — | — | — | 350 | 2 | 0.13 | COMPARATIVE EXAMPLE |
| 197 | 0.198 | 452 | 453 | 2.2 | 3.7 | — | — | — | — | 350 | 2 | 0.05 | COMPARATIVE EXAMPLE |
| 198 | 0.191 | 449 | 451 | 2.1 | 5.0 | — | — | — | — | 350 | 2 | 0.10 | COMPARATIVE EXAMPLE |
| 199 | 0.208 | 447 | 441 | 3.1 | 1.7 | — | — | — | — | 350 | 2 | 0.19 | EXAMPLE |
| 200 | 0.197 | 450 | 457 | 2.0 | 3.5 | — | — | — | — | 350 | 2 | 0.20 | COMPARATIVE EXAMPLE |
| 201 | 0.195 | 448 | 452 | 1.8 | 3.6 | — | — | — | — | 350 | 2 | 0.19 | EXAMPLE |
| 202 | 0.190 | 446 | 450 | 1.9 | 3.3 | — | — | — | — | 350 | 2 | 0.19 | COMPARATIVE EXAMPLE |

TABLE 16

| EXPERI-MENTAL EXAMPLE | CHEMICAL COMPONENT | MICROSTRUCTURE ||||||||| BASE IRON SURFACE LAYER |||| |
|---|---|---|---|---|---|---|---|---|---|---|---|---|---|---|
| | | 1/4 THICKNESS STRUCTURAL FRACTION |||||||| STRUCTURAL FRACTION || | OXIDE AT GRAIN BOUNDARY AND/OR WITHIN GRAIN | |
| | | FERRITE % | BAINITE % | BAINITIC FERRITE % | MARTEN-SITE % | TEMPERED MARTEN-SITE % | RETAINED AUSTENITE % | OTHERS % | HARD PHASE V1 % | RETAINED AUSTENITE % | HARD PHASE V2 % | V1/V2 | | |
| 1 | A | 59 | 9 | 12 | 17 | 0 | 3 | 0 | 38 | 0 | 28 | 0.73 | ABSENT | COMPARATIVE EXAMPLE |
| 2 | A | 54 | 6 | 8 | 15 | 2 | 2 | 3 | 31 | 1 | 17 | 0.55 | ABSENT | COMPARATIVE EXAMPLE |
| 3 | A | 71 | 14 | 13 | 2 | 0 | 0 | 0 | 29 | 0 | 20 | 0.70 | ABSENT | EXAMPLE |
| 4 | A | 71 | 14 | 13 | 2 | 0 | 0 | 0 | 29 | 0 | 20 | 0.70 | ABSENT | EXAMPLE |
| 5 | A | 81 | 3 | 3 | 0 | 13 | 0 | 0 | 19 | 0 | 15 | 0.77 | ABSENT | EXAMPLE |
| 6 | B | 68 | 11 | 2 | 14 | 3 | 1 | 1 | 30 | 0 | 17 | 0.56 | ABSENT | EXAMPLE |
| 7 | B | 80 | 6 | 4 | 8 | 0 | 2 | 0 | 18 | 0 | 12 | 0.66 | ABSENT | EXAMPLE |
| 8 | B | 79 | 5 | 2 | 0 | 14 | 0 | 0 | 21 | 0 | 12 | 0.59 | ABSENT | EXAMPLE |
| 9 | B | 72 | 14 | 7 | 2 | 0 | 5 | 0 | 23 | 0 | 16 | 0.68 | ABSENT | EXAMPLE |
| 10 | C | 61 | 0 | 13 | 23 | 0 | 3 | 0 | 36 | 0 | 22 | 0.60 | ABSENT | COMPARATIVE EXAMPLE |
| 11 | C | 61 | 4 | 20 | 0 | 8 | 7 | 0 | 32 | 2 | 22 | 0.70 | ABSENT | EXAMPLE |
| 12 | C | 51 | 4 | 4 | 0 | 8 | 7 | 0 | 32 | 2 | 22 | 0.70 | ABSENT | EXAMPLE |
| 13 | C | 51 | 6 | 17 | 16 | 2 | 0 | 0 | 39 | 0 | 22 | 0.56 | PRESENT | EXAMPLE |
| 14 | C | 67 | 7 | 10 | 13 | 2 | 1 | 0 | 32 | 0 | 16 | 0.51 | ABSENT | COMPARATIVE EXAMPLE |
| 15 | D | 71 | 3 | 6 | 18 | 0 | 2 | 0 | 27 | 0 | 11 | 0.40 | ABSENT | COMPARATIVE EXAMPLE |
| 16 | D | 79 | 0 | 0 | 13 | 8 | 2 | 0 | 19 | 2 | 1 | 0.05 | PRESENT | COMPARATIVE EXAMPLE |
| 17 | D | 63 | 4 | 13 | 2 | 15 | 3 | 0 | 34 | 0 | 18 | 0.53 | PRESENT | EXAMPLE |
| 18 | D | 76 | 6 | 2 | 0 | 16 | 0 | 0 | 24 | 0 | 12 | 0.52 | ABSENT | EXAMPLE |
| 19 | E | 55 | 2 | 9 | 18 | 4 | 0 | 0 | 33 | 0 | 19 | 0.57 | ABSENT | EXAMPLE |
| 20 | E | 64 | 6 | 12 | 0 | 18 | 0 | 0 | 36 | 0 | 12 | 0.32 | ABSENT | EXAMPLE |
| 21 | E | 55 | 12 | 16 | 15 | 0 | 1 | 1 | 43 | 0 | 14 | 0.32 | ABSENT | EXAMPLE |
| 22 | E | 76 | 5 | 3 | 3 | 0 | 0 | 13 | 11 | 0 | 6 | 0.59 | ABSENT | COMPARATIVE EXAMPLE |
| 23 | F | 37 | 8 | 5 | 17 | 1 | 2 | 0 | 31 | 0 | 23 | 0.74 | ABSENT | EXAMPLE |
| 24 | F | 60 | 25 | 9 | 0 | 5 | 1 | 0 | 39 | 0 | 26 | 0.67 | ABSENT | EXAMPLE |
| 25 | F | 65 | 11 | 16 | 3 | 0 | 5 | 0 | 30 | 2 | 25 | 0.84 | ABSENT | EXAMPLE |
| 26 | F | 71 | 4 | 9 | 15 | 0 | 1 | 0 | 28 | 0 | 10 | 0.36 | ABSENT | EXAMPLE |
| 27 | G | 72 | 9 | 0 | 15 | 0 | 3 | 0 | 27 | 0 | 21 | 0.78 | ABSENT | EXAMPLE |
| 28 | G | 67 | 14 | 3 | 14 | 0 | 2 | 0 | 31 | 2 | 31 | 1.00 | ABSENT | COMPARATIVE EXAMPLE |
| 29 | G | 72 | 12 | 3 | 13 | 0 | 0 | 0 | 28 | 0 | 20 | 0.72 | ABSENT | EXAMPLE |
| 30 | H | 70 | 2 | 5 | 21 | 0 | 2 | 0 | 28 | 0 | 16 | 0.58 | ABSENT | EXAMPLE |
| 31 | H | 62 | 4 | 10 | 4 | 18 | 2 | 0 | 36 | 1 | 27 | 0.75 | ABSENT | EXAMPLE |
| 32 | H | 87 | 0 | 3 | 8 | 0 | 2 | 0 | 11 | 0 | 7 | 0.61 | ABSENT | EXAMPLE |
| 33 | I | 70 | 12 | 0 | 18 | 0 | 0 | 0 | 30 | 1 | 15 | 0.51 | ABSENT | EXAMPLE |
| 34 | I | 68 | 18 | 6 | 0 | 4 | 4 | 0 | 28 | 1 | 17 | 0.60 | ABSENT | EXAMPLE |
| 35 | I | 83 | 5 | 2 | 9 | 1 | 0 | 0 | 17 | 0 | 14 | 0.80 | PRESENT | EXAMPLE |
| 36 | J | 70 | 7 | 5 | 16 | 0 | 2 | 0 | 28 | 2 | 12 | 0.43 | PRESENT | EXAMPLE |
| 37 | J | 56 | 10 | 24 | 5 | 0 | 5 | 0 | 39 | 0 | 33 | 0.85 | ABSENT | EXAMPLE |
| 38 | J | 70 | 8 | 4 | 15 | 0 | 3 | 0 | 27 | 2 | 18 | 0.68 | ABSENT | EXAMPLE |
| 39 | K | 65 | 10 | 2 | 17 | 5 | 1 | 0 | 34 | 0 | 24 | 0.71 | ABSENT | EXAMPLE |
| 40 | K | 55 | 21 | 13 | 6 | 0 | 0 | 5 | 40 | 0 | 34 | 0.84 | ABSENT | EXAMPLE |

TABLE 16-continued

| EXPERI-MENTAL EXAMPLE | CHEMICAL COMPONENT | MICROSTRUCTURE ||||||||| BASE IRON SURFACE LAYER ||||
|---|---|---|---|---|---|---|---|---|---|---|---|---|---|
| | | 1/4 THICKNESS STRUCTURAL FRACTION |||||||| STRUCTURAL FRACTION || | |
| | | FERRITE % | BAINITE % | BAINITIC FERRITE % | MAR-TEN-SITE % | TEMPERED MARTEN-SITE % | RETAINED AUSTENITE % | OTHERS % | HARD PHASE V1 % | RETAINED AUSTENITE % | HARD PHASE V2 % | V1/V2 | OXIDE AT GRAIN BOUNDARY AND/OR WITHIN GRAIN | |
| 41 | K | 55 | 9 | 21 | 9 | 0 | 6 | 0 | 39 | 2 | 26 | 0.67 | PRESENT | EXAMPLE |
| 42 | L | 73 | 0 | 5 | 19 | 0 | 3 | 0 | 24 | 0 | 16 | 0.68 | ABSENT | EXAMPLE |
| 43 | L | 74 | 4 | 10 | 2 | 0 | 0 | 10 | 16 | 0 | 12 | 0.72 | ABSENT | COMPARATIVE EXAMPLE |
| 44 | M | 57 | 5 | 0 | 8 | 0 | 0 | 0 | 13 | 0 | 7 | 0.55 | ABSENT | EXAMPLE |
| 45 | M | 59 | 26 | 6 | 7 | 0 | 2 | 0 | 39 | 1 | 22 | 0.56 | ABSENT | EXAMPLE |
| 46 | M | 87 | 0 | 0 | 8 | 4 | 1 | 0 | 12 | 0 | 10 | 0.83 | ABSENT | COMPARATIVE EXAMPLE |
| 47 | N | 62 | 13 | 3 | 21 | 0 | 0 | 1 | 37 | 0 | 26 | 0.69 | ABSENT | EXAMPLE |
| 48 | N | 51 | 18 | 0 | 0 | 31 | 0 | 0 | 49 | 0 | 31 | 0.63 | ABSENT | EXAMPLE |
| 49 | N | 31 | 31 | 6 | 24 | 5 | 3 | 0 | 66 | 3 | 24 | 0.74 | ABSENT | COMPARATIVE EXAMPLE |
| 50 | O | 74 | 0 | 8 | 15 | 0 | 3 | 0 | 23 | 1 | 12 | 0.54 | ABSENT | EXAMPLE |

TABLE 17

| EXPERI-MENTAL EXAMPLE | CHEMICAL COMPONENT | MICROSTRUCTURE 1/4 THICKNESS STRUCTURAL FRACTION | | | | | | BASE IRON SURFACE LAYER STRUCTURAL FRACTION | | | | |  |
|---|---|---|---|---|---|---|---|---|---|---|---|---|---|
| | | FERRITE % | BAINITE % | BAINITIC FERRITE % | MAR-TENSITE % | TEMPERED MARTENSITE % | RETAINED AUSTENITE % | OTHERS % | HARD PHASE V1 % | RETAINED AUSTENITE % | HARD PHASE V2 % | V1/V2 | OXIDE AT GRAIN BOUNDARY AND/OR WITHIN GRAIN | |
| 51 | O | 76 | 2 | 6 | 14 | 0 | 2 | 0 | 22 | 0 | 2 | 0.08 | ABSENT | COMPARATIVE EXAMPLE |
| 52 | O | 69 | 0 | 9 | 21 | 0 | 1 | 0 | 30 | 0 | 17 | 0.56 | ABSENT | EXAMPLE |
| 53 | O | 75 | 0 | 8 | 0 | 17 | 0 | 0 | 25 | 0 | 7 | 0.28 | ABSENT | EXAMPLE |
| 54 | P | 74 | 9 | 2 | 14 | 0 | 1 | 0 | 25 | 0 | 17 | 0.66 | ABSENT | EXAMPLE |
| 55 | P | 68 | 10 | 15 | 1 | 0 | 6 | 0 | 26 | 2 | 21 | 0.79 | ABSENT | EXAMPLE |
| 56 | P | 72 | 10 | 7 | 10 | 1 | 0 | 0 | 28 | 0 | 23 | 0.82 | ABSENT | EXAMPLE |
| 57 | Q | 84 | 0 | 4 | 12 | 0 | 0 | 0 | 16 | 0 | 11 | 0.66 | ABSENT | EXAMPLE |
| 58 | Q | 66 | 14 | 8 | 12 | 0 | 0 | 0 | 34 | 0 | 25 | 0.74 | ABSENT | EXAMPLE |
| 59 | Q | 58 | 5 | 19 | 0 | 12 | 6 | 0 | 36 | 5 | 28 | 0.77 | ABSENT | COMPARATIVE EXAMPLE |
| 60 | R | 91 | 0 | 0 | 7 | 0 | 2 | 0 | 7 | 0 | 5 | 0.68 | ABSENT | EXAMPLE |
| 61 | R | 88 | 3 | 0 | 9 | 0 | 0 | 0 | 12 | 0 | 4 | 0.37 | ABSENT | EXAMPLE |
| 62 | R | 93 | 0 | 0 | 0 | 7 | 0 | 0 | 7 | 0 | 5 | 0.71 | ABSENT | EXAMPLE |
| 63 | S | 73 | 3 | 10 | 13 | 0 | 1 | 0 | 26 | 0 | 19 | 0.74 | ABSENT | EXAMPLE |
| 64 | S | 71 | 0 | 0 | 24 | 3 | 2 | 0 | 27 | 0 | 15 | 0.54 | ABSENT | EXAMPLE |
| 65 | T | 73 | 7 | 2 | 15 | 2 | 0 | 1 | 26 | 0 | 15 | 0.59 | ABSENT | EXAMPLE |
| 66 | T | 70 | 22 | 8 | 0 | 0 | 0 | 0 | 30 | 0 | 19 | 0.62 | ABSENT | EXAMPLE |
| 67 | T | 28 | 21 | 10 | 37 | 0 | 4 | 0 | 68 | 2 | 46 | 0.68 | ABSENT | COMPARATIVE EXAMPLE |
| 68 | U | 76 | 4 | 7 | 11 | 0 | 2 | 0 | 22 | 0 | 14 | 0.62 | PRESENT | EXAMPLE |
| 69 | U | 61 | 3 | 4 | 27 | 0 | 5 | 0 | 34 | 3 | 26 | 0.77 | ABSENT | EXAMPLE |
| 70 | U | 63 | 14 | 21 | 0 | 0 | 2 | 0 | 35 | 0 | 26 | 0.74 | PRESENT | EXAMPLE |
| 71 | V | 67 | 8 | 3 | 21 | 0 | 1 | 0 | 32 | 0 | 19 | 0.60 | PRESENT | EXAMPLE |
| 72 | V | 63 | 27 | 9 | 0 | 0 | 0 | 1 | 36 | 1 | 26 | 0.73 | ABSENT | EXAMPLE |
| 73 | V | 88 | 0 | 0 | 0 | 12 | 0 | 0 | 12 | 0 | 8 | 0.68 | ABSENT | EXAMPLE |
| 74 | W | 68 | 6 | 3 | 23 | 0 | 0 | 0 | 32 | 0 | 19 | 0.60 | ABSENT | EXAMPLE |
| 75 | W | 80 | 2 | 3 | 14 | 0 | 1 | 0 | 19 | 0 | 0 | 0.00 | ABSENT | COMPARATIVE EXAMPLE |
| 76 | W | 85 | 3 | 1 | 0 | 11 | 0 | 0 | 15 | 0 | 7 | 0.45 | PRESENT | EXAMPLE |
| 77 | X | 90 | 2 | 2 | 6 | 0 | 0 | 0 | 10 | 0 | 5 | 0.45 | PRESENT | EXAMPLE |
| 78 | X | 72 | 8 | 4 | 15 | 0 | 1 | 0 | 27 | 0 | 16 | 0.58 | PRESENT | EXAMPLE |
| 79 | X | 74 | 6 | 0 | 0 | 20 | 0 | 0 | 26 | 0 | 15 | 0.57 | ABSENT | EXAMPLE |
| 80 | Y | 84 | 0 | 4 | 11 | 0 | 1 | 0 | 15 | 0 | 8 | 0.55 | ABSENT | EXAMPLE |
| 81 | Y | 52 | 14 | 0 | 0 | 34 | 0 | 0 | 48 | 0 | 25 | 0.53 | ABSENT | COMPARATIVE EXAMPLE |
| 82 | Y | 73 | 12 | 6 | 9 | 0 | 0 | 0 | 27 | 0 | 17 | 0.63 | ABSENT | EXAMPLE |
| 83 | Z | 71 | 8 | 3 | 18 | 0 | 0 | 0 | 29 | 0 | 19 | 0.58 | ABSENT | EXAMPLE |
| 84 | Z | 67 | 10 | 5 | 16 | 0 | 2 | 0 | 31 | 2 | 19 | 0.07 | ABSENT | COMPARATIVE EXAMPLE |
| 85 | Z | 81 | 4 | 0 | 14 | 1 | 0 | 0 | 31 | 0 | 2 | 0.76 | ABSENT | EXAMPLE |
| 86 | AA | 72 | 3 | 6 | 16 | 0 | 2 | 1 | 18 | 1 | 14 | 0.76 | ABSENT | EXAMPLE |
| 87 | AA | 60 | 0 | 13 | 3 | 22 | 2 | 0 | 26 | 0 | 15 | 0.57 | ABSENT | EXAMPLE |
| 88 | AB | 59 | 11 | 7 | 23 | 0 | 0 | 0 | 38 | 0 | 29 | 0.75 | ABSENT | EXAMPLE |
| 89 | AB | 62 | 38 | 0 | 0 | 0 | 0 | 0 | 41 | 0 | 31 | 0.70 | ABSENT | EXAMPLE |
| 90 | AB | 76 | 15 | 6 | 0 | 0 | 3 | 0 | 21 | 1 | 13 | 0.60 | ABSENT | EXAMPLE |
| 91 | AC | 88 | 0 | 2 | 7 | 0 | 3 | 0 | 9 | 0 | 6 | 0.70 | ABSENT | EXAMPLE |

TABLE 17-continued

| | | MICROSTRUCTURE | | | | | | | | | | | |
|---|---|---|---|---|---|---|---|---|---|---|---|---|---|
| | | 1/4 THICKNESS STRUCTURAL FRACTION | | | | | | BASE IRON SURFACE LAYER | | | | | |
| | | | | MAR-TEN-SITE | TEMPERED MARTEN-SITE | RETAINED AUSTENITE | OTHERS | HARD PHASE V1 | STRUCTURAL FRACTION | | | | |
| EXPERI-MENTAL EXAM-PLE | CHEMI-CAL COMPO-NENT | FERRITE % | BAINITE % | BAINITIC FERRITE % | % | % | % | % | % | RETAINED AUSTENITE % | HARD PHASE V2 % | V1/V2 | OXIDE AT GRAIN BOUNDARY AND/OR WITHIN GRAIN | |
| 92 | AC | 87 | 0 | 3 | 5 | 0 | 5 | 0 | 8 | 2 | 5 | 0.63 | PRESENT | EXAMPLE |
| 93 | AD | 62 | 8 | 6 | 24 | 0 | 0 | 0 | 38 | 0 | 30 | 0.80 | ABSENT | EXAMPLE |
| 94 | AD | 61 | 7 | 8 | 0 | 23 | 1 | 0 | 38 | 0 | 21 | 0.56 | PRESENT | EXAMPLE |
| 95 | AE | 69 | 7 | 3 | 17 | 0 | 0 | 3 | 27 | 0 | 16 | 0.58 | ABSENT | EXAMPLE |
| 96 | AE | 55 | 33 | 4 | 0 | 8 | 0 | 0 | 45 | 1 | 33 | 0.74 | ABSENT | EXAMPLE |
| 97 | AF | 74 | 6 | 4 | 13 | 0 | 2 | 1 | 23 | 0 | 13 | 0.56 | ABSENT | EXAMPLE |
| 98 | AF | 50 | 2 | 6 | 34 | 8 | 0 | 0 | 50 | 0 | 29 | 0.57 | ABSENT | EXAMPLE |
| 99 | AG | 68 | 6 | 6 | 18 | 0 | 2 | 0 | 30 | 0 | 21 | 0.70 | ABSENT | EXAMPLE |
| 100 | AG | 60 | 0 | 9 | 21 | 0 | 0 | 10 | 30 | 0 | 22 | 0.73 | ABSENT | EXAMPLE |

TABLE 18

| EXPERI-MENTAL EXAMPLE | CHEMICAL COMPONENT | MICROSTRUCTURE ||||||||| BASE IRON SURFACE LAYER |||
|---|---|---|---|---|---|---|---|---|---|---|---|---|---|
| | | 1/4 THICKNESS STRUCTURAL FRACTION |||||||| STRUCTURAL FRACTION ||| OXIDE AT GRAIN BOUNDARY AND/OR WITHIN GRAIN | |
| | | FERRITE % | BAINITE % | BAINITIC FERRITE % | MAR-TEN-SITE % | TEMPERED MARTEN-SITE % | RETAINED AUSTENITE % | OTHERS % | HARD PHASE V1 % | RETAINED AUSTENITE % | HARD PHASE V2 % | V1/V2 | |
| 101 | AH | 57 | 7 | 5 | 25 | 2 | 4 | 0 | 39 | 1 | 22 | 0.57 | ABSENT | EXAMPLE |
| 102 | AH | 60 | 4 | 31 | 5 | 0 | 0 | 0 | 40 | 0 | 34 | 0.85 | ABSENT | EXAMPLE |
| 103 | AI | 84 | 2 | 0 | 12 | 0 | 2 | 0 | 14 | 2 | 8 | 0.57 | ABSENT | EXAMPLE |
| 104 | AI | 71 | 21 | 4 | 4 | 0 | 0 | 0 | 29 | 0 | 21 | 0.72 | ABSENT | EXAMPLE |
| 105 | AJ | 70 | 8 | 5 | 16 | 0 | 1 | 0 | 29 | 0 | 17 | 0.59 | ABSENT | EXAMPLE |
| 106 | AJ | 58 | 13 | 5 | 24 | 0 | 0 | 0 | 42 | 0 | 26 | 0.63 | ABSENT | EXAMPLE |
| 107 | AK | 56 | 7 | 8 | 26 | 0 | 3 | 0 | 41 | 0 | 28 | 0.69 | PRESENT | EXAMPLE |
| 108 | AK | 54 | 13 | 25 | 5 | 0 | 3 | 0 | 43 | 0 | 18 | 0.43 | ABSENT | EXAMPLE |
| 109 | AL | 86 | 5 | 0 | 6 | 0 | 0 | 3 | 11 | 0 | 8 | 0.76 | ABSENT | EXAMPLE |
| 110 | AL | 76 | 19 | 5 | 0 | 0 | 0 | 0 | 24 | 0 | 16 | 0.65 | ABSENT | EXAMPLE |
| 111 | AM | 63 | 13 | 3 | 19 | 0 | 1 | 1 | 35 | 0 | 17 | 0.48 | ABSENT | EXAMPLE |
| 112 | AM | 64 | 5 | 6 | 0 | 24 | 1 | 0 | 35 | 0 | 20 | 0.58 | ABSENT | EXAMPLE |
| 113 | AM | 63 | 7 | 14 | 8 | 3 | 5 | 0 | 32 | 2 | 18 | 0.55 | ABSENT | EXAMPLE |
| 114 | AM | 61 | 15 | 10 | 12 | 0 | 2 | 0 | 37 | 0 | 3 | 0.09 | ABSENT | COMPARATIVE EXAMPLE |
| 115 | AN | 79 | 5 | 3 | 11 | 0 | 0 | 2 | 19 | 0 | 14 | 0.72 | ABSENT | EXAMPLE |
| 116 | AN | 51 | 7 | 6 | 23 | 0 | 3 | 0 | 36 | 0 | 28 | 0.79 | ABSENT | EXAMPLE |
| 117 | AO | 81 | 5 | 3 | 10 | 0 | 1 | 0 | 18 | 0 | 13 | 0.74 | ABSENT | COMPARATIVE EXAMPLE |
| 118 | AO | 70 | 7 | 4 | 19 | 0 | 0 | 0 | 30 | 0 | 18 | 0.60 | ABSENT | EXAMPLE |
| 119 | AP | 77 | 8 | 4 | 8 | 0 | 1 | 2 | 20 | 0 | 11 | 0.56 | ABSENT | EXAMPLE |
| 120 | AP | 69 | 16 | 1 | 14 | 0 | 0 | 0 | 31 | 0 | 26 | 0.83 | ABSENT | EXAMPLE |
| 121 | AP | 75 | 18 | 4 | 3 | 0 | 0 | 0 | 25 | 0 | 19 | 0.76 | ABSENT | EXAMPLE |
| 122 | AQ | 83 | 5 | 0 | 10 | 0 | 0 | 2 | 15 | 0 | 9 | 0.58 | PRESENT | EXAMPLE |
| 123 | AQ | 83 | 6 | 1 | 10 | 0 | 0 | 0 | 17 | 0 | 9 | 0.50 | ABSENT | EXAMPLE |
| 124 | AR | 87 | 5 | 2 | 7 | 0 | 0 | 0 | 13 | 0 | 6 | 0.45 | PRESENT | EXAMPLE |
| 125 | AR | 73 | 4 | 3 | 15 | 0 | 2 | 3 | 25 | 0 | 19 | 0.77 | ABSENT | EXAMPLE |
| 126 | AS | 75 | 7 | 8 | 15 | 0 | 0 | 0 | 25 | 0 | 17 | 0.67 | ABSENT | EXAMPLE |
| 127 | AS | 61 | 2 | 16 | 14 | 0 | 0 | 0 | 39 | 0 | 32 | 0.82 | ABSENT | EXAMPLE |
| 128 | AT | 80 | 9 | 3 | 14 | 0 | 0 | 1 | 19 | 0 | 12 | 0.64 | PRESENT | EXAMPLE |
| 129 | AT | 88 | 2 | 2 | 0 | 6 | 0 | 0 | 12 | 0 | 7 | 0.60 | ABSENT | EXAMPLE |
| 130 | AU | 87 | 4 | 2 | 11 | 0 | 0 | 0 | 13 | 0 | 9 | 0.72 | ABSENT | EXAMPLE |
| 131 | AU | 80 | 5 | 3 | 12 | 0 | 5 | 0 | 20 | 1 | 19 | 0.95 | PRESENT | COMPARATIVE EXAMPLE |
| 132 | AU | 88 | 5 | 4 | 1 | 0 | 1 | 0 | 9 | 1 | 7 | 0.83 | ABSENT | EXAMPLE |
| 133 | AV | 88 | 3 | 1 | 7 | 0 | 1 | 0 | 11 | 0 | 7 | 0.68 | ABSENT | EXAMPLE |
| 134 | AV | 79 | 0 | 5 | 13 | 0 | 3 | 0 | 18 | 0 | 12 | 0.64 | ABSENT | EXAMPLE |
| 135 | AW | 51 | 13 | 17 | 4 | 0 | 5 | 0 | 34 | 3 | 26 | 0.75 | ABSENT | EXAMPLE |
| 136 | AW | 57 | 11 | 4 | 16 | 0 | 1 | 1 | 31 | 0 | 22 | 0.71 | ABSENT | EXAMPLE |
| 137 | AW | 63 | 13 | 8 | 0 | 0 | 0 | 16 | 21 | 0 | 17 | 0.66 | ABSENT | COMPARATIVE EXAMPLE |
| 138 | AX | 60 | 23 | 13 | 0 | 0 | 4 | 0 | 36 | 2 | 23 | 0.65 | PRESENT | EXAMPLE |
| 139 | AX | 61 | 5 | 6 | 23 | 2 | 3 | 0 | 36 | 0 | 27 | 0.75 | ABSENT | EXAMPLE |
| 140 | AX | 64 | 11 | 6 | 18 | 0 | 1 | 0 | 35 | 0 | 26 | 0.73 | ABSENT | EXAMPLE |

TABLE 18-continued

| | | MICROSTRUCTURE | | | | | | | | | | |
|---|---|---|---|---|---|---|---|---|---|---|---|---|
| | | 1/4 THICKNESS STRUCTURAL FRACTION | | | | | | BASE IRON SURFACE LAYER | | | | |
| | | | | | | | | STRUCTURAL FRACTION | | | | |
| | | | | | MAR-TEMPERED | | | | | | | |
| EXPERI-MENTAL EXAMPLE | CHEMICAL COMPONENT | FERRITE % | BAINITE % | BAINITIC FERRITE % | MAR-TEN-SITE % | MARTEN-SITE % | RETAINED AUSTENITE % | OTHERS % | HARD PHASE V1 % | RETAINED AUSTENITE % | HARD PHASE V2 % | V1/V2 | OXIDE AT GRAIN BOUNDARY AND/OR WITHIN GRAIN | |
| 141 | AY | 53 | 4 | 16 | 25 | 0 | 2 | 0 | 45 | 1 | 28 | 0.62 | PRESENT | EXAMPLE |
| 142 | AY | 54 | 6 | 34 | 0 | 0 | 6 | 0 | 40 | 0 | 22 | 0.55 | ABSENT | EXAMPLE |
| 143 | AZ | 72 | 5 | 9 | 12 | 0 | 0 | 2 | 26 | 0 | 20 | 0.75 | ABSENT | EXAMPLE |
| 144 | AZ | 74 | 5 | 6 | 15 | 0 | 0 | 0 | 26 | 0 | 20 | 0.76 | ABSENT | EXAMPLE |
| 145 | BA | 75 | 3 | 5 | 15 | 0 | 2 | 0 | 23 | 0 | 18 | 0.78 | ABSENT | EXAMPLE |
| 146 | BA | 56 | 10 | 5 | 21 | 7 | 1 | 0 | 43 | 0 | 23 | 0.54 | PRESENT | EXAMPLE |
| 147 | BB | 56 | 8 | 7 | 26 | 0 | 3 | 0 | 41 | 0 | 27 | 0.66 | ABSENT | EXAMPLE |
| 148 | BB | 70 | 5 | 5 | 16 | 0 | 1 | 0 | 29 | 0 | 19 | 0.65 | ABSENT | COMPARATIVE EXAMPLE |
| 149 | BB | 65 | 20 | 20 | 3 | 0 | 4 | 0 | 31 | 0 | 18 | 0.58 | ABSENT | EXAMPLE |
| 150 | BB | 56 | 14 | 14 | 9 | 0 | 0 | 0 | 34 | 0 | 13 | 0.38 | ABSENT | EXAMPLE |
| 151 | BC | 86 | 0 | 0 | 8 | 0 | 0 | 2 | 12 | 0 | 9 | 0.75 | ABSENT | EXAMPLE |

TABLE 19

| EXPERIMENTAL EXAMPLE | CHEMICAL COMPONENT | MICROSTRUCTURE ||||||||| BASE IRON SURFACE LAYER ||| |
| --- | --- | --- | --- | --- | --- | --- | --- | --- | --- | --- | --- | --- | --- |
| | | 1/4 THICKNESS ||||||||| STRUCTURAL FRACTION || | |
| | | STRUCTURAL FRACTION ||||||| | | | | | |
| | | FERRITE % | BAINITE % | BAINITIC FERRITE % | MARTENSITE % | TEMPERED MARTENSITE % | RETAINED AUSTENITE % | OTHERS % | HARD PHASE V1 % | RETAINED AUSTENITE % | HARD PHASE V2 % | V1/V2 | OXIDE AT GRAIN BOUNDARY AND/OR WITHIN GRAIN | |
| 152 | BC | 66 | 13 | 6 | 4 | 5 | 5 | 1 | 28 | 1 | 22 | 0.78 | ABSENT | EXAMPLE |
| 153 | BC | 67 | 9 | 3 | 21 | 0 | 0 | 0 | 33 | 0 | 24 | 0.74 | ABSENT | EXAMPLE |
| 154 | BC | 79 | 10 | 8 | 0 | 0 | 3 | 0 | 18 | 0 | 14 | 0.76 | PRESENT | EXAMPLE |
| 155 | BD | 82 | 4 | 3 | 11 | 0 | 0 | 0 | 18 | 0 | 17 | 0.97 | ABSENT | COMPARATIVE EXAMPLE |
| 156 | BD | 80 | 5 | 0 | 11 | 0 | 1 | 3 | 16 | 0 | 12 | 0.76 | ABSENT | EXAMPLE |
| 157 | BD | 80 | 6 | 0 | 14 | 0 | 0 | 0 | 20 | 0 | 15 | 0.77 | ABSENT | EXAMPLE |
| 158 | BE | 77 | 3 | 4 | 14 | 0 | 2 | 0 | 21 | 0 | 14 | 0.67 | ABSENT | EXAMPLE |
| 159 | BE | 85 | 0 | 4 | 9 | 0 | 2 | 0 | 13 | 0 | 8 | 0.62 | ABSENT | EXAMPLE |
| 160 | BF | 64 | 13 | 7 | 13 | 0 | 3 | 0 | 33 | 0 | 18 | 0.55 | ABSENT | EXAMPLE |
| 161 | BF | 61 | 5 | 7 | 24 | 0 | 3 | 0 | 36 | 0 | 28 | 0.77 | ABSENT | EXAMPLE |
| 162 | BF | 63 | 1 | 27 | 4 | 0 | 5 | 0 | 32 | 2 | 17 | 0.53 | ABSENT | EXAMPLE |
| 163 | BF | 63 | 3 | 21 | 0 | 0 | 13 | 0 | 24 | 3 | 13 | 0.56 | ABSENT | COMPARATIVE EXAMPLE |
| 164 | BG | 87 | 0 | 4 | 7 | 0 | 2 | 0 | 11 | 0 | 4 | 0.35 | ABSENT | EXAMPLE |
| 165 | BG | 80 | 3 | 6 | 11 | 0 | 0 | 0 | 20 | 0 | 1 | 0.06 | ABSENT | COMPARATIVE EXAMPLE |
| 166 | BG | 71 | 2 | 6 | 19 | 0 | 2 | 0 | 27 | 0 | 14 | 0.52 | ABSENT | EXAMPLE |
| 167 | BH | 65 | 3 | 7 | 19 | 5 | 0 | 1 | 34 | 0 | 22 | 0.65 | ABSENT | EXAMPLE |
| 168 | BH | 54 | 5 | 14 | 25 | 0 | 2 | 0 | 44 | 0 | 33 | 0.75 | ABSENT | COMPARATIVE EXAMPLE |
| 169 | BH | 58 | 6 | 27 | 3 | 0 | 6 | 0 | 36 | 2 | 29 | 0.80 | ABSENT | EXAMPLE |
| 170 | BH | 54 | 13 | 23 | 5 | 0 | 5 | 0 | 41 | 0 | 34 | 0.83 | ABSENT | EXAMPLE |
| 171 | BI | 85 | 0 | 5 | 8 | 0 | 2 | 0 | 13 | 0 | 7 | 0.57 | PRESENT | EXAMPLE |
| 172 | BI | 75 | 2 | 13 | 0 | 5 | 5 | 0 | 20 | 0 | 9 | 0.46 | ABSENT | EXAMPLE |
| 173 | BJ | 83 | 4 | 2 | 11 | 0 | 0 | 0 | 17 | 0 | 10 | 0.60 | ABSENT | COMPARATIVE EXAMPLE |
| 174 | BJ | 63 | 9 | 16 | 0 | 0 | 0 | 12 | 25 | 0 | 21 | 0.83 | ABSENT | EXAMPLE |
| 175 | BJ | 83 | 3 | 4 | 8 | 0 | 2 | 0 | 15 | 0 | 10 | 0.64 | ABSENT | EXAMPLE |
| 176 | BK | 86 | 0 | 0 | 12 | 0 | 2 | 0 | 12 | 0 | 6 | 0.49 | ABSENT | COMPARATIVE EXAMPLE |
| 177 | BK | 64 | 14 | 7 | 15 | 0 | 0 | 0 | 36 | 0 | 31 | 0.85 | ABSENT | EXAMPLE |
| 178 | BL | 78 | 3 | 3 | 16 | 0 | 0 | 0 | 22 | 0 | 17 | 0.78 | PRESENT | EXAMPLE |
| 179 | BL | 61 | 8 | 6 | 3 | 21 | 1 | 0 | 38 | 0 | 33 | 0.88 | ABSENT | EXAMPLE |
| 180 | BL | 78 | 5 | 6 | 9 | 0 | 2 | 0 | 20 | 0 | 11 | 0.55 | ABSENT | COMPARATIVE EXAMPLE |
| 181 | BL | 68 | 20 | 10 | 2 | 0 | 0 | 0 | 32 | 0 | 20 | 0.61 | ABSENT | COMPARATIVE EXAMPLE |
| 182 | BM | 79 | 0 | 8 | 11 | 0 | 2 | 0 | 19 | 1 | 9 | 0.48 | ABSENT | EXAMPLE |
| 183 | BM | 90 | 0 | 0 | 0 | 0 | 0 | 10 | 0 | 0 | 0 | 0.46 | ABSENT | COMPARATIVE EXAMPLE |
| 184 | BM | 76 | 0 | 13 | 5 | 0 | 6 | 0 | 18 | 0 | 7 | 0.37 | ABSENT | EXAMPLE |
| 185 | BN | 86 | 5 | 2 | 7 | 0 | 0 | 0 | 14 | 0 | 8 | 0.54 | ABSENT | EXAMPLE |
| 186 | BN | 73 | 10 | 0 | 0 | 17 | 0 | 1 | 27 | 0 | 19 | 0.69 | PRESENT | EXAMPLE |
| 187 | BO | 98 | 0 | 1 | 0 | 0 | 0 | 1 | 1 | 0 | 0 | 0.00 | ABSENT | COMPARATIVE EXAMPLE |
| 188 | BP | 47 | 7 | 6 | 37 | 0 | 3 | 0 | 50 | 0 | 38 | 0.75 | ABSENT | COMPARATIVE EXAMPLE |
| 189 | BQ | 71 | 8 | 0 | 0 | 0 | 0 | 21 | 8 | 0 | 6 | 0.75 | ABSENT | COMPARATIVE EXAMPLE |

TABLE 19-continued

| | | MICROSTRUCTURE | | | | | | | | | | |
|---|---|---|---|---|---|---|---|---|---|---|---|---|
| | | 1/4 THICKNESS | | | | | | | BASE IRON SURFACE LAYER | | | |
| | | STRUCTURAL FRACTION | | | | | | | STRUCTURAL FRACTION | | | |
| EXPERIMENTAL EXAMPLE | CHEMICAL COMPONENT | FERRITE % | BAINITE % | BAINITIC FERRITE % | MARTENSITE % | TEMPERED MARTENSITE % | RETAINED AUSTENITE % | OTHERS % | HARD PHASE V1 % | RETAINED AUSTENITE % | HARD PHASE V2 % | V1/V2 | OXIDE AT GRAIN BOUNDARY AND/OR WITHIN GRAIN | |
| 190 | BR | EXPERIMENT STOPPED BECAUSE SLAB CRACKED DURING SLAB HEATING IN HOT ROLLING STEP | | | | | | | | | | | | COMPARATIVE EXAMPLE |
| 191 | BS | 84 | 0 | 2 | 0 | 0 | 0 | 14 | 2 | 0 | 0 | 0.00 | ABSENT | COMPARATIVE EXAMPLE |
| 192 | BT | EXPERIMENT STOPPED BECAUSE SLAB CRACKED DURING SLAB HEATING IN HOT ROLLING STEP | | | | | | | | | | | | COMPARATIVE EXAMPLE |
| 193 | BU | EXPERIMENT STOPPED BECAUSE SLAB CRACKED DURING ROLLING IN HOT ROLLING STEP | | | | | | | | | | | | COMPARATIVE EXAMPLE |
| 194 | BV | 70 | 11 | 4 | 14 | 0 | 1 | 0 | 29 | 0 | 19 | 0.67 | ABSENT | COMPARATIVE EXAMPLE |
| 195 | BW | AFTER SLAB WAS CAST, SLAB CRACKED DURING TRANSFER, SO THAT EXPERIMENT STOPPED | | | | | | | | | | | | COMPARATIVE EXAMPLE |
| 196 | BX | 68 | 6 | 8 | 17 | 0 | 1 | 0 | 31 | 0 | 24 | 0.79 | ABSENT | COMPARATIVE EXAMPLE |
| 197 | BY | 60 | 4 | 7 | 26 | 0 | 3 | 0 | 37 | 0 | 23 | 0.62 | ABSENT | COMPARATIVE EXAMPLE |
| 198 | A | 59 | 8 | 12 | 17 | 0 | 4 | 0 | 38 | 0 | 18 | 0.47 | ABSENT | COMPARATIVE EXAMPLE |
| 199 | J | 70 | 8 | 4 | 15 | 0 | 3 | 0 | 27 | 0 | 18 | 0.68 | ABSENT | EXAMPLE |
| 200 | D | 71 | 3 | 6 | 18 | 0 | 2 | 0 | 27 | 0 | 11 | 0.40 | ABSENT | COMPARATIVE EXAMPLE |
| 201 | D | 71 | 3 | 6 | 18 | 0 | 2 | 0 | 27 | 0 | 11 | 0.40 | ABSENT | EXAMPLE |
| 202 | D | 71 | 3 | 6 | 18 | 0 | 2 | 0 | 27 | 0 | 11 | 0.40 | ABSENT | COMPARATIVE EXAMPLE |

TABLE 20

| EXPERIMENTAL EXAMPLE | PLATING LAYER CONTENT Fe % | PLATING LAYER CONTENT Al % | PLATING DEPOSITION AMOUNT g/m2 | Fe—Al ALLOY LAYER AVERAGE THICKNESS μm | Fe—Al ALLOY LAYER THICKNESS DIFFERENCE IN WIDTH DIRECTION μm | BASE STEEL SHEET FINE-GRAIN LAYER AVERAGE THICKNESS μm | BASE STEEL SHEET FINE-GRAIN LAYER THICKNESS DIFFERENCE IN WIDTH DIRECTION μm | AVERAGE GRAIN DIAMETER OF FERRITE PHASE μm | MAXIMUM DIAMETER OF OXIDE μm | |
|---|---|---|---|---|---|---|---|---|---|---|
| 1 | 2.2 | 0.23 | 61 | 0.4 | 0.2 | 2.4 | 0.2 | 1.6 | 0.02 | EXAMPLE |
| 2 | 4.9 | 0.14 | 56 | 0.08 | 0.1 | 2.7 | 0.5 | 0.8 | 0.02 | COMPARATIVE EXAMPLE |
| 3 | 1.5 | 0.24 | 67 | 0.4 | 0.6 | 2.4 | 2.2 | 0.6 | 0.04 | COMPARATIVE EXAMPLE |
| 4 | 1.7 | 0.22 | 65 | 0.5 | 0.3 | 1.8 | 0.3 | 0.4 | 0.02 | EXAMPLE |
| 5 | 1.1 | 0.29 | 56 | 0.3 | 0.2 | 2.7 | 0.2 | 0.7 | 0.1 | EXAMPLE |
| 6 | 1.7 | 0.28 | 74 | 0.5 | 0.2 | 3.7 | 0.3 | 0.6 | 0.1 | EXAMPLE |
| 7 | 1.9 | 0.48 | 69 | 0.7 | 0.3 | 3.5 | 0.2 | 0.3 | 0.2 | EXAMPLE |
| 8 | 2.7 | 0.52 | 60 | 0.6 | 0.3 | 4.7 | 0.7 | 0.4 | 0.1 | EXAMPLE |
| 9 | 0.4 | 0.22 | 72 | 0.8 | 0.4 | 0.1 | 0.5 | 1.6 | 0.1 | EXAMPLE |
| 10 | 1.7 | 0.31 | 58 | 0.6 | 0.3 | 2.3 | 0.6 | 0.4 | 0.2 | EXAMPLE |
| 11 | 0.5 | 0.22 | 67 | 0.5 | 0.7 | 1.6 | 2.6 | 0.5 | 0.3 | COMPARATIVE EXAMPLE |
| 12 | 0.6 | 0.25 | 64 | 0.6 | 0.3 | 1.3 | 0.4 | 0.3 | 0.1 | EXAMPLE |
| 13 | 1.0 | 0.24 | 63 | 0.5 | 0.2 | 2.2 | 1.5 | 0.4 | 0.3 | EXAMPLE |
| 14 | 8.3 | 0.00 | 58 | 0 | 0 | 2.2 | 1.2 | 0.3 | 0.1 | COMPARATIVE EXAMPLE |
| 15 | 1.0 | 0.28 | 68 | 0.7 | 0.3 | 3.0 | 1.0 | 0.3 | 0.1 | EXAMPLE |
| 16 | 5.2 | 0.22 | 67 | 0.7 | 0.3 | 8.6 | 0.2 | 0.4 | 0.02 | COMPARATIVE EXAMPLE |
| 17 | 1.3 | 0.37 | 65 | 0.8 | 0.3 | 2.9 | 0.2 | 0.4 | 0.04 | EXAMPLE |
| 18 | 1.2 | 0.38 | 66 | 1.0 | 0.5 | 2.6 | 1.0 | 1.8 | 0.04 | EXAMPLE |
| 19 | 1.2 | 0.28 | 70 | 0.8 | 0.3 | 2.3 | 1.2 | 1.5 | 0.02 | EXAMPLE |
| 20 | 1.0 | 0.26 | 70 | 0.9 | 0.4 | 3.0 | 0.9 | 0.3 | 0.3 | EXAMPLE |
| 21 | 1.1 | 0.23 | 66 | 0.8 | 0.4 | 2.5 | 1.3 | 0.4 | 0.1 | EXAMPLE |
| 22 | 1.4 | 0.20 | 57 | 0.6 | 0.3 | 2.4 | 0.6 | 0.4 | 0.1 | COMPARATIVE EXAMPLE |
| 23 | 1.2 | 0.30 | 68 | 0.7 | 0.3 | 2.8 | 0.5 | 0.4 | 0.3 | EXAMPLE |
| 24 | 0.9 | 0.44 | 68 | 1.2 | 0.4 | 3.1 | 1.7 | 0.3 | 0.1 | EXAMPLE |
| 25 | 0.7 | 0.35 | 64 | 0.7 | 0.3 | 1.9 | 0.8 | 0.4 | 0.4 | EXAMPLE |
| 26 | 2.0 | 0.19 | 64 | 0.6 | 0.2 | 4.2 | 1.0 | 0.3 | 0.01 | EXAMPLE |
| 27 | 1.6 | 0.41 | 71 | 0.6 | 0.3 | 2.9 | 0.5 | 0.3 | 0.1 | EXAMPLE |
| 28 | 1.2 | 0.36 | 65 | 0.8 | 0.3 | 3.2 | 0.2 | 0.3 | 0.04 | COMPARATIVE EXAMPLE |
| 29 | 1.1 | 0.41 | 56 | 0.5 | 0.3 | 3.6 | 0.8 | 0.3 | 0.02 | EXAMPLE |
| 30 | 1.3 | 0.26 | 70 | 0.4 | 0.2 | 2.3 | 1.0 | 0.4 | 0.2 | EXAMPLE |
| 31 | 0.8 | 0.35 | 64 | 1.3 | 0.4 | 1.0 | 0.7 | 0.5 | 0.2 | EXAMPLE |
| 32 | 1.2 | 0.50 | 61 | 0.8 | 0.4 | 2.4 | 0.4 | 0.3 | 0.1 | EXAMPLE |
| 33 | 1.7 | 0.37 | 67 | 0.7 | 0.3 | 3.5 | 0.8 | 0.4 | 0.3 | EXAMPLE |
| 34 | 2.5 | 0.19 | 75 | 0.6 | 0.3 | 1.8 | 1.5 | 0.6 | 0.1 | EXAMPLE |
| 35 | 1.5 | 0.37 | 58 | 0.8 | 0.3 | 2.5 | 1.0 | 1.3 | 0.04 | EXAMPLE |
| 36 | 1.5 | 0.31 | 72 | 0.9 | 0.4 | 2.9 | 1.0 | 0.3 | 0.3 | EXAMPLE |
| 37 | 1.2 | 0.35 | 54 | 0.8 | 0.3 | 2.5 | 0.7 | 0.4 | 0.1 | EXAMPLE |
| 38 | 0.7 | 0.30 | 66 | 0.7 | 0.3 | 0.8 | 0.6 | 1.9 | 0.3 | EXAMPLE |
| 39 | 1.3 | 0.29 | 69 | 0.7 | 0.3 | 1.9 | 0.7 | 0.3 | 0.03 | EXAMPLE |
| 40 | 1.1 | 0.30 | 71 | 0.8 | 0.3 | 2.1 | 0.8 | 0.4 | 0.1 | EXAMPLE |
| 41 | 1.6 | 0.25 | 55 | 0.7 | 0.3 | 2.9 | 0.5 | 0.2 | 0.2 | EXAMPLE |
| 42 | 1.4 | 0.31 | 56 | 0.7 | 0.2 | 2.6 | 0.9 | 0.3 | 0.3 | EXAMPLE |
| 43 | 1.9 | 0.55 | 57 | 0.6 | 0.2 | 3.0 | 0.3 | 0.3 | 0.03 | COMPARATIVE EXAMPLE |
| 44 | 1.7 | 0.24 | 65 | 0.4 | 0.2 | 3.4 | 0.5 | 0.3 | 0.02 | EXAMPLE |
| 45 | 1.2 | 0.44 | 57 | 1.0 | 0.3 | 3.3 | 0.7 | 0.3 | 0.03 | EXAMPLE |
| 46 | 1.8 | 0.32 | 66 | 0.5 | 0.2 | 2.8 | 0.7 | 0.4 | 0.1 | COMPARATIVE EXAMPLE |
| 47 | 1.8 | 0.19 | 64 | 0.6 | 0.3 | 3.5 | 0.3 | 0.3 | 0.4 | EXAMPLE |
| 48 | 1.9 | 0.40 | 61 | 0.8 | 0.4 | 3.3 | 0.5 | 0.2 | 0.3 | EXAMPLE |
| 49 | 2.2 | 0.37 | 63 | 0.7 | 0.3 | 3.1 | 0.3 | 0.3 | 0.02 | COMPARATIVE EXAMPLE |
| 50 | 1.2 | 0.32 | 62 | 0.5 | 0.3 | 1.9 | 0.5 | 0.4 | 0.02 | EXAMPLE |

TABLE 21

| EXPERIMENTAL EXAMPLE | PLATING LAYER CONTENT Fe % | PLATING LAYER CONTENT Al % | PLATING DEPOSITION AMOUNT g/m2 | Fe—Al ALLOY LAYER AVERAGE THICKNESS μm | Fe—Al ALLOY LAYER THICKNESS DIFFERENCE IN WIDTH DIRECTION μm | BASE STEEL SHEET FINE-GRAIN LAYER AVERAGE THICKNESS μm | BASE STEEL SHEET FINE-GRAIN LAYER THICKNESS DIFFERENCE IN WIDTH DIRECTION μm | AVERAGE GRAIN DIAMETER OF FERRITE PHASE μm | MAXIMUM DIAMETER OF OXIDE μm | |
|---|---|---|---|---|---|---|---|---|---|---|
| 51 | 0.8 | 0.32 | 63 | 0.7 | 0.3 | 1.0 | 1.0 | 0.5 | 0.2 | COMPARATIVE EXAMPLE |
| 52 | 1.0 | 0.36 | 62 | 0.7 | 0.3 | 1.8 | 0.7 | 0.3 | 0.1 | EXAMPLE |
| 53 | 0.6 | 0.11 | 60 | 0.4 | 0.2 | 1.8 | 1.7 | 0.6 | 0.1 | EXAMPLE |
| 54 | 1.2 | 0.24 | 74 | 0.7 | 0.3 | 2.3 | 0.8 | 1.4 | 0.1 | EXAMPLE |
| 55 | 0.8 | 0.26 | 65 | 0.8 | 0.3 | 0.3 | 1.2 | 0.9 | 0.3 | EXAMPLE |
| 56 | 0.4 | 0.35 | 66 | 1.2 | 0.4 | 2.1 | 0.7 | 0.5 | 0.1 | EXAMPLE |
| 57 | 0.8 | 0.26 | 62 | 1.0 | 0.4 | 2.4 | 0.6 | 0.4 | 0.1 | EXAMPLE |
| 58 | 0.9 | 0.37 | 70 | 0.9 | 0.4 | 2.2 | 0.9 | 0.4 | 0.1 | EXAMPLE |
| 59 | 1.0 | 0.30 | 74 | 0.9 | 0.3 | 2.0 | 0.7 | 0.5 | 0.3 | COMPARATIVE EXAMPLE |
| 60 | 2.2 | 0.26 | 75 | 0.7 | 0.3 | 2.1 | 1.4 | 0.4 | 0.1 | EXAMPLE |
| 61 | 1.3 | 0.23 | 68 | 0.8 | 0.4 | 2.0 | 0.5 | 0.4 | 0.1 | EXAMPLE |
| 62 | 1.9 | 0.20 | 64 | 0.6 | 0.3 | 2.9 | 0.7 | 0.4 | 0.2 | EXAMPLE |
| 63 | 1.9 | 0.32 | 68 | 0.7 | 0.3 | 2.3 | 0.6 | 0.3 | 0.1 | EXAMPLE |
| 64 | 1.4 | 0.44 | 58 | 0.9 | 0.4 | 1.9 | 0.9 | 0.5 | 0.1 | EXAMPLE |
| 65 | 1.6 | 0.35 | 56 | 0.7 | 0.3 | 2.4 | 1.0 | 0.4 | 0.2 | EXAMPLE |
| 66 | 1.8 | 0.32 | 56 | 0.7 | 0.3 | 3.0 | 0.8 | 1.5 | 0.02 | EXAMPLE |
| 67 | 0.7 | 0.26 | 75 | 0.7 | 0.3 | 2.6 | 0.6 | 0.5 | 0.1 | COMPARATIVE EXAMPLE |
| 68 | 1.4 | 0.28 | 58 | 0.8 | 0.4 | 1.8 | 0.8 | 0.5 | 0.1 | EXAMPLE |
| 69 | 1.1 | 0.32 | 57 | 0.6 | 0.3 | 1.7 | 0.6 | 0.3 | 0.2 | EXAMPLE |
| 70 | 1.4 | 0.24 | 66 | 0.7 | 0.3 | 1.1 | 0.4 | 0.5 | 0.02 | EXAMPLE |
| 71 | 0.8 | 0.23 | 74 | 0.9 | 0.4 | 1.9 | 0.5 | 0.5 | 0.03 | EXAMPLE |
| 72 | 0.7 | 0.54 | 56 | 1.0 | 0.4 | 2.2 | 0.8 | 0.6 | 0.04 | EXAMPLE |
| 73 | 1.0 | 0.37 | 68 | 0.9 | 0.3 | 2.0 | 0.9 | 0.5 | 0.04 | EXAMPLE |
| 74 | 1.0 | 0.32 | 72 | 0.8 | 0.4 | 1.9 | 1.3 | 0.4 | 0.1 | EXAMPLE |
| 75 | 3.6 | 0.17 | 58 | 1.0 | 0.4 | 14.1 | 0.3 | 0.2 | 0.3 | COMPARATIVE EXAMPLE |
| 76 | 1.6 | 0.30 | 63 | 0.9 | 0.3 | 2.7 | 0.5 | 0.4 | 0.1 | EXAMPLE |
| 77 | 0.8 | 0.32 | 66 | 1.0 | 0.3 | 2.6 | 0.9 | 0.4 | 0.3 | EXAMPLE |
| 78 | 1.2 | 0.37 | 69 | 0.8 | 0.3 | 3.1 | 0.6 | 0.5 | 0.1 | EXAMPLE |
| 79 | 1.3 | 0.24 | 75 | 0.6 | 0.3 | 2.6 | 0.8 | 0.5 | 0.3 | COMPARATIVE EXAMPLE |
| 80 | 1.7 | 0.25 | 59 | 0.6 | 0.3 | 2.1 | 0.5 | 0.5 | 0.1 | EXAMPLE |
| 81 | 2.0 | 0.16 | 70 | 0.5 | 0.2 | 2.4 | 0.6 | 0.5 | 0.1 | EXAMPLE |
| 82 | 1.4 | 0.19 | 60 | 0.6 | 0.3 | 1.4 | 0.8 | 0.8 | 0.3 | EXAMPLE |
| 83 | 1.1 | 0.34 | 71 | 0.8 | 0.3 | 2.7 | 0.6 | 0.6 | 0.04 | EXAMPLE |
| 84 | 1.6 | 0.28 | 70 | 0.8 | 0.4 | 2.3 | 0.8 | 0.5 | 0.6 | COMPARATIVE EXAMPLE |
| 85 | 1.1 | 0.19 | 58 | 0.7 | 0.3 | 2.9 | 1.0 | 0.5 | 0.2 | EXAMPLE |
| 86 | 1.1 | 0.36 | 63 | 0.8 | 0.4 | 2.1 | 0.9 | 2.5 | 0.02 | EXAMPLE |
| 87 | 1.1 | 0.34 | 58 | 0.8 | 0.3 | 1.6 | 0.2 | 0.6 | 0.3 | EXAMPLE |
| 88 | 1.4 | 0.24 | 66 | 0.8 | 0.3 | 4.3 | 0.8 | 0.4 | 0.04 | EXAMPLE |
| 89 | 1.3 | 0.90 | 65 | 1.7 | 0.5 | 4.6 | 0.3 | 0.4 | 0.02 | EXAMPLE |
| 90 | 1.1 | 0.31 | 66 | 0.7 | 0.3 | 0.5 | 0.2 | 0.7 | 0.1 | EXAMPLE |
| 91 | 1.0 | 0.22 | 59 | 0.7 | 0.3 | 1.7 | 0.7 | 0.5 | 0.2 | EXAMPLE |
| 92 | 1.0 | 0.24 | 57 | 0.7 | 0.2 | 1.9 | 1.9 | 0.5 | 0.1 | EXAMPLE |
| 93 | 2.3 | 0.28 | 57 | 0.7 | 0.3 | 2.5 | 0.7 | 0.3 | 0.1 | EXAMPLE |
| 94 | 1.3 | 0.26 | 67 | 0.8 | 0.3 | 2.6 | 0.4 | 0.3 | 0.4 | EXAMPLE |
| 95 | 1.6 | 0.32 | 65 | 0.8 | 0.4 | 2.5 | 0.5 | 2.4 | 0.02 | EXAMPLE |
| 96 | 1.8 | 0.36 | 64 | 0.6 | 0.3 | 2.5 | 1.4 | 0.4 | 0.3 | EXAMPLE |
| 97 | 1.3 | 0.26 | 72 | 0.6 | 0.2 | 2.4 | 0.9 | 0.5 | 0.3 | EXAMPLE |
| 98 | 1.3 | 0.23 | 70 | 0.4 | 0.2 | 2.0 | 1.0 | 0.4 | 0.1 | EXAMPLE |
| 99 | 1.0 | 0.29 | 59 | 0.6 | 0.3 | 1.9 | 0.7 | 0.5 | 0.1 | EXAMPLE |
| 100 | 1.6 | 0.24 | 69 | 0.5 | 0.2 | 2.8 | 1.4 | 0.4 | 0.1 | EXAMPLE |

TABLE 22

| EXPERIMENTAL EXAMPLE | PLATING LAYER CONTENT Fe % | PLATING LAYER CONTENT Al % | PLATING DEPOSITION AMOUNT g/m2 | Fe—Al ALLOY LAYER AVERAGE THICKNESS μm | Fe—Al ALLOY LAYER THICKNESS DIFFERENCE IN WIDTH DIRECTION μm | BASE STEEL SHEET FINE-GRAIN LAYER AVERAGE THICKNESS μm | BASE STEEL SHEET FINE-GRAIN LAYER THICKNESS DIFFERENCE IN WIDTH DIRECTION μm | AVERAGE GRAIN DIAMETER OF FERRITE PHASE μm | MAXIMUM DIAMETER OF OXIDE μm | |
|---|---|---|---|---|---|---|---|---|---|---|
| 101 | 1.7 | 0.25 | 72 | 0.4 | 0.2 | 3.0 | 1.2 | 0.5 | 0.03 | EXAMPLE |
| 102 | 1.7 | 0.35 | 72 | 0.4 | 0.2 | 2.3 | 1.5 | 0.5 | 0.04 | EXAMPLE |
| 103 | 1.3 | 0.30 | 68 | 0.7 | 0.2 | 2.8 | 0.9 | 0.4 | 0.2 | EXAMPLE |
| 104 | 1.0 | 0.35 | 62 | 0.9 | 0.3 | 2.8 | 0.7 | 0.5 | 0.04 | EXAMPLE |
| 105 | 1.4 | 0.28 | 69 | 0.6 | 0.2 | 3.1 | 0.5 | 1.5 | 0.02 | EXAMPLE |
| 106 | 2.2 | 0.16 | 64 | 0.5 | 0.2 | 3.2 | 1.0 | 0.6 | 0.1 | EXAMPLE |
| 107 | 1.3 | 0.23 | 71 | 0.7 | 0.2 | 2.8 | 0.4 | 0.5 | 0.2 | EXAMPLE |
| 108 | 1.2 | 0.19 | 76 | 0.6 | 0.2 | 2.3 | 0.8 | 0.4 | 0.1 | EXAMPLE |
| 109 | 2.5 | 0.31 | 57 | 0.7 | 0.3 | 4.4 | 0.7 | 0.6 | 0.3 | EXAMPLE |
| 110 | 1.9 | 0.36 | 67 | 0.6 | 0.2 | 4.0 | 0.9 | 0.4 | 0.1 | EXAMPLE |
| 111 | 1.1 | 0.25 | 68 | 0.4 | 0.2 | 2.7 | 0.7 | 0.5 | 0.1 | EXAMPLE |
| 112 | 1.9 | 0.22 | 57 | 0.3 | 0.1 | 2.1 | 0.5 | 0.4 | 0.1 | EXAMPLE |
| 113 | 1.3 | 0.29 | 73 | 0.8 | 0.3 | 2.4 | 0.2 | 0.4 | 0.1 | EXAMPLE |
| 114 | 1.0 | 0.24 | 70 | 0.7 | 0.2 | 2.7 | 1.5 | 0.5 | 0.1 | COMPARATIVE EXAMPLE |
| 115 | 1.6 | 0.36 | 70 | 0.8 | 0.3 | 2.9 | 0.8 | 0.6 | 0.1 | EXAMPLE |
| 116 | 1.2 | 0.28 | 63 | 0.6 | 0.7 | 2.2 | 2.2 | 0.4 | 0.3 | COMPARATIVE EXAMPLE |
| 117 | 1.4 | 0.53 | 65 | 0.8 | 0.3 | 2.3 | 0.8 | 0.4 | 0.04 | EXAMPLE |
| 118 | 1.7 | 0.41 | 72 | 0.7 | 0.3 | 2.9 | 0.6 | 0.5 | 0.1 | EXAMPLE |
| 119 | 1.3 | 0.28 | 61 | 0.7 | 0.3 | 3.7 | 0.9 | 0.6 | 0.1 | EXAMPLE |
| 120 | 1.5 | 0.22 | 73 | 0.2 | 0.2 | 2.7 | 0.7 | 0.5 | 0.1 | EXAMPLE |
| 121 | 1.6 | 0.42 | 66 | 0.6 | 0.3 | 2.9 | 0.5 | 0.5 | 0.03 | EXAMPLE |
| 122 | 1.4 | 0.34 | 71 | 0.8 | 0.3 | 3.6 | 0.9 | 0.4 | 0.1 | EXAMPLE |
| 123 | 1.4 | 0.36 | 69 | 0.8 | 0.3 | 3.4 | 0.4 | 0.5 | 0.1 | EXAMPLE |
| 124 | 1.0 | 0.31 | 71 | 0.7 | 0.3 | 3.5 | 0.7 | 2.4 | 0.01 | EXAMPLE |
| 125 | 1.5 | 0.29 | 67 | 0.6 | 0.2 | 3.3 | 0.2 | 0.5 | 0.1 | EXAMPLE |
| 126 | 1.5 | 0.31 | 58 | 0.5 | 0.2 | 2.6 | 0.8 | 0.4 | 0.1 | EXAMPLE |
| 127 | 1.5 | 0.42 | 56 | 0.6 | 0.3 | 2.0 | 0.4 | 0.4 | 0.02 | EXAMPLE |
| 128 | 0.7 | 0.22 | 63 | 0.6 | 0.3 | 3.1 | 0.6 | 0.6 | 0.3 | EXAMPLE |
| 129 | 2.6 | 0.46 | 75 | 0.7 | 0.3 | 2.7 | 1.3 | 0.4 | 0.04 | EXAMPLE |
| 130 | 1.3 | 0.42 | 58 | 0.6 | 0.2 | 2.7 | 0.8 | 0.5 | 0.1 | EXAMPLE |
| 131 | 1.4 | 0.31 | 67 | 0.2 | 0.2 | 2.5 | 0.2 | 0.6 | 0.4 | COMPARATIVE EXAMPLE |
| 132 | 0.8 | 0.26 | 59 | 0.3 | 0.2 | 0.7 | 0.5 | 0.8 | 0.1 | EXAMPLE |
| 133 | 0.8 | 0.20 | 66 | 0.3 | 0.2 | 3.2 | 0.3 | 0.5 | 0.1 | EXAMPLE |
| 134 | 1.1 | 0.25 | 71 | 0.5 | 0.2 | 2.6 | 0.8 | 0.7 | 0.04 | EXAMPLE |
| 135 | 1.3 | 0.41 | 71 | 0.6 | 0.3 | 2.0 | 1.6 | 0.5 | 0.1 | EXAMPLE |
| 136 | 1.2 | 0.30 | 60 | 0.7 | 0.3 | 2.8 | 0.6 | 0.5 | 0.1 | EXAMPLE |
| 137 | 1.4 | 0.42 | 55 | 0.7 | 0.2 | 3.6 | 0.3 | 0.5 | 0.3 | COMPARATIVE EXAMPLE |
| 138 | 1.1 | 0.22 | 60 | 0.5 | 0.2 | 3.8 | 1.1 | 0.5 | 0.4 | EXAMPLE |
| 139 | 1.0 | 0.24 | 58 | 0.7 | 0.3 | 2.6 | 1.0 | 0.6 | 0.1 | EXAMPLE |
| 140 | 2.0 | 0.48 | 75 | 0.9 | 0.4 | 3.2 | 0.3 | 0.4 | 0.3 | EXAMPLE |
| 141 | 1.4 | 0.23 | 57 | 0.8 | 0.3 | 2.4 | 0.6 | 0.6 | 0.03 | EXAMPLE |
| 142 | 0.8 | 0.19 | 70 | 0.5 | 0.2 | 2.1 | 0.4 | 0.4 | 0.04 | EXAMPLE |
| 143 | 0.9 | 0.38 | 72 | 0.6 | 0.3 | 2.4 | 0.7 | 0.5 | 0.1 | EXAMPLE |
| 144 | 1.1 | 0.26 | 61 | 0.3 | 0.2 | 2.0 | 1.0 | 0.4 | 0.4 | EXAMPLE |
| 145 | 0.9 | 0.29 | 63 | 0.6 | 0.3 | 1.8 | 0.7 | 0.4 | 0.1 | EXAMPLE |
| 146 | 1.1 | 0.19 | 62 | 0.5 | 0.2 | 2.5 | 0.8 | 0.5 | 0.1 | EXAMPLE |
| 147 | 1.3 | 0.31 | 71 | 0.7 | 0.2 | 2.9 | 0.8 | 0.5 | 0.3 | EXAMPLE |
| 148 | 0.1 | 1.08 | 64 | 2.3 | 0.5 | 2.8 | 0.6 | 0.4 | 0.1 | COMPARATIVE EXAMPLE |
| 149 | 1.8 | 0.42 | 56 | 0.8 | 0.3 | 2.7 | 0.8 | 0.4 | 0.1 | EXAMPLE |
| 150 | 2.7 | 0.12 | 66 | 0.5 | 0.2 | 2.7 | 0.4 | 0.3 | 0.3 | EXAMPLE |
| 151 | 1.3 | 0.49 | 65 | 0.7 | 0.3 | 3.9 | 0.5 | 0.7 | 0.03 | EXAMPLE |

TABLE 23

| EXPERIMENTAL EXAMPLE | PLATING LAYER CONTENT Fe % | PLATING LAYER CONTENT Al % | PLATING DEPOSITION AMOUNT g/m2 | Fe—Al ALLOY LAYER AVERAGE THICKNESS μm | Fe—Al ALLOY LAYER THICKNESS DIFFERENCE IN WIDTH DIRECTION μm | BASE STEEL SHEET FINE-GRAIN LAYER AVERAGE THICKNESS μm | BASE STEEL SHEET FINE-GRAIN LAYER THICKNESS DIFFERENCE IN WIDTH DIRECTION μm | AVERAGE GRAIN DIAMETER OF FERRITE PHASE μm | MAXIMUM DIAMETER OF OXIDE μm | |
|---|---|---|---|---|---|---|---|---|---|---|
| 152 | 0.8 | 0.23 | 72 | 0.6 | 0.3 | 3.5 | 0.3 | 0.7 | 0.1 | EXAMPLE |
| 153 | 1.6 | 0.14 | 61 | 0.3 | 0.2 | 4.3 | 0.8 | 0.4 | 0.04 | EXAMPLE |
| 154 | 1.4 | 0.34 | 56 | 0.8 | 0.3 | 4.0 | 0.6 | 0.4 | 0.1 | EXAMPLE |
| 155 | 1.1 | 0.31 | 70 | 0.5 | 0.3 | 4.2 | 0.5 | 0.4 | 0.1 | COMPARATIVE EXAMPLE |
| 156 | 2.7 | 0.29 | 72 | 0.3 | 0.2 | 4.9 | 0.5 | 0.6 | 0.1 | EXAMPLE |
| 157 | 1.7 | 0.37 | 62 | 0.6 | 0.3 | 4.9 | 0.8 | 2.5 | 0.02 | EXAMPLE |
| 158 | 1.1 | 0.24 | 59 | 0.5 | 0.2 | 3.0 | 0.6 | 0.4 | 0.1 | EXAMPLE |
| 159 | 1.1 | 0.42 | 59 | 0.9 | 0.3 | 3.0 | 0.7 | 0.5 | 0.1 | EXAMPLE |
| 160 | 0.8 | 0.29 | 57 | 0.7 | 0.3 | 2.4 | 0.4 | 0.4 | 0.1 | EXAMPLE |
| 161 | 0.8 | 0.28 | 60 | 0.7 | 0.3 | 0.5 | 0.5 | 0.8 | 0.1 | EXAMPLE |
| 162 | 2.1 | 0.30 | 71 | 0.6 | 0.3 | 2.5 | 0.9 | 0.4 | 0.1 | EXAMPLE |
| 163 | 1.0 | 0.30 | 71 | 0.9 | 0.3 | 2.3 | 0.6 | 0.5 | 0.3 | COMPARATIVE EXAMPLE |
| 164 | 0.9 | 0.22 | 68 | 0.3 | 0.2 | 2.2 | 0.7 | 0.5 | 0.1 | EXAMPLE |
| 165 | 0.8 | 0.36 | 59 | 0.7 | 0.3 | 2.2 | 1.2 | 0.5 | 0.1 | COMPARATIVE EXAMPLE |
| 166 | 1.0 | 0.20 | 57 | 0.8 | 0.3 | 1.9 | 0.8 | 0.4 | 0.3 | EXAMPLE |
| 167 | 1.5 | 0.29 | 58 | 0.8 | 0.3 | 2.3 | 0.6 | 0.4 | 0.03 | EXAMPLE |
| 168 | 1.6 | 0.43 | 70 | 0.9 | 0.3 | <0.1 | <0.1 | (3.4) | (<0.01) | COMPARATIVE EXAMPLE |
| 169 | 2.5 | 0.23 | 68 | 0.6 | 0.3 | 1.9 | 0.9 | 0.5 | 0.4 | EXAMPLE |
| 170 | 1.3 | 0.48 | 71 | 0.9 | 0.3 | 2.1 | 0.6 | 0.5 | 0.04 | EXAMPLE |
| 171 | 0.5 | 0.30 | 73 | 0.8 | 0.4 | 1.8 | 0.5 | 0.5 | 0.02 | EXAMPLE |
| 172 | 1.4 | 0.31 | 58 | 0.2 | 0.2 | 2.2 | 0.3 | 0.4 | 0.02 | EXAMPLE |
| 173 | 1.9 | 0.22 | 58 | 0.8 | 0.3 | 3.0 | 0.8 | 0.5 | 0.04 | EXAMPLE |
| 174 | 1.0 | 0.28 | 56 | 0.6 | 0.3 | 2.4 | 0.4 | 0.5 | 0.4 | COMPARATIVE EXAMPLE |
| 175 | 1.1 | 0.26 | 62 | 0.3 | 0.2 | 2.2 | 0.6 | 0.5 | 0.1 | EXAMPLE |
| 176 | 1.0 | 0.25 | 59 | 0.8 | 0.3 | 3.7 | 1.1 | 0.4 | 0.1 | EXAMPLE |
| 177 | 1.0 | 0.26 | 62 | 0.6 | 0.2 | 2.7 | 0.8 | 0.5 | 0.3 | EXAMPLE |
| 178 | 1.9 | 0.25 | 59 | 0.7 | 0.3 | 2.7 | 0.9 | 0.5 | 0.1 | EXAMPLE |
| 179 | 1.7 | 0.47 | 68 | 0.9 | 0.3 | 2.1 | 0.7 | 0.4 | 0.02 | EXAMPLE |
| 180 | 3.5 | 0.36 | 70 | 0.3 | 0.2 | 2.8 | 0.5 | 0.3 | 0.1 | COMPARATIVE EXAMPLE |
| 181 | 1.1 | 0.34 | 70 | 0.8 | 0.3 | <0.1 | <0.1 | (3.2) | (<0.01) | COMPARATIVE EXAMPLE |
| 182 | 0.9 | 0.28 | 68 | 0.6 | 0.3 | 1.9 | 0.9 | 0.5 | 0.04 | EXAMPLE |
| 183 | 1.4 | 0.26 | 67 | 0.5 | 0.2 | 1.7 | 1.0 | 0.4 | 0.1 | COMPARATIVE EXAMPLE |
| 184 | 0.9 | 0.23 | 58 | 0.8 | 0.3 | 1.9 | 1.9 | 0.5 | 0.1 | EXAMPLE |
| 185 | 2.2 | 0.28 | 60 | 0.6 | 0.2 | 4.1 | 0.7 | 0.4 | 0.3 | EXAMPLE |
| 186 | 1.8 | 0.37 | 73 | 0.9 | 0.3 | 4.0 | 0.6 | 0.6 | 0.3 | EXAMPLE |
| 187 | 1.1 | 0.26 | 68 | 0.5 | 0.2 | 2.3 | 0.6 | 0.5 | 0.1 | COMPARATIVE EXAMPLE |
| 188 | 1.6 | 0.44 | 66 | 0.7 | 0.2 | 2.2 | 0.6 | 0.5 | 0.1 | COMPARATIVE EXAMPLE |
| 189 | 2.4 | 0.50 | 70 | 0.8 | 0.3 | 4.8 | 0.5 | 0.5 | 0.1 | COMPARATIVE EXAMPLE |
| 190 | | | | | | | | | | COMPARATIVE EXAMPLE |
| 191 | 0.7 | 0.24 | 76 | 0.8 | 0.3 | 2.9 | 0.5 | 0.6 | 0.03 | COMPARATIVE EXAMPLE |
| 192 | | | | | | | | | | COMPARATIVE EXAMPLE |
| 193 | | | | | | | | | | COMPARATIVE EXAMPLE |
| 194 | 0.7 | 0.26 | 60 | 0.9 | 0.3 | 2.5 | 0.5 | 0.7 | 0.3 | COMPARATIVE EXAMPLE |
| 195 | | | | | | | | | | COMPARATIVE EXAMPLE |
| 196 | 1.3 | 0.28 | 71 | 0.6 | 0.3 | 2.3 | 0.7 | 0.5 | 0.1 | COMPARATIVE EXAMPLE |
| 197 | 1.1 | 0.22 | 55 | 0.8 | 0.3 | 2.9 | 0.8 | 0.6 | 0.03 | COMPARATIVE EXAMPLE |
| 198 | 4.0 | 0.23 | 65 | 0.6 | 0.8 | 7.4 | 0.4 | 0.6 | 0.1 | COMPARATIVE EXAMPLE |
| 199 | 0.7 | 0.30 | 66 | 1.0 | 0.3 | 0.8 | 0.6 | 1.9 | 0.3 | EXAMPLE |

TABLE 23-continued

| EXPERIMENTAL EXAMPLE | PLATING LAYER | | PLATING DEPOSITION AMOUNT g/m2 | Fe—Al ALLOY LAYER | | BASE STEEL SHEET | | | | |
|---|---|---|---|---|---|---|---|---|---|---|
| | | | | AVERAGE THICKNESS μm | THICKNESS DIFFERENCE IN WIDTH DIRECTION μm | FINE-GRAIN LAYER | | AVERAGE GRAIN DIAMETER OF FERRITE PHASE μm | MAXIMUM DIAMETER OF OXIDE μm | |
| | CONTENT | | | | | AVERAGE THICKNESS μm | THICKNESS DIFFERENCE IN WIDTH DIRECTION μm | | | |
| | Fe % | Al % | | | | | | | | |
| 200 | 0.9 | 0.26 | 63 | 0.6 | 0.6 | 2.9 | 2.1 | 0.3 | 0.1 | COMPARATIVE EXAMPLE |
| 201 | 1.0 | 0.28 | 68 | 0.4 | 0.4 | 2.5 | 1.0 | 0.2 | 0.05 | EXAMPLE |
| 202 | 0.9 | 0.27 | 62 | 0.3 | 0.7 | 1.5 | 2.2 | 0.1 | 0.03 | COMPARATIVE EXAMPLE |

TABLE 24

| EXPERIMENTAL EXAMPLE | CHEMICAL COMPONENT | SHEET THICKNESS t mm | TENSILE PROPERTIES | | | | | BENDABILITY MINIMUM BEND RADIUS | | FATIGUE RESISTANCE | | |
|---|---|---|---|---|---|---|---|---|---|---|---|---|
| | | | YIELD STRENGTH YS MPa | MAXIMUM TENSILE STRENGTH TS MPa | TOTAL ELONGATION El % | HOLE EXPANDABILITY λ % | $TS^{0.5} \times EI \times \lambda^{0.5}$ | r mm | r/t | FATIGUE LIMIT DL MPa | DL/TS | |
| 1 | A | 1.5 | 454 | 748 | 24 | 37 | 2.99E+06 | 1.5 | 1.0 | 373 | 0.50 | EXAMPLE |
| 2 | A | 1.6 | 454 | 732 | 26 | 33 | 2.96E+06 | 1.5 | 0.9 | 333 | 0.45 | COMPARATIVE EXAMPLE |
| 3 | A | 2.0 | 322 | 569 | 30 | 86 | 3.78E+06 | 3.5 | 1.8 | 253 | 0.44 | COMPARATIVE EXAMPLE |
| 4 | A | 2.0 | 322 | 569 | 30 | 86 | 3.78E+06 | 3.5 | 1.8 | 253 | 0.44 | EXAMPLE |
| 5 | A | 1.5 | 371 | 693 | 27 | 40 | 3.12E+06 | 1.5 | 1.0 | 319 | 0.46 | EXAMPLE |
| 6 | B | 1.5 | 349 | 613 | 32 | 53 | 3.54E+06 | 3.0 | 2.0 | 300 | 0.49 | EXAMPLE |
| 7 | B | 1.6 | 316 | 619 | 31 | 50 | 3.38E+06 | 2.0 | 1.3 | 324 | 0.52 | EXAMPLE |
| 8 | B | 1.7 | 341 | 608 | 30 | 48 | 3.12E+06 | 1.0 | 0.6 | 333 | 0.55 | EXAMPLE |
| 9 | B | 1.2 | 342 | 553 | 33 | 54 | 3.15E+06 | 2.0 | 1.7 | 284 | 0.51 | EXAMPLE |
| 10 | C | 1.5 | 510 | 935 | 20 | 22 | 2.68E+06 | 1.0 | 0.7 | 418 | 0.45 | EXAMPLE |
| 11 | C | 1.2 | 575 | 820 | 23 | 33 | 3.10E+06 | 1.0 | 0.8 | 469 | 0.57 | COMPARATIVE EXAMPLE |
| 12 | C | 1.2 | 575 | 820 | 23 | 33 | 3.10E+06 | 1.0 | 0.8 | 469 | 0.57 | EXAMPLE |
| 13 | C | 1.3 | 551 | 890 | 18 | 38 | 2.95E+06 | 1.5 | 1.2 | 485 | 0.54 | EXAMPLE |
| 14 | C | 1.7 | 410 | 748 | 23 | 39 | 2.94E+06 | 2.5 | 1.5 | 345 | 0.46 | COMPARATIVE EXAMPLE |
| 15 | D | 2.8 | 347 | 696 | 31 | 23 | 2.73E+06 | 2.0 | 1.6 | 288 | 0.41 | EXAMPLE |
| 16 | D | 1.3 | 357 | 699 | 29 | 33 | 3.08E+06 | 1.0 | 0.8 | 201 | 0.29 | COMPARATIVE EXAMPLE |
| 17 | D | 1.4 | 432 | 622 | 29 | 61 | 3.51E+06 | 2.5 | 1.8 | 301 | 0.48 | EXAMPLE |
| 18 | D | 1.2 | 342 | 609 | 30 | 73 | 3.85E+06 | 1.0 | 0.8 | 323 | 0.53 | EXAMPLE |
| 19 | E | 1.5 | 591 | 1015 | 15 | 41 | 3.11E+06 | 1.0 | 0.7 | 498 | 0.49 | EXAMPLE |
| 20 | E | 1.8 | 569 | 826 | 22 | 51 | 3.73E+06 | 2.0 | 1.1 | 449 | 0.54 | EXAMPLE |
| 21 | E | 1.2 | 583 | 913 | 17 | 28 | 2.48E+06 | 1.5 | 1.3 | 385 | 0.42 | EXAMPLE |
| 22 | E | 1.6 | 359 | 603 | 16 | 27 | 1.23E+06 | 2.0 | 1.3 | 324 | 0.54 | COMPARATIVE EXAMPLE |
| 23 | F | 1.5 | 505 | 880 | 17 | 47 | 3.04E+06 | 1.0 | 0.7 | 445 | 0.51 | EXAMPLE |
| 24 | F | 1.6 | 429 | 633 | 26 | 87 | 3.86E+06 | 1.5 | 0.9 | 299 | 0.47 | EXAMPLE |
| 25 | F | 1.2 | 488 | 755 | 24 | 31 | 2.77E+06 | 1.0 | 0.8 | 405 | 0.54 | EXAMPLE |
| 26 | F | 1.3 | 373 | 727 | 24 | 35 | 2.78E+06 | 1.0 | 0.8 | 318 | 0.44 | EXAMPLE |
| 27 | G | 1.3 | 429 | 833 | 20 | 39 | 3.00E+06 | 1.5 | 1.2 | 407 | 0.49 | EXAMPLE |
| 28 | G | 1.5 | 516 | 873 | 22 | 25 | 2.84E+06 | 3.5 | 2.3 | 484 | 0.55 | COMPARATIVE EXAMPLE |
| 29 | G | 1.2 | 462 | 818 | 23 | 22 | 2.52E+06 | 1.5 | 1.3 | 390 | 0.48 | EXAMPLE |
| 30 | H | 1.3 | 427 | 772 | 21 | 40 | 2.85E+06 | 2.0 | 1.5 | 385 | 0.50 | EXAMPLE |
| 31 | H | 1.7 | 573 | 877 | 20 | 45 | 3.48E+06 | 2.5 | 1.5 | 553 | 0.63 | EXAMPLE |
| 32 | H | 2.4 | 405 | 852 | 24 | 24 | 2.92E+06 | 2.0 | 0.8 | 351 | 0.41 | EXAMPLE |
| 33 | I | 1.3 | 411 | 742 | 20 | 63 | 3.21E+06 | 2.0 | 1.5 | 356 | 0.48 | EXAMPLE |
| 34 | I | 1.5 | 420 | 675 | 27 | 43 | 3.10E+06 | 2.0 | 1.3 | 359 | 0.53 | EXAMPLE |
| 35 | I | 1.5 | 367 | 717 | 28 | 30 | 2.94E+06 | 1.0 | 0.7 | 347 | 0.48 | EXAMPLE |
| 36 | J | 2.0 | 510 | 949 | 20 | 19 | 2.55E+06 | 2.0 | 1.0 | 388 | 0.41 | EXAMPLE |
| 37 | J | 1.6 | 522 | 846 | 21 | 32 | 2.92E+06 | 1.0 | 0.6 | 476 | 0.56 | EXAMPLE |
| 38 | J | 1.7 | 541 | 953 | 19 | 24 | 2.74E+06 | 1.0 | 0.6 | 439 | 0.46 | EXAMPLE |

TABLE 24-continued

| EXPERIMENTAL EXAMPLE | CHEMICAL COMPONENT | SHEET THICKNESS t mm | TENSILE PROPERTIES ||||| BENDABILITY MINIMUM BEND RADIUS || FATIGUE RESISTANCE FATIGUE LIMIT || |
|---|---|---|---|---|---|---|---|---|---|---|---|---|
| | | | YIELD STRENGTH YS MPa | MAXIMUM TENSILE STRENGTH TS MPa | TOTAL ELONGATION EI % | HOLE EXPANDABILITY $\lambda$ % | $TS^{0.5} \times EI \times \lambda^{0.5}$ | r mm | r/t | DL MPa | DL/TS | |
| 39 | K | 1.3 | 693 | 1111 | 15 | 28 | 2.94E+06 | 1.0 | 0.8 | 598 | 0.54 | EXAMPLE |
| 40 | K | 1.8 | 456 | 737 | 26 | 40 | 3.29E+06 | 2.5 | 1.4 | 357 | 0.48 | EXAMPLE |
| 41 | K | 1.9 | 632 | 1022 | 16 | 35 | 3.09E+06 | 1.0 | 0.5 | 538 | 0.53 | EXAMPLE |
| 42 | L | 1.3 | 531 | 976 | 17 | 22 | 2.43E+06 | 1.0 | 0.8 | 469 | 0.48 | EXAMPLE |
| 43 | L | 1.4 | 353 | 601 | 21 | 20 | 1.38E+06 | 2.0 | 1.4 | 297 | 0.49 | COMPARATIVE EXAMPLE |
| 44 | M | 1.5 | 338 | 748 | 25 | 32 | 2.89E+06 | 2.0 | 1.3 | 328 | 0.44 | EXAMPLE |
| 45 | M | 1.5 | 439 | 700 | 28 | 44 | 3.44E+06 | 2.0 | 1.3 | 314 | 0.45 | EXAMPLE |
| 46 | M | 2.0 | 393 | 784 | 22 | 40 | 3.05E+06 | 4.5 | 2.3 | 359 | 0.46 | COMPARATIVE EXAMPLE |
| 47 | N | 1.5 | 508 | 832 | 23 | 31 | 3.07E+06 | 1.0 | 0.7 | 435 | 0.52 | EXAMPLE |
| 48 | N | 1.7 | 631 | 801 | 21 | 60 | 3.69E+06 | 2.0 | 1.2 | 438 | 0.55 | EXAMPLE |
| 49 | N | 2.0 | 767 | 1128 | 9 | 30 | 1.87E+06 | 1.5 | 0.8 | 477 | 0.42 | COMPARATIVE EXAMPLE |
| 50 | O | 1.5 | 440 | 771 | 24 | 30 | 2.81E+06 | 2.0 | 1.3 | 365 | 0.47 | EXAMPLE |

TABLE 25

| EXPERIMENTAL EXAMPLE | CHEMICAL COMPONENT | SHEET THICKNESS t mm | TENSILE PROPERTIES ||||| BENDABILITY MINIMUM BEND RADIUS || FATIGUE RESISTANCE FATIGUE LIMIT || |
|---|---|---|---|---|---|---|---|---|---|---|---|---|
| | | | YIELD STRENGTH YS MPa | MAXIMUM TENSILE STRENGTH TS MPa | TOTAL ELONGATION EI % | HOLE EXPANDABILITY $\lambda$ % | $TS^{0.5} \times EI \times \lambda^{0.5}$ | r mm | r/t | DL MPa | DL/TS | |
| 51 | O | 1.3 | 369 | 737 | 20 | 48 | 2.77E+06 | 1.0 | 0.8 | 199 | 0.27 | COMPARATIVE EXAMPLE |
| 52 | O | 1.8 | 401 | 810 | 24 | 33 | 3.18E+06 | 1.5 | 0.8 | 365 | 0.45 | EXAMPLE |
| 53 | O | 1.3 | 472 | 748 | 26 | 44 | 3.53E+06 | 1.5 | 1.2 | 340 | 0.45 | EXAMPLE |
| 54 | P | 1.5 | 380 | 683 | 23 | 62 | 3.23E+06 | 1.5 | 1.0 | 313 | 0.46 | EXAMPLE |
| 55 | P | 1.5 | 456 | 769 | 27 | 23 | 2.76E+06 | 1.5 | 1.0 | 293 | 0.38 | EXAMPLE |
| 56 | P | 1.6 | 418 | 708 | 25 | 35 | 2.79E+06 | 2.0 | 1.3 | 385 | 0.54 | EXAMPLE |
| 57 | Q | 1.3 | 439 | 827 | 22 | 31 | 2.91E+06 | 1.5 | 1.2 | 399 | 0.48 | EXAMPLE |
| 58 | Q | 1.9 | 431 | 694 | 27 | 42 | 3.20E+06 | 2.0 | 1.1 | 358 | 0.52 | EXAMPLE |
| 59 | Q | 1.7 | 467 | 692 | 26 | 56 | 3.54E+06 | 3.5 | 2.1 | 378 | 0.55 | COMPARATIVE EXAMPLE |
| 60 | R | 0.9 | 287 | 640 | 24 | 67 | 3.18E+06 | 1.0 | 1.1 | 288 | 0.45 | EXAMPLE |
| 61 | R | 1.3 | 291 | 636 | 33 | 31 | 2.95E+06 | 2.0 | 1.5 | 270 | 0.42 | EXAMPLE |
| 62 | R | 1.3 | 275 | 593 | 29 | 75 | 3.63E+06 | 2.5 | 1.9 | 292 | 0.49 | EXAMPLE |
| 63 | S | 1.5 | 571 | 974 | 17 | 32 | 2.92E+06 | 1.0 | 0.7 | 521 | 0.53 | EXAMPLE |
| 64 | S | 1.4 | 528 | 1050 | 15 | 26 | 2.60E+06 | 1.0 | 0.7 | 425 | 0.40 | EXAMPLE |
| 65 | T | 1.5 | 479 | 911 | 21 | 29 | 3.11E+06 | 2.0 | 1.3 | 408 | 0.45 | EXAMPLE |
| 66 | T | 1.6 | 378 | 607 | 34 | 55 | 3.77E+06 | 2.0 | 1.3 | 274 | 0.45 | EXAMPLE |
| 67 | T | 1.3 | 663 | 1006 | 7 | 8 | 6.32E+05 | 3.5 | 2.7 | 508 | 0.50 | COMPARATIVE EXAMPLE |
| 68 | U | 1.5 | 396 | 749 | 25 | 34 | 2.99E+06 | 1.5 | 1.0 | 387 | 0.52 | EXAMPLE |
| 69 | U | 1.2 | 511 | 960 | 19 | 18 | 2.40E+06 | 1.0 | 0.8 | 355 | 0.37 | EXAMPLE |
| 70 | U | 1.6 | 406 | 640 | 31 | 43 | 3.29E+06 | 1.0 | 0.6 | 316 | 0.49 | EXAMPLE |
| 71 | V | 1.5 | 405 | 714 | 28 | 29 | 2.88E+06 | 2.5 | 1.7 | 346 | 0.48 | EXAMPLE |
| 72 | V | 2.0 | 342 | 562 | 33 | 72 | 3.73E+06 | 1.0 | 0.5 | 221 | 0.39 | EXAMPLE |
| 73 | V | 1.2 | 314 | 598 | 31 | 49 | 3.17E+06 | 1.0 | 0.8 | 288 | 0.48 | EXAMPLE |
| 74 | W | 1.5 | 398 | 772 | 24 | 32 | 2.91E+06 | 1.5 | 1.0 | 355 | 0.46 | EXAMPLE |
| 75 | W | 1.8 | 364 | 693 | 24 | 39 | 2.73E+06 | 1.5 | 0.8 | 202 | 0.29 | COMPARATIVE EXAMPLE |
| 76 | W | 1.7 | 335 | 662 | 25 | 52 | 3.07E+06 | 1.5 | 0.9 | 301 | 0.45 | EXAMPLE |
| 77 | X | 2.4 | 284 | 556 | 32 | 61 | 3.28E+06 | 3.5 | 1.5 | 277 | 0.50 | EXAMPLE |
| 78 | X | 1.3 | 340 | 663 | 26 | 55 | 3.29E+06 | 2.0 | 1.5 | 299 | 0.45 | EXAMPLE |
| 79 | X | 1.7 | 374 | 617 | 17 | 47 | 1.79E+06 | 3.0 | 1.8 | 300 | 0.49 | COMPARATIVE EXAMPLE |
| 80 | Y | 2.0 | 373 | 831 | 21 | 29 | 2.71E+06 | 2.5 | 1.3 | 362 | 0.44 | EXAMPLE |

TABLE 25-continued

| EXPERIMENTAL EXAMPLE | CHEMICAL COMPONENT | SHEET THICKNESS t mm | TENSILE PROPERTIES ||||  | BENDABILITY MINIMUM ||  FATIGUE RESISTANCE ||  |
|---|---|---|---|---|---|---|---|---|---|---|---|---|
|  |  |  | YIELD STRENGTH YS MPa | MAXIMUM TENSILE STRENGTH TS MPa | TOTAL ELONGATION EI % | HOLE EXPANDABILITY λ % | $TS^{0.5} \times EI \times \lambda^{0.5}$ | BEND RADIUS r mm | r/t | FATIGUE LIMIT DL MPa | DL/TS |  |
| 81 | Y | 1.7 | 562 | 783 | 19 | 70 | 3.48E+06 | 3.0 | 1.8 | 414 | 0.53 | EXAMPLE |
| 82 | Y | 1.8 | 412 | 713 | 25 | 47 | 3.26E+06 | 3.0 | 1.7 | 375 | 0.53 | EXAMPLE |
| 83 | Z | 1.5 | 414 | 781 | 20 | 33 | 2.51E+06 | 2.0 | 1.3 | 350 | 0.45 | EXAMPLE |
| 84 | Z | 1.7 | 399 | 758 | 23 | 36 | 2.88E+06 | 3.0 | 1.8 | 209 | 0.28 | COMPARATIVE EXAMPLE |
| 85 | Z | 1.7 | 340 | 682 | 31 | 27 | 2.87E+06 | 1.5 | 0.9 | 312 | 0.46 | EXAMPLE |
| 86 | AA | 1.5 | 582 | 1137 | 15 | 18 | 2.44E+06 | 1.5 | 1.0 | 481 | 0.42 | EXAMPLE |
| 87 | AA | 1.9 | 605 | 908 | 17 | 42 | 3.01E+06 | 1.5 | 0.8 | 474 | 0.52 | EXAMPLE |
| 88 | AB | 1.5 | 578 | 999 | 17 | 27 | 2.79E+06 | 1.0 | 0.7 | 506 | 0.51 | EXAMPLE |
| 89 | AB | 1.8 | 401 | 618 | 31 | 48 | 3.30E+06 | 3.0 | 1.7 | 219 | 0.35 | EXAMPLE |
| 90 | AB | 1.7 | 348 | 583 | 31 | 52 | 3.15E+06 | 1.5 | 0.9 | 298 | 0.51 | EXAMPLE |
| 91 | AC | 1.3 | 414 | 778 | 25 | 33 | 3.12E+06 | 1.5 | 1.2 | 358 | 0.46 | EXAMPLE |
| 92 | AC | 1.5 | 385 | 721 | 25 | 46 | 3.28E+06 | 2.0 | 1.3 | 303 | 0.42 | EXAMPLE |
| 93 | AD | 1.5 | 527 | 905 | 20 | 20 | 2.44E+06 | 1.0 | 0.7 | 491 | 0.54 | EXAMPLE |
| 94 | AD | 1.5 | 537 | 738 | 23 | 53 | 3.36E+06 | 2.5 | 1.7 | 359 | 0.49 | EXAMPLE |
| 95 | AE | 2.0 | 445 | 785 | 22 | 41 | 3.10E+06 | 1.5 | 0.8 | 374 | 0.48 | EXAMPLE |
| 96 | AE | 1.9 | 484 | 709 | 24 | 61 | 3.54E+06 | 2.5 | 1.3 | 278 | 0.39 | EXAMPLE |
| 97 | AF | 1.5 | 398 | 810 | 24 | 27 | 2.87E+06 | 1.0 | 0.7 | 335 | 0.41 | EXAMPLE |
| 98 | AF | 1.9 | 675 | 1042 | 18 | 17 | 2.50E+06 | 1.0 | 0.5 | 498 | 0.48 | EXAMPLE |
| 99 | AG | 1.5 | 536 | 982 | 18 | 32 | 3.13E+06 | 1.0 | 0.7 | 503 | 0.51 | EXAMPLE |
| 100 | AG | 1.6 | 551 | 1012 | 15 | 28 | 2.56E+06 | 1.5 | 0.9 | 460 | 0.45 | EXAMPLE |

TABLE 26

| EXPERIMENTAL EXAMPLE | CHEMICAL COMPONENT | SHEET THICKNESS t mm | TENSILE PROPERTIES ||||  | BENDABILITY MINIMUM ||  FATIGUE RESISTANCE ||  |
|---|---|---|---|---|---|---|---|---|---|---|---|---|
|  |  |  | YIELD STRENGTH YS MPa | MAXIMUM TENSILE STRENGTH TS MPa | TOTAL ELONGATION EI % | HOLE EXPANDABILITY λ % | $TS^{0.5} \times EI \times \lambda^{0.5}$ | BEND RADIUS r mm | r/t | FATIGUE LIMIT DL MPa | DL/TS |  |
| 101 | AH | 0.9 | 621 | 1037 | 16 | 19 | 2.33E+06 | 1.0 | 1.1 | 520 | 0.50 | EXAMPLE |
| 102 | AH | 1.5 | 482 | 819 | 20 | 35 | 2.77E+06 | 1.5 | 1.0 | 477 | 0.58 | EXAMPLE |
| 103 | AI | 1.5 | 448 | 931 | 18 | 22 | 2.40E+06 | 1.0 | 0.7 | 360 | 0.39 | EXAMPLE |
| 104 | AI | 1.6 | 434 | 702 | 28 | 46 | 3.53E+06 | 2.5 | 1.6 | 338 | 0.48 | EXAMPLE |
| 105 | AJ | 1.5 | 475 | 899 | 20 | 33 | 3.10E+06 | 1.5 | 1.0 | 423 | 0.47 | EXAMPLE |
| 106 | AJ | 1.9 | 564 | 987 | 17 | 29 | 2.84E+06 | 2.5 | 1.3 | 496 | 0.50 | EXAMPLE |
| 107 | AK | 1.5 | 611 | 1099 | 14 | 19 | 2.22E+06 | 1.5 | 1.0 | 539 | 0.49 | EXAMPLE |
| 108 | AK | 1.4 | 560 | 867 | 18 | 54 | 3.38E+06 | 2.0 | 1.4 | 391 | 0.45 | EXAMPLE |
| 109 | AL | 1.5 | 287 | 630 | 27 | 49 | 2.99E+06 | 2.0 | 1.3 | 287 | 0.46 | EXAMPLE |
| 110 | AL | 1.6 | 302 | 530 | 29 | 115 | 3.79E+06 | 3.0 | 1.9 | 268 | 0.51 | EXAMPLE |
| 111 | AM | 1.5 | 598 | 1007 | 17 | 32 | 3.07E+06 | 1.0 | 0.7 | 507 | 0.50 | EXAMPLE |
| 112 | AM | 1.4 | 632 | 932 | 18 | 51 | 3.66E+06 | 2.5 | 1.8 | 465 | 0.50 | EXAMPLE |
| 113 | AM | 1.2 | 636 | 965 | 17 | 23 | 2.44E+06 | 1.0 | 0.8 | 513 | 0.53 | EXAMPLE |
| 114 | AM | 1.9 | 592 | 930 | 21 | 22 | 2.79E+06 | 2.5 | 1.3 | 256 | 0.28 | COMPARATIVE EXAMPLE |
| 115 | AN | 1.2 | 372 | 731 | 27 | 28 | 2.82E+06 | 1.5 | 1.3 | 367 | 0.50 | EXAMPLE |
| 116 | AN | 2.0 | 489 | 853 | 20 | 30 | 2.73E+06 | 1.5 | 0.8 | 427 | 0.50 | COMPARATIVE EXAMPLE |
| 117 | AO | 1.2 | 381 | 702 | 23 | 55 | 3.17E+06 | 1.5 | 1.3 | 283 | 0.40 | EXAMPLE |
| 118 | AO | 1.8 | 465 | 818 | 20 | 39 | 2.92E+06 | 2.0 | 1.1 | 420 | 0.51 | EXAMPLE |
| 119 | AP | 1.5 | 363 | 729 | 21 | 50 | 2.92E+06 | 2.0 | 1.3 | 349 | 0.48 | EXAMPLE |
| 120 | AP | 1.5 | 472 | 826 | 19 | 46 | 3.06E+06 | 1.5 | 1.0 | 435 | 0.53 | EXAMPLE |
| 121 | AP | 1.9 | 346 | 623 | 35 | 41 | 3.48E+06 | 2.5 | 1.3 | 334 | 0.54 | EXAMPLE |
| 122 | AQ | 1.5 | 351 | 725 | 29 | 33 | 3.25E+06 | 1.5 | 1.0 | 287 | 0.40 | EXAMPLE |
| 123 | AQ | 1.4 | 317 | 595 | 27 | 52 | 2.83E+06 | 2.0 | 1.4 | 298 | 0.50 | EXAMPLE |
| 124 | AR | 1.5 | 346 | 703 | 30 | 25 | 2.80E+06 | 2.0 | 1.3 | 321 | 0.46 | EXAMPLE |
| 125 | AR | 1.8 | 381 | 718 | 24 | 37 | 2.81E+06 | 3.0 | 1.7 | 353 | 0.49 | EXAMPLE |
| 126 | AS | 2.1 | 434 | 848 | 23 | 24 | 2.78E+06 | 2.5 | 1.2 | 361 | 0.43 | EXAMPLE |
| 127 | AS | 1.5 | 539 | 843 | 21 | 40 | 3.25E+06 | 2.0 | 1.3 | 354 | 0.42 | EXAMPLE |

TABLE 26-continued

| EXPERIMENTAL EXAMPLE | CHEMICAL COMPONENT | SHEET THICKNESS t mm | TENSILE PROPERTIES | | | | $TS^{0.5} \times EI \times \lambda^{0.5}$ | BENDABILITY MINIMUM BEND RADIUS | | FATIGUE RESISTANCE | | |
|---|---|---|---|---|---|---|---|---|---|---|---|---|
| | | | YIELD STRENGTH YS MPa | MAXIMUM TENSILE STRENGTH TS MPa | TOTAL ELONGATION EI % | HOLE EXPANDABILITY $\lambda$ % | | r mm | r/t | FATIGUE LIMIT DL MPa | DL/TS | |
| 128 | AT | 1.5 | 389 | 825 | 21 | 27 | 2.59E+06 | 1.0 | 0.7 | 359 | 0.44 | EXAMPLE |
| 129 | AT | 1.2 | 310 | 637 | 33 | 43 | 3.48E+06 | 2.0 | 1.7 | 298 | 0.47 | EXAMPLE |
| 130 | AU | 1.5 | 416 | 904 | 20 | 22 | 2.55E+06 | 1.5 | 1.0 | 404 | 0.45 | EXAMPLE |
| 131 | AU | 2.0 | 437 | 842 | 22 | 21 | 2.46E+06 | 5.0 | 2.5 | 381 | 0.45 | COMPARATIVE EXAMPLE |
| 132 | AU | 2.0 | 369 | 756 | 23 | 37 | 2.91E+06 | 1.5 | 0.8 | 348 | 0.46 | EXAMPLE |
| 133 | AU | 1.9 | 343 | 747 | 22 | 41 | 2.88E+06 | 2.0 | 1.1 | 333 | 0.45 | EXAMPLE |
| 134 | AV | 0.9 | 481 | 932 | 17 | 42 | 3.13E+06 | 1.0 | 1.1 | 416 | 0.45 | EXAMPLE |
| 135 | AV | 1.3 | 557 | 901 | 18 | 39 | 3.04E+06 | 1.5 | 1.2 | 425 | 0.47 | EXAMPLE |
| 136 | AW | 0.9 | 433 | 831 | 22 | 30 | 2.89E+06 | 1.0 | 1.1 | 374 | 0.45 | EXAMPLE |
| 137 | AW | 1.4 | 355 | 543 | 21 | 39 | 1.66E+06 | 2.5 | 1.8 | 224 | 0.41 | COMPARATIVE EXAMPLE |
| 138 | AW | 1.7 | 400 | 637 | 27 | 60 | 3.36E+06 | 1.5 | 0.9 | 309 | 0.49 | EXAMPLE |
| 139 | AX | 1.5 | 502 | 899 | 19 | 24 | 2.51E+06 | 2.0 | 1.3 | 433 | 0.48 | EXAMPLE |
| 140 | AX | 1.8 | 395 | 746 | 25 | 37 | 3.10E+06 | 2.0 | 1.1 | 329 | 0.44 | EXAMPLE |
| 141 | AY | 1.5 | 616 | 1098 | 15 | 23 | 2.62E+06 | 1.5 | 1.0 | 473 | 0.43 | EXAMPLE |
| 142 | AY | 2.0 | 465 | 722 | 27 | 28 | 2.77E+06 | 3.5 | 1.8 | 408 | 0.57 | EXAMPLE |
| 143 | AZ | 0.9 | 396 | 744 | 21 | 59 | 3.27E+06 | 1.5 | 1.7 | 388 | 0.52 | EXAMPLE |
| 144 | AZ | 1.2 | 395 | 709 | 27 | 38 | 3.14E+06 | 1.5 | 1.3 | 342 | 0.48 | EXAMPLE |
| 145 | BA | 1.5 | 465 | 842 | 23 | 28 | 2.97E+06 | 2.0 | 1.3 | 415 | 0.49 | EXAMPLE |
| 146 | BA | 1.6 | 542 | 883 | 19 | 30 | 2.73E+06 | 2.0 | 1.3 | 487 | 0.55 | EXAMPLE |
| 147 | BB | 1.5 | 625 | 995 | 19 | 22 | 2.80E+06 | 1.5 | 1.0 | 537 | 0.54 | EXAMPLE |
| 148 | BB | 1.5 | 458 | 866 | 20 | 23 | 2.44E+06 | 2.0 | 1.3 | 445 | 0.51 | COMPARATIVE EXAMPLE |
| 149 | BB | 2.2 | 492 | 761 | 22 | 42 | 2.99E+06 | 3.0 | 1.4 | 369 | 0.48 | EXAMPLE |
| 150 | BB | 2.0 | 542 | 854 | 22 | 35 | 3.25E+06 | 2.0 | 1.0 | 458 | 0.54 | EXAMPLE |
| 151 | BC | 1.1 | 271 | 598 | 29 | 58 | 3.23E+06 | 1.5 | 1.4 | 283 | 0.47 | EXAMPLE |

TABLE 27

| EXPERIMENTAL EXAMPLE | CHEMICAL COMPONENT | SHEET THICKNESS t mm | TENSILE PROPERTIES | | | | $TS^{0.5} \times EI \times \lambda^{0.5}$ | BENDABILITY MINIMUM BEND RADIUS | | FATIGUE RESISTANCE | | |
|---|---|---|---|---|---|---|---|---|---|---|---|---|
| | | | YIELD STRENGTH YS MPa | MAXIMUM TENSILE STRENGTH TS MPa | TOTAL ELONGATION EI % | HOLE EXPANDABILITY $\lambda$ % | | r mm | r/t | FATIGUE LIMIT DL MPa | DL/TS | |
| 152 | BC | 1.3 | 427 | 687 | 24 | 46 | 2.93E+06 | 1.5 | 1.2 | 385 | 0.56 | EXAMPLE |
| 153 | BC | 1.7 | 443 | 762 | 23 | 45 | 3.25E+06 | 1.5 | 0.9 | 384 | 0.50 | EXAMPLE |
| 154 | BC | 2.0 | 330 | 594 | 29 | 61 | 3.28E+06 | 2.5 | 1.3 | 310 | 0.52 | EXAMPLE |
| 155 | BC | 1.2 | 361 | 686 | 27 | 35 | 2.87E+06 | 3.0 | 2.5 | 381 | 0.56 | COMPARATIVE EXAMPLE |
| 156 | BD | 1.5 | 353 | 706 | 29 | 24 | 2.67E+06 | 1.0 | 0.7 | 293 | 0.42 | EXAMPLE |
| 157 | BD | 1.7 | 369 | 696 | 26 | 45 | 3.20E+06 | 1.5 | 0.9 | 362 | 0.52 | EXAMPLE |
| 158 | BE | 1.5 | 421 | 753 | 26 | 28 | 2.84E+06 | 1.0 | 0.7 | 359 | 0.48 | EXAMPLE |
| 159 | BE | 1.9 | 384 | 742 | 25 | 36 | 3.03E+06 | 2.5 | 1.3 | 329 | 0.44 | EXAMPLE |
| 160 | BF | 1.0 | 480 | 879 | 20 | 35 | 3.08E+06 | 1.5 | 1.5 | 376 | 0.43 | EXAMPLE |
| 161 | BF | 1.7 | 568 | 1055 | 14 | 38 | 2.96E+06 | 1.5 | 0.9 | 495 | 0.47 | EXAMPLE |
| 162 | BF | 1.5 | 567 | 899 | 20 | 26 | 2.75E+06 | 1.5 | 1.0 | 460 | 0.51 | EXAMPLE |
| 163 | BF | 0.9 | 534 | 899 | 26 | 37 | 4.26E+06 | 2.0 | 2.2 | 419 | 0.47 | COMPARATIVE EXAMPLE |
| 164 | BG | 1.0 | 353 | 686 | 27 | 34 | 2.83E+06 | 1.0 | 1.0 | 295 | 0.43 | EXAMPLE |
| 165 | BG | 1.5 | 348 | 690 | 25 | 48 | 3.14E+06 | 3.0 | 2.0 | 197 | 0.29 | COMPARATIVE EXAMPLE |
| 166 | BG | 1.2 | 419 | 776 | 24 | 33 | 2.98E+06 | 1.5 | 1.3 | 354 | 0.46 | EXAMPLE |
| 167 | BH | 1.5 | 513 | 911 | 17 | 30 | 2.56E+06 | 1.0 | 0.7 | 457 | 0.50 | EXAMPLE |

TABLE 27-continued

| EX-PERIMENTAL EXAMPLE | CHEMICAL COMPONENT | SHEET THICKNESS t mm | TENSILE PROPERTIES YIELD STRENGTH YS MPa | MAXIMUM TENSILE STRENGTH TS MPa | TOTAL ELONGATION EI % | HOLE EXPANDABILITY λ % | $TS^{0.5} \times EI \times \lambda^{0.5}$ | BENDABILITY MINIMUM BEND RADIUS r mm | r/t | FATIGUE RESISTANCE FATIGUE LIMIT DL MPa | DL/TS | |
|---|---|---|---|---|---|---|---|---|---|---|---|---|
| 168 | BH | 1.9 | 590 | 1052 | 15 | 24 | 2.51E+06 | 1.0 | 0.5 | 535 | 0.51 | COMPARATIVE EXAMPLE |
| 169 | BH | 1.8 | 583 | 861 | 22 | 27 | 2.89E+06 | 1.0 | 0.6 | 475 | 0.55 | EXAMPLE |
| 170 | BH | 1.3 | 513 | 818 | 20 | 47 | 3.21E+06 | 1.5 | 1.2 | 488 | 0.60 | EXAMPLE |
| 171 | BI | 1.5 | 345 | 675 | 28 | 44 | 3.26E+06 | 2.0 | 1.3 | 317 | 0.47 | EXAMPLE |
| 172 | BI | 1.2 | 296 | 481 | 41 | 43 | 2.84E+06 | 2.0 | 1.7 | 215 | 0.45 | EXAMPLE |
| 173 | BJ | 1.5 | 416 | 858 | 17 | 56 | 3.20E+06 | 1.5 | 1.0 | 412 | 0.48 | EXAMPLE |
| 174 | BJ | 1.4 | 386 | 630 | 19 | 25 | 1.50E+06 | 2.5 | 1.8 | 349 | 0.55 | COMPARATIVE EXAMPLE |
| 175 | BJ | 1.5 | 450 | 972 | 17 | 28 | 2.73E+06 | 2.0 | 1.3 | 433 | 0.45 | EXAMPLE |
| 176 | BK | 1.3 | 307 | 671 | 30 | 29 | 2.81E+06 | 2.0 | 1.5 | 282 | 0.42 | EXAMPLE |
| 177 | BK | 1.3 | 378 | 684 | 24 | 45 | 2.88E+06 | 2.0 | 1.5 | 346 | 0.51 | EXAMPLE |
| 178 | BL | 1.3 | 357 | 718 | 26 | 37 | 3.04E+06 | 1.5 | 1.2 | 338 | 0.47 | EXAMPLE |
| 179 | BL | 2.0 | 447 | 692 | 28 | 50 | 3.60E+06 | 3.5 | 1.8 | 431 | 0.62 | EXAMPLE |
| 180 | BL | 1.9 | 379 | 740 | 24 | 34 | 2.82E+06 | 1.5 | 0.8 | 361 | 0.49 | COMPARATIVE EXAMPLE |
| 181 | BL | 1.3 | 375 | 635 | 30 | 54 | 3.53E+06 | 3.0 | 2.3 | 353 | 0.56 | COMPARATIVE EXAMPLE |
| 182 | BM | 1.5 | 486 | 921 | 17 | 33 | 2.73E+06 | 1.0 | 0.7 | 397 | 0.43 | EXAMPLE |
| 183 | BM | 1.4 | 261 | 551 | 21 | 31 | 1.51E+06 | 2.5 | 1.8 | 216 | 0.39 | COMPARATIVE EXAMPLE |
| 184 | BM | 1.6 | 482 | 885 | 20 | 34 | 3.07E+06 | 2.0 | 1.3 | 418 | 0.47 | EXAMPLE |
| 185 | BN | 1.5 | 354 | 706 | 24 | 44 | 2.99E+06 | 2.0 | 1.3 | 314 | 0.44 | EXAMPLE |
| 186 | BN | 1.2 | 385 | 641 | 29 | 56 | 3.52E+06 | 2.0 | 1.7 | 368 | 0.57 | EXAMPLE |
| 187 | BO | 1.5 | 160 | 365 | 37 | 52 | 1.86E+06 | 1.0 | 0.7 | 155 | 0.42 | COMPARATIVE EXAMPLE |
| 188 | BP | 1.5 | 870 | 1460 | 5 | 13 | 1.01E+06 | 5.5 | 3.7 | 423 | 0.29 | COMPARATIVE EXAMPLE |
| 189 | BQ | 1.5 | 292 | 462 | 27 | 29 | 1.44E+06 | 4.0 | 2.7 | 175 | 0.38 | COMPARATIVE EXAMPLE |
| 190 | BR | EXPERIMENT STOPPED BECAUSE SLAB CRACKED DURING SLAB HEATING IN HOT ROLLING STEP | | | | | | | | | | COMPARATIVE EXAMPLE |
| 191 | BS | 1.5 | 230 | 430 | 30 | 35 | 1.58E+06 | 3.5 | 2.3 | 155 | 0.36 | COMPARATIVE EXAMPLE |
| 192 | BT | EXPERIMENT STOPPED BECAUSE SLAB CRACKED DURING SLAB HEATING IN HOT ROLLING STEP | | | | | | | | | | COMPARATIVE EXAMPLE |
| 193 | BU | EXPERIMENT STOPPED BECAUSE SLAB CRACKED DURING ROLLING IN HOT ROLLING STEP | | | | | | | | | | COMPARATIVE EXAMPLE |
| 194 | BV | 1.5 | 485 | 830 | 13 | 16 | 1.24E+06 | 5.0 | 3.3 | 234 | 0.28 | COMPARATIVE EXAMPLE |
| 195 | BW | AFTER SLAB WAS CAST, SLAB CRACKED DURING TRANSFER, SO THAT EXPERIMENT STOPPED | | | | | | | | | | COMPARATIVE EXAMPLE |
| 196 | BX | 1.5 | 442 | 756 | 14 | 12 | 1.01E+06 | 5.0 | 3.3 | 208 | 0.28 | COMPARATIVE EXAMPLE |
| 197 | BY | 1.5 | 635 | 1204 | 3 | 5 | 2.80E+06 | GREATER THAN 6.0 | GREATER THAN 4.0 | 298 | 0.25 | COMPARATIVE EXAMPLE |
| 198 | A | 1.5 | 452 | 745 | 24 | 38 | 2.99E+06 | 1.5 | 1.0 | 380 | 0.51 | COMPARATIVE EXAMPLE |
| 199 | J | 1.7 | 541 | 953 | 19 | 24 | 2.74E+06 | 1.0 | 0.6 | 439 | 0.46 | EXAMPLE |
| 200 | D | 2.8 | 347 | 696 | 31 | 23 | 2.73E+06 | 2.0 | 1.6 | 288 | 0.41 | COMPARATIVE EXAMPLE |

TABLE 27-continued

| EXPERIMENTAL EXAMPLE | CHEMICAL COMPONENT | SHEET THICKNESS t mm | TENSILE PROPERTIES ||||| BENDABILITY || FATIGUE RESISTANCE || |
|---|---|---|---|---|---|---|---|---|---|---|---|---|
| | | | YIELD STRENGTH YS MPa | MAXIMUM TENSILE STRENGTH TS MPa | TOTAL ELONGATION EI % | HOLE EXPANDABILITY λ % | $TS^{0.5} \times EI \times \lambda^{0.5}$ | MINIMUM BEND RADIUS r mm | r/t | FATIGUE LIMIT DL MPa | DL/TS | |
| 201 | D | 2.8 | 345 | 695 | 32 | 24 | 2.87E+06 | 2.0 | 1.5 | 282 | 0.41 | EXAMPLE |
| 202 | D | 2.8 | 350 | 694 | 31 | 23 | 2.72E+06 | 2.0 | 1.5 | 286 | 0.41 | COMPARATIVE EXAMPLE |

TABLE 28

| EXPERIMENTAL EXAMPLE | PLATING ADHESION | SPOT WELDABILITY | CORROSION RESISTANCE | CHIPPING RESISTANCE | POWDERING RESISTANCE | PLATING APPEARANCE UNIFORMITY | |
|---|---|---|---|---|---|---|---|
| 1 | ⊚ | ○ | ○ | ○ | ○ | ○ | EXAMPLE |
| 2 | x | ○ | ○ | x | x | x | COMPARATIVE EXAMPLE |
| 3 | ⊚ | ○ | ○ | ○ | ○ | Δ | COMPARATIVE EXAMPLE |
| 4 | ⊚ | ○ | ○ | ○ | ○ | ○ | EXAMPLE |
| 5 | ⊚ | ○ | ○ | ○ | ○ | ○ | EXAMPLE |
| 6 | ⊚ | ○ | ○ | ○ | ○ | ○ | EXAMPLE |
| 7 | ⊚ | ○ | ○ | ○ | ○ | ○ | EXAMPLE |
| 8 | ⊚ | ○ | ○ | ○ | ○ | ○ | EXAMPLE |
| 9 | ○ | ○ | ○ | ○ | ○ | ○ | EXAMPLE |
| 10 | ⊚ | ○ | ○ | ○ | ○ | ○ | EXAMPLE |
| 11 | ⊚ | ○ | ○ | ○ | ○ | Δ | COMPARATIVE EXAMPLE |
| 12 | ⊚ | ○ | ○ | ○ | ○ | ○ | EXAMPLE |
| 13 | ⊚ | ○ | ○ | ○ | ○ | ○ | EXAMPLE |
| 14 | x | ○ | ○ | x | x | x | COMPARATIVE EXAMPLE |
| 15 | ⊚ | ○ | ○ | ○ | ○ | ○ | EXAMPLE |
| 16 | x | ○ | ○ | x | x | ○ | COMPARATIVE EXAMPLE |
| 17 | ⊚ | ○ | ○ | ○ | ○ | ○ | EXAMPLE |
| 18 | ⊚ | ○ | ○ | ○ | ○ | ○ | EXAMPLE |
| 19 | ⊚ | ○ | ○ | ○ | ○ | ○ | EXAMPLE |
| 20 | ⊚ | ○ | ○ | ○ | ○ | ○ | EXAMPLE |
| 21 | ⊚ | ○ | ○ | ○ | ○ | ○ | EXAMPLE |
| 22 | ⊚ | ○ | ○ | ○ | ○ | ○ | COMPARATIVE EXAMPLE |
| 23 | ⊚ | ○ | ○ | ○ | ○ | ○ | EXAMPLE |
| 24 | ⊚ | ○ | ○ | ○ | ○ | ○ | EXAMPLE |
| 25 | ⊚ | ○ | ○ | ○ | ○ | ○ | EXAMPLE |
| 26 | ⊚ | ○ | ○ | ○ | ○ | ○ | EXAMPLE |
| 27 | ⊚ | ○ | ○ | ○ | ○ | ○ | EXAMPLE |
| 28 | ⊚ | ○ | ○ | ○ | ○ | ○ | COMPARATIVE EXAMPLE |
| 29 | ⊚ | ○ | ○ | ○ | ○ | ○ | EXAMPLE |
| 30 | ⊚ | ○ | ○ | ○ | ○ | ○ | EXAMPLE |
| 31 | ⊚ | ○ | ○ | ○ | ○ | ○ | EXAMPLE |
| 32 | ⊚ | ○ | ○ | ○ | ○ | ○ | EXAMPLE |
| 33 | ⊚ | ○ | ○ | ○ | ○ | ○ | EXAMPLE |
| 34 | ⊚ | ○ | ○ | ○ | ○ | ○ | EXAMPLE |
| 35 | ⊚ | ○ | ○ | ○ | ○ | ○ | EXAMPLE |
| 36 | ⊚ | ○ | ○ | ○ | ○ | ○ | EXAMPLE |
| 37 | ⊚ | ○ | ○ | ○ | ○ | ○ | EXAMPLE |
| 38 | ⊚ | ○ | ○ | ○ | ○ | ○ | EXAMPLE |
| 39 | ⊚ | ○ | ○ | ○ | ○ | ○ | EXAMPLE |
| 40 | ⊚ | ○ | ○ | ○ | ○ | ○ | EXAMPLE |
| 41 | ⊚ | ○ | ○ | ○ | ○ | ○ | EXAMPLE |
| 42 | ⊚ | ○ | ○ | ○ | ○ | ○ | EXAMPLE |
| 43 | ⊚ | ○ | ○ | ○ | ○ | ○ | COMPARATIVE EXAMPLE |
| 44 | ⊚ | ○ | ○ | ○ | ○ | ○ | EXAMPLE |
| 45 | ⊚ | ○ | ○ | ○ | ○ | ○ | EXAMPLE |
| 46 | x | ○ | ○ | ○ | x | x (UNPLATING) | COMPARATIVE EXAMPLE |

TABLE 28-continued

| EXPERIMENTAL EXAMPLE | PLATING ADHESION | SPOT WELDA-BILITY | CORROSION RESISTANCE | CHIPPING RESISTANCE | POWDERING RESISTANCE | PLATING APPEARANCE UNIFORMITY | |
|---|---|---|---|---|---|---|---|
| 47 | ⊚ | ○ | ○ | ○ | ○ | ○ | EXAMPLE |
| 48 | ⊚ | ○ | ○ | ○ | ○ | ○ | EXAMPLE |
| 49 | ⊚ | ○ | ○ | ○ | ○ | ○ | COMPARATIVE EXAMPLE |
| 50 | ⊚ | ○ | ○ | ○ | ○ | ○ | EXAMPLE |

TABLE 29

| EXPERIMENTAL EXAMPLE | PLATING ADHESION | SPOT WELDA-BILITY | CORROSION RESISTANCE | CHIPPING RESISTANCE | POWDERING RESISTANCE | PLATING APPEARANCE UNIFORMITY | |
|---|---|---|---|---|---|---|---|
| 51 | ⊚ | ○ | ○ | ○ | ○ | ○ | COMPARATIVE EXAMPLE |
| 52 | ⊚ | ○ | ○ | ○ | ○ | ○ | EXAMPLE |
| 53 | ⊚ | ○ | ○ | ○ | ○ | ○ | EXAMPLE |
| 54 | ⊚ | ○ | ○ | ○ | ○ | ○ | EXAMPLE |
| 55 | ⊚ | ○ | ○ | ○ | ○ | ○ | EXAMPLE |
| 56 | ⊚ | ○ | ○ | ○ | ○ | ○ | EXAMPLE |
| 57 | ⊚ | ○ | ○ | ○ | ○ | ○ | EXAMPLE |
| 58 | ⊚ | ○ | ○ | ○ | ○ | ○ | EXAMPLE |
| 59 | ⊚ | ○ | ○ | ○ | ○ | ○ | COMPARATIVE EXAMPLE |
| 60 | ⊚ | ○ | ○ | ○ | ○ | ○ | EXAMPLE |
| 61 | ⊚ | ○ | ○ | ○ | ○ | ○ | EXAMPLE |
| 62 | ⊚ | ○ | ○ | ○ | ○ | ○ | EXAMPLE |
| 63 | ⊚ | ○ | ○ | ○ | ○ | ○ | EXAMPLE |
| 64 | ⊚ | ○ | ○ | ○ | ○ | ○ | EXAMPLE |
| 65 | ⊚ | ○ | ○ | ○ | ○ | ○ | EXAMPLE |
| 66 | ⊚ | ○ | ○ | ○ | ○ | ○ | EXAMPLE |
| 67 | ⊚ | ○ | ○ | ○ | ○ | ○ | COMPARATIVE EXAMPLE |
| 68 | ⊚ | ○ | ○ | ○ | ○ | ○ | EXAMPLE |
| 69 | ⊚ | ○ | ○ | ○ | ○ | ○ | EXAMPLE |
| 70 | ⊚ | ○ | ○ | ○ | ○ | ○ | EXAMPLE |
| 71 | ⊚ | ○ | ○ | ○ | ○ | ○ | EXAMPLE |
| 72 | ⊚ | ○ | ○ | ○ | ○ | ○ | EXAMPLE |
| 73 | ⊚ | ○ | ○ | ○ | ○ | ○ | EXAMPLE |
| 74 | ⊚ | ○ | ○ | ○ | ○ | ○ | EXAMPLE |
| 75 | × | ○ | ○ | × | × | ○ | COMPARATIVE EXAMPLE |
| 76 | ⊚ | ○ | ○ | ○ | ○ | ○ | EXAMPLE |
| 77 | ⊚ | ○ | ○ | ○ | ○ | ○ | EXAMPLE |
| 78 | ⊚ | ○ | ○ | ○ | ○ | ○ | EXAMPLE |
| 79 | ⊚ | ○ | ○ | ○ | ○ | ○ | COMPARATIVE EXAMPLE |
| 80 | ⊚ | ○ | ○ | ○ | ○ | ○ | EXAMPLE |
| 81 | ⊚ | ○ | ○ | ○ | ○ | ○ | EXAMPLE |
| 82 | ⊚ | ○ | ○ | ○ | ○ | ○ | EXAMPLE |
| 83 | ⊚ | ○ | ○ | ○ | ○ | ○ | EXAMPLE |
| 84 | × | ○ | ○ | ○ | × | ○ | COMPARATIVE EXAMPLE |
| 85 | ⊚ | ○ | ○ | ○ | ○ | ○ | EXAMPLE |
| 86 | ⊚ | ○ | ○ | ○ | ○ | ○ | EXAMPLE |
| 87 | ⊚ | ○ | ○ | ○ | ○ | ○ | EXAMPLE |
| 88 | ⊚ | ○ | ○ | ○ | ○ | ○ | EXAMPLE |
| 89 | ○ | ○ | ○ | ○ | ○ | ○ | EXAMPLE |
| 90 | ⊚ | ○ | ○ | ○ | ○ | ○ | EXAMPLE |
| 91 | ⊚ | ○ | ○ | ○ | ○ | ○ | EXAMPLE |
| 92 | ⊚ | ○ | ○ | ○ | ○ | ○ | EXAMPLE |
| 93 | ⊚ | ○ | ○ | ○ | ○ | ○ | EXAMPLE |
| 94 | ⊚ | ○ | ○ | ○ | ○ | ○ | EXAMPLE |
| 95 | ⊚ | ○ | ○ | ○ | ○ | ○ | EXAMPLE |
| 96 | ⊚ | ○ | ○ | ○ | ○ | ○ | EXAMPLE |
| 97 | ⊚ | ○ | ○ | ○ | ○ | ○ | EXAMPLE |
| 98 | ⊚ | ○ | ○ | ○ | ○ | ○ | EXAMPLE |
| 99 | ⊚ | ○ | ○ | ○ | ○ | ○ | EXAMPLE |
| 100 | ⊚ | ○ | ○ | ○ | ○ | ○ | EXAMPLE |

TABLE 30

| EXPERIMENTAL EXAMPLE | PLATING ADHESION | SPOT WELDA-BILITY | CORROSION RESISTANCE | CHIPPING RESISTANCE | POWDERING RESISTANCE | PLATING APPEARANCE UNIFORMITY | |
|---|---|---|---|---|---|---|---|
| 101 | ◎ | ○ | ○ | ○ | ○ | ○ | EXAMPLE |
| 102 | ◎ | ○ | ○ | ○ | ○ | ○ | EXAMPLE |
| 103 | ◎ | ○ | ○ | ○ | ○ | ○ | EXAMPLE |
| 104 | ◎ | ○ | ○ | ○ | ○ | ○ | EXAMPLE |
| 105 | ◎ | ○ | ○ | ○ | ○ | ○ | EXAMPLE |
| 106 | ◎ | ○ | ○ | ○ | ○ | ○ | EXAMPLE |
| 107 | ◎ | ○ | ○ | ○ | ○ | ○ | EXAMPLE |
| 108 | ◎ | ○ | ○ | ○ | ○ | ○ | EXAMPLE |
| 109 | ◎ | ○ | ○ | ○ | ○ | ○ | EXAMPLE |
| 110 | ◎ | ○ | ○ | ○ | ○ | ○ | EXAMPLE |
| 111 | ◎ | ○ | ○ | ○ | ○ | ○ | EXAMPLE |
| 112 | ◎ | ○ | ○ | ○ | ○ | ○ | EXAMPLE |
| 113 | ◎ | ○ | ○ | ○ | ○ | ○ | EXAMPLE |
| 114 | ◎ | ○ | ○ | ○ | ○ | ○ | COMPARATIVE EXAMPLE |
| 115 | ◎ | ○ | ○ | ○ | ○ | ○ | EXAMPLE |
| 116 | ◎ | ○ | ○ | ○ | ○ | Δ | COMPARATIVE EXAMPLE |
| 117 | ◎ | ○ | ○ | ○ | ○ | ○ | EXAMPLE |
| 118 | ◎ | ○ | ○ | ○ | ○ | ○ | EXAMPLE |
| 119 | ◎ | ○ | ○ | ○ | ○ | ○ | EXAMPLE |
| 120 | ◎ | ○ | ○ | ○ | ○ | ○ | EXAMPLE |
| 121 | ◎ | ○ | ○ | ○ | ○ | ○ | EXAMPLE |
| 122 | ◎ | ○ | ○ | ○ | ○ | ○ | EXAMPLE |
| 123 | ◎ | ○ | ○ | ○ | ○ | ○ | EXAMPLE |
| 124 | ◎ | ○ | ○ | ○ | ○ | ○ | EXAMPLE |
| 125 | ◎ | ○ | ○ | ○ | ○ | ○ | EXAMPLE |
| 126 | ◎ | ○ | ○ | ○ | ○ | ○ | EXAMPLE |
| 127 | ◎ | ○ | ○ | ○ | ○ | ○ | EXAMPLE |
| 128 | ◎ | ○ | ○ | ○ | ○ | ○ | EXAMPLE |
| 129 | ◎ | ○ | ○ | ○ | ○ | ○ | EXAMPLE |
| 130 | ◎ | ○ | ○ | ○ | ○ | ○ | EXAMPLE |
| 131 | ◎ | ○ | ○ | ○ | ○ | ○ | COMPARATIVE EXAMPLE |
| 132 | ◎ | ○ | ○ | ○ | ○ | ○ | EXAMPLE |
| 133 | ◎ | ○ | ○ | ○ | ○ | ○ | EXAMPLE |
| 134 | ◎ | ○ | ○ | ○ | ○ | ○ | EXAMPLE |
| 135 | ◎ | ○ | ○ | ○ | ○ | ○ | EXAMPLE |
| 136 | ◎ | ○ | ○ | ○ | ○ | ○ | EXAMPLE |
| 137 | ◎ | ○ | ○ | ○ | ○ | ○ | COMPARATIVE EXAMPLE |
| 138 | ◎ | ○ | ○ | ○ | ○ | ○ | EXAMPLE |
| 139 | ◎ | ○ | ○ | ○ | ○ | ○ | EXAMPLE |
| 140 | ◎ | ○ | ○ | ○ | ○ | ○ | EXAMPLE |
| 141 | ◎ | ○ | ○ | ○ | ○ | ○ | EXAMPLE |
| 142 | ◎ | ○ | ○ | ○ | ○ | ○ | EXAMPLE |
| 143 | ◎ | ○ | ○ | ○ | ○ | ○ | EXAMPLE |
| 144 | ◎ | ○ | ○ | ○ | ○ | ○ | EXAMPLE |
| 145 | ◎ | ○ | ○ | ○ | ○ | ○ | EXAMPLE |
| 146 | ◎ | ○ | ○ | ○ | ○ | ○ | EXAMPLE |
| 147 | ◎ | ○ | ○ | ○ | ○ | ○ | EXAMPLE |
| 148 | x | x | ○ | ○ | ○ | ○ | COMPARATIVE EXAMPLE |
| 149 | ◎ | ○ | ○ | ○ | ○ | ○ | EXAMPLE |
| 150 | ◎ | ○ | ○ | ○ | ○ | ○ | EXAMPLE |
| 151 | ◎ | ○ | ○ | ○ | ○ | ○ | EXAMPLE |

TABLE 31

| EXPERIMENTAL EXAMPLE | PLATING ADHESION | SPOT WELDA-BILITY | CORROSION RESISTANCE | CHIPPING RESISTANCE | POWDERING RESISTANCE | PLATING APPEARANCE UNIFORMITY | |
|---|---|---|---|---|---|---|---|
| 152 | ◎ | ○ | ○ | ○ | ○ | ○ | EXAMPLE |
| 153 | ◎ | ○ | ○ | ○ | ○ | ○ | EXAMPLE |
| 154 | ◎ | ○ | ○ | ○ | ○ | ○ | EXAMPLE |
| 155 | ◎ | ○ | ○ | ○ | ○ | ○ | COMPARATIVE EXAMPLE |
| 156 | ◎ | ○ | ○ | ○ | ○ | ○ | EXAMPLE |
| 157 | ◎ | ○ | ○ | ○ | ○ | ○ | EXAMPLE |
| 158 | ◎ | ○ | ○ | ○ | ○ | ○ | EXAMPLE |
| 159 | ◎ | ○ | ○ | ○ | ○ | ○ | EXAMPLE |
| 160 | ◎ | ○ | ○ | ○ | ○ | ○ | EXAMPLE |

TABLE 31-continued

| EXPERIMENTAL EXAMPLE | PLATING ADHESION | SPOT WELDA-BILITY | CORROSION RESISTANCE | CHIPPING RESISTANCE | POWDERING RESISTANCE | PLATING APPEARANCE UNIFORMITY | |
|---|---|---|---|---|---|---|---|
| 161 | ⊚ | ○ | ○ | ○ | ○ | ○ | EXAMPLE |
| 162 | ⊚ | ○ | ○ | ○ | ○ | ○ | EXAMPLE |
| 163 | ⊚ | ○ | ○ | ○ | ○ | ○ | COMPARATIVE EXAMPLE |
| 164 | ⊚ | ○ | ○ | ○ | ○ | ○ | EXAMPLE |
| 165 | ⊚ | ○ | ○ | ○ | ○ | ○ | COMPARATIVE EXAMPLE |
| 166 | ⊚ | ○ | ○ | ○ | ○ | ○ | EXAMPLE |
| 167 | ⊚ | ○ | ○ | ○ | ○ | ○ | EXAMPLE |
| 168 | x | ○ | ○ | ○ | ○ | x (UNPLATING) | COMPARATIVE EXAMPLE |
| 169 | ⊚ | ○ | ○ | ○ | ○ | ○ | EXAMPLE |
| 170 | ⊚ | ○ | ○ | ○ | ○ | ○ | EXAMPLE |
| 171 | ⊚ | ○ | ○ | ○ | ○ | ○ | EXAMPLE |
| 172 | ⊚ | ○ | ○ | ○ | ○ | ○ | EXAMPLE |
| 173 | ⊚ | ○ | ○ | ○ | ○ | ○ | EXAMPLE |
| 174 | ⊚ | ○ | ○ | ○ | ○ | ○ | COMPARATIVE EXAMPLE |
| 175 | ⊚ | ○ | ○ | ○ | ○ | ○ | EXAMPLE |
| 176 | ⊚ | ○ | ○ | ○ | ○ | ○ | EXAMPLE |
| 177 | ⊚ | ○ | ○ | ○ | ○ | ○ | EXAMPLE |
| 178 | ⊚ | ○ | ○ | ○ | ○ | ○ | EXAMPLE |
| 179 | ⊚ | ○ | ○ | ○ | ○ | ○ | EXAMPLE |
| 180 | x | ○ | ○ | x | x | ○ | COMPARATIVE EXAMPLE |
| 181 | x | ○ | ○ | ○ | ○ | x (UNPLATING) | COMPARATIVE EXAMPLE |
| 182 | ⊚ | ○ | ○ | ○ | ○ | ○ | EXAMPLE |
| 183 | ⊚ | ○ | ○ | ○ | ○ | ○ | COMPARATIVE EXAMPLE |
| 184 | ⊚ | ○ | ○ | ○ | ○ | ○ | EXAMPLE |
| 185 | ⊚ | ○ | ○ | ○ | ○ | ○ | EXAMPLE |
| 186 | ⊚ | ○ | ○ | ○ | ○ | ○ | EXAMPLE |
| 187 | ⊚ | ○ | ○ | ○ | ○ | ○ | COMPARATIVE EXAMPLE |
| 188 | ⊚ | x | ○ | ○ | ○ | ○ | COMPARATIVE EXAMPLE |
| 189 | ⊚ | ○ | ○ | ○ | ○ | ○ | COMPARATIVE EXAMPLE |
| 190 | | | | | | | COMPARATIVE EXAMPLE |
| 191 | ⊚ | ○ | ○ | ○ | ○ | ○ | COMPARATIVE EXAMPLE |
| 192 | | | | | | | COMPARATIVE EXAMPLE |
| 193 | | | | | | | COMPARATIVE EXAMPLE |
| 194 | ⊚ | x | ○ | ○ | ○ | ○ | COMPARATIVE EXAMPLE |
| 195 | | | | | | | COMPARATIVE EXAMPLE |
| 196 | ⊚ | x | ○ | ○ | ○ | ○ | COMPARATIVE EXAMPLE |
| 197 | ⊚ | x | ○ | ○ | ○ | ○ | COMPARATIVE EXAMPLE |
| 198 | x | ○ | ○ | ○ | ○ | x | COMPARATIVE EXAMPLE |
| 199 | ⊚ | ○ | ○ | ○ | ○ | ○ | EXAMPLE |
| 200 | ⊚ | ○ | ○ | ○ | ○ | Δ | COMPARATIVE EXAMPLE |
| 201 | ○ | ○ | ○ | ○ | ○ | ○ | EXAMPLE |
| 202 | ○ | ○ | ○ | ○ | ○ | Δ | COMPARATIVE EXAMPLE |

In the experimental example 30 being the example of the present invention, the effective Al amount was 0.180 mass %, but, the Fe—Al alloy was uniformly generated in the width direction, and thus the reduction in plating adhesion described in Patent Document 12 was not observed, and the plating adhesion was improved on the contrary.

The experimental example 187 is an example in which since the C content was small, the volume fraction of the hard phase became small, and thus it was not possible to obtain sufficient strength, ductility, and hole expandability.

The experimental example 188 is an example in which since the C content was large, the spot weldability deteriorated. Further, the fraction of the martensite became large, and thus the fatigue resistance, the ductility, the hole expandability, and the bendability were inferior.

The experimental example 189 is an example in which since the Si content was small, large amounts of pearlite and coarse cementite were generated in the annealing step and the plating step, and thus it was not possible to sufficiently obtain the formability of the steel sheet.

The experimental example 190 is an example in which since the slab cracked during the heating in the hot rolling step due to the large Si content, the experiment was stopped.

The experimental example 191 is an example in which since the Mn content was small, large amounts of pearlite and coarse cementite were generated in the annealing step and the plating step, and thus it was not possible to sufficiently obtain the formability of the steel sheet.

The experimental example 192 is an example in which, due to the large Mn content, the slab cracked during the heating in the hot rolling step, so that the experiment was stopped.

The experimental example 193 is an example in which when the slab was rolled in the hot rolling step, a crack occurred due to the large P content, so that the experiment was stopped.

The experimental example 194 is an example in which since large amounts of coarse sulfides were generated due to the large S content, the ductility, the hole expandability, the bendability, the spot weldability, and the fatigue resistance deteriorated.

The experimental example 195 is an example in which, due to the large Al content, the slab cracked during transfer in the hot rolling step, so that the experiment was stopped.

The experimental example 196 is an example in which since large amounts of coarse nitrides were generated due to the large N content, the ductility, the hole expandability, the bendability, the spot weldability, and the fatigue resistance deteriorated.

The experimental example 197 is an example in which since large amounts of coarse oxides were generated due to the large O content, the ductility, the hole expandability, the bendability, the spot weldability, and the fatigue resistance deteriorated.

The experimental examples 28, 131, and 155 are examples in each of which since the value of the formula (1) was small in the hot rolling step, the fraction of the hard phase (V1/V2) in the surface layer became large, and thus it was not possible to obtain sufficient bendability.

The experimental examples 51, 114, and 165 are examples in each of which since the value of the formula (1) was large in the hot rolling step, the decarburization in the surface layer progressed excessively and the fraction of the hard phase (V1/V2) became small, resulting in that it was not possible to obtain sufficient fatigue resistance.

The experimental example 84 is an example in which since the average heating rate in the temperature region between 600° C. and 750° C. in the annealing step was small, the growth of oxide inside the steel sheet progressed excessively, and a coarse oxide to be a starting point of breakage was generated, resulting in that the bendability and the fatigue resistance deteriorated. Note that in accordance with the deterioration of bendability, the plating peeling caused by bending crack of the steel sheet occurred in the test of evaluating the plating adhesion and the powdering resistance, resulting in that the plating adhesion and the powdering resistance deteriorated as well.

In the experimental example 202, since the average heating rate in the temperature region between 600° C. and 750° C. in the annealing step was excessively large, the difference between the maximum value and the minimum value of the thickness of the fine-grain layer in the steel sheet width direction exceeded 2.0 and further, the difference between the maximum value and the minimum value of the thickness of the Fe—Al alloy layer in the steel sheet width direction exceeded 0.5 For this reason, the plating appearance was slightly nonuniform.

The experimental example 67 is an example in which since the maximum heating temperature (TM) was higher than the Ac3 temperature in the annealing step, the volume fraction of the ferrite phase at ¼ thickness became small, and thus the ductility and the bendability deteriorated.

The experimental example 183 is an example in which since the maximum heating temperature (TM) was lower than the (Ac1+20)° C. in the annealing step, the coarse iron-based carbide was left undissolved, and thus the ductility and the hole expandability deteriorated.

The experimental example 46 is an example in which the air ratio in the preheating zone was small in the heating step of the annealing step, so that the plating adhesion deteriorated. Note that since the plating peeling occurred during the bending deformation due to the deterioration of the plating adhesion, the powdering resistance deteriorated as well. Further, the bad appearance due to the unplating also occurred.

The experimental example 16 is an example in which since the decarburization in the surface layer progressed excessively due to the large air ratio in the preheating zone in the heating step of the annealing step, the fraction of the hard phase (V1/V2) became small, and the fatigue resistance deteriorated. Besides, since the average thickness of the fine-grain layer become large, the alloying of the plating layer (generation of Zn—Fe alloy) progressed excessively and the Fe content in the plating layer was increased, resulting in that the plating adhesion, the chipping resistance, and the powdering resistance deteriorated.

The experimental example 181 is an example in which since $Log(P(H_2O)/P(H_2))$ in the preheating zone was small in the heating step of the annealing step, the surface layer was not refined, resulting in that the plating adhesion deteriorated. Note that the average grain diameter of ferrite in the surface was 3.2 and the maximum diameter of the oxide inside the steel sheet in the range of 0.5 μm from the surface was less than 0.01 Further, the bad appearance due to the unplating also occurred.

The experimental example 168 is an example in which since $Log(P(H_2O)/P(H_2))$ in the soaking zone was small in the heating step of the annealing step, the grain diameter of the base steel sheet surface layer did not become fine, resulting in that the plating adhesion deteriorated. Note that the average grain diameter of ferrite in the base steel sheet surface was 3.4 and the maximum diameter of the oxide inside the steel sheet in the range of 0.5 μm from the surface was less than 0.01

The experimental example 198 is an example in which since $Log(P(H_2O)/P(H_2))$ in the preheating zone was large in the heating step of the annealing step, the fine-grain layer of the surface layer became excessively thick, the alloying of the plating layer (generation of Zn—Fe alloy) progressed excessively, and the Fe content in the plating layer was increased, resulting in that the plating adhesion deteriorated. Further, the difference between the maximum value and the minimum value of the thickness of the Fe—Al alloy layer in the width direction of the steel sheet exceeded 0.5 and the plating appearance was nonuniform.

The experimental example 75 is an example in which since $Log(P(H_2O)/P(H_2))$ in the soaking zone was particularly large in the heating step of the annealing step, the decarburization in the surface layer progressed excessively, so that the fraction of the hard phase (V1/V2) became small, and the fatigue resistance deteriorated. In addition, since the fine-grain layer of the surface layer of the base steel sheet became excessively thick, the alloying of the plating layer (generation of Zn—Fe alloy) progressed excessively and the Fe content in the plating layer was increased, resulting in that the plating adhesion, the chipping resistance, and the powdering resistance deteriorated.

The experimental example 22 is an example in which since the average cooling rate between 760° C. and 700° C. (cooling rate 1) was small in the cooling step of the annealing step, large amounts of pearlite were generated, resulting in that the ductility and the hole expandability deteriorated.

The experimental example 49 is an example in which since the average cooling rate between 760° C. and 700° C. (cooling rate 1) was large in the cooling step of the annealing step, the volume fraction of the ferrite phase at ¼ thickness became small, resulting in that it was not possible to obtain sufficient ductility.

The experimental example 137 is an example in which since the average cooling rate between 650° C. and 500° C. (cooling rate 2) was small in the cooling step of the annealing step, large amounts of pearlite were generated, resulting in that the ductility and the hole expandability deteriorated.

The experimental example 2 is an example in which since the effective Al concentration in the plating bath was low in the plating step, the Fe—Al alloy layer with a sufficient thickness was not generated and the Fe content in the plating layer became large, resulting in that it was not possible to obtain the plating adhesion, the chipping resistance, the powdering resistance, and the plating appearance uniformity.

The experimental example 14 is an example in which since the effective Al concentration in the plating bath was extremely low in the plating step, the Fe—Al alloy layer was not formed and the Fe content in the plating layer was increased excessively, resulting in that it was not possible to obtain sufficient plating adhesion, chipping resistance, powdering resistance, and plating appearance uniformity.

The experimental example 148 is an example in which since the effective Al concentration in the plating bath was high in the plating step, the Al content in the plating layer was increased excessively, resulting in that it was not possible to obtain sufficient plating adhesion and spot weldability.

The experimental example 180 is an example in which since the cooling rate after plating was small in the plating step, the Fe content in the plating layer was increased excessively, resulting in that it was not possible to obtain sufficient plating adhesion, chipping resistance, and powdering resistance.

The experimental examples 8, 17, 31, 81, and 179 are examples in each of which the martensite transformation treatment was performed in the cooling step of the annealing step, and it was possible to obtain a high-strength hot-dip galvanized steel sheet excellent in the formability, the plating adhesion, the weldability, the corrosion resistance, and the fatigue resistance.

The experimental examples 37, 45, 66, 89, 102, 104, 108, 142, 149, and 162 are examples in each of which the bainite transformation treatment 1 was performed in the cooling step of the annealing step, and it was possible to obtain a high-strength hot-dip galvanized steel sheet excellent in the formability, the plating adhesion, the weldability, the corrosion resistance, and the fatigue resistance.

The experimental example 43 is an example in which the bainite transformation treatment 1 was performed in the cooling step of the annealing step, and since the treatment temperature was high, the pearlite and the coarse cementite were generated to deteriorate the ductility and the hole expandability.

The experimental example 174 is an example in which the bainite transformation treatment 1 was performed in the cooling step of the annealing step, and since the treatment time was long, the pearlite and the coarse cementite were generated to deteriorate the ductility and the hole expandability.

The experimental examples 25, 41, 55, 90, 113, 135, 152, 170, and 184 are examples in each of which the bainite transformation treatment 2 was performed in the cooling step after plating, and it was possible to obtain a high-strength hot-dip galvanized steel sheet excellent in the formability, the plating adhesion, the weldability, the corrosion resistance, and the fatigue resistance.

The experimental example 163 is an example in which the bainite transformation treatment 2 was performed in the cooling step after plating, and is an example in which the treatment temperature was high, so that large amounts of retained austenite were generated to impair the bendability.

The experimental examples 5, 20, 48, 53, 62, 73, 76, 87, 94, 112, 129, and 186 are examples in each of which the reheat treatment was performed in the cooling step after plating, and it was possible to obtain a high-strength hot-dip galvanized steel sheet excellent in the formability, the plating adhesion, the weldability, the corrosion resistance, and the fatigue resistance.

The experimental example 18 is an example in which the martensite transformation treatment and the bainite transformation treatment 1 were performed in the cooling step of the annealing step, and it was possible to obtain a high-strength hot-dip galvanized steel sheet excellent in the formability, the plating adhesion, the weldability, the corrosion resistance, and the fatigue resistance.

The experimental examples 9, 110, 132, 138, 154, and 169 are examples in each of which the bainite transformation treatment 1 was performed in the cooling step of the annealing step, and the bainite transformation treatment 2 was performed in the cooling step after plating, and it was possible to obtain a high-strength hot-dip galvanized steel sheet excellent in the formability, the plating adhesion, the weldability, the corrosion resistance, and the fatigue resistance.

The experimental examples 24, 34, and 96 are examples in each of which the bainite transformation treatment 1 was performed in the cooling step of the annealing step, and then the reheat treatment was performed in the cooling step after plating, and it was possible to obtain a high-strength hot-dip galvanized steel sheet excellent in the formability, the plating adhesion, the weldability, the corrosion resistance, and the fatigue resistance.

The experimental example 11 is an example in which the bainite transformation treatment 2 and the reheat treatment were performed in the cooling step after plating, and it was possible to obtain a high-strength hot-dip galvanized steel sheet excellent in the formability, the plating adhesion, the weldability, the corrosion resistance, and the fatigue resistance. However, the plating appearance was slightly non-uniform, as will be described later.

The experimental example 172 is an example in which the bainite transformation treatment 1 was performed in the cooling step of the annealing step, and then the bainite transformation treatment 2 and the reheat treatment were performed in the cooling step after plating, and it was possible to obtain a high-strength hot-dip galvanized steel sheet excellent in the formability, the plating adhesion, the weldability, the corrosion resistance, and the fatigue resistance.

The experimental example 79 is an example in which since the diameter of the roll used for working was small in the bending-unbending working step of the working step, the strain was excessively introduced into the steel sheet surface layer portion, resulting in that the ductility deteriorated.

The experimental example 59 is an example in which since the diameter of the roll used for working was large in the bending-unbending working step of the working step, the strain was not sufficiently introduced into the steel sheet surface layer portion, resulting in that large amounts of retained austenite existed in the steel sheet surface layer portion to deteriorate the bendability.

In each of the experimental examples 3, 11, and 116, since the coiling temperature in the hot rolling step was 650° C. or more, the difference between the maximum value and the minimum value of the thickness of the fine-grain layer in the steel sheet width direction exceeded 2.0 and further, the difference between the maximum value and the minimum value of the thickness of the Fe—Al alloy layer in the steel sheet width direction exceeded 0.5 so that the plating appearance was slightly nonuniform.

On the other hand, in each of the experimental examples 4 and 12, although the coiling temperature in the hot rolling step was 650° C. or more, similarly to the above, by increasing the length of the acid pickling time in the acid pickling step, the difference between the maximum value and the minimum value of the thickness of the fine-grain layer in the steel sheet width direction was favorably changed to fall within 2.0 and the difference between the maximum value and the minimum value of the thickness of the Fe—Al alloy layer in the steel sheet width direction was favorably changed to fall within 0.5 resulting in that good plating appearance uniformity was obtained.

In the experimental example 200, although the coiling temperature was less than 650° C., the acid pickling time was short to be 15 seconds, so that it was not possible to completely remove the nonuniformly-generated internal oxide layer, the difference between the maximum value and the minimum value of the thickness of the fine-grain layer in the width direction of the steel sheet exceeded 2.0 and further, the difference between the maximum value and the minimum value of the thickness of the Fe—Al alloy layer in the steel sheet width direction exceeded 0.5 resulting in that the plating appearance was slightly nonuniform.

The respective embodiments of the present invention have been described above in detail, but, the above-described embodiments merely illustrate a concrete example of implementing the present invention. The technical scope of the present invention should not to be construed in a restrictive manner by these embodiments. That is, the present invention may be implemented in various forms without departing from the technical spirit or main features thereof.

INDUSTRIAL APPLICABILITY

The present invention is a technique effective for a high-strength hot-dip galvanized steel sheet excellent in plating appearance uniformity, formability, fatigue resistance, weldability, corrosion resistance, and plating adhesion, and a manufacturing method thereof. Further, according to an embodiment of the present invention, it is possible to provide a high-strength hot-dip galvanized steel sheet excellent in ductility, hole expandability, and bendability, excellent in plating adhesion after formation, having high fatigue limit, and provided with excellent spot weldability and corrosion resistance, and a manufacturing method thereof.

The invention claimed is:

1. A hot-dip galvanized steel sheet comprising a hot-dip galvanizing layer on at least one side of a base steel sheet, wherein:
the base steel sheet has chemical components containing, in mass %,
C: 0.040% to 0.280%,
Si: 0.05% to 2.00%,
Mn: 0.50% to 3.50%,
P: 0.0001% to 0.1000%,
S: 0.0001% to 0.0100%,
Al: 0.001% to 1.500%,
N: 0.0001% to 0.0100%,
O: 0.0001% to 0.0100%,
Ti: 0% to 0.150%,
Nb: 0% to 0.100%,
V: 0% to 0.300%,
Cr: 0% to 2.00%,
Ni: 0% to 2.00%,
Cu: 0% to 2.00%,
Mo: 0% to 2.00%,
B: 0% to 0.0100%,
W: 0% to 2.00%,
Ce, Mg, Zr, La, and REM: 0% to 0.0100% in total, and
a balance comprising Fe and impurities;
the base steel sheet has a microstructure in which:
in a ⅛ thickness to ⅜ thickness range whose middle is a ¼ thickness of a total thickness of the base steel sheet from a surface of the base steel sheet,
ferrite phase is 50% or more and 97% or less by volume fraction,
a total of a hard structure consisting of one or more of bainite phase, bainitic ferrite phase, fresh martensite phase, and tempered martensite phase is 3% or more by volume fraction,
retained austenite phase is 0% to 8% by volume fraction, and
a total of pearlite phase and coarse cementite phase is 0% to 8% by volume fraction;
in a surface layer portion from an interface between the hot-dip galvanizing layer and the base steel sheet up to a 20 μm depth in a steel sheet thickness direction,
retained austenite is 0% to 3% by volume fraction; and
V1/V2 being a ratio between a volume fraction V1 of the hard structure in the surface layer portion and a volume fraction V2 of the hard structure in the ⅛ thickness to ⅜ thickness range whose middle is the ¼ thickness from the surface of the steel sheet, is set to fall within a range of 0.10 or more and 0.90 or less; and
in the hot-dip galvanizing layer, a Fe content is more than 0% and 3.0% or less, and an Al content is more than 0% and 1.0% or less,
the hot-dip galvanized steel sheet comprising:
at an interface between the hot-dip galvanizing layer and the base steel sheet, a Fe—Al alloy layer in which an average thickness is 0.1 μm to 2.0 μm, and a difference between a maximum thickness and a minimum thickness in a steel sheet width direction is within 0.5 μm; and
a fine-grain layer directly brought into contact with the Fe—Al alloy layer in the base steel sheet, the fine-grain layer with an average thickness of 0.1 urn to 5.0 μm, and an average grain diameter of 0.1 μm to 3.0 μm, the fine-grain layer containing an oxide of one or more of Si and Mn with a maximum diameter of 0.01 μm to 0.4 μm, and the fine-grain layer with a difference between a maximum thickness and a minimum thickness in the steel sheet width direction of within 2.0 μm.

2. The hot-dip galvanized steel sheet according to claim 1, wherein
a plating deposition amount per one side of the hot-dip galvanizing layer is 10 g/m² or more and 100 g/m² or less.

3. The hot-dip galvanized steel sheet according to claim 2, wherein
the base steel sheet further contains, in mass %, one or two or more selected from a group consisting of
Ti: 0.001% to 0.150%,
Nb: 0.001% to 0.100%, and
V: 0.001% to 0.300%.

4. The hot-dip galvanized steel sheet according to claim 2, wherein
the base steel sheet further contains, in mass %, one or two or more selected from a group consisting of
Cr: 0.01% to 2.00%,
Ni 0.01% to 2.00%,
Cu: 0.01% to 2.00%,
Mo: 0.01% to 2.00%,
B: 0.0001% to 0.0100%, and
W: 0.01% to 2.00%.

5. The hot-dip galvanized steel sheet according to claim 2, wherein
the base steel sheet further contains, in mass %, one or two or more selected from a group consisting of Ca, Ce, Mg, Zr, La, and REM of 0.0001% to 0.0100% in total.

6. The hot-dip galvanized steel sheet according to claim 1, wherein
the base steel sheet further contains, in mass %, one or two or more selected from a group consisting of
Ti: 0.001% to 0.150%,
Nb: 0.001% to 0.100%, and
V: 0.001% to 0.300%.

7. The hot-dip galvanized steel sheet according to claim 1, wherein
the base steel sheet further contains, in mass %, one or two or more selected from a group consisting of
Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

8. The hot-dip galvanized steel sheet according to claim 1, wherein
the base steel sheet further contains, in mass %, one or two or more selected from a group consisting of Ca, Ce, Mg, Zr, La, and REM of 0.0001% to 0.0100% in total.

* * * * *